US008483501B2

(12) United States Patent

Lee et al.

(10) Patent No.: US 8,483,501 B2

(45) Date of Patent: Jul. 9, 2013

(54) METHOD AND DEVICE FOR TRANSFORMATION OF IMAGE AND METHOD AND DEVICE FOR REVERSE TRANSFORMATION OF IMAGE

(75) Inventors: Tammy Lee, Seoul (KR); Il-Koo Kim, Osan-si (KR); Min-Su Cheon, Suwon-si (KR); Yoon-Mi Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 13/188,868

(22) Filed: Jul. 22, 2011

(65) Prior Publication Data

US 2012/0020583 A1 Jan. 26, 2012

Related U.S. Application Data

(63) Continuation of application No. PCT/KR2010/000443, filed on Jan. 12, 2010.

(60) Provisional application No. 61/146,372, filed on Jan. 22, 2009.

(51) Int. Cl.
*G06K 9/36* (2006.01)

(52) U.S. Cl.
USPC ........... 382/250; 382/251; 382/233; 382/232; 382/277; 382/248; 375/240.02; 375/240.21; 375/240.24; 375/240.23

(58) Field of Classification Search
USPC ................. 382/250, 162, 164, 232, 233, 128, 382/248, 199, 277; 375/240.03, 240.2, E07.241, 375/E07.232, 240.24, 240.23
See application file for complete search history.

(56) References Cited

U.S. PATENT DOCUMENTS

| | | | | | |
|---|---|---|---|---|---|
| 6,044,176 | A * | 3/2000 | Kim et al. | ..................... | 382/233 |
| 6,137,916 | A * | 10/2000 | Chang et al. | .................. | 382/250 |
| 6,160,920 | A * | 12/2000 | Shyu | ............................. | 382/250 |
| 6,215,909 | B1 * | 4/2001 | Chang et al. | .................. | 382/250 |
| 6,445,829 | B1 * | 9/2002 | Shyu | ............................. | 382/250 |
| 6,870,885 | B2 * | 3/2005 | LaRocca et al. | ........... | 375/240.2 |
| 6,876,704 | B2 * | 4/2005 | LaRocca et al. | ........... | 375/240.2 |
| 6,882,685 | B2 | 4/2005 | Malvar | | |
| 2005/0213659 | A1 * | 9/2005 | Malvar | ..................... | 375/240.03 |
| 2007/0196025 | A1 * | 8/2007 | Tran et al. | ..................... | 382/250 |

FOREIGN PATENT DOCUMENTS

| | | | |
|---|---|---|---|
| KR | 1997-0022846 | A | 5/1997 |
| KR | 2003-0053108 | A | 6/2003 |
| KR | 10-0790846 | B1 | 1/2008 |

OTHER PUBLICATIONS

International Search Report issued Aug. 25, 2010 in counterpart International Application No. PCT/KR2010/000443.

Chen, et al., "A Fast Computational Algorithm for the Discrete Cosine Transform", IEEE Transactions on Communications, vol. COM-25, No. 9, Sep. 1977, pp. 1004-1009.

Liang, et al., "Fast Multiplierless Approximations of the DCT With the Lifting Scheme", IEEE Transactions on Signal Processing, vol. 49, No. 12, Dec. 2001, pp. 3032-3044.

Loeffler, et al., "Practical Fast 1-D DCT Algorithms with 11 Multiplications", Institute for Signal and Information Processing, 1989, pp. 988-991.

* cited by examiner

*Primary Examiner* — Mekonen Bekele

(74) *Attorney, Agent, or Firm* — Sughrue Mion, PLLC

(57) ABSTRACT

Provided are methods and apparatuses for transforming and inverse-transforming an image. The method of transforming an image includes: generating a substituted N×N transformation matrix by substituting elements of an N×N transformation matrix used for a 1-dimensional (1D) discrete cosine transform (DCT) of a N×N block of the image with values based on N variables, where N is an integer; obtaining a multiplication matrix of the substituted N×N transformation matrix and a transposed matrix of the substituted N×N transformation matrix; obtaining the N variables that enable a sum of squares of elements excluding diagonal components of the obtained multiplication matrix to be a minimum; and transforming the N×N block by using the substituted N×N transformation matrix, which is substituted with the values based on the obtained N variables.

42 Claims, 98 Drawing Sheets

| | | | | | | | | | | | | | | | |
|---|---|---|---|---|---|---|---|---|---|---|---|---|---|---|---|
| a8 | a8 | a8 | a8 | a8 | a8 | a8 | a8 | a8 | a8 | a8 | a8 | a8 | a8 | a8 | a8 |
| a1 | a15*a12 +a1*a4 | -a8*(-a15*a12 +a15*a4-a1*a4 -a1*a12) | a8* (a15 +a1) | -a8* (a15 -a1) | a8*(a15*a4 +a15*a12 -a1*a12+a1*a4) | -a15*a4 +a1*a12 | a15 | -a15 | a15*a4 -a1*a12 | -a8*(a15*a4 +a15*a12 -a1*a12+a1*a4) | a8* (a15-a1) | -a8* (a15+a1) | a8*(-a15*a12 +a15*a4 -a1*a4-a1*a12) | -a15*a12 -a1*a4 | -a1 |
| a2 | a8* (a14+a2) | -a8*(-a14-a2) | a14 | -a14 | a8*(a14-a2) | -a8* (a14+a2) | -a2 | -a2 | -a8* (a14+a2) | a8*(a14-a2) | -a14 | a14 | -a8*(a14-a2) | a8* (a14+a2) | a2 |
| a3 | a3*a12 +a13*a4 | a8*(-a3*a12 +a3*a4-a13*a4 -a13*a12) | -a8* (a3- a13) | -a8* (a3+ a13) | -a8*(a3*a12 +a3*a4+a13*a4 -a13*a12) | -a3*a4 +a13*a12 | -a13 | a13 | a3*a4 -a13*a12 | a8*(a3*a12 +a3*a4+a13*a4 -a13*a12) | a8* (a3+a13) | a8* (a3-a13) | -a8*(-a3*a12 +a3*a4+a13*a4 -a13*a12) | -a3*a12 -a13*a4 | -a3 |
| a4 | a12 | -a12 | -a4 | -a4 | -a12 | a12 | a4 | a4 | a12 | -a12 | -a4 | -a4 | -a12 | a12 | a4 |
| a5 | a11*a4 -a5*a12 | -a8*(a11*a12 +a11*a4+a5*a4 -a5*a12) | -a8* (a11 +a5) | -a8* (-a11 +a5) | a8*(-a11*a4 +a11*a12+ a5*a12+a5*a4) | a11*a12 -a5*a4 | a11 | -a11 | a11*a12 -a5*a4 | -a8*(-a11*a4 +a11*a2 +a5*a12+a5*a4) | a8* (-a11+a5) | a8* (a11+a5) | a8*(a11*a12 +a11*a4+a5*a4 -a5*a12) | -a11*a4 +a5*a12 | -a5 |
| a6 | -a8* (a6-a10) | -a8*(a6+a10) | -a10 | a10 | a8*(a6+a10) | a8* (a6-a10) | -a6 | -a6 | a8* (a6-a10) | a8*(a6+a10) | a10 | -a10 | -a8*(a6+a10) | -a8* (a6-a10) | a6 |
| a7 | -a7*a4 +a9*a12 | -a8*(a7*a4 +a7*a12- a9*a12+a9*a4) | a8* (a7 -a9) | a8* (a7 +a9) | -a8*(a7*a4 -a7*a12 -a9*a12-a9*a4) | -a7*a12 -a9*a4 | -a9 | a9 | a7*a12 +a9*a4 | a8*(a7*a4 -a7*a12 -a9*a12-a9*a4) | -a8* (a7+a9) | -a8* (a7-a9) | a8*(a7*a4 +a7*a12 -a9*a12+a9*a4) | a7*a4 -a9*a12 | -a7 |
| a8 | -a8 | -a8 | a8 | a8 | -a8 | -a8 | a8 | a8 | -a8 | -a8 | a8 | a8 | -a8 | -a8 | a8 |
| a9 | -a7*a12 -a9*a4 | a8*(a7*a4 -a7*a12 -a9*a12-a9*a4) | a8* (a7 +a9) | a8* (a7 -a9) | -a8*(a7*a4 +a7*a12 -a9*a12+a9*a4) | a7*a4 -a9*a12 | a7 | -a7 | -a7*a4 +a9*a12 | a8*(a7*a4 +a7*a12 -a9*a12+a9*a4) | a8* (a7-a9) | -a8* (a7+a9) | -a8*(a7*a4 -a7*a12 -a9*a12-a9*a4) | a7*a12 +a9*a4 | -a9 |
| a10 | -a8* (a6+a10) | a8*(a6-a10) | a6 | -a6 | -a8*(a6-a10) | a8* (a6+a10) | -a10 | -a10 | a8* (a6+a10) | -a8*(a6-a10) | -a6 | a6 | a8*(a6-a10) | -a8* (a6+a10) | a10 |
| a11 | -a11*a12 -a5*a4 | a8*(-a11*a4 +a11*a12 +a5*a12+a5*a4) | a8* (-a11 +a5) | -a8* (a11 +a5) | a8*(a11*a12 +a11*a4 +a5*a4-a5*a12) | a11*a4 -a5*a12 | -a5 | a5 | -a11*a4 +a5*a12 | -a8*(a11*a12 +a11*a4+a5*a4 -a5*a12) | a8* (a11+a5) | -a8* (-a11+a5) | -a8*(-a11*a4 +a11*a12 +a5*a12+a5*a4) | a11*a12 +a5*a4 | -a11 |
| a12 | -a4 | a4 | -a12 | -a12 | a4 | -a4 | a12 | a12 | -a4 | a4 | -a12 | -a12 | a4 | -a4 | a12 |
| a13 | -a3*a4 +a13*a12 | a8*(a3*a12 +a3*a4+a13*a4 -a13*a12) | -a8* (a3 +a13) | a8* (a3 -a13) | a8*(-a3*a12 +a3*a4-a13*a4 -a13*a12) | -a3*a12 -a13*a4 | a3 | -a3 | a3*a12 +a13*a4 | -a8*(-a3*a12 +a3*a4-a13*a4 -a13*a12) | -a8* (a3-a13) | a8* (a3+a13) | -a8*(a3*a12 +a3*a4+a13*a4 -a13*a12) | a3*a4 -a13*a12 | -a13 |
| a14 | a8* (a14-a2) | a8*(a14+a2) | -a2 | a2 | -a8*(a14+a2) | -a8* (a14-a2) | -a14 | -a14 | -a8* (a14-a2) | -a8*(a14+a2) | a2 | -a2 | a8*(a14+a2) | a8* (a14-a2) | a14 |
| a15 | a15*a4 -a1*a12 | a8*(a15*a4 +a15*a12 -a1*a12+a1*a4) | a8* (a15 -a1) | a8* (a15 +a1) | a8*(-a15*a12 +a15*a4 -a1*a4-a1*a12) | a15*a12 +a1*a4 | -a1 | a1 | -a15*a12 -a1*a4 | -a8*(-a15*a12 +a15*a4 -a1*a4-a1*a12) | -a8* (a15+a1) | -a8* (a15-a1) | -a8*(a15*a4 +a15*a12 -a1*a12+a1*a4) | -a15*a4 +a1*a12 | -a15 |

| | | | | | | | | | | | | | | | |
|---|---|---|---|---|---|---|---|---|---|---|---|---|---|---|---|
| 207 | 209 | 209 | 208 | 207 | 209 | 208 | 209 | 207 | 209 | 208 | 209 | 207 | 208 | 209 | 209 |
| 209 | 212 | 212 | 211 | 209 | 211 | 210 | 212 | 209 | 212 | 210 | 211 | 209 | 211 | 212 | 212 |
| 209 | 212 | 212 | 211 | 209 | 211 | 210 | 211 | 209 | 212 | 210 | 211 | 209 | 211 | 212 | 212 |
| 208 | 211 | 211 | 210 | 208 | 210 | 209 | 211 | 208 | 211 | 209 | 210 | 208 | 210 | 211 | 211 |
| 207 | 209 | 209 | 208 | 207 | 208 | 208 | 209 | 207 | 209 | 208 | 208 | 207 | 208 | 209 | 209 |
| 209 | 211 | 211 | 210 | 208 | 210 | 210 | 211 | 208 | 211 | 210 | 210 | 208 | 210 | 211 | 211 |
| 208 | 210 | 210 | 209 | 208 | 210 | 209 | 210 | 208 | 211 | 209 | 210 | 208 | 209 | 210 | 210 |
| 209 | 212 | 212 | 211 | 209 | 211 | 210 | 212 | 209 | 212 | 210 | 211 | 209 | 211 | 212 | 212 |
| 207 | 209 | 209 | 208 | 207 | 209 | 208 | 209 | 207 | 210 | 208 | 209 | 207 | 208 | 209 | 209 |
| 209 | 212 | 212 | 211 | 209 | 211 | 210 | 212 | 210 | 212 | 210 | 211 | 209 | 211 | 212 | 212 |
| 208 | 210 | 210 | 209 | 208 | 210 | 209 | 210 | 208 | 210 | 209 | 210 | 208 | 209 | 210 | 210 |
| 209 | 211 | 211 | 210 | 208 | 210 | 210 | 211 | 209 | 211 | 210 | 210 | 208 | 210 | 211 | 211 |
| 207 | 209 | 209 | 208 | 207 | 208 | 208 | 209 | 207 | 209 | 208 | 208 | 207 | 208 | 209 | 209 |
| 208 | 211 | 211 | 210 | 208 | 210 | 209 | 211 | 208 | 211 | 209 | 210 | 208 | 210 | 211 | 211 |
| 209 | 212 | 212 | 211 | 209 | 211 | 210 | 212 | 209 | 212 | 210 | 211 | 209 | 211 | 212 | 212 |
| 209 | 212 | 212 | 211 | 209 | 211 | 210 | 212 | 209 | 212 | 210 | 212 | 209 | 211 | 212 | 212 |

QP2 =

| | | | | | | | | | | | | | | | |
|---|---|---|---|---|---|---|---|---|---|---|---|---|---|---|---|
| 159 | 161 | 161 | 160 | 159 | 160 | 160 | 161 | 159 | 161 | 160 | 160 | 159 | 160 | 161 | 161 |
| 161 | 163 | 163 | 162 | 161 | 162 | 162 | 163 | 161 | 163 | 162 | 162 | 161 | 162 | 163 | 163 |
| 161 | 163 | 163 | 162 | 161 | 162 | 162 | 163 | 161 | 163 | 162 | 162 | 161 | 162 | 163 | 163 |
| 160 | 162 | 162 | 161 | 160 | 161 | 161 | 162 | 160 | 162 | 161 | 161 | 160 | 161 | 162 | 162 |
| 159 | 161 | 161 | 160 | 159 | 160 | 160 | 161 | 159 | 161 | 160 | 160 | 159 | 160 | 161 | 161 |
| 160 | 162 | 162 | 161 | 160 | 162 | 161 | 162 | 160 | 162 | 161 | 162 | 160 | 161 | 162 | 162 |
| 160 | 162 | 162 | 161 | 160 | 161 | 161 | 162 | 160 | 162 | 161 | 161 | 160 | 161 | 162 | 162 |
| 161 | 163 | 163 | 162 | 161 | 162 | 162 | 163 | 161 | 163 | 162 | 162 | 161 | 162 | 163 | 163 |
| 159 | 161 | 161 | 160 | 159 | 160 | 160 | 161 | 159 | 161 | 160 | 160 | 159 | 160 | 161 | 161 |
| 161 | 163 | 163 | 162 | 161 | 162 | 162 | 163 | 161 | 163 | 162 | 162 | 161 | 162 | 163 | 163 |
| 160 | 162 | 162 | 161 | 160 | 161 | 161 | 162 | 160 | 162 | 161 | 161 | 160 | 161 | 162 | 162 |
| 160 | 162 | 162 | 161 | 160 | 162 | 161 | 162 | 160 | 162 | 161 | 162 | 160 | 161 | 162 | 162 |
| 159 | 161 | 161 | 160 | 159 | 160 | 160 | 161 | 159 | 161 | 160 | 160 | 159 | 160 | 161 | 161 |
| 160 | 162 | 162 | 161 | 160 | 161 | 161 | 162 | 160 | 162 | 161 | 161 | 160 | 161 | 162 | 162 |
| 161 | 163 | 163 | 162 | 161 | 162 | 162 | 163 | 161 | 163 | 162 | 162 | 161 | 162 | 163 | 163 |
| 160 | 163 | 163 | 162 | 161 | 162 | 162 | 163 | 161 | 163 | 162 | 162 | 161 | 162 | 163 | 163 |

QP4 =

| | | | | | | | | | | | | | | | |
|---|---|---|---|---|---|---|---|---|---|---|---|---|---|---|---|
| 129 | 131 | 131 | 130 | 129 | 130 | 130 | 131 | 129 | 131 | 130 | 130 | 129 | 130 | 131 | 131 |
| 131 | 132 | 132 | 132 | 131 | 132 | 131 | 132 | 131 | 132 | 131 | 132 | 131 | 132 | 132 | 132 |
| 131 | 132 | 132 | 132 | 131 | 132 | 131 | 132 | 131 | 132 | 131 | 132 | 131 | 132 | 132 | 132 |
| 130 | 132 | 132 | 131 | 130 | 131 | 131 | 132 | 130 | 132 | 131 | 131 | 130 | 131 | 132 | 132 |
| 129 | 131 | 131 | 130 | 129 | 130 | 130 | 131 | 129 | 131 | 130 | 130 | 129 | 130 | 131 | 131 |
| 130 | 132 | 132 | 131 | 130 | 131 | 131 | 132 | 130 | 132 | 131 | 131 | 130 | 131 | 132 | 132 |
| 130 | 131 | 131 | 131 | 130 | 131 | 131 | 132 | 130 | 132 | 131 | 131 | 131 | 131 | 131 | 131 |
| 131 | 132 | 132 | 132 | 131 | 132 | 132 | 132 | 131 | 132 | 132 | 132 | 131 | 132 | 132 | 132 |
| 129 | 131 | 131 | 130 | 129 | 130 | 130 | 131 | 129 | 131 | 130 | 130 | 129 | 130 | 131 | 131 |
| 131 | 132 | 132 | 132 | 131 | 132 | 132 | 132 | 131 | 132 | 132 | 132 | 131 | 132 | 132 | 132 |
| 130 | 131 | 131 | 131 | 130 | 131 | 131 | 132 | 130 | 132 | 131 | 131 | 130 | 131 | 131 | 131 |
| 130 | 132 | 132 | 131 | 130 | 131 | 131 | 132 | 130 | 132 | 131 | 131 | 130 | 131 | 132 | 132 |
| 129 | 131 | 131 | 130 | 129 | 130 | 130 | 131 | 129 | 131 | 130 | 130 | 129 | 130 | 131 | 131 |
| 130 | 132 | 132 | 131 | 130 | 131 | 131 | 132 | 130 | 132 | 131 | 131 | 130 | 131 | 132 | 132 |
| 131 | 132 | 132 | 132 | 131 | 132 | 131 | 132 | 131 | 132 | 131 | 132 | 131 | 132 | 132 | 132 |
| 131 | 132 | 132 | 132 | 131 | 132 | 131 | 132 | 131 | 132 | 131 | 132 | 131 | 132 | 132 | 132 |

QP1 =

| | | | | | | | | | | | | | | | |
|---|---|---|---|---|---|---|---|---|---|---|---|---|---|---|---|
| 188 | 190 | 190 | 189 | 188 | 190 | 189 | 190 | 188 | 190 | 189 | 190 | 188 | 189 | 190 | 190 |
| 190 | 192 | 192 | 191 | 190 | 192 | 191 | 192 | 190 | 193 | 191 | 192 | 190 | 191 | 192 | 192 |
| 190 | 192 | 192 | 191 | 190 | 192 | 191 | 192 | 190 | 192 | 191 | 192 | 190 | 191 | 192 | 192 |
| 189 | 191 | 191 | 190 | 189 | 191 | 190 | 191 | 189 | 192 | 190 | 191 | 189 | 190 | 191 | 191 |
| 188 | 190 | 190 | 189 | 188 | 189 | 189 | 190 | 188 | 190 | 189 | 189 | 188 | 189 | 190 | 190 |
| 190 | 192 | 192 | 191 | 189 | 191 | 191 | 192 | 190 | 192 | 191 | 191 | 189 | 191 | 192 | 192 |
| 189 | 191 | 191 | 190 | 189 | 191 | 190 | 191 | 189 | 191 | 190 | 191 | 189 | 190 | 191 | 191 |
| 190 | 192 | 192 | 191 | 190 | 192 | 191 | 193 | 190 | 193 | 191 | 192 | 190 | 191 | 192 | 192 |
| 188 | 190 | 190 | 189 | 188 | 190 | 189 | 190 | 188 | 190 | 189 | 190 | 188 | 189 | 190 | 190 |
| 190 | 193 | 192 | 192 | 190 | 192 | 191 | 193 | 190 | 193 | 191 | 192 | 190 | 192 | 192 | 193 |
| 189 | 191 | 191 | 190 | 189 | 191 | 190 | 191 | 189 | 191 | 190 | 191 | 189 | 190 | 191 | 191 |
| 190 | 192 | 192 | 191 | 189 | 191 | 191 | 192 | 190 | 192 | 191 | 191 | 189 | 191 | 192 | 192 |
| 188 | 190 | 190 | 189 | 188 | 189 | 189 | 190 | 188 | 190 | 189 | 189 | 188 | 189 | 190 | 190 |
| 189 | 191 | 191 | 190 | 189 | 191 | 190 | 191 | 189 | 192 | 190 | 191 | 189 | 190 | 191 | 191 |
| 190 | 192 | 192 | 191 | 190 | 192 | 191 | 192 | 190 | 192 | 191 | 192 | 190 | 191 | 192 | 192 |
| 190 | 192 | 192 | 191 | 190 | 192 | 191 | 192 | 190 | 193 | 191 | 192 | 190 | 191 | 192 | 192 |

QP3 =

| | | | | | | | | | | | | | | | |
|---|---|---|---|---|---|---|---|---|---|---|---|---|---|---|---|
| 148 | 150 | 150 | 149 | 148 | 149 | 149 | 150 | 148 | 150 | 149 | 149 | 148 | 149 | 150 | 150 |
| 150 | 151 | 151 | 150 | 149 | 151 | 150 | 151 | 150 | 151 | 150 | 151 | 149 | 150 | 151 | 151 |
| 150 | 151 | 151 | 150 | 149 | 151 | 150 | 151 | 150 | 151 | 150 | 151 | 149 | 150 | 151 | 151 |
| 149 | 150 | 150 | 150 | 149 | 150 | 150 | 150 | 149 | 150 | 150 | 150 | 149 | 150 | 150 | 150 |
| 148 | 149 | 149 | 149 | 148 | 149 | 149 | 149 | 148 | 149 | 149 | 149 | 148 | 149 | 149 | 149 |
| 149 | 151 | 151 | 150 | 149 | 150 | 150 | 151 | 149 | 151 | 150 | 150 | 149 | 150 | 151 | 151 |
| 149 | 150 | 150 | 150 | 149 | 150 | 149 | 150 | 149 | 150 | 149 | 150 | 149 | 150 | 150 | 150 |
| 150 | 151 | 151 | 150 | 149 | 151 | 150 | 151 | 150 | 151 | 150 | 151 | 149 | 150 | 151 | 151 |
| 148 | 150 | 150 | 149 | 148 | 149 | 149 | 150 | 148 | 150 | 149 | 149 | 148 | 149 | 150 | 150 |
| 150 | 151 | 151 | 150 | 149 | 151 | 150 | 151 | 150 | 151 | 150 | 151 | 149 | 150 | 151 | 151 |
| 149 | 150 | 150 | 150 | 149 | 150 | 149 | 150 | 149 | 150 | 149 | 150 | 149 | 150 | 150 | 150 |
| 149 | 151 | 151 | 150 | 149 | 150 | 150 | 151 | 149 | 151 | 150 | 150 | 149 | 150 | 151 | 151 |
| 148 | 149 | 149 | 149 | 148 | 149 | 149 | 149 | 148 | 149 | 149 | 149 | 148 | 149 | 149 | 149 |
| 149 | 150 | 150 | 150 | 149 | 150 | 150 | 150 | 149 | 151 | 150 | 150 | 149 | 150 | 150 | 150 |
| 150 | 151 | 151 | 150 | 149 | 151 | 150 | 151 | 150 | 151 | 150 | 151 | 149 | 150 | 151 | 151 |
| 150 | 151 | 151 | 150 | 149 | 151 | 150 | 151 | 150 | 151 | 150 | 151 | 149 | 150 | 151 | 151 |

QP5 =

| | | | | | | | | | | | | | | | |
|---|---|---|---|---|---|---|---|---|---|---|---|---|---|---|---|
| 115 | 116 | 116 | 116 | 115 | 116 | 116 | 116 | 115 | 116 | 116 | 116 | 115 | 116 | 116 | 116 |
| 116 | 118 | 118 | 117 | 116 | 117 | 117 | 118 | 116 | 118 | 117 | 117 | 116 | 117 | 118 | 118 |
| 116 | 118 | 118 | 117 | 116 | 117 | 117 | 118 | 116 | 118 | 117 | 117 | 116 | 117 | 118 | 118 |
| 116 | 117 | 117 | 116 | 116 | 117 | 116 | 117 | 116 | 117 | 116 | 117 | 116 | 116 | 117 | 117 |
| 115 | 116 | 116 | 116 | 115 | 116 | 116 | 116 | 115 | 116 | 116 | 116 | 115 | 116 | 116 | 116 |
| 116 | 117 | 117 | 117 | 116 | 117 | 116 | 117 | 116 | 117 | 116 | 117 | 116 | 117 | 117 | 117 |
| 116 | 117 | 117 | 116 | 116 | 116 | 116 | 117 | 116 | 117 | 116 | 116 | 116 | 116 | 117 | 117 |
| 116 | 118 | 118 | 117 | 116 | 117 | 117 | 118 | 116 | 118 | 117 | 117 | 116 | 117 | 118 | 118 |
| 115 | 116 | 116 | 116 | 115 | 116 | 116 | 116 | 115 | 116 | 116 | 116 | 115 | 116 | 116 | 116 |
| 116 | 118 | 118 | 117 | 116 | 117 | 117 | 118 | 116 | 118 | 117 | 117 | 116 | 117 | 118 | 118 |
| 116 | 117 | 117 | 116 | 116 | 116 | 116 | 117 | 116 | 117 | 116 | 116 | 116 | 116 | 117 | 117 |
| 116 | 117 | 117 | 117 | 116 | 117 | 116 | 117 | 116 | 117 | 116 | 117 | 116 | 117 | 117 | 117 |
| 115 | 116 | 116 | 116 | 115 | 116 | 116 | 116 | 115 | 116 | 116 | 116 | 115 | 116 | 116 | 116 |
| 116 | 117 | 117 | 116 | 116 | 117 | 116 | 117 | 116 | 117 | 116 | 117 | 116 | 116 | 117 | 117 |
| 116 | 118 | 118 | 117 | 116 | 117 | 117 | 118 | 116 | 118 | 117 | 117 | 116 | 117 | 118 | 118 |
| 116 | 118 | 118 | 117 | 116 | 117 | 117 | 118 | 116 | 118 | 117 | 117 | 116 | 117 | 118 | 118 |

| | | | | | | | | | | | | | | | |
|---|---|---|---|---|---|---|---|---|---|---|---|---|---|---|---|
| 81 | 82 | 82 | 81 | 81 | 81 | 81 | 82 | 81 | 82 | 81 | 81 | 81 | 81 | 82 | 82 |
| 82 | 83 | 83 | 82 | 82 | 82 | 82 | 83 | 82 | 83 | 82 | 82 | 82 | 82 | 82 | 83 |
| 82 | 83 | 83 | 82 | 82 | 82 | 82 | 83 | 82 | 83 | 82 | 82 | 82 | 82 | 83 | 83 |
| 81 | 82 | 82 | 82 | 81 | 82 | 82 | 82 | 81 | 82 | 82 | 82 | 81 | 82 | 82 | 82 |
| 81 | 82 | 82 | 81 | 81 | 81 | 81 | 82 | 81 | 82 | 81 | 81 | 81 | 81 | 82 | 82 |
| 81 | 82 | 82 | 82 | 81 | 82 | 82 | 82 | 81 | 82 | 82 | 82 | 81 | 82 | 82 | 82 |
| 81 | 82 | 82 | 82 | 81 | 82 | 82 | 82 | 81 | 82 | 82 | 82 | 81 | 82 | 82 | 82 |
| 82 | 83 | 83 | 82 | 82 | 82 | 82 | 83 | 82 | 83 | 82 | 82 | 82 | 82 | 83 | 83 |
| 81 | 82 | 82 | 81 | 81 | 81 | 81 | 82 | 81 | 82 | 81 | 81 | 81 | 81 | 82 | 82 |
| 82 | 83 | 83 | 82 | 82 | 82 | 82 | 83 | 82 | 83 | 82 | 82 | 82 | 82 | 83 | 83 |
| 81 | 82 | 82 | 82 | 81 | 82 | 82 | 82 | 81 | 82 | 82 | 82 | 81 | 82 | 82 | 82 |
| 81 | 82 | 82 | 82 | 81 | 82 | 82 | 82 | 81 | 82 | 82 | 82 | 81 | 82 | 82 | 82 |
| 81 | 82 | 82 | 81 | 81 | 81 | 81 | 82 | 81 | 82 | 81 | 81 | 81 | 81 | 82 | 82 |
| 81 | 82 | 82 | 82 | 81 | 82 | 82 | 82 | 81 | 82 | 82 | 82 | 81 | 82 | 82 | 82 |
| 82 | 83 | 83 | 82 | 82 | 82 | 82 | 83 | 82 | 83 | 82 | 82 | 82 | 82 | 83 | 83 |
| 82 | 83 | 83 | 82 | 82 | 82 | 82 | 83 | 82 | 83 | 82 | 82 | 82 | 82 | 83 | 83 |

QP1 =

| | | | | | | | | | | | | | | | |
|---|---|---|---|---|---|---|---|---|---|---|---|---|---|---|---|
| 89 | 90 | 90 | 90 | 89 | 90 | 89 | 90 | 89 | 90 | 89 | 90 | 89 | 90 | 90 | 90 |
| 90 | 91 | 91 | 90 | 90 | 91 | 90 | 91 | 90 | 91 | 90 | 91 | 90 | 90 | 91 | 91 |
| 90 | 91 | 91 | 90 | 90 | 91 | 90 | 91 | 90 | 91 | 90 | 91 | 90 | 90 | 91 | 91 |
| 90 | 90 | 90 | 90 | 89 | 90 | 90 | 91 | 90 | 91 | 90 | 90 | 89 | 90 | 90 | 90 |
| 89 | 90 | 90 | 89 | 89 | 90 | 89 | 90 | 89 | 90 | 89 | 90 | 89 | 89 | 90 | 90 |
| 90 | 91 | 91 | 90 | 90 | 90 | 90 | 91 | 90 | 91 | 90 | 90 | 90 | 90 | 91 | 91 |
| 89 | 90 | 90 | 90 | 89 | 90 | 90 | 90 | 89 | 90 | 90 | 90 | 89 | 90 | 90 | 90 |
| 90 | 91 | 91 | 91 | 90 | 91 | 90 | 91 | 90 | 91 | 90 | 91 | 90 | 91 | 91 | 91 |
| 89 | 90 | 90 | 90 | 89 | 90 | 89 | 90 | 89 | 90 | 89 | 90 | 89 | 90 | 90 | 90 |
| 90 | 91 | 91 | 91 | 90 | 91 | 90 | 91 | 90 | 91 | 90 | 91 | 90 | 91 | 91 | 91 |
| 89 | 90 | 90 | 90 | 89 | 90 | 90 | 90 | 89 | 90 | 90 | 90 | 89 | 90 | 90 | 90 |
| 90 | 91 | 91 | 90 | 90 | 90 | 90 | 91 | 90 | 91 | 90 | 90 | 90 | 90 | 91 | 91 |
| 89 | 90 | 90 | 89 | 89 | 90 | 89 | 90 | 89 | 90 | 89 | 90 | 89 | 89 | 90 | 90 |
| 90 | 90 | 90 | 90 | 89 | 90 | 90 | 91 | 90 | 91 | 90 | 90 | 89 | 90 | 90 | 90 |
| 90 | 91 | 91 | 90 | 90 | 91 | 90 | 91 | 90 | 91 | 90 | 91 | 90 | 90 | 91 | 91 |
| 90 | 91 | 91 | 90 | 90 | 91 | 90 | 91 | 90 | 91 | 90 | 91 | 90 | 90 | 91 | 91 |

QP2 =

| | | | | | | | | | | | | | | | |
|---|---|---|---|---|---|---|---|---|---|---|---|---|---|---|---|
| 105 | 106 | 106 | 106 | 105 | 106 | 106 | 106 | 105 | 106 | 106 | 106 | 105 | 106 | 106 | 106 |
| 106 | 107 | 107 | 107 | 106 | 107 | 107 | 108 | 106 | 108 | 107 | 107 | 106 | 107 | 107 | 107 |
| 106 | 107 | 107 | 107 | 106 | 107 | 107 | 107 | 106 | 108 | 107 | 107 | 106 | 107 | 107 | 107 |
| 106 | 107 | 107 | 106 | 106 | 107 | 106 | 107 | 106 | 107 | 106 | 107 | 106 | 106 | 107 | 107 |
| 105 | 106 | 106 | 106 | 105 | 106 | 106 | 106 | 105 | 106 | 106 | 106 | 105 | 106 | 106 | 106 |
| 106 | 107 | 107 | 107 | 106 | 107 | 106 | 107 | 106 | 107 | 106 | 107 | 106 | 107 | 107 | 107 |
| 106 | 107 | 107 | 106 | 106 | 106 | 106 | 107 | 106 | 107 | 106 | 106 | 106 | 106 | 107 | 107 |
| 106 | 108 | 107 | 107 | 106 | 107 | 107 | 108 | 106 | 108 | 107 | 107 | 106 | 107 | 107 | 108 |
| 105 | 106 | 106 | 106 | 105 | 106 | 106 | 106 | 105 | 106 | 106 | 106 | 105 | 106 | 106 | 106 |
| 106 | 108 | 108 | 107 | 106 | 107 | 107 | 108 | 106 | 108 | 107 | 107 | 106 | 107 | 108 | 108 |
| 106 | 107 | 107 | 106 | 106 | 106 | 106 | 107 | 106 | 107 | 106 | 106 | 106 | 106 | 107 | 107 |
| 106 | 107 | 107 | 107 | 106 | 107 | 106 | 107 | 106 | 107 | 106 | 107 | 106 | 107 | 107 | 107 |
| 105 | 106 | 106 | 106 | 105 | 106 | 106 | 106 | 105 | 106 | 106 | 106 | 105 | 106 | 106 | 106 |
| 106 | 107 | 107 | 106 | 106 | 107 | 106 | 107 | 106 | 107 | 106 | 107 | 106 | 106 | 107 | 107 |
| 106 | 107 | 107 | 107 | 106 | 107 | 107 | 107 | 106 | 108 | 107 | 107 | 106 | 107 | 107 | 107 |
| 106 | 107 | 107 | 107 | 106 | 107 | 107 | 108 | 106 | 108 | 107 | 107 | 106 | 107 | 107 | 107 |

QP3 =

| | | | | | | | | | | | | | | | |
|---|---|---|---|---|---|---|---|---|---|---|---|---|---|---|---|
| 113 | 115 | 114 | 114 | 113 | 114 | 114 | 115 | 113 | 115 | 114 | 114 | 113 | 114 | 114 | 114 |
| 115 | 116 | 116 | 115 | 114 | 115 | 115 | 116 | 115 | 116 | 115 | 115 | 114 | 115 | 116 | 116 |
| 114 | 116 | 116 | 115 | 114 | 115 | 115 | 116 | 114 | 116 | 115 | 115 | 114 | 115 | 116 | 116 |
| 114 | 115 | 115 | 115 | 114 | 115 | 114 | 115 | 114 | 115 | 114 | 115 | 114 | 115 | 115 | 115 |
| 113 | 114 | 114 | 114 | 113 | 114 | 114 | 114 | 113 | 114 | 114 | 114 | 113 | 114 | 114 | 114 |
| 114 | 115 | 115 | 115 | 114 | 115 | 115 | 115 | 114 | 115 | 115 | 115 | 114 | 115 | 115 | 115 |
| 114 | 115 | 115 | 114 | 114 | 115 | 114 | 115 | 114 | 115 | 114 | 115 | 114 | 114 | 115 | 115 |
| 115 | 116 | 116 | 115 | 114 | 115 | 115 | 116 | 115 | 116 | 115 | 115 | 114 | 115 | 116 | 116 |
| 113 | 115 | 114 | 114 | 113 | 114 | 114 | 115 | 113 | 115 | 114 | 114 | 113 | 114 | 114 | 115 |
| 115 | 116 | 116 | 115 | 114 | 115 | 115 | 116 | 115 | 116 | 115 | 115 | 114 | 115 | 116 | 116 |
| 114 | 115 | 115 | 114 | 114 | 115 | 114 | 115 | 114 | 115 | 114 | 115 | 114 | 114 | 115 | 115 |
| 114 | 115 | 115 | 115 | 114 | 115 | 115 | 115 | 114 | 115 | 115 | 115 | 114 | 115 | 115 | 115 |
| 113 | 114 | 114 | 114 | 113 | 114 | 114 | 114 | 113 | 114 | 114 | 114 | 113 | 114 | 114 | 114 |
| 114 | 115 | 115 | 115 | 114 | 115 | 114 | 115 | 114 | 115 | 114 | 115 | 114 | 115 | 115 | 115 |
| 114 | 116 | 116 | 115 | 114 | 115 | 115 | 116 | 114 | 116 | 115 | 115 | 114 | 115 | 116 | 116 |
| 114 | 116 | 116 | 115 | 114 | 115 | 115 | 116 | 115 | 116 | 115 | 115 | 114 | 115 | 116 | 116 |

QP4 =

| | | | | | | | | | | | | | | | |
|---|---|---|---|---|---|---|---|---|---|---|---|---|---|---|---|
| 129 | 131 | 131 | 130 | 129 | 130 | 130 | 131 | 129 | 131 | 130 | 130 | 129 | 130 | 131 | 131 |
| 131 | 132 | 132 | 132 | 131 | 132 | 131 | 132 | 131 | 132 | 131 | 132 | 131 | 132 | 132 | 132 |
| 131 | 132 | 132 | 132 | 131 | 132 | 131 | 132 | 131 | 132 | 131 | 132 | 131 | 132 | 132 | 132 |
| 130 | 132 | 132 | 131 | 130 | 131 | 131 | 132 | 130 | 132 | 131 | 131 | 130 | 131 | 132 | 132 |
| 129 | 131 | 131 | 130 | 129 | 130 | 130 | 131 | 129 | 131 | 130 | 130 | 129 | 130 | 131 | 131 |
| 130 | 132 | 132 | 131 | 130 | 131 | 131 | 132 | 130 | 132 | 131 | 131 | 130 | 131 | 132 | 132 |
| 130 | 131 | 131 | 131 | 130 | 131 | 131 | 132 | 130 | 132 | 131 | 131 | 130 | 131 | 131 | 131 |
| 131 | 132 | 132 | 132 | 131 | 132 | 132 | 132 | 131 | 132 | 132 | 132 | 131 | 132 | 132 | 132 |
| 129 | 131 | 131 | 130 | 129 | 130 | 130 | 131 | 129 | 131 | 130 | 130 | 129 | 130 | 131 | 131 |
| 131 | 132 | 132 | 132 | 131 | 132 | 132 | 132 | 131 | 132 | 132 | 132 | 131 | 132 | 132 | 132 |
| 130 | 131 | 131 | 131 | 130 | 131 | 131 | 132 | 130 | 132 | 131 | 131 | 130 | 131 | 131 | 131 |
| 130 | 132 | 132 | 131 | 130 | 131 | 131 | 132 | 130 | 132 | 131 | 131 | 130 | 131 | 132 | 132 |
| 129 | 131 | 131 | 130 | 129 | 130 | 130 | 131 | 129 | 131 | 130 | 130 | 129 | 130 | 131 | 131 |
| 130 | 132 | 132 | 131 | 130 | 131 | 131 | 132 | 130 | 132 | 131 | 131 | 130 | 131 | 132 | 132 |
| 131 | 132 | 132 | 132 | 131 | 132 | 131 | 132 | 131 | 132 | 131 | 132 | 131 | 132 | 132 | 132 |
| 131 | 132 | 132 | 132 | 131 | 132 | 131 | 132 | 131 | 132 | 131 | 132 | 131 | 132 | 132 | 132 |

QP5 =

| | | | | | | | | | | | | | | | |
|---|---|---|---|---|---|---|---|---|---|---|---|---|---|---|---|
| 146 | 147 | 147 | 146 | 146 | 147 | 146 | 147 | 146 | 147 | 146 | 147 | 145 | 146 | 147 | 147 |
| 147 | 149 | 149 | 148 | 147 | 148 | 148 | 149 | 147 | 149 | 148 | 148 | 147 | 148 | 149 | 149 |
| 147 | 149 | 149 | 148 | 147 | 148 | 148 | 149 | 147 | 149 | 148 | 148 | 147 | 148 | 149 | 149 |
| 146 | 148 | 148 | 147 | 146 | 147 | 147 | 148 | 146 | 148 | 147 | 147 | 146 | 147 | 148 | 148 |
| 146 | 147 | 147 | 146 | 145 | 147 | 146 | 147 | 146 | 147 | 146 | 147 | 145 | 146 | 147 | 147 |
| 147 | 148 | 148 | 147 | 147 | 148 | 147 | 148 | 147 | 148 | 147 | 148 | 147 | 147 | 148 | 148 |
| 146 | 148 | 148 | 147 | 146 | 147 | 147 | 148 | 146 | 148 | 147 | 147 | 146 | 147 | 148 | 148 |
| 147 | 149 | 149 | 148 | 147 | 148 | 148 | 149 | 147 | 149 | 148 | 148 | 147 | 148 | 149 | 149 |
| 146 | 147 | 147 | 146 | 146 | 147 | 146 | 147 | 146 | 147 | 146 | 147 | 146 | 146 | 147 | 147 |
| 147 | 149 | 149 | 148 | 147 | 148 | 148 | 149 | 147 | 149 | 148 | 148 | 147 | 148 | 149 | 149 |
| 146 | 148 | 148 | 147 | 146 | 147 | 147 | 148 | 146 | 148 | 147 | 147 | 146 | 147 | 148 | 148 |
| 147 | 148 | 148 | 147 | 147 | 148 | 147 | 148 | 147 | 148 | 147 | 148 | 147 | 147 | 148 | 148 |
| 145 | 147 | 147 | 146 | 145 | 147 | 146 | 147 | 146 | 147 | 146 | 147 | 145 | 146 | 147 | 147 |
| 146 | 148 | 148 | 147 | 146 | 147 | 147 | 148 | 146 | 148 | 147 | 147 | 146 | 147 | 148 | 148 |
| 147 | 149 | 149 | 148 | 147 | 148 | 148 | 149 | 147 | 149 | 148 | 148 | 147 | 148 | 149 | 149 |
| 147 | 149 | 149 | 148 | 147 | 148 | 148 | 149 | 147 | 149 | 148 | 148 | 147 | 148 | 149 | 149 |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 102 | 103 | 103 | 103 | 103 | 103 | 103 | 103 | 103 | 103 | 103 | 103 | 103 | 103 | 103 | 103 | 102 | 103 | 103 | 103 | 103 | 103 | 103 | 103 | 103 | 103 | 103 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 104 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |
| 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |
| 103 | 103 | 103 | 103 | 103 | 103 | 104 | 103 | 103 | 103 | 104 | 104 | 103 | 104 | 104 | 104 | 103 | 104 | 104 | 104 | 103 | 104 | 104 | 103 | 103 | 103 | 104 | 103 | 103 | 103 | 103 | 103 |
| 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 |
| 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |
| 103 | 103 | 103 | 103 | 103 | 103 | 104 | 103 | 103 | 103 | 104 | 104 | 103 | 104 | 104 | 104 | 103 | 104 | 104 | 104 | 103 | 104 | 104 | 103 | 103 | 103 | 104 | 103 | 103 | 103 | 103 | 103 |
| 103 | 104 | 104 | 104 | 103 | 104 | 104 | 103 | 103 | 104 | 104 | 104 | 103 | 104 | 104 | 104 | 103 | 104 | 104 | 104 | 103 | 104 | 104 | 104 | 103 | 103 | 104 | 104 | 103 | 104 | 104 | 104 |
| 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 |
| 103 | 104 | 104 | 104 | 103 | 104 | 104 | 103 | 103 | 104 | 104 | 104 | 103 | 104 | 104 | 104 | 103 | 104 | 104 | 104 | 103 | 104 | 104 | 104 | 103 | 103 | 104 | 104 | 103 | 104 | 104 | 104 |
| 103 | 103 | 103 | 103 | 103 | 103 | 104 | 103 | 103 | 103 | 104 | 104 | 103 | 104 | 104 | 104 | 103 | 104 | 104 | 104 | 103 | 104 | 104 | 103 | 103 | 103 | 104 | 103 | 103 | 103 | 103 | 103 |
| 103 | 104 | 104 | 104 | 103 | 104 | 104 | 103 | 103 | 104 | 104 | 104 | 103 | 104 | 104 | 104 | 103 | 104 | 104 | 104 | 103 | 104 | 104 | 104 | 103 | 103 | 104 | 104 | 103 | 104 | 104 | 104 |
| 102 | 103 | 103 | 103 | 103 | 103 | 103 | 103 | 103 | 103 | 103 | 103 | 103 | 103 | 103 | 103 | 102 | 103 | 103 | 103 | 103 | 103 | 103 | 103 | 103 | 103 | 103 | 103 | 103 | 103 | 103 | 103 |
| 103 | 104 | 104 | 104 | 103 | 104 | 104 | 103 | 103 | 104 | 104 | 104 | 103 | 104 | 104 | 104 | 103 | 104 | 104 | 104 | 103 | 104 | 104 | 104 | 103 | 103 | 104 | 104 | 103 | 104 | 104 | 104 |
| 103 | 103 | 103 | 103 | 103 | 103 | 104 | 103 | 103 | 103 | 104 | 104 | 103 | 104 | 104 | 104 | 103 | 104 | 104 | 104 | 103 | 104 | 104 | 103 | 103 | 103 | 104 | 103 | 103 | 103 | 103 | 103 |
| 103 | 104 | 104 | 104 | 103 | 104 | 104 | 103 | 103 | 104 | 104 | 104 | 103 | 104 | 104 | 104 | 103 | 104 | 104 | 104 | 103 | 104 | 104 | 104 | 103 | 103 | 104 | 104 | 103 | 104 | 104 | 104 |
| 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 |
| 103 | 104 | 104 | 104 | 103 | 104 | 104 | 103 | 103 | 104 | 104 | 104 | 103 | 104 | 104 | 104 | 103 | 104 | 104 | 104 | 103 | 104 | 104 | 104 | 103 | 103 | 104 | 104 | 103 | 104 | 104 | 104 |
| 103 | 103 | 103 | 103 | 103 | 103 | 104 | 103 | 103 | 103 | 104 | 104 | 103 | 104 | 104 | 104 | 103 | 104 | 104 | 104 | 103 | 104 | 104 | 103 | 103 | 103 | 104 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |
| 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 |
| 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 |
| 103 | 104 | 103 | 103 | 103 | 103 | 104 | 103 | 103 | 103 | 104 | 104 | 103 | 104 | 104 | 104 | 103 | 104 | 104 | 104 | 103 | 104 | 104 | 103 | 103 | 103 | 104 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |
| 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |
| 103 | 103 | 103 | 103 | 103 | 103 | 103 | 103 | 103 | 103 | 103 | 104 | 103 | 104 | 103 | 104 | 103 | 104 | 103 | 104 | 103 | 104 | 103 | 103 | 103 | 103 | 103 | 103 | 103 | 103 | 103 | 103 |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 93 | 94 | 94 | 94 | 93 | 94 | 94 | 93 | 93 | 94 | 94 | 94 | 93 | 94 | 94 | 94 | 93 | 94 | 94 | 94 | 93 | 94 | 94 | 94 | 93 | 93 | 94 | 94 | 93 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 93 | 94 | 94 | 94 | 93 | 94 | 94 | 93 | 93 | 94 | 94 | 94 | 93 | 94 | 94 | 94 | 93 | 94 | 94 | 94 | 93 | 94 | 94 | 94 | 93 | 93 | 94 | 94 | 93 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 93 | 94 | 94 | 94 | 93 | 94 | 94 | 94 | 94 | 94 | 94 | 94 | 94 | 94 | 94 | 94 | 93 | 94 | 94 | 94 | 94 | 94 | 94 | 94 | 94 | 94 | 94 | 94 | 93 | 94 | 94 | 94 |
| 93 | 94 | 94 | 94 | 93 | 94 | 94 | 94 | 94 | 94 | 94 | 94 | 94 | 94 | 94 | 94 | 93 | 94 | 94 | 94 | 94 | 94 | 94 | 94 | 94 | 94 | 94 | 94 | 93 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 93 | 94 | 94 | 94 | 93 | 94 | 94 | 94 | 94 | 94 | 94 | 94 | 94 | 94 | 94 | 94 | 93 | 94 | 94 | 94 | 94 | 94 | 94 | 94 | 94 | 94 | 94 | 94 | 93 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 93 | 94 | 94 | 94 | 93 | 94 | 94 | 93 | 93 | 94 | 94 | 94 | 93 | 94 | 94 | 94 | 93 | 94 | 94 | 94 | 93 | 94 | 94 | 94 | 93 | 93 | 94 | 94 | 93 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 93 | 94 | 94 | 94 | 93 | 94 | 94 | 94 | 94 | 94 | 94 | 94 | 94 | 94 | 94 | 94 | 93 | 94 | 94 | 94 | 94 | 94 | 94 | 94 | 94 | 94 | 94 | 94 | 93 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 93 | 94 | 94 | 94 | 93 | 94 | 94 | 94 | 94 | 94 | 94 | 94 | 94 | 94 | 94 | 94 | 93 | 94 | 94 | 94 | 94 | 94 | 94 | 94 | 94 | 94 | 94 | 94 | 94 | 94 | 94 | 94 |
| 93 | 94 | 94 | 94 | 93 | 94 | 94 | 94 | 94 | 94 | 94 | 94 | 94 | 94 | 94 | 94 | 93 | 94 | 94 | 94 | 94 | 94 | 94 | 94 | 94 | 94 | 94 | 94 | 93 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 93 | 94 | 94 | 94 | 93 | 94 | 94 | 93 | 93 | 94 | 94 | 94 | 93 | 94 | 94 | 94 | 93 | 94 | 94 | 94 | 93 | 94 | 94 | 94 | 94 | 93 | 94 | 94 | 93 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |
| 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 | 94 |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |
| 79 | 80 | 80 | 80 | 79 | 80 | 80 | 79 | 79 | 79 | 80 | 80 | 79 | 80 | 80 | 80 | 79 | 80 | 80 | 80 | 79 | 80 | 80 | 79 | 79 | 79 | 80 | 80 | 79 | 80 | 80 | 80 |
| 79 | 80 | 80 | 79 | 79 | 80 | 80 | 79 | 79 | 79 | 80 | 80 | 79 | 80 | 80 | 80 | 79 | 80 | 80 | 80 | 79 | 80 | 80 | 79 | 79 | 79 | 80 | 80 | 79 | 79 | 80 | 80 |
| 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |
| 79 | 79 | 79 | 79 | 79 | 79 | 79 | 79 | 79 | 79 | 79 | 79 | 79 | 79 | 79 | 79 | 79 | 80 | 79 | 79 | 79 | 79 | 79 | 79 | 79 | 79 | 79 | 79 | 79 | 79 | 79 | 79 |
| 79 | 79 | 79 | 79 | 79 | 79 | 79 | 79 | 79 | 79 | 79 | 80 | 79 | 80 | 79 | 80 | 79 | 80 | 79 | 80 | 79 | 80 | 79 | 79 | 79 | 79 | 79 | 79 | 79 | 79 | 79 | 79 |
| 79 | 80 | 79 | 79 | 79 | 80 | 80 | 79 | 79 | 79 | 80 | 80 | 79 | 80 | 80 | 80 | 79 | 80 | 80 | 80 | 79 | 80 | 80 | 79 | 79 | 79 | 80 | 79 | 79 | 79 | 79 | 80 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |
| 79 | 80 | 80 | 80 | 79 | 80 | 80 | 79 | 80 | 80 | 80 | 80 | 80 | 80 | 80 | 80 | 79 | 80 | 80 | 80 | 80 | 80 | 80 | 80 | 80 | 80 | 80 | 80 | 79 | 80 | 80 | 80 |
| 79 | 79 | 79 | 79 | 79 | 79 | 79 | 79 | 79 | 79 | 79 | 80 | 79 | 80 | 79 | 80 | 79 | 80 | 79 | 80 | 79 | 80 | 79 | 79 | 79 | 79 | 79 | 79 | 79 | 79 | 79 | 79 |
| 79 | 80 | 80 | 80 | 79 | 80 | 80 | 79 | 80 | 80 | 80 | 80 | 80 | 80 | 80 | 80 | 79 | 80 | 80 | 80 | 80 | 80 | 80 | 80 | 80 | 79 | 80 | 80 | 79 | 80 | 80 | 80 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |
| 79 | 80 | 80 | 80 | 79 | 80 | 80 | 79 | 80 | 80 | 80 | 80 | 80 | 80 | 80 | 80 | 79 | 80 | 80 | 80 | 80 | 80 | 80 | 80 | 80 | 80 | 80 | 80 | 79 | 80 | 80 | 80 |
| 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 |
| 79 | 80 | 80 | 80 | 79 | 80 | 80 | 80 | 80 | 80 | 80 | 80 | 80 | 80 | 80 | 80 | 79 | 80 | 80 | 80 | 80 | 80 | 80 | 80 | 80 | 80 | 80 | 80 | 79 | 80 | 80 | 80 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |
| 79 | 80 | 80 | 80 | 79 | 80 | 80 | 79 | 80 | 80 | 80 | 80 | 80 | 80 | 80 | 80 | 79 | 80 | 80 | 80 | 80 | 80 | 80 | 80 | 80 | 79 | 80 | 80 | 79 | 80 | 80 | 80 |
| 79 | 79 | 79 | 79 | 79 | 79 | 79 | 79 | 79 | 79 | 79 | 80 | 79 | 80 | 79 | 80 | 79 | 80 | 79 | 80 | 79 | 80 | 79 | 79 | 79 | 79 | 79 | 79 | 79 | 79 | 79 | 79 |
| 79 | 80 | 80 | 80 | 79 | 80 | 80 | 79 | 80 | 80 | 80 | 80 | 80 | 80 | 80 | 80 | 79 | 80 | 80 | 80 | 80 | 80 | 80 | 80 | 80 | 80 | 80 | 80 | 79 | 80 | 80 | 80 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |
| 79 | 80 | 79 | 79 | 79 | 80 | 80 | 79 | 79 | 79 | 80 | 80 | 79 | 80 | 80 | 80 | 79 | 80 | 80 | 80 | 79 | 80 | 80 | 79 | 79 | 79 | 80 | 79 | 79 | 79 | 79 | 80 |
| 79 | 79 | 79 | 79 | 79 | 79 | 79 | 79 | 79 | 79 | 79 | 80 | 79 | 80 | 79 | 80 | 79 | 80 | 79 | 80 | 79 | 80 | 79 | 79 | 79 | 79 | 79 | 79 | 79 | 79 | 79 | 79 |
| 79 | 79 | 79 | 79 | 79 | 79 | 79 | 79 | 79 | 79 | 79 | 80 | 79 | 79 | 79 | 80 | 79 | 80 | 79 | 79 | 79 | 80 | 79 | 79 | 79 | 79 | 79 | 79 | 79 | 79 | 79 | 79 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |
| 79 | 80 | 80 | 80 | 79 | 80 | 80 | 79 | 79 | 79 | 80 | 80 | 79 | 80 | 80 | 80 | 79 | 80 | 80 | 80 | 79 | 80 | 80 | 79 | 79 | 79 | 80 | 80 | 79 | 79 | 80 | 80 |
| 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 | 79 |
| 79 | 80 | 80 | 79 | 79 | 80 | 80 | 79 | 79 | 79 | 80 | 80 | 79 | 80 | 80 | 80 | 79 | 80 | 80 | 80 | 79 | 80 | 80 | 79 | 79 | 79 | 80 | 79 | 79 | 79 | 79 | 80 |
| 79 | 80 | 80 | 80 | 79 | 80 | 80 | 79 | 79 | 79 | 80 | 80 | 79 | 80 | 80 | 80 | 79 | 80 | 80 | 80 | 79 | 80 | 80 | 79 | 79 | 79 | 80 | 80 | 79 | 79 | 80 | 80 |
| 79 | 80 | 80 | 80 | 79 | 80 | 80 | 79 | 79 | 80 | 80 | 80 | 79 | 80 | 80 | 80 | 79 | 80 | 80 | 80 | 79 | 80 | 80 | 80 | 79 | 79 | 80 | 80 | 79 | 80 | 80 | 80 |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 73 | 74 | 74 | 73 | 73 | 74 | 74 | 73 | 73 | 73 | 74 | 74 | 73 | 74 | 74 | 74 | 73 | 74 | 74 | 74 | 73 | 74 | 74 | 73 | 73 | 73 | 74 | 73 | 73 | 73 | 73 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 74 | 74 | 74 | 74 |
| 73 | 74 | 74 | 74 | 74 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 74 | 74 | 74 | 74 |
| 73 | 74 | 74 | 74 | 73 | 74 | 74 | 73 | 73 | 74 | 74 | 74 | 73 | 74 | 74 | 74 | 73 | 74 | 74 | 74 | 73 | 74 | 74 | 74 | 73 | 73 | 74 | 74 | 73 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 73 | 74 | 74 | 74 | 73 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 73 | 74 | 74 | 74 |
| 73 | 74 | 74 | 74 | 73 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 73 | 74 | 74 | 74 |
| 73 | 74 | 74 | 74 | 74 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 73 | 74 | 74 | 74 | 73 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 73 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 73 | 74 | 73 | 73 | 73 | 74 | 74 | 73 | 73 | 73 | 74 | 74 | 73 | 74 | 74 | 74 | 73 | 74 | 74 | 74 | 73 | 74 | 74 | 73 | 73 | 73 | 74 | 73 | 73 | 73 | 73 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 73 | 74 | 74 | 74 | 73 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 73 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 73 | 74 | 74 | 74 | 74 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 74 | 74 | 74 | 74 |
| 73 | 74 | 74 | 74 | 73 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 73 | 74 | 74 | 74 |
| 73 | 74 | 74 | 74 | 73 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 73 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |
| 73 | 74 | 74 | 74 | 74 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 74 | 74 | 74 | 74 |
| 73 | 74 | 74 | 74 | 73 | 74 | 74 | 73 | 73 | 74 | 74 | 74 | 73 | 74 | 74 | 74 | 73 | 74 | 74 | 74 | 73 | 74 | 74 | 74 | 73 | 73 | 74 | 74 | 73 | 74 | 74 | 74 |
| 73 | 74 | 74 | 74 | 74 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 74 | 74 | 74 | 74 |
| 73 | 74 | 74 | 74 | 74 | 74 | 74 | 74 | 74 | 74 | 74 | 74 | 74 | 74 | 74 | 74 | 73 | 74 | 74 | 74 | 74 | 74 | 74 | 74 | 74 | 74 | 74 | 74 | 74 | 74 | 74 | 74 |
| 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 | 74 |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 |
| 64 | 65 | 65 | 65 | 64 | 65 | 65 | 64 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 64 | 65 | 65 | 65 | 65 | 65 | 65 | 65 | 65 | 64 | 65 | 65 | 65 | 65 | 65 | 65 | 65 | 65 | 64 | 65 | 65 | 64 | 65 | 65 | 65 |
| 64 | 65 | 65 | 65 | 64 | 65 | 65 | 64 | 65 | 65 | 65 | 65 | 65 | 65 | 65 | 65 | 64 | 65 | 65 | 65 | 65 | 65 | 65 | 65 | 65 | 64 | 65 | 65 | 64 | 65 | 65 | 65 |
| 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 |
| 64 | 65 | 65 | 65 | 64 | 65 | 65 | 64 | 65 | 65 | 65 | 65 | 65 | 65 | 65 | 65 | 64 | 65 | 65 | 65 | 65 | 65 | 65 | 65 | 65 | 64 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 64 | 64 | 64 | 64 | 64 | 65 | 64 | 64 | 64 | 65 | 65 | 64 | 65 | 65 | 65 | 64 | 65 | 65 | 65 | 64 | 65 | 65 | 64 | 64 | 64 | 65 | 64 | 64 | 64 | 64 | 64 |
| 64 | 65 | 65 | 65 | 64 | 65 | 65 | 64 | 64 | 64 | 65 | 65 | 64 | 65 | 65 | 65 | 64 | 65 | 65 | 65 | 64 | 65 | 65 | 64 | 64 | 64 | 65 | 65 | 64 | 65 | 65 | 65 |
| 64 | 65 | 65 | 65 | 64 | 65 | 65 | 64 | 64 | 65 | 65 | 65 | 64 | 65 | 65 | 65 | 64 | 65 | 65 | 65 | 64 | 65 | 65 | 65 | 64 | 64 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 64 | 64 | 64 | 65 | 65 | 64 | 65 | 65 | 65 | 64 | 65 | 65 | 65 | 64 | 65 | 65 | 64 | 64 | 64 | 65 | 65 | 64 | 64 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 64 | 64 | 64 | 65 | 65 | 64 | 65 | 65 | 65 | 64 | 65 | 65 | 65 | 64 | 65 | 65 | 64 | 64 | 64 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 64 | 64 | 65 | 65 | 65 | 64 | 65 | 65 | 65 | 64 | 65 | 65 | 65 | 64 | 65 | 65 | 65 | 64 | 64 | 65 | 65 | 64 | 65 | 65 | 65 |
| 64 | 65 | 65 | 65 | 64 | 65 | 65 | 64 | 64 | 64 | 65 | 65 | 64 | 65 | 65 | 65 | 64 | 65 | 65 | 65 | 64 | 65 | 65 | 64 | 64 | 64 | 65 | 65 | 64 | 65 | 65 | 65 |
| 64 | 65 | 64 | 64 | 64 | 64 | 65 | 64 | 64 | 64 | 65 | 65 | 64 | 65 | 65 | 65 | 64 | 65 | 65 | 65 | 64 | 65 | 65 | 64 | 64 | 64 | 65 | 64 | 64 | 64 | 64 | 65 |
| 64 | 65 | 65 | 65 | 64 | 65 | 65 | 65 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |
| 64 | 65 | 65 | 65 | 64 | 65 | 65 | 64 | 65 | 65 | 65 | 65 | 65 | 65 | 65 | 65 | 64 | 65 | 65 | 65 | 65 | 65 | 65 | 65 | 65 | 64 | 65 | 65 | 64 | 65 | 65 | 65 |
| 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 | 64 |
| 64 | 65 | 65 | 65 | 64 | 65 | 65 | 64 | 65 | 65 | 65 | 65 | 64 | 65 | 65 | 65 | 64 | 65 | 65 | 65 | 65 | 65 | 65 | 65 | 65 | 64 | 65 | 65 | 64 | 65 | 65 | 65 |
| 64 | 65 | 65 | 65 | 64 | 65 | 65 | 64 | 65 | 65 | 65 | 65 | 65 | 65 | 65 | 65 | 64 | 65 | 65 | 65 | 65 | 65 | 65 | 65 | 65 | 64 | 65 | 65 | 64 | 65 | 65 | 65 |
| 64 | 65 | 65 | 65 | 64 | 65 | 65 | 64 | 65 | 65 | 65 | 65 | 65 | 65 | 65 | 65 | 64 | 65 | 65 | 65 | 65 | 65 | 65 | 65 | 65 | 65 | 65 | 65 | 64 | 65 | 65 | 65 |

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 58 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |
| 57 | 57 | 57 | 57 | 57 | 57 | 58 | 57 | 57 | 57 | 58 | 58 | 57 | 58 | 58 | 58 | 57 | 58 | 58 | 58 | 57 | 58 | 58 | 57 | 57 | 57 | 58 | 57 | 57 | 57 | 57 | 57 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |
| 57 | 57 | 57 | 57 | 57 | 57 | 58 | 57 | 57 | 57 | 58 | 58 | 57 | 58 | 58 | 58 | 57 | 58 | 58 | 58 | 57 | 58 | 58 | 57 | 57 | 57 | 58 | 57 | 57 | 57 | 57 | 57 |
| 57 | 58 | 58 | 58 | 57 | 58 | 58 | 57 | 57 | 58 | 58 | 58 | 57 | 58 | 58 | 58 | 57 | 58 | 58 | 58 | 57 | 58 | 58 | 58 | 57 | 57 | 58 | 58 | 57 | 58 | 58 | 58 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 58 | 58 | 58 | 57 | 58 | 58 | 57 | 57 | 58 | 58 | 58 | 57 | 58 | 58 | 58 | 57 | 58 | 58 | 58 | 57 | 58 | 58 | 58 | 57 | 57 | 58 | 58 | 57 | 58 | 58 | 58 |
| 57 | 57 | 57 | 57 | 57 | 57 | 58 | 57 | 57 | 57 | 58 | 58 | 57 | 58 | 58 | 58 | 57 | 58 | 58 | 58 | 57 | 58 | 58 | 57 | 57 | 57 | 58 | 57 | 57 | 57 | 57 | 57 |
| 57 | 58 | 58 | 58 | 57 | 58 | 58 | 57 | 57 | 58 | 58 | 58 | 57 | 58 | 58 | 58 | 57 | 58 | 58 | 58 | 57 | 58 | 58 | 58 | 57 | 57 | 58 | 58 | 57 | 58 | 58 | 58 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 58 | 58 | 58 | 57 | 58 | 58 | 57 | 57 | 58 | 58 | 58 | 57 | 58 | 58 | 58 | 57 | 58 | 58 | 58 | 57 | 58 | 58 | 58 | 57 | 57 | 58 | 58 | 57 | 58 | 58 | 58 |
| 57 | 57 | 57 | 57 | 57 | 57 | 58 | 57 | 57 | 57 | 58 | 58 | 57 | 58 | 58 | 58 | 57 | 58 | 58 | 58 | 57 | 58 | 58 | 57 | 57 | 57 | 58 | 57 | 57 | 57 | 57 | 57 |
| 57 | 58 | 58 | 58 | 57 | 58 | 58 | 57 | 57 | 58 | 58 | 58 | 57 | 58 | 58 | 58 | 57 | 58 | 58 | 58 | 57 | 58 | 58 | 58 | 57 | 57 | 58 | 58 | 57 | 58 | 58 | 58 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 58 | 58 | 58 | 57 | 58 | 58 | 57 | 57 | 58 | 58 | 58 | 57 | 58 | 58 | 58 | 57 | 58 | 58 | 58 | 57 | 58 | 58 | 58 | 57 | 57 | 58 | 58 | 57 | 58 | 58 | 58 |
| 57 | 57 | 57 | 57 | 57 | 57 | 58 | 57 | 57 | 57 | 58 | 58 | 57 | 58 | 58 | 58 | 57 | 58 | 58 | 58 | 57 | 58 | 58 | 57 | 57 | 57 | 58 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 58 | 57 | 57 | 57 | 57 | 58 | 57 | 57 | 57 | 58 | 58 | 57 | 58 | 58 | 58 | 57 | 58 | 58 | 58 | 57 | 58 | 58 | 57 | 57 | 57 | 58 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |
| 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |
| 57 | 57 | 57 | 57 | 57 | 57 | 57 | 57 | 57 | 57 | 57 | 58 | 57 | 58 | 57 | 58 | 57 | 58 | 57 | 58 | 57 | 58 | 57 | 57 | 57 | 57 | 57 | 57 | 57 | 57 | 57 | 57 |

$$\equiv \begin{bmatrix} Y_1 \\ Y_2 \end{bmatrix} = \begin{bmatrix} \cos\theta & -\sin\theta \\ \sin\theta & \cos\theta \end{bmatrix} \begin{bmatrix} X_1 \\ X_2 \end{bmatrix}$$

```
QP1={
93, 93, 93, 93, 93, 93, 93, 93, 94, 93, 94, 94, 93, 93, 93, 93, 93, 93, 93, 94, 93, 93, 93, 93, 93, 93, 94, 93, 93, 93, 93, 93,
93, 93, 94, 93, 94, 94, 93, 94, 94, 94, 94, 94, 93, 94, 94, 93, 93, 94, 94, 94, 93, 94, 93, 94, 93, 94, 94, 93, 93, 93, 93, 94,
93, 94, 94, 94, 94, 94, 94, 94, 94, 94, 94, 94, 93, 94, 94, 93, 93, 94, 94, 94, 94, 94, 94, 94, 93, 94, 94, 94, 93, 94, 94, 94,
93, 93, 94, 94, 94, 94, 93, 94, 94, 94, 94, 94, 93, 94, 94, 93, 93, 94, 94, 94, 94, 94, 93, 94, 93, 94, 94, 94, 93, 94, 93, 94,
93, 94, 94, 94, 94, 94, 93, 94, 94, 94, 94, 94, 93, 94, 94, 93, 93, 94, 94, 94, 94, 94, 94, 94, 93, 94, 94, 94, 93, 94, 94, 94,
93, 94, 94, 94, 94, 94, 94, 94, 94, 94, 94, 94, 93, 94, 94, 93, 93, 94, 94, 94, 94, 94, 94, 94, 93, 94, 94, 94, 93, 94, 94, 94,
93, 93, 94, 93, 93, 94, 93, 94, 94, 94, 94, 94, 93, 94, 94, 93, 93, 94, 94, 94, 93, 94, 93, 94, 93, 94, 94, 93, 93, 93, 93, 93,
93, 94, 94, 94, 94, 94, 94, 94, 94, 94, 94, 94, 93, 94, 94, 93, 93, 94, 94, 94, 94, 94, 94, 94, 94, 94, 95, 94, 93, 94, 94, 94,
94, 94, 94, 94, 94, 94, 94, 94, 94, 94, 95, 94, 94, 94, 94, 94, 94, 94, 94, 94, 94, 94, 94, 94, 94, 94, 95, 94, 94, 94, 94, 94,
93, 94, 94, 94, 94, 94, 94, 94, 94, 94, 95, 94, 94, 94, 94, 94, 94, 94, 94, 94, 94, 94, 94, 94, 94, 94, 95, 94, 93, 94, 94, 94,
94, 94, 94, 94, 94, 94, 94, 94, 95, 95, 95, 95, 94, 94, 94, 94, 94, 94, 94, 95, 94, 94, 94, 94, 94, 94, 95, 94, 94, 94, 94, 94,
94, 94, 94, 94, 94, 94, 94, 94, 94, 94, 95, 94, 94, 94, 94, 94, 94, 94, 94, 94, 94, 94, 94, 94, 94, 94, 95, 94, 93, 94, 94, 94,
93, 93, 93, 93, 93, 93, 93, 93, 94, 94, 94, 94, 93, 93, 94, 93, 93, 93, 93, 94, 93, 93, 93, 94, 93, 93, 94, 93, 93, 93, 93, 93,
93, 94, 94, 94, 94, 94, 94, 94, 94, 94, 94, 94, 93, 94, 94, 93, 93, 94, 94, 94, 94, 94, 94, 94, 93, 94, 94, 94, 93, 94, 94, 94,
93, 94, 94, 94, 94, 94, 94, 94, 94, 94, 94, 94, 94, 94, 94, 94, 93, 94, 94, 94, 94, 94, 94, 94, 94, 94, 95, 94, 93, 94, 94, 94,
93, 93, 93, 93, 93, 93, 93, 93, 94, 94, 94, 94, 93, 93, 94, 93, 93, 93, 93, 94, 93, 93, 93, 94, 93, 93, 94, 93, 93, 93, 93, 93,
93, 93, 93, 93, 93, 93, 93, 93, 94, 94, 94, 94, 93, 93, 93, 93, 93, 93, 93, 94, 93, 93, 93, 93, 93, 93, 94, 93, 93, 93, 93, 93,
93, 94, 94, 94, 94, 94, 94, 94, 94, 94, 94, 94, 93, 94, 94, 93, 93, 94, 94, 94, 94, 94, 94, 94, 93, 94, 94, 94, 93, 94, 94, 94,
93, 94, 94, 94, 94, 94, 94, 94, 94, 94, 94, 94, 93, 94, 94, 93, 93, 94, 94, 94, 94, 94, 94, 94, 93, 94, 94, 94, 93, 94, 94, 94,
94, 94, 94, 94, 94, 94, 94, 94, 94, 94, 95, 94, 94, 94, 94, 94, 94, 94, 94, 94, 94, 94, 94, 94, 94, 94, 95, 94, 94, 94, 94, 94,
93, 93, 94, 94, 94, 94, 93, 94, 94, 94, 94, 94, 93, 94, 94, 93, 93, 94, 94, 94, 94, 94, 93, 94, 93, 94, 94, 94, 93, 94, 93, 94,
93, 94, 94, 94, 94, 94, 94, 94, 94, 94, 94, 94, 93, 94, 94, 93, 93, 94, 94, 94, 94, 94, 94, 94, 94, 94, 95, 94, 93, 94, 94, 94,
93, 93, 94, 93, 94, 94, 93, 94, 94, 94, 94, 94, 93, 94, 94, 93, 93, 94, 94, 94, 93, 94, 93, 94, 93, 94, 94, 93, 93, 93, 93, 94,
93, 94, 94, 94, 94, 94, 94, 94, 94, 94, 94, 94, 94, 94, 94, 94, 93, 94, 94, 94, 94, 94, 94, 94, 94, 94, 95, 94, 93, 94, 94, 94,
93, 93, 93, 93, 93, 93, 93, 94, 94, 94, 94, 94, 93, 93, 94, 93, 93, 93, 93, 94, 93, 94, 93, 94, 93, 93, 94, 93, 93, 93, 93, 93,
93, 94, 94, 94, 94, 94, 94, 94, 94, 94, 94, 94, 93, 94, 94, 93, 93, 94, 94, 94, 94, 94, 94, 94, 93, 94, 95, 94, 93, 94, 94, 94,
94, 94, 94, 94, 94, 94, 94, 95, 95, 95, 95, 95, 94, 94, 95, 94, 94, 94, 94, 95, 94, 95, 94, 95, 94, 95, 95, 94, 94, 94, 94, 94,
93, 93, 94, 94, 94, 94, 93, 94, 94, 94, 94, 94, 93, 94, 94, 93, 93, 94, 94, 94, 94, 94, 93, 94, 93, 94, 94, 94, 93, 94, 93, 94,
93, 93, 93, 93, 93, 93, 93, 93, 94, 93, 94, 93, 93, 93, 93, 93, 93, 93, 93, 94, 93, 93, 93, 93, 93, 93, 94, 93, 93, 93, 93, 93,
93, 93, 94, 94, 94, 94, 93, 94, 94, 94, 94, 94, 93, 94, 94, 93, 93, 94, 94, 94, 94, 94, 93, 94, 93, 94, 94, 94, 93, 94, 93, 94,
93, 93, 94, 93, 94, 94, 93, 94, 94, 94, 94, 94, 93, 94, 94, 93, 93, 94, 94, 94, 93, 94, 93, 94, 93, 94, 94, 93, 93, 93, 93, 94,
93, 94, 94, 94, 94, 94, 93, 94, 94, 94, 94, 94, 93, 94, 94, 93, 93, 94, 94, 94, 94, 94, 94, 94, 93, 94, 94, 94, 93, 94, 94, 94,
},
```

```
QP2={
79, 79, 79, 79, 79, 79, 79, 79, 79, 79, 79, 79, 79, 79, 79, 79, 79, 79, 79, 79, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 80, 79, 80, 80, 79, 79, 79, 79, 79, 79, 79, 80, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 80, 79, 79, 79, 79, 79, 79, 80, 79, 79, 79, 79, 79,
79, 79, 79, 79, 79, 79, 79, 79, 80, 79, 80, 80, 79, 79, 79, 79, 79, 79, 79, 80, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 80, 80, 80, 80, 79, 79, 79, 79, 79, 79, 79, 80, 79, 79, 79, 79, 79, 79, 80, 79, 79, 79, 79, 79,
79, 79, 80, 79, 79, 80, 79, 80, 80, 80, 80, 80, 79, 80, 80, 79, 79, 80, 80, 80, 79, 80, 79, 80, 79, 80, 80, 79, 79, 79, 79, 79,
79, 79, 79, 79, 79, 79, 79, 80, 80, 80, 80, 80, 79, 80, 80, 79, 79, 80, 79, 80, 79, 80, 79, 80, 79, 80, 80, 79, 79, 79, 79, 79,
79, 80, 80, 80, 80, 80, 80, 80, 80, 80, 80, 80, 80, 80, 80, 80, 80, 80, 80, 80, 80, 80, 80, 80, 80, 80, 80, 80, 79, 80, 80, 80,
79, 79, 80, 79, 79, 80, 79, 80, 80, 80, 80, 80, 79, 80, 80, 79, 79, 80, 79, 80, 79, 80, 79, 80, 79, 80, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 80, 80, 80, 80, 79, 79, 79, 79, 79, 79, 79, 80, 79, 79, 79, 79, 79, 79, 80, 79, 79, 79, 79, 79,
79, 79, 79, 79, 79, 79, 79, 79, 80, 80, 80, 80, 79, 79, 79, 79, 79, 79, 79, 80, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 80, 80, 80, 80, 79, 79, 79, 79, 79, 79, 79, 80, 79, 79, 79, 79, 79, 79, 80, 79, 79, 79, 79, 79,
79, 79, 79, 79, 79, 79, 79, 79, 80, 79, 80, 79, 79, 79, 79, 79, 79, 79, 79, 80, 79, 79, 79, 79, 79, 79, 80, 79, 79, 79, 79, 79,
79, 79, 80, 79, 80, 80, 79, 80, 80, 80, 80, 80, 79, 80, 80, 79, 79, 80, 80, 80, 79, 80, 79, 80, 79, 80, 80, 80, 79, 79, 79, 80,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 80, 80, 80, 80, 79, 79, 79, 79, 79, 79, 79, 80, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 80, 80, 80, 80, 79, 79, 79, 79, 79, 79, 79, 80, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 80, 80, 80, 80, 79, 79, 79, 79, 79, 79, 79, 80, 79, 79, 79, 79, 79, 79, 80, 79, 79, 79, 79, 79,
80, 80, 80, 80, 80, 80, 80, 80, 80, 80, 80, 80, 80, 80, 80, 80, 80, 80, 80, 80, 80, 80, 80, 80, 80, 80, 81, 80, 80, 80, 80, 80,
79, 79, 79, 79, 79, 79, 79, 79, 79, 79, 80, 79, 79, 79, 79, 79, 79, 79, 79, 80, 79, 79, 79, 79, 79, 79, 80, 79, 79, 79, 79, 79,
79, 79, 79, 79, 79, 79, 79, 79, 79, 79, 79, 79, 79, 79, 79, 79, 79, 79, 79, 79, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 79, 79, 79, 79, 79, 79, 79, 80, 79, 79, 79, 79, 79,
79, 79, 79, 79, 79, 79, 79, 79, 79, 79, 80, 79, 79, 79, 79, 79, 79, 79, 79, 80, 79, 79, 79, 79, 79, 79, 80, 79, 79, 79, 79, 79,
},
```

```
QP4={
64, 64, 64, 64, 64, 64, 64, 64, 64, 64, 65, 64, 64, 64, 64, 64, 64, 64, 64, 64, 64, 64, 64, 64, 64, 64, 65, 64, 64, 64, 64, 64,
64, 64, 64, 64, 64, 64, 64, 64, 65, 64, 65, 64, 64, 64, 64, 64, 64, 64, 64, 65, 64, 64, 64, 64, 64, 64, 65, 64, 64, 64, 64, 64,
64, 64, 64, 64, 64, 64, 64, 65, 65, 65, 65, 65, 64, 64, 65, 64, 64, 64, 64, 65, 64, 65, 64, 65, 64, 65, 65, 64, 64, 64, 64, 64,
64, 64, 64, 64, 64, 64, 64, 64, 65, 64, 65, 65, 64, 64, 64, 64, 64, 64, 64, 65, 64, 64, 64, 64, 64, 64, 65, 64, 64, 64, 64, 64,
64, 64, 64, 64, 64, 64, 64, 64, 65, 65, 65, 65, 64, 64, 64, 64, 64, 64, 64, 65, 64, 64, 64, 64, 64, 64, 65, 64, 64, 64, 64, 64,
64, 64, 64, 64, 64, 64, 64, 65, 65, 65, 65, 65, 64, 64, 65, 64, 64, 64, 64, 65, 64, 65, 64, 65, 64, 65, 65, 64, 64, 64, 64, 64,
64, 64, 64, 64, 64, 64, 64, 64, 64, 64, 65, 64, 64, 64, 64, 64, 64, 64, 64, 65, 64, 64, 64, 64, 64, 64, 65, 64, 64, 64, 64, 64,
64, 64, 65, 64, 64, 65, 64, 65, 65, 65, 65, 65, 64, 65, 65, 64, 64, 65, 64, 65, 64, 65, 64, 65, 64, 65, 65, 64, 64, 64, 64, 64,
64, 65, 65, 65, 65, 65, 64, 65, 65, 65, 65, 65, 64, 65, 65, 64, 64, 65, 65, 65, 65, 65, 65, 65, 64, 65, 65, 65, 64, 65, 65, 65,
64, 64, 65, 64, 65, 65, 64, 65, 65, 65, 65, 65, 64, 65, 65, 64, 64, 65, 65, 65, 64, 65, 64, 65, 64, 65, 65, 65, 64, 65, 64, 65,
65, 65, 65, 65, 65, 65, 65, 65, 65, 65, 65, 65, 65, 65, 65, 65, 65, 65, 65, 65, 65, 65, 65, 65, 65, 65, 65, 65, 65, 65, 65, 65,
64, 64, 65, 65, 65, 65, 64, 65, 65, 65, 65, 65, 64, 65, 65, 64, 64, 65, 65, 65, 65, 65, 64, 65, 64, 65, 65, 65, 64, 65, 64, 65,
64, 64, 64, 64, 64, 64, 64, 64, 64, 64, 65, 64, 64, 64, 64, 64, 64, 64, 64, 64, 64, 64, 64, 64, 64, 64, 65, 64, 64, 64, 64, 64,
64, 64, 64, 64, 64, 64, 64, 65, 65, 65, 65, 65, 64, 65, 65, 64, 64, 65, 64, 65, 64, 65, 64, 65, 64, 65, 65, 64, 64, 64, 64, 64,
64, 64, 65, 64, 64, 65, 64, 65, 65, 65, 65, 65, 64, 65, 65, 64, 64, 65, 65, 65, 64, 65, 64, 65, 64, 65, 65, 64, 64, 64, 64, 64,
64, 64, 64, 64, 64, 64, 64, 64, 64, 64, 65, 64, 64, 64, 64, 64, 64, 64, 64, 64, 64, 64, 64, 64, 64, 64, 65, 64, 64, 64, 64, 64,
64, 64, 64, 64, 64, 64, 64, 64, 64, 64, 65, 64, 64, 64, 64, 64, 64, 64, 64, 64, 64, 64, 64, 64, 64, 64, 65, 64, 64, 64, 64, 64,
64, 64, 64, 64, 64, 64, 64, 65, 65, 65, 65, 65, 64, 65, 65, 64, 64, 65, 64, 65, 64, 65, 64, 65, 64, 65, 65, 64, 64, 64, 64, 64,
64, 64, 64, 64, 64, 64, 64, 64, 65, 65, 65, 65, 64, 64, 65, 64, 64, 64, 64, 65, 64, 64, 64, 64, 64, 64, 65, 64, 64, 64, 64, 64,
64, 65, 65, 65, 65, 65, 65, 65, 65, 65, 65, 65, 64, 65, 65, 64, 64, 65, 65, 65, 65, 65, 65, 65, 64, 65, 65, 65, 64, 65, 65, 65,
64, 64, 64, 64, 64, 64, 64, 64, 65, 64, 65, 65, 64, 64, 64, 64, 64, 64, 64, 65, 64, 64, 64, 64, 64, 64, 65, 64, 64, 64, 64, 64,
64, 64, 65, 64, 64, 65, 64, 65, 65, 65, 65, 65, 64, 65, 65, 64, 64, 65, 64, 65, 64, 65, 64, 65, 64, 65, 65, 64, 64, 64, 64, 64,
64, 64, 64, 64, 64, 64, 64, 64, 65, 64, 65, 64, 64, 64, 64, 64, 64, 64, 64, 65, 64, 64, 64, 64, 64, 64, 65, 64, 64, 64, 64, 64,
64, 64, 65, 64, 64, 65, 64, 65, 65, 65, 65, 65, 64, 65, 65, 64, 64, 65, 64, 65, 64, 65, 64, 65, 64, 65, 65, 64, 64, 64, 64, 64,
64, 64, 64, 64, 64, 64, 64, 64, 64, 64, 65, 64, 64, 64, 64, 64, 64, 64, 64, 64, 64, 64, 64, 64, 64, 64, 65, 64, 64, 64, 64, 64,
64, 64, 65, 64, 64, 65, 64, 65, 65, 65, 65, 65, 64, 65, 65, 64, 64, 65, 64, 65, 64, 65, 64, 65, 64, 65, 65, 64, 64, 64, 64, 64,
65, 65, 65, 65, 65, 65, 65, 65, 65, 65, 65, 65, 65, 65, 65, 65, 65, 65, 65, 65, 65, 65, 65, 65, 65, 65, 65, 65, 65, 65, 65, 65,
64, 64, 64, 64, 64, 64, 64, 64, 65, 65, 65, 65, 64, 64, 64, 64, 64, 64, 64, 65, 64, 64, 64, 64, 64, 64, 65, 64, 64, 64, 64, 64,
64, 64, 64, 64, 64, 64, 64, 64, 64, 64, 65, 64, 64, 64, 64, 64, 64, 64, 64, 64, 64, 64, 64, 64, 64, 64, 65, 64, 64, 64, 64, 64,
64, 64, 64, 64, 64, 64, 64, 64, 65, 65, 65, 65, 64, 64, 64, 64, 64, 64, 64, 65, 64, 64, 64, 64, 64, 64, 65, 64, 64, 64, 64, 64,
64, 64, 64, 64, 64, 64, 64, 64, 65, 64, 65, 64, 64, 64, 64, 64, 64, 64, 64, 65, 64, 64, 64, 64, 64, 64, 65, 64, 64, 64, 64, 64,
64, 64, 64, 64, 64, 64, 64, 64, 65, 65, 65, 65, 64, 64, 64, 64, 64, 64, 64, 65, 64, 64, 64, 64, 64, 64, 65, 64, 64, 64, 64, 64,
},
```

```
QP2={
39, 79, 79, 55, 39, 57, 60, 52, 60, 60, 52, 67, 56, 46, 56, 56, 79, 55, 56, 67, 56, 46, 60, 52, 51, 59, 52, 56, 78, 57, 38, 40,
79, 157, 157, 109, 79, 114, 120, 102, 121, 122, 99, 140, 113, 92, 110, 116, 163, 110, 112, 134, 111, 93, 121, 103, 103, 121, 103, 108, 157, 113, 79, 78,
79, 157, 158, 108, 79, 110, 123, 98, 117, 122, 101, 135, 111, 93, 111, 111, 157, 111, 112, 140, 113, 91, 123, 99, 99, 122, 102, 110, 157, 114, 78, 78,
55, 109, 108, 76, 53, 76, 83, 72, 84, 84, 71, 93, 78, 65, 75, 78, 109, 77, 77, 93, 77, 65, 85, 77, 71, 83, 73, 75, 110, 78, 55, 55,
39, 79, 79, 53, 38, 57, 61, 51, 60, 61, 52, 66, 55, 46, 56, 56, 79, 56, 54, 65, 54, 46, 61, 52, 51, 65, 51, 53, 77, 57, 39, 39,
57, 114, 110, 76, 57, 81, 87, 74, 86, 103, 76, 96, 80, 67, 82, 84, 117, 80, 80, 96, 81, 67, 104, 73, 74, 88, 69, 81, 108, 81, 57, 57,
60, 120, 123, 83, 61, 87, 92, 81, 93, 92, 79, 103, 87, 72, 86, 85, 120, 83, 85, 102, 85, 71, 86, 79, 79, 92, 79, 99, 120, 87, 60, 61,
52, 102, 98, 72, 51, 74, 81, 68, 79, 79, 67, 90, 72, 61, 73, 75, 102, 73, 73, 85, 75, 61, 79, 67, 68, 80, 67, 71, 102, 74, 51, 52,
60, 121, 117, 84, 60, 86, 93, 79, 92, 93, 79, 102, 85, 70, 86, 85, 120, 90, 86, 102, 85, 72, 93, 79, 79, 94, 79, 84, 119, 87, 61, 60,
60, 122, 122, 84, 61, 103, 92, 79, 93, 92, 79, 102, 86, 71, 86, 83, 121, 85, 85, 103, 85, 71, 86, 79, 79, 95, 78, 84, 120, 87, 61, 60,
52, 99, 101, 71, 52, 76, 79, 67, 79, 79, 69, 89, 72, 60, 72, 73, 103, 71, 73, 87, 74, 61, 78, 66, 67, 79, 63, 72, 103, 69, 50, 52,
67, 140, 135, 93, 66, 96, 103, 90, 102, 102, 89, 114, 96, 79, 95, 94, 134, 95, 92, 114, 95, 78, 102, 87, 88, 103, 87, 94, 134, 95, 70, 67,
56, 113, 111, 78, 55, 80, 87, 72, 85, 86, 72, 96, 80, 65, 78, 79, 111, 81, 79, 97, 79, 65, 88, 73, 73, 87, 73, 75, 112, 80, 57, 56,
46, 92, 93, 65, 46, 67, 72, 61, 70, 71, 60, 79, 65, 61, 65, 66, 93, 66, 69, 79, 66, 54, 71, 60, 61, 69, 61, 63, 94, 67, 46, 46,
56, 110, 111, 75, 56, 82, 86, 73, 86, 86, 72, 95, 78, 65, 78, 78, 111, 78, 79, 91, 79, 71, 86, 74, 73, 85, 74, 78, 108, 80, 56, 56,
56, 116, 111, 78, 56, 84, 85, 75, 85, 83, 73, 94, 79, 66, 78, 78, 111, 79, 79, 94, 79, 66, 82, 73, 76, 85, 75, 77, 111, 80, 55, 56,
79, 163, 157, 109, 79, 117, 120, 102, 120, 121, 103, 134, 111, 93, 111, 111, 158, 112, 112, 133, 112, 93, 119, 103, 103, 121, 104, 109, 156, 114, 77, 79,
55, 110, 111, 77, 56, 80, 83, 73, 90, 85, 71, 95, 81, 66, 78, 79, 112, 79, 79, 94, 79, 69, 85, 77, 73, 82, 72, 77, 111, 80, 56, 56,
56, 112, 112, 77, 54, 80, 85, 73, 86, 85, 73, 92, 79, 69, 79, 79, 112, 79, 79, 95, 77, 65, 85, 73, 73, 82, 73, 74, 111, 81, 56, 56,
67, 134, 140, 93, 65, 96, 102, 85, 102, 103, 87, 114, 97, 79, 91, 94, 133, 94, 95, 117, 95, 79, 105, 88, 85, 103, 87, 89, 134, 102, 67, 68,
56, 111, 113, 77, 54, 81, 85, 75, 85, 85, 74, 95, 79, 66, 79, 79, 112, 79, 77, 95, 78, 66, 85, 73, 73, 85, 73, 78, 111, 80, 56, 56,
46, 93, 91, 65, 46, 67, 71, 61, 72, 71, 61, 78, 65, 54, 71, 66, 93, 69, 65, 79, 66, 54, 71, 61, 60, 70, 56, 64, 93, 63, 47, 46,
60, 121, 123, 85, 61, 104, 86, 79, 93, 86, 78, 102, 88, 71, 86, 82, 119, 85, 85, 105, 85, 71, 81, 79, 79, 89, 79, 84, 122, 87, 60, 60,
52, 103, 99, 77, 52, 73, 79, 67, 79, 79, 66, 87, 73, 60, 74, 73, 103, 77, 73, 88, 73, 61, 79, 67, 67, 79, 67, 72, 110, 74, 51, 52,
51, 103, 99, 71, 51, 74, 79, 68, 79, 79, 67, 88, 73, 61, 73, 76, 103, 73, 73, 85, 73, 60, 79, 67, 67, 79, 67, 71, 102, 74, 52, 52,
59, 121, 122, 83, 65, 88, 92, 80, 94, 95, 79, 103, 87, 69, 85, 85, 121, 82, 82, 103, 85, 70, 89, 79, 79, 92, 80, 107, 119, 87, 61, 60,
52, 103, 102, 73, 51, 69, 79, 67, 79, 78, 63, 87, 73, 61, 74, 75, 104, 72, 73, 87, 73, 56, 79, 67, 67, 80, 58, 72, 103, 74, 52, 52,
56, 108, 110, 75, 53, 81, 99, 71, 84, 84, 72, 94, 75, 63, 78, 77, 109, 77, 74, 89, 78, 64, 84, 72, 71, 107, 72, 75, 110, 79, 54, 56,
78, 157, 157, 110, 77, 108, 120, 102, 119, 120, 103, 134, 112, 94, 108, 111, 156, 111, 111, 134, 111, 93, 122, 110, 102, 119, 103, 110, 158, 114, 78, 78,
57, 113, 114, 78, 57, 81, 87, 74, 87, 87, 69, 95, 80, 67, 80, 80, 114, 80, 81, 102, 80, 63, 87, 74, 74, 87, 74, 79, 114, 82, 57, 57,
38, 79, 78, 55, 39, 57, 60, 51, 61, 61, 50, 70, 57, 46, 56, 55, 77, 56, 56, 67, 56, 47, 60, 51, 52, 61, 52, 54, 78, 57, 40, 38,
40, 78, 78, 55, 39, 57, 61, 52, 60, 60, 52, 67, 56, 46, 56, 56, 79, 56, 56, 68, 56, 46, 60, 52, 52, 60, 52, 56, 78, 57, 38, 42,
};
```

```
QP0={
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 39, 40, 39, 40, 40, 40, 40, 40, 40, 40, 40, 39, 40, 40, 40, 40, 40, 40, 39, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 39, 40, 39, 39, 40, 39, 39, 39, 39, 39, 40, 39, 39, 40, 40, 39, 39, 39, 40, 39, 40, 39, 40, 39, 39, 40, 40, 40, 40, 39,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 39, 40, 39, 40, 40, 40, 40, 40, 40, 40, 40, 39, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
40, 40, 39, 39, 39, 39, 40, 39, 39, 39, 39, 39, 40, 39, 39, 40, 40, 39, 39, 39, 39, 39, 40, 39, 40, 39, 39, 39, 40, 39, 39, 39,
40, 40, 40, 40, 40, 40, 40, 40, 40, 40, 40, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 40, 40, 40, 40, 40, 40, 40, 40, 40, 40, 40, 40, 40, 40, 40, 40, 39, 40, 40, 40, 40, 40,
40, 40, 40, 40, 40, 40, 40, 40, 40, 40, 39, 40, 40, 40, 40, 40, 40, 40, 40, 40, 40, 40, 40, 40, 40, 40, 39, 40, 40, 40, 40, 40,
};
```

```
QP1={
44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 44, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 43, 43, 43, 43, 44, 44, 44, 44, 44, 44, 44, 43, 44, 44, 44, 44, 44, 43, 44, 44, 44, 44, 44, 44,
44, 44, 44, 44, 44, 44, 44, 44, 43, 44, 43, 44, 44, 44, 44, 44, 44, 44, 44, 43, 44, 44, 44, 44, 44, 43, 44, 44, 44, 44, 44, 44,
44, 43, 43, 43, 43, 43, 44, 43, 43, 43, 43, 43, 44, 43, 43, 44, 44, 43, 43, 43, 43, 43, 43, 43, 44, 43, 43, 43, 44, 43, 43, 43,
44, 44, 44, 44, 44, 44, 44, 44, 43, 44, 43, 44, 44, 44, 44, 44, 44, 44, 44, 43, 44, 44, 44, 44, 44, 43, 44, 44, 44, 44, 44, 44,
44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44,
44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 43, 43, 43, 43, 44, 44, 44, 44, 44, 44, 44, 43, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 43, 43, 43, 43, 43, 43, 43, 43, 43, 43, 43, 44, 43, 43, 44, 44, 43, 43, 43, 43, 43, 43, 43, 44, 43, 43, 43, 44, 43, 43, 43,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
44, 44, 44, 44, 44, 44, 44, 44, 44, 44, 43, 44, 44, 44, 44, 44, 44, 44, 44, 44, 44, 44, 44, 44, 44, 43, 44, 44, 44, 44, 44, 44,
},
```

```
QP2={
52, 52, 52, 52, 52, 52, 52, 52, 52, 52, 52, 52, 52, 52, 52, 52, 52, 52, 52, 52, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 51, 52, 51, 52, 52, 52, 52, 52, 52, 52, 52, 51, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 51, 52, 51, 52, 52, 52, 52, 52, 52, 52, 52, 51, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 51, 52, 51, 51, 52, 52, 52, 52, 52, 52, 52, 51, 52, 52, 52, 52, 52, 52, 51, 52, 52, 52, 52, 52,
52, 52, 51, 52, 52, 51, 52, 51, 51, 51, 51, 51, 52, 51, 51, 52, 52, 51, 52, 51, 52, 51, 52, 51, 52, 51, 51, 52, 52, 52, 52, 52,
52, 52, 52, 52, 52, 52, 52, 52, 51, 51, 51, 51, 52, 52, 51, 52, 52, 52, 52, 51, 52, 52, 52, 51, 52, 52, 51, 52, 52, 52, 52, 52,
52, 51, 51, 51, 51, 51, 51, 51, 51, 51, 51, 51, 51, 51, 51, 51, 52, 51, 51, 51, 51, 51, 51, 51, 51, 51, 51, 51, 52, 51, 51, 51,
52, 52, 52, 52, 52, 52, 52, 51, 51, 51, 51, 51, 52, 51, 51, 52, 52, 52, 52, 51, 52, 51, 52, 51, 52, 51, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 51, 52, 51, 51, 52, 52, 52, 52, 52, 52, 52, 51, 52, 52, 52, 52, 52, 52, 51, 52, 52, 52, 52, 52,
52, 52, 52, 52, 52, 52, 52, 52, 51, 51, 51, 51, 52, 52, 52, 52, 52, 52, 52, 51, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 52, 52, 52, 52, 52, 52, 52, 52, 52, 52, 52, 52, 52, 52, 52, 52, 52, 52, 51, 52, 52, 52, 52, 52,
52, 52, 52, 52, 52, 52, 52, 52, 51, 52, 51, 52, 52, 52, 52, 52, 52, 52, 52, 51, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 51, 52, 52, 52, 52, 52, 52, 51, 52, 52, 52, 52, 52,
52, 52, 51, 52, 52, 51, 52, 51, 51, 51, 51, 51, 52, 51, 51, 52, 52, 51, 51, 51, 52, 51, 52, 51, 52, 51, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 51, 52, 51, 51, 52, 52, 52, 52, 52, 52, 52, 51, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 51, 51, 51, 51, 52, 52, 52, 52, 52, 52, 52, 51, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 51, 52, 51, 51, 52, 52, 52, 52, 52, 52, 52, 51, 52, 52, 52, 52, 52, 52, 51, 52, 52, 52, 52, 52,
51, 51, 51, 51, 51, 51, 51, 51, 51, 51, 51, 51, 51, 51, 51, 51, 51, 51, 51, 51, 51, 51, 51, 51, 51, 51, 51, 51, 52, 51, 51, 51,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 52, 52, 52, 52, 52, 52, 52, 52, 52, 52, 52, 52, 52, 52, 52, 52, 52, 52, 52, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
52, 52, 52, 52, 52, 52, 52, 52, 52, 52, 51, 52, 52, 52, 52, 52, 52, 52, 52, 52, 52, 52, 52, 52, 52, 52, 51, 52, 52, 52, 52, 52,
},
```

```
},
QP3={
37, 73, 73, 51, 37, 53, 56, 48, 56, 56, 48, 62, 52, 43, 52, 52, 73, 52, 52, 63, 52, 43, 55, 48, 48, 55, 48, 52, 72, 53, 36, 38,
73, 146, 146, 101, 73, 106, 112, 95, 112, 113, 92, 130, 105, 85, 102, 108, 151, 102, 104, 124, 103, 86, 112, 95, 95, 112, 95, 101, 145, 105, 74, 72,
73, 146, 146, 101, 73, 103, 115, 91, 108, 113, 94, 125, 103, 86, 103, 103, 146, 103, 104, 130, 105, 85, 114, 92, 92, 114, 94, 102, 146, 106, 73, 73,
51, 101, 101, 70, 49, 71, 77, 66, 78, 78, 66, 86, 72, 61, 70, 72, 101, 72, 72, 86, 72, 60, 79, 71, 66, 77, 68, 70, 102, 73, 51, 51,
37, 73, 73, 49, 35, 53, 56, 48, 56, 56, 48, 61, 51, 43, 52, 52, 73, 52, 50, 61, 51, 43, 56, 48, 48, 61, 48, 50, 72, 53, 37, 37,
53, 106, 103, 71, 53, 75, 81, 69, 80, 96, 70, 89, 75, 62, 76, 78, 109, 74, 75, 89, 75, 62, 96, 68, 69, 81, 64, 75, 100, 75, 53, 53,
56, 112, 115, 77, 56, 81, 86, 75, 87, 86, 73, 96, 80, 67, 79, 79, 112, 77, 79, 95, 79, 66, 80, 73, 74, 85, 74, 92, 111, 81, 56, 56,
48, 95, 91, 66, 48, 69, 75, 63, 73, 73, 62, 84, 67, 56, 68, 70, 95, 68, 68, 79, 69, 56, 73, 62, 63, 74, 62, 66, 95, 68, 48, 48,
56, 112, 108, 78, 56, 80, 87, 73, 86, 86, 73, 95, 79, 65, 80, 79, 112, 83, 79, 95, 79, 67, 87, 73, 73, 87, 74, 78, 111, 81, 56, 56,
56, 113, 113, 78, 56, 96, 86, 73, 86, 85, 73, 95, 80, 66, 79, 77, 112, 79, 79, 96, 79, 66, 80, 73, 73, 88, 73, 78, 111, 80, 56, 56,
48, 92, 94, 66, 48, 70, 73, 62, 73, 73, 64, 82, 67, 56, 67, 68, 96, 66, 67, 81, 69, 57, 73, 62, 62, 73, 59, 67, 95, 64, 46, 48,
62, 130, 125, 86, 61, 89, 96, 84, 95, 95, 82, 106, 89, 73, 88, 87, 124, 88, 86, 106, 88, 73, 95, 81, 82, 95, 81, 87, 124, 88, 65, 62,
52, 105, 103, 72, 51, 75, 80, 67, 79, 80, 67, 89, 74, 61, 72, 73, 103, 75, 73, 90, 74, 61, 82, 67, 67, 81, 67, 70, 104, 75, 53, 52,
43, 85, 86, 61, 43, 62, 67, 56, 65, 66, 56, 73, 61, 56, 61, 61, 86, 61, 64, 73, 61, 51, 66, 56, 56, 64, 56, 59, 87, 62, 42, 43,
52, 102, 103, 70, 52, 76, 79, 68, 80, 79, 67, 88, 72, 61, 72, 73, 103, 73, 73, 84, 73, 66, 79, 69, 68, 79, 69, 72, 100, 74, 52, 52,
52, 108, 103, 72, 52, 78, 79, 70, 79, 77, 68, 87, 73, 61, 73, 73, 103, 73, 73, 88, 73, 61, 76, 67, 71, 79, 69, 72, 103, 74, 51, 52,
73, 151, 146, 101, 73, 109, 112, 95, 112, 112, 96, 124, 103, 86, 103, 103, 146, 104, 104, 124, 104, 86, 111, 95, 96, 112, 96, 101, 145, 105, 71, 73,
52, 102, 103, 72, 52, 74, 77, 68, 83, 79, 66, 88, 75, 61, 73, 73, 104, 74, 73, 87, 73, 64, 79, 71, 68, 76, 67, 72, 103, 74, 52, 52,
52, 104, 104, 72, 50, 75, 79, 68, 79, 79, 67, 86, 73, 64, 73, 73, 104, 73, 74, 88, 72, 61, 79, 68, 67, 76, 67, 69, 103, 75, 52, 52,
63, 124, 130, 86, 61, 89, 95, 79, 95, 96, 81, 106, 90, 73, 84, 88, 124, 87, 88, 109, 88, 73, 98, 81, 79, 95, 81, 83, 125, 94, 62, 63,
52, 103, 105, 72, 51, 75, 79, 69, 79, 79, 69, 88, 74, 61, 73, 73, 104, 73, 72, 88, 73, 61, 79, 68, 68, 79, 68, 72, 103, 74, 52, 52,
43, 86, 85, 60, 43, 62, 66, 56, 67, 66, 57, 73, 61, 51, 66, 61, 86, 64, 61, 73, 61, 51, 66, 56, 56, 65, 52, 60, 87, 58, 43, 43,
55, 112, 114, 79, 56, 96, 80, 73, 87, 80, 73, 95, 82, 66, 79, 76, 111, 79, 79, 98, 79, 66, 75, 74, 73, 82, 73, 78, 113, 81, 56, 55,
48, 95, 92, 71, 48, 68, 73, 62, 73, 73, 62, 81, 67, 56, 69, 67, 95, 71, 68, 81, 68, 56, 74, 63, 62, 73, 62, 67, 102, 69, 48, 48,
48, 95, 92, 66, 48, 69, 74, 63, 73, 73, 62, 82, 67, 56, 68, 71, 96, 68, 67, 79, 68, 56, 73, 62, 62, 73, 62, 66, 95, 69, 48, 48,
55, 112, 114, 77, 61, 81, 85, 74, 87, 88, 73, 95, 81, 64, 79, 79, 112, 76, 76, 95, 79, 65, 82, 73, 73, 85, 74, 99, 111, 81, 56, 55,
48, 95, 94, 68, 48, 64, 74, 62, 74, 73, 59, 81, 67, 56, 69, 69, 96, 67, 67, 81, 68, 52, 73, 62, 62, 74, 54, 67, 96, 69, 48, 48,
52, 101, 102, 70, 50, 75, 92, 66, 78, 78, 67, 87, 70, 59, 72, 72, 101, 72, 69, 83, 72, 60, 78, 67, 66, 99, 67, 70, 102, 73, 50, 52,
72, 145, 146, 102, 72, 100, 111, 95, 111, 111, 95, 124, 104, 87, 100, 103, 145, 103, 103, 125, 103, 87, 113, 102, 95, 111, 96, 102, 147, 106, 73, 72,
53, 105, 106, 73, 53, 75, 81, 68, 81, 80, 64, 88, 75, 62, 74, 74, 105, 74, 75, 94, 74, 58, 81, 69, 69, 81, 69, 73, 106, 76, 52, 53,
36, 74, 73, 51, 37, 53, 56, 48, 56, 56, 46, 65, 53, 42, 52, 51, 71, 52, 52, 62, 52, 43, 56, 48, 48, 56, 48, 50, 73, 52, 37, 35,
38, 72, 73, 51, 37, 53, 56, 48, 56, 56, 48, 62, 52, 43, 52, 52, 73, 52, 52, 63, 52, 43, 55, 48, 48, 55, 48, 52, 72, 53, 35, 39,
},
```

```
QP5={
28, 57, 57, 39, 28, 41, 44, 37, 43, 44, 37, 48, 40, 33, 40, 40, 57, 40, 40, 49, 40, 33, 43, 37, 37, 43, 37, 41, 56, 41, 28, 29,
57, 113, 113, 79, 57, 83, 87, 74, 87, 88, 72, 101, 82, 66, 79, 84, 118, 80, 81, 97, 80, 67, 87, 74, 74, 87, 74, 78, 113, 82, 57, 56,
57, 113, 114, 78, 57, 80, 89, 71, 84, 88, 73, 97, 80, 67, 80, 80, 114, 80, 81, 101, 82, 66, 89, 71, 72, 88, 73, 80, 113, 82, 57, 57,
39, 79, 78, 55, 38, 55, 60, 52, 60, 60, 51, 67, 56, 47, 54, 56, 79, 56, 56, 67, 56, 47, 61, 56, 52, 60, 53, 54, 79, 57, 40, 39,
28, 57, 57, 38, 27, 41, 44, 37, 43, 44, 38, 47, 40, 33, 40, 40, 57, 40, 39, 47, 39, 33, 44, 37, 37, 47, 37, 39, 56, 41, 29, 28,
41, 83, 80, 55, 41, 59, 63, 54, 62, 74, 55, 70, 58, 49, 59, 61, 85, 57, 58, 69, 58, 48, 75, 53, 54, 63, 50, 58, 78, 58, 42, 41,
44, 87, 89, 60, 44, 63, 67, 58, 67, 67, 57, 74, 63, 52, 62, 62, 87, 60, 62, 74, 62, 51, 62, 57, 57, 66, 57, 71, 86, 63, 44, 44,
37, 74, 71, 52, 37, 54, 58, 49, 57, 57, 48, 65, 52, 44, 53, 54, 74, 53, 53, 61, 54, 44, 57, 48, 49, 58, 48, 51, 74, 53, 37, 37,
43, 87, 84, 60, 43, 62, 67, 57, 67, 67, 57, 74, 61, 51, 62, 62, 87, 65, 62, 74, 62, 52, 67, 57, 57, 68, 57, 61, 86, 63, 44, 44,
44, 88, 88, 60, 44, 74, 67, 57, 67, 66, 57, 74, 62, 51, 62, 60, 87, 62, 61, 75, 61, 51, 62, 57, 57, 68, 57, 61, 87, 63, 44, 44,
37, 72, 73, 51, 38, 55, 57, 48, 57, 57, 50, 64, 52, 44, 52, 53, 74, 51, 52, 63, 54, 44, 57, 48, 48, 57, 46, 52, 74, 50, 36, 37,
48, 101, 97, 67, 47, 70, 74, 65, 74, 74, 64, 82, 69, 57, 69, 68, 96, 68, 67, 82, 68, 57, 74, 63, 63, 74, 63, 68, 97, 69, 51, 49,
40, 82, 80, 56, 40, 58, 63, 52, 61, 62, 52, 69, 58, 47, 56, 57, 80, 58, 57, 70, 57, 47, 64, 52, 52, 63, 52, 54, 81, 58, 41, 40,
33, 66, 67, 47, 33, 49, 52, 44, 51, 51, 44, 57, 47, 44, 47, 47, 67, 47, 50, 57, 48, 39, 51, 43, 44, 50, 44, 46, 68, 48, 33, 33,
40, 79, 80, 54, 40, 59, 62, 53, 62, 62, 52, 69, 56, 47, 56, 57, 80, 57, 57, 66, 57, 51, 62, 53, 53, 61, 54, 56, 78, 58, 40, 40,
40, 84, 80, 56, 40, 61, 62, 54, 62, 60, 53, 68, 57, 47, 57, 56, 80, 57, 57, 68, 57, 47, 59, 52, 55, 62, 54, 56, 80, 58, 39, 40,
57, 118, 114, 79, 57, 85, 87, 74, 87, 87, 74, 96, 80, 67, 80, 80, 114, 81, 81, 96, 81, 67, 86, 74, 74, 87, 75, 79, 113, 82, 55, 57,
40, 80, 80, 56, 40, 57, 60, 53, 65, 62, 51, 68, 58, 47, 57, 57, 81, 57, 57, 68, 57, 50, 62, 56, 53, 59, 52, 56, 80, 58, 41, 40,
40, 81, 81, 56, 39, 58, 62, 53, 62, 61, 52, 67, 57, 50, 57, 57, 81, 57, 57, 68, 56, 47, 61, 53, 52, 59, 52, 53, 80, 58, 40, 40,
49, 97, 101, 67, 47, 69, 74, 61, 74, 75, 63, 82, 70, 57, 66, 68, 96, 68, 68, 85, 68, 57, 76, 63, 62, 74, 63, 64, 97, 73, 49, 49,
40, 80, 82, 56, 39, 58, 62, 54, 62, 61, 54, 68, 57, 48, 57, 57, 81, 57, 56, 68, 57, 47, 62, 53, 53, 62, 53, 56, 80, 58, 40, 40,
33, 67, 66, 47, 33, 48, 51, 44, 52, 51, 44, 57, 47, 39, 51, 47, 67, 50, 47, 57, 47, 39, 51, 44, 44, 51, 40, 46, 67, 45, 34, 33,
43, 87, 89, 61, 44, 75, 62, 57, 67, 62, 57, 74, 64, 51, 62, 59, 86, 62, 61, 76, 62, 51, 59, 57, 57, 64, 57, 60, 88, 63, 44, 43,
37, 74, 71, 56, 37, 53, 57, 48, 57, 57, 48, 63, 52, 43, 53, 52, 74, 56, 53, 63, 53, 44, 57, 49, 48, 57, 49, 52, 79, 53, 37, 37,
37, 74, 72, 52, 37, 54, 57, 49, 57, 57, 48, 63, 52, 44, 53, 55, 74, 53, 52, 62, 53, 44, 57, 48, 49, 57, 49, 51, 74, 54, 37, 37,
43, 87, 88, 60, 47, 63, 66, 58, 68, 68, 57, 74, 63, 50, 61, 62, 87, 59, 59, 74, 62, 51, 64, 57, 57, 66, 58, 77, 86, 63, 44, 43,
37, 74, 73, 53, 37, 50, 57, 48, 57, 57, 46, 63, 52, 44, 54, 54, 75, 52, 52, 63, 53, 40, 57, 49, 49, 58, 42, 52, 74, 54, 37, 37,
41, 78, 80, 54, 39, 58, 71, 51, 61, 61, 52, 68, 54, 46, 56, 56, 79, 56, 53, 64, 56, 46, 60, 52, 51, 77, 52, 54, 79, 57, 39, 41,
56, 113, 113, 79, 56, 78, 86, 74, 86, 87, 74, 97, 81, 68, 78, 80, 113, 80, 80, 97, 80, 67, 88, 79, 74, 86, 74, 79, 114, 82, 57, 56,
41, 82, 82, 57, 41, 58, 63, 53, 63, 63, 50, 69, 58, 48, 58, 58, 82, 58, 58, 73, 58, 45, 63, 53, 54, 63, 54, 57, 82, 59, 41, 41,
28, 57, 57, 40, 29, 42, 44, 37, 44, 44, 36, 51, 41, 33, 40, 39, 55, 41, 40, 49, 40, 34, 44, 37, 37, 44, 37, 39, 57, 41, 29, 27,
29, 56, 57, 39, 28, 41, 44, 37, 44, 44, 37, 49, 40, 33, 40, 40, 57, 40, 40, 49, 40, 33, 43, 37, 37, 43, 37, 41, 56, 41, 27, 30,
}
```

```
QP0={
80, 40, 40, 58, 80, 56, 52, 61, 52, 52, 61, 47, 57, 68, 57, 56, 40, 57, 56, 47, 56, 68, 53, 61, 61, 53, 61, 56, 40, 55, 82, 78,
40, 20, 20, 29, 40, 28, 26, 31, 26, 26, 32, 22, 28, 34, 29, 27, 19, 29, 28, 24, 28, 34, 26, 31, 31, 26, 31, 29, 20, 28, 40, 41,
40, 20, 20, 29, 40, 29, 26, 32, 27, 26, 31, 23, 28, 34, 28, 28, 20, 28, 28, 23, 28, 34, 26, 32, 32, 26, 31, 29, 20, 28, 40, 40,
58, 29, 29, 42, 59, 41, 38, 44, 38, 38, 44, 34, 40, 48, 42, 40, 29, 41, 41, 34, 41, 49, 37, 41, 44, 38, 43, 42, 29, 40, 58, 58,
80, 40, 40, 59, 83, 55, 52, 61, 52, 52, 61, 48, 57, 68, 56, 57, 40, 57, 58, 48, 58, 68, 52, 61, 61, 48, 62, 59, 41, 56, 80, 80,
56, 28, 29, 41, 55, 39, 36, 42, 36, 31, 42, 33, 39, 47, 39, 37, 27, 40, 39, 33, 39, 47, 30, 43, 42, 36, 46, 39, 29, 39, 55, 56,
52, 26, 26, 38, 52, 36, 34, 39, 34, 34, 40, 31, 36, 44, 37, 37, 26, 38, 37, 31, 37, 45, 36, 40, 40, 34, 40, 32, 26, 36, 52, 52,
61, 31, 32, 44, 61, 42, 39, 46, 40, 40, 47, 35, 44, 52, 43, 42, 31, 43, 43, 37, 42, 52, 40, 47, 47, 39, 47, 45, 31, 43, 62, 61,
52, 26, 27, 38, 52, 36, 34, 40, 34, 34, 40, 31, 37, 45, 37, 37, 26, 35, 37, 31, 37, 44, 34, 40, 40, 34, 40, 38, 26, 36, 52, 52,
52, 26, 26, 38, 52, 31, 34, 40, 34, 34, 40, 31, 36, 44, 37, 38, 26, 37, 37, 31, 37, 44, 37, 40, 40, 33, 40, 38, 26, 36, 52, 52,
61, 32, 31, 44, 61, 42, 40, 47, 40, 40, 46, 35, 43, 52, 44, 43, 31, 45, 43, 36, 42, 52, 40, 47, 47, 40, 50, 44, 31, 45, 63, 61,
47, 22, 23, 34, 48, 33, 31, 35, 31, 31, 35, 28, 33, 40, 33, 33, 24, 33, 34, 28, 33, 40, 31, 36, 36, 31, 36, 34, 24, 33, 45, 47,
57, 28, 28, 40, 57, 39, 36, 44, 37, 36, 43, 33, 39, 48, 40, 40, 28, 39, 40, 33, 40, 48, 36, 43, 43, 36, 43, 42, 28, 39, 55, 57,
68, 34, 34, 48, 68, 47, 44, 52, 45, 44, 52, 40, 48, 52, 48, 48, 34, 48, 45, 40, 48, 58, 44, 53, 52, 45, 52, 50, 33, 47, 69, 68,
57, 29, 28, 42, 56, 39, 37, 43, 37, 37, 44, 33, 40, 48, 41, 40, 28, 40, 40, 35, 40, 44, 37, 43, 43, 37, 42, 40, 29, 39, 56, 57,
56, 27, 28, 40, 57, 37, 37, 42, 37, 38, 43, 33, 40, 48, 40, 40, 28, 40, 40, 33, 40, 48, 38, 43, 41, 37, 42, 41, 28, 39, 58, 56,
40, 19, 20, 29, 40, 27, 26, 31, 26, 26, 31, 24, 28, 34, 28, 28, 20, 28, 28, 24, 28, 34, 26, 31, 31, 26, 30, 29, 20, 28, 41, 40,
57, 29, 28, 41, 57, 40, 38, 43, 35, 37, 45, 33, 39, 48, 40, 40, 28, 40, 40, 34, 40, 45, 37, 41, 43, 38, 43, 41, 28, 39, 56, 57,
56, 28, 28, 41, 58, 39, 37, 43, 37, 37, 43, 34, 40, 45, 40, 40, 28, 40, 40, 33, 41, 48, 37, 43, 43, 38, 43, 43, 28, 39, 57, 56,
47, 24, 23, 34, 48, 33, 31, 37, 31, 31, 36, 28, 33, 40, 35, 33, 24, 34, 33, 27, 33, 40, 30, 36, 37, 31, 36, 35, 23, 31, 47, 47,
56, 28, 28, 41, 58, 39, 37, 42, 37, 37, 42, 33, 40, 48, 40, 40, 28, 40, 41, 33, 40, 48, 37, 43, 43, 37, 43, 41, 28, 39, 57, 56,
68, 34, 34, 49, 68, 47, 45, 52, 44, 44, 52, 40, 48, 58, 44, 48, 34, 45, 48, 40, 48, 58, 45, 52, 52, 45, 56, 49, 34, 50, 68, 68,
53, 26, 26, 37, 52, 30, 36, 40, 34, 37, 40, 31, 36, 44, 37, 38, 26, 37, 37, 30, 37, 45, 39, 40, 40, 35, 40, 38, 26, 36, 52, 53,
61, 31, 32, 41, 61, 43, 40, 47, 40, 40, 47, 36, 43, 53, 43, 43, 31, 41, 43, 36, 43, 52, 40, 47, 47, 40, 47, 44, 29, 43, 61, 61,
61, 31, 32, 44, 61, 42, 40, 47, 40, 40, 47, 36, 43, 52, 43, 41, 31, 43, 43, 37, 43, 52, 40, 47, 47, 40, 47, 45, 31, 42, 61, 61,
53, 26, 26, 38, 48, 36, 34, 39, 34, 33, 40, 31, 36, 45, 37, 37, 26, 38, 38, 31, 37, 45, 35, 40, 40, 34, 39, 30, 26, 36, 52, 53,
61, 31, 31, 43, 62, 46, 40, 47, 40, 40, 50, 36, 43, 52, 42, 42, 30, 43, 43, 36, 43, 56, 40, 47, 47, 39, 54, 43, 31, 43, 61, 61,
56, 29, 29, 42, 59, 39, 32, 45, 38, 38, 44, 34, 42, 50, 40, 41, 29, 41, 43, 35, 41, 49, 38, 44, 45, 30, 43, 42, 29, 40, 58, 56,
40, 20, 20, 29, 41, 29, 26, 31, 26, 26, 31, 24, 28, 33, 29, 28, 20, 28, 28, 23, 28, 34, 26, 29, 31, 26, 31, 29, 20, 28, 40, 40,
55, 28, 28, 40, 56, 39, 36, 43, 36, 36, 45, 33, 39, 47, 39, 39, 28, 39, 39, 31, 39, 50, 36, 43, 42, 36, 43, 40, 28, 38, 56, 55,
82, 40, 40, 58, 80, 55, 52, 62, 52, 52, 63, 45, 55, 69, 56, 58, 41, 56, 57, 47, 57, 68, 52, 61, 61, 52, 61, 58, 40, 56, 78, 83,
78, 41, 40, 58, 80, 56, 52, 61, 52, 52, 61, 47, 57, 68, 57, 56, 40, 57, 56, 47, 56, 68, 53, 61, 61, 53, 61, 56, 40, 55, 83, 76,
},
```

```
QP1={
88, 44, 44, 63, 88, 61, 58, 67, 58, 58, 67, 52, 62, 75, 62, 62, 44, 62, 62, 51, 62, 75, 58, 67, 67, 58, 67, 62, 44, 61, 90, 86,
44, 22, 22, 32, 44, 30, 29, 34, 29, 29, 35, 25, 31, 38, 32, 30, 21, 31, 31, 26, 31, 37, 29, 34, 34, 29, 34, 32, 22, 31, 44, 45,
44, 22, 22, 32, 44, 31, 28, 35, 30, 28, 34, 26, 31, 37, 31, 31, 22, 31, 31, 25, 31, 38, 28, 35, 35, 28, 34, 31, 22, 30, 44, 44,
63, 32, 32, 46, 65, 45, 42, 48, 41, 41, 49, 37, 45, 53, 46, 45, 32, 45, 45, 37, 45, 54, 41, 45, 49, 42, 48, 46, 32, 44, 63, 64,
88, 44, 44, 65, 92, 61, 57, 67, 58, 57, 67, 53, 63, 75, 62, 62, 44, 62, 64, 53, 64, 75, 57, 67, 67, 53, 68, 65, 45, 61, 88, 88,
61, 30, 31, 45, 61, 43, 40, 47, 40, 34, 46, 36, 43, 52, 42, 41, 30, 44, 43, 36, 43, 52, 33, 47, 47, 40, 50, 43, 32, 43, 60, 61,
58, 29, 28, 42, 57, 40, 38, 43, 37, 38, 44, 34, 40, 48, 41, 41, 29, 42, 41, 34, 41, 49, 40, 44, 44, 38, 44, 35, 29, 40, 58, 57,
67, 34, 35, 48, 67, 47, 43, 51, 44, 44, 52, 38, 48, 57, 47, 46, 34, 48, 48, 41, 46, 57, 44, 52, 51, 43, 52, 49, 34, 47, 68, 67,
58, 29, 30, 41, 58, 40, 37, 44, 38, 37, 44, 34, 41, 49, 40, 41, 29, 39, 41, 34, 41, 48, 37, 44, 44, 37, 44, 41, 29, 40, 57, 57,
58, 29, 28, 41, 57, 34, 38, 44, 37, 38, 44, 34, 40, 49, 41, 42, 29, 41, 41, 34, 41, 49, 40, 44, 44, 37, 44, 41, 29, 40, 57, 57,
67, 35, 34, 49, 67, 46, 44, 52, 44, 44, 51, 39, 48, 57, 48, 48, 34, 49, 48, 40, 47, 57, 44, 52, 52, 44, 55, 48, 34, 50, 69, 67,
52, 25, 26, 37, 53, 36, 34, 38, 34, 34, 39, 30, 36, 44, 36, 37, 26, 37, 38, 30, 37, 44, 34, 40, 39, 34, 40, 37, 26, 36, 49, 52,
62, 31, 31, 45, 63, 43, 40, 48, 41, 40, 48, 36, 43, 53, 44, 44, 31, 43, 44, 36, 44, 53, 39, 48, 48, 40, 48, 46, 31, 43, 61, 62,
75, 38, 37, 53, 75, 52, 48, 57, 49, 49, 57, 44, 53, 57, 53, 53, 37, 53, 50, 44, 53, 64, 49, 58, 57, 50, 57, 55, 37, 52, 76, 75,
62, 32, 31, 46, 62, 42, 41, 47, 40, 41, 48, 36, 44, 53, 45, 44, 31, 44, 44, 38, 44, 49, 41, 47, 47, 41, 47, 44, 32, 43, 62, 62,
62, 30, 31, 45, 62, 41, 41, 46, 41, 42, 48, 37, 44, 53, 44, 44, 31, 44, 44, 37, 44, 53, 42, 48, 45, 41, 46, 45, 31, 43, 63, 62,
44, 21, 22, 32, 44, 30, 29, 34, 29, 29, 34, 26, 31, 37, 31, 31, 22, 31, 31, 26, 31, 37, 29, 34, 34, 29, 33, 32, 22, 31, 45, 44,
62, 31, 31, 45, 62, 44, 42, 48, 39, 41, 49, 37, 43, 53, 44, 44, 31, 44, 44, 37, 44, 50, 41, 45, 48, 42, 48, 45, 31, 43, 62, 62,
62, 31, 31, 45, 64, 43, 41, 48, 41, 41, 48, 38, 44, 50, 44, 44, 31, 44, 44, 37, 45, 53, 41, 48, 48, 42, 48, 47, 31, 43, 62, 62,
51, 26, 25, 37, 53, 36, 34, 41, 34, 34, 40, 30, 36, 44, 38, 37, 26, 37, 37, 30, 37, 44, 33, 40, 41, 34, 40, 39, 26, 34, 52, 51,
62, 31, 31, 45, 64, 43, 41, 46, 41, 41, 47, 37, 44, 53, 44, 44, 31, 44, 45, 37, 44, 53, 41, 48, 48, 41, 47, 45, 31, 43, 62, 62,
75, 37, 38, 54, 75, 52, 49, 57, 48, 49, 57, 44, 53, 64, 49, 53, 37, 50, 53, 44, 53, 64, 49, 57, 57, 49, 62, 54, 37, 55, 74, 75,
58, 29, 28, 41, 57, 33, 40, 44, 37, 40, 44, 34, 39, 49, 41, 42, 29, 41, 41, 33, 41, 49, 43, 44, 44, 39, 44, 41, 29, 40, 58, 58,
67, 34, 35, 45, 67, 47, 44, 52, 44, 44, 52, 40, 48, 58, 47, 48, 34, 45, 48, 40, 48, 57, 44, 51, 52, 44, 52, 48, 32, 47, 67, 67,
67, 34, 35, 49, 67, 47, 44, 51, 44, 44, 52, 39, 48, 57, 47, 45, 34, 48, 48, 41, 48, 57, 44, 52, 52, 44, 52, 49, 34, 47, 67, 67,
58, 29, 28, 42, 53, 40, 38, 43, 37, 37, 44, 34, 40, 50, 41, 41, 29, 42, 42, 34, 41, 49, 39, 44, 44, 38, 43, 33, 29, 40, 57, 58,
67, 34, 34, 48, 68, 50, 44, 52, 44, 44, 55, 40, 48, 57, 47, 46, 33, 48, 48, 40, 47, 62, 44, 52, 52, 43, 59, 48, 34, 47, 67, 67,
62, 32, 31, 46, 65, 43, 35, 49, 41, 41, 48, 37, 46, 55, 44, 45, 32, 45, 47, 39, 45, 54, 41, 48, 49, 33, 48, 46, 32, 44, 64, 62,
44, 22, 22, 32, 45, 32, 29, 34, 29, 29, 34, 26, 31, 37, 32, 31, 22, 31, 31, 26, 31, 37, 29, 32, 34, 29, 34, 32, 22, 31, 44, 45,
61, 31, 30, 44, 61, 43, 40, 47, 40, 40, 50, 36, 43, 52, 43, 43, 31, 43, 43, 34, 43, 55, 40, 47, 47, 40, 47, 44, 31, 42, 61, 61,
90, 44, 44, 63, 88, 60, 58, 68, 57, 57, 69, 49, 61, 76, 62, 63, 45, 62, 62, 52, 62, 74, 58, 67, 67, 57, 67, 64, 44, 61, 86, 91,
86, 45, 44, 64, 88, 61, 57, 67, 57, 57, 67, 52, 62, 75, 62, 62, 44, 62, 62, 51, 62, 75, 58, 67, 67, 58, 67, 62, 45, 61, 91, 83,
},
```

```
QP2={
104, 52, 52, 75, 104, 72, 68, 80, 68, 68, 80, 61, 74, 89, 74, 73, 52, 74, 73, 61, 73, 89, 69, 79, 80, 69, 79, 73, 52, 72, 107, 101,
52, 26, 26, 37, 52, 36, 34, 40, 34, 34, 41, 29, 36, 45, 37, 35, 25, 37, 37, 31, 37, 44, 34, 40, 40, 34, 40, 38, 26, 36, 52, 53,
52, 26, 26, 38, 52, 37, 33, 42, 35, 34, 40, 30, 37, 44, 37, 37, 26, 37, 37, 29, 36, 45, 33, 41, 41, 33, 40, 37, 26, 36, 52, 52,
75, 37, 38, 54, 77, 54, 49, 57, 49, 49, 58, 44, 53, 63, 55, 53, 38, 53, 53, 44, 53, 63, 48, 53, 57, 49, 56, 54, 37, 52, 75, 75,
104, 52, 52, 77, 108, 72, 68, 80, 68, 68, 79, 62, 75, 89, 73, 74, 52, 74, 76, 63, 75, 89, 68, 80, 80, 63, 80, 77, 53, 72, 104, 104,
72, 36, 37, 54, 72, 50, 47, 55, 47, 40, 54, 43, 51, 61, 50, 49, 35, 51, 51, 43, 51, 61, 40, 56, 55, 47, 59, 51, 38, 51, 71, 72,
68, 34, 33, 49, 68, 47, 44, 51, 44, 44, 52, 40, 47, 57, 48, 48, 34, 49, 48, 40, 48, 58, 47, 52, 52, 44, 52, 41, 34, 47, 68, 68,
80, 40, 42, 57, 80, 55, 51, 60, 52, 52, 61, 45, 57, 68, 56, 54, 40, 56, 56, 48, 55, 68, 52, 61, 61, 51, 61, 58, 40, 56, 80, 79,
68, 34, 35, 49, 68, 47, 44, 52, 44, 44, 52, 40, 48, 58, 48, 48, 34, 46, 48, 40, 48, 57, 44, 52, 52, 44, 52, 49, 34, 47, 67, 68,
68, 34, 34, 49, 68, 40, 44, 52, 44, 45, 52, 40, 47, 58, 48, 49, 34, 48, 48, 40, 48, 58, 47, 52, 52, 43, 52, 49, 34, 47, 68, 68,
80, 41, 40, 58, 79, 54, 52, 61, 52, 52, 60, 46, 57, 68, 57, 56, 40, 58, 56, 47, 55, 67, 52, 62, 61, 52, 65, 57, 40, 59, 82, 79,
61, 29, 30, 44, 62, 43, 40, 45, 40, 40, 46, 36, 43, 52, 43, 44, 31, 43, 44, 36, 43, 52, 40, 47, 47, 40, 47, 44, 31, 43, 58, 61,
74, 36, 37, 53, 75, 51, 47, 57, 48, 47, 57, 43, 51, 63, 52, 52, 37, 51, 52, 42, 52, 63, 46, 56, 56, 47, 56, 55, 36, 51, 72, 74,
89, 45, 44, 63, 89, 61, 57, 68, 58, 58, 68, 52, 63, 68, 63, 62, 44, 62, 59, 52, 62, 75, 58, 68, 68, 59, 67, 65, 44, 61, 90, 88,
74, 37, 37, 55, 73, 50, 48, 56, 48, 48, 57, 43, 52, 63, 53, 52, 37, 52, 52, 45, 52, 58, 48, 55, 56, 48, 55, 53, 38, 51, 73, 74,
73, 35, 37, 53, 74, 49, 48, 54, 48, 49, 56, 44, 52, 62, 52, 52, 37, 52, 52, 43, 52, 62, 50, 56, 54, 48, 55, 53, 37, 51, 75, 73,
52, 25, 26, 38, 52, 35, 34, 40, 34, 34, 40, 31, 37, 44, 37, 37, 26, 37, 37, 31, 37, 44, 34, 40, 40, 34, 40, 38, 26, 36, 53, 52,
74, 37, 37, 53, 74, 51, 49, 56, 46, 48, 58, 43, 51, 62, 52, 52, 37, 52, 52, 44, 52, 59, 48, 53, 56, 50, 57, 53, 37, 51, 73, 74,
73, 37, 37, 53, 76, 51, 48, 56, 48, 48, 56, 44, 52, 59, 52, 52, 37, 52, 52, 43, 53, 63, 48, 56, 56, 50, 56, 55, 37, 51, 74, 73,
61, 31, 29, 44, 63, 43, 40, 48, 40, 40, 47, 36, 42, 52, 45, 43, 31, 44, 43, 35, 43, 52, 39, 47, 48, 40, 47, 46, 31, 40, 61, 61,
73, 37, 36, 53, 75, 51, 48, 55, 48, 48, 55, 43, 52, 62, 52, 52, 37, 52, 53, 43, 52, 62, 48, 56, 56, 48, 56, 53, 37, 51, 74, 73,
89, 44, 45, 63, 89, 61, 58, 68, 57, 58, 67, 52, 63, 75, 58, 62, 44, 59, 63, 52, 62, 75, 58, 68, 68, 58, 73, 64, 44, 65, 88, 89,
69, 34, 33, 48, 68, 40, 47, 52, 44, 47, 52, 40, 46, 58, 48, 50, 34, 48, 48, 39, 48, 58, 51, 52, 52, 46, 52, 49, 34, 47, 68, 69,
79, 40, 41, 53, 80, 56, 52, 61, 52, 52, 62, 47, 56, 68, 55, 56, 40, 53, 56, 47, 56, 68, 52, 61, 61, 52, 61, 57, 37, 55, 80, 79,
80, 40, 41, 57, 80, 55, 52, 61, 52, 52, 61, 47, 56, 68, 56, 54, 40, 56, 56, 48, 56, 68, 52, 61, 61, 52, 61, 58, 40, 55, 80, 79,
69, 34, 33, 49, 63, 47, 44, 51, 44, 43, 52, 40, 47, 59, 48, 48, 34, 50, 50, 40, 48, 58, 46, 52, 52, 45, 51, 38, 34, 47, 68, 69,
79, 40, 40, 56, 80, 59, 52, 61, 52, 52, 65, 47, 56, 67, 55, 55, 40, 57, 56, 47, 56, 73, 52, 61, 61, 51, 70, 57, 40, 55, 79, 79,
73, 38, 37, 54, 77, 51, 41, 58, 49, 49, 57, 44, 55, 65, 53, 53, 38, 53, 55, 46, 53, 64, 49, 57, 58, 38, 57, 54, 37, 52, 75, 73,
52, 26, 26, 37, 53, 38, 34, 40, 34, 34, 40, 31, 36, 44, 38, 37, 26, 37, 37, 31, 37, 44, 34, 37, 40, 34, 40, 37, 26, 36, 52, 53,
72, 36, 36, 52, 72, 51, 47, 56, 47, 47, 59, 43, 51, 61, 51, 51, 36, 51, 51, 40, 51, 65, 47, 55, 55, 47, 55, 52, 36, 50, 72, 72,
107, 52, 52, 75, 104, 71, 68, 80, 67, 68, 82, 58, 72, 90, 73, 75, 53, 73, 74, 61, 74, 88, 68, 80, 80, 68, 79, 75, 52, 72, 102, 108,
101, 53, 52, 75, 104, 72, 68, 79, 68, 68, 79, 61, 74, 88, 74, 73, 52, 74, 73, 61, 73, 89, 69, 79, 79, 69, 79, 73, 53, 72, 108, 98,
},
```

```
QP4={
128, 64, 64, 92, 128, 89, 84, 98, 84, 84, 98, 75, 91, 109, 91, 90, 64, 91, 90, 75, 90, 109, 84, 97, 98, 85, 97, 90, 65, 88, 131, 124,
64, 32, 32, 46, 64, 44, 42, 49, 42, 41, 51, 36, 45, 55, 46, 43, 31, 46, 45, 38, 45, 54, 42, 49, 49, 42, 49, 47, 32, 45, 63, 65,
64, 32, 32, 46, 64, 46, 41, 51, 43, 41, 50, 37, 45, 54, 45, 45, 32, 45, 45, 36, 45, 55, 41, 51, 51, 41, 50, 46, 32, 44, 64, 64,
92, 46, 46, 66, 95, 66, 61, 70, 60, 60, 71, 54, 65, 77, 67, 65, 46, 65, 65, 54, 65, 78, 59, 66, 71, 61, 69, 67, 46, 64, 92, 92,
128, 64, 64, 95, 134, 88, 83, 98, 84, 83, 97, 77, 92, 109, 90, 90, 64, 91, 93, 77, 93, 109, 83, 98, 98, 77, 99, 94, 65, 89, 128, 128,
89, 44, 46, 66, 88, 62, 58, 68, 58, 49, 67, 52, 63, 75, 62, 60, 43, 63, 63, 53, 63, 76, 49, 69, 68, 58, 73, 62, 47, 63, 88, 89,
84, 42, 41, 61, 83, 58, 55, 63, 54, 55, 64, 49, 58, 70, 59, 59, 42, 61, 59, 49, 59, 71, 58, 64, 64, 55, 64, 51, 42, 58, 84, 83,
98, 49, 51, 70, 98, 68, 63, 74, 64, 64, 75, 56, 70, 83, 69, 67, 49, 69, 69, 59, 67, 83, 64, 75, 75, 63, 75, 71, 49, 68, 98, 98,
84, 42, 43, 60, 84, 58, 54, 64, 55, 54, 64, 49, 59, 72, 58, 59, 42, 56, 59, 49, 59, 70, 54, 64, 64, 54, 64, 60, 42, 58, 83, 84,
84, 41, 41, 60, 83, 49, 55, 64, 54, 55, 64, 49, 58, 71, 59, 61, 42, 59, 59, 49, 59, 71, 58, 64, 64, 53, 64, 60, 42, 58, 83, 84,
98, 51, 50, 71, 97, 67, 64, 75, 64, 64, 73, 57, 70, 84, 70, 69, 49, 71, 70, 58, 68, 82, 64, 76, 76, 64, 80, 70, 49, 73, 101, 98,
75, 36, 37, 54, 77, 52, 49, 56, 49, 49, 57, 44, 53, 64, 53, 54, 38, 53, 55, 44, 53, 64, 49, 58, 57, 49, 58, 54, 38, 53, 72, 75,
91, 45, 45, 65, 92, 63, 58, 70, 59, 58, 70, 53, 63, 77, 65, 64, 45, 63, 64, 52, 64, 77, 57, 69, 69, 58, 69, 67, 45, 63, 89, 91,
109, 55, 54, 77, 109, 75, 70, 83, 72, 71, 84, 64, 77, 83, 77, 77, 54, 77, 73, 64, 77, 93, 71, 84, 83, 73, 83, 79, 54, 76, 110, 109,
91, 46, 45, 67, 90, 62, 59, 69, 58, 59, 70, 53, 65, 77, 65, 64, 45, 64, 64, 55, 64, 71, 59, 68, 69, 59, 68, 65, 47, 63, 90, 91,
90, 43, 45, 65, 90, 60, 59, 67, 59, 61, 69, 54, 64, 77, 64, 64, 45, 64, 64, 53, 64, 77, 61, 69, 66, 59, 68, 65, 45, 63, 92, 90,
64, 31, 32, 46, 64, 43, 42, 49, 42, 42, 49, 38, 45, 54, 45, 45, 32, 45, 45, 38, 45, 54, 42, 49, 49, 42, 49, 46, 32, 44, 66, 64,
91, 46, 45, 65, 91, 63, 61, 69, 56, 59, 71, 53, 63, 77, 64, 64, 45, 64, 64, 54, 64, 73, 59, 66, 69, 61, 70, 65, 46, 63, 90, 91,
90, 45, 45, 65, 93, 63, 59, 69, 59, 59, 70, 55, 64, 73, 64, 64, 45, 64, 63, 53, 65, 77, 59, 69, 69, 61, 69, 68, 45, 63, 91, 90,
75, 38, 36, 54, 77, 53, 49, 59, 49, 49, 58, 44, 52, 64, 55, 53, 38, 54, 53, 43, 53, 64, 48, 58, 59, 49, 58, 57, 38, 50, 75, 75,
90, 45, 45, 65, 93, 63, 59, 67, 59, 59, 68, 53, 64, 77, 64, 64, 45, 64, 65, 53, 64, 77, 59, 69, 69, 59, 69, 65, 45, 63, 91, 90,
109, 54, 55, 78, 109, 76, 71, 83, 70, 71, 82, 64, 77, 93, 71, 77, 54, 73, 77, 64, 77, 93, 71, 83, 83, 72, 90, 79, 54, 80, 108, 109,
84, 42, 41, 59, 83, 49, 58, 64, 54, 58, 64, 49, 57, 71, 59, 61, 42, 59, 59, 48, 59, 71, 62, 64, 64, 57, 64, 60, 41, 58, 84, 84,
97, 49, 51, 66, 98, 69, 64, 75, 64, 64, 76, 58, 69, 84, 68, 69, 49, 66, 69, 58, 69, 83, 64, 75, 75, 64, 75, 70, 46, 68, 98, 97,
98, 49, 51, 71, 98, 68, 64, 75, 64, 64, 76, 57, 69, 83, 69, 66, 49, 69, 69, 59, 69, 83, 64, 75, 75, 64, 75, 71, 49, 68, 98, 98,
85, 42, 41, 61, 77, 58, 55, 63, 54, 53, 64, 49, 58, 73, 59, 59, 42, 61, 61, 49, 59, 72, 57, 64, 64, 55, 63, 47, 42, 58, 83, 85,
97, 49, 50, 69, 99, 73, 64, 75, 64, 64, 80, 58, 69, 83, 68, 68, 49, 70, 69, 58, 69, 90, 64, 75, 75, 63, 86, 70, 49, 68, 98, 97,
90, 47, 46, 67, 94, 62, 51, 71, 60, 60, 70, 54, 67, 79, 65, 65, 46, 65, 68, 57, 65, 79, 60, 70, 71, 47, 70, 67, 46, 64, 93, 90,
65, 32, 32, 46, 65, 47, 42, 49, 42, 42, 49, 38, 45, 54, 47, 45, 32, 46, 45, 38, 45, 54, 41, 46, 49, 42, 49, 46, 32, 44, 64, 65,
88, 45, 44, 64, 89, 63, 58, 68, 58, 58, 73, 53, 63, 76, 63, 63, 44, 63, 63, 50, 63, 80, 58, 68, 68, 58, 68, 64, 44, 61, 89, 89,
131, 63, 64, 92, 128, 88, 84, 98, 83, 83, 101, 72, 89, 110, 90, 92, 66, 90, 91, 75, 91, 108, 84, 98, 98, 83, 98, 93, 64, 89, 126, 133,
124, 65, 64, 92, 128, 89, 83, 98, 84, 84, 98, 75, 91, 109, 91, 90, 64, 91, 90, 75, 90, 109, 84, 97, 98, 85, 97, 90, 65, 89, 133, 121,
},
```

```
QP1={
93, 93, 93, 93, 94, 93, 94, 93, 94, 94, 94, 93, 94, 94, 94, 93, 93, 94, 93, 93, 93, 93, 93, 93, 94, 95, 93, 92, 95, 95, 94, 87,
93, 94, 93, 93, 94, 94, 93, 94, 94, 94, 95, 97, 94, 96, 96, 98, 97, 95, 94, 94, 94, 94, 93, 94, 93, 94, 94, 94, 93, 94, 93, 93,
93, 93, 94, 93, 94, 95, 98, 100, 98, 93, 95, 94, 93, 94, 94, 93, 93, 94, 94, 87, 93, 94, 94, 97, 97, 93, 95, 93, 93, 94, 94, 92,
93, 93, 93, 94, 95, 97, 95, 94, 94, 94, 94, 94, 93, 91, 93, 92, 93, 93, 94, 94, 94, 94, 95, 90, 95, 94, 96, 93, 93, 93, 94, 94,
94, 94, 94, 95, 97, 93, 94, 94, 94, 94, 95, 95, 94, 93, 94, 94, 94, 94, 94, 96, 95, 93, 94, 94, 94, 90, 94, 95, 95, 93, 94, 93,
93, 94, 95, 97, 93, 93, 93, 94, 95, 90, 94, 94, 93, 94, 93, 95, 94, 94, 94, 94, 93, 92, 91, 94, 93, 93, 99, 93, 95, 94, 93, 93,
94, 93, 98, 95, 94, 93, 95, 90, 92, 94, 94, 93, 95, 96, 93, 94, 94, 94, 98, 95, 93, 93, 91, 91, 91, 94, 94, 89, 94, 98, 93, 93,
93, 94, 100, 94, 94, 94, 90, 94, 94, 94, 95, 95, 94, 94, 93, 98, 94, 93, 94, 93, 93, 94, 94, 93, 95, 93, 94, 93, 95, 96, 94, 93,
94, 94, 98, 94, 94, 95, 92, 94, 94, 95, 95, 94, 94, 99, 94, 94, 94, 91, 94, 94, 94, 95, 94, 94, 95, 94, 95, 94, 95, 94, 94, 94,
94, 94, 93, 94, 94, 90, 94, 94, 95, 95, 94, 95, 98, 95, 94, 96, 94, 94, 94, 97, 94, 94, 91, 94, 93, 93, 93, 94, 93, 94, 94, 94,
94, 95, 95, 94, 95, 94, 94, 95, 95, 94, 94, 94, 94, 95, 94, 94, 94, 96, 94, 94, 94, 94, 94, 94, 94, 100, 95, 94, 96, 95, 94,
93, 97, 94, 94, 95, 94, 93, 95, 94, 95, 94, 95, 93, 96, 94, 94, 94, 94, 95, 95, 94, 91, 94, 94, 96, 94, 95, 94, 93, 94, 96, 94,
94, 94, 93, 93, 94, 93, 95, 94, 94, 98, 94, 93, 91, 94, 94, 94, 94, 94, 93, 93, 92, 93, 96, 94, 95, 94, 94, 92, 92, 93, 94, 94,
94, 96, 94, 91, 93, 94, 96, 94, 99, 95, 95, 96, 94, 83, 93, 94, 94, 94, 88, 94, 94, 94, 95, 99, 93, 93, 94, 93, 91, 94, 95, 94,
94, 96, 94, 93, 94, 93, 93, 93, 94, 94, 94, 94, 94, 93, 94, 94, 94, 93, 93, 95, 94, 95, 93, 92, 93, 94, 93, 93, 94, 94, 93, 94,
93, 98, 93, 92, 94, 95, 94, 98, 94, 96, 94, 94, 94, 94, 94, 94, 94, 94, 94, 94, 93, 94, 94, 94, 98, 94, 94, 94, 94, 94, 95, 94,
93, 97, 93, 93, 94, 94, 94, 94, 94, 94, 94, 94, 94, 94, 94, 94, 93, 94, 93, 94, 93, 94, 93, 94, 94, 94, 93, 94, 95, 94, 94, 94,
94, 95, 94, 93, 94, 94, 94, 93, 91, 94, 96, 94, 94, 94, 93, 94, 94, 92, 94, 95, 94, 96, 94, 89, 93, 95, 94, 93, 93, 94, 93, 94,
93, 94, 94, 94, 94, 94, 98, 94, 94, 94, 94, 95, 93, 88, 93, 94, 93, 94, 94, 94, 93, 94, 94, 95, 93, 94, 94, 94, 93, 94, 93, 94,
93, 94, 87, 94, 96, 94, 95, 93, 94, 97, 94, 95, 93, 94, 95, 94, 94, 95, 94, 94, 94, 93, 95, 94, 94, 94, 94, 94, 93, 86, 94, 93,
93, 94, 93, 94, 95, 93, 93, 93, 94, 94, 94, 94, 92, 94, 94, 93, 93, 94, 93, 94, 93, 90, 94, 94, 94, 94, 94, 94, 93, 93, 94, 94,
93, 94, 94, 94, 93, 92, 93, 94, 95, 94, 94, 91, 93, 94, 95, 94, 94, 96, 94, 93, 90, 94, 94, 94, 93, 93, 98, 93, 93, 95, 94, 93,
93, 93, 94, 95, 94, 91, 91, 94, 94, 91, 94, 94, 96, 95, 93, 94, 93, 94, 94, 95, 94, 94, 88, 94, 93, 90, 94, 94, 95, 95, 94, 93,
93, 94, 97, 90, 94, 94, 91, 93, 94, 94, 94, 94, 94, 99, 92, 94, 94, 89, 95, 94, 94, 94, 94, 94, 94, 93, 94, 93, 92, 93, 94, 93,
94, 93, 97, 95, 94, 93, 91, 95, 95, 93, 94, 96, 95, 93, 93, 98, 94, 93, 93, 94, 94, 93, 93, 94, 95, 93, 94, 94, 96, 93, 93, 94,
95, 94, 93, 94, 90, 93, 94, 93, 94, 93, 94, 94, 94, 93, 94, 94, 94, 95, 94, 94, 94, 93, 90, 93, 93, 94, 94, 86, 94, 93, 94, 94,
93, 94, 95, 96, 94, 99, 94, 94, 95, 93, 100, 95, 94, 94, 93, 94, 93, 94, 94, 94, 94, 98, 94, 94, 94, 94, 105, 94, 94, 94, 94, 93,
92, 94, 93, 93, 95, 93, 89, 93, 94, 94, 95, 94, 92, 93, 93, 94, 94, 93, 94, 94, 94, 93, 94, 93, 94, 86, 94, 93, 93, 93, 94, 92,
95, 93, 93, 93, 95, 95, 94, 95, 95, 93, 94, 93, 92, 91, 94, 94, 95, 93, 93, 93, 93, 93, 95, 92, 96, 94, 94, 93, 92, 93, 94, 96,
95, 94, 94, 93, 93, 94, 98, 96, 94, 94, 96, 94, 93, 94, 94, 94, 94, 94, 94, 86, 93, 95, 95, 93, 93, 93, 94, 93, 93, 94, 94, 94,
94, 93, 94, 94, 94, 93, 93, 94, 94, 94, 95, 96, 94, 95, 93, 95, 94, 93, 93, 94, 94, 94, 94, 94, 93, 94, 94, 94, 94, 94, 92, 95,
87, 93, 92, 94, 93, 93, 93, 93, 94, 94, 94, 94, 94, 94, 94, 94, 94, 94, 94, 93, 94, 93, 93, 93, 94, 94, 93, 92, 96, 94, 95, 81,
},
```

```
QP2={
79, 79, 79, 79, 79, 79, 79, 79, 79, 79, 80, 79, 79, 79, 79, 79, 79, 79, 79, 79, 79, 79, 79, 79, 80, 80, 79, 78, 80, 81, 80, 74,
79, 79, 79, 79, 79, 79, 78, 80, 80, 80, 81, 82, 79, 81, 81, 83, 82, 81, 80, 79, 79, 79, 79, 80, 79, 79, 80, 79, 79, 79, 78, 79,
79, 79, 79, 79, 79, 80, 83, 85, 83, 79, 80, 79, 79, 79, 79, 79, 79, 79, 79, 73, 79, 80, 80, 82, 82, 79, 80, 79, 79, 79, 79, 78,
79, 79, 79, 80, 80, 82, 80, 79, 80, 79, 80, 80, 78, 77, 79, 78, 78, 79, 79, 79, 79, 79, 80, 77, 80, 80, 81, 79, 79, 79, 79, 80,
79, 79, 79, 80, 82, 79, 79, 79, 80, 79, 80, 80, 80, 79, 79, 79, 79, 79, 79, 81, 80, 79, 79, 79, 80, 77, 80, 80, 80, 79, 79, 79,
79, 79, 80, 82, 79, 79, 79, 79, 80, 76, 79, 80, 79, 79, 78, 80, 80, 79, 80, 79, 79, 78, 77, 80, 79, 79, 84, 79, 80, 80, 79, 79,
79, 78, 83, 80, 79, 79, 80, 76, 78, 80, 80, 79, 80, 82, 78, 79, 79, 79, 83, 80, 79, 79, 77, 77, 77, 80, 80, 75, 80, 83, 78, 79,
79, 80, 85, 79, 79, 79, 76, 80, 80, 80, 80, 80, 80, 80, 79, 83, 79, 79, 80, 79, 79, 79, 79, 79, 80, 78, 80, 79, 80, 81, 79, 79,
79, 80, 83, 80, 80, 80, 78, 80, 80, 80, 81, 80, 80, 83, 79, 79, 79, 77, 80, 80, 79, 81, 80, 80, 80, 79, 80, 79, 81, 80, 80, 79,
79, 80, 79, 79, 79, 76, 80, 80, 80, 80, 80, 80, 83, 80, 79, 81, 80, 79, 80, 82, 80, 80, 77, 80, 79, 79, 79, 79, 79, 79, 80, 80,
80, 81, 80, 80, 80, 79, 80, 80, 81, 80, 80, 80, 80, 80, 80, 80, 80, 81, 80, 80, 79, 80, 80, 79, 80, 80, 84, 80, 79, 81, 81, 80,
79, 82, 79, 80, 80, 80, 79, 80, 80, 80, 80, 80, 79, 81, 79, 79, 79, 79, 80, 80, 79, 77, 80, 80, 81, 80, 80, 79, 79, 80, 82, 79,
79, 79, 79, 78, 80, 79, 80, 80, 80, 83, 80, 79, 77, 79, 80, 79, 79, 80, 79, 78, 78, 79, 81, 80, 80, 80, 80, 78, 78, 79, 80, 80,
79, 81, 79, 77, 79, 79, 82, 80, 83, 80, 80, 81, 79, 70, 79, 80, 79, 79, 75, 80, 79, 80, 80, 83, 79, 78, 80, 79, 77, 80, 80, 80,
79, 81, 79, 79, 79, 78, 78, 79, 79, 79, 80, 79, 80, 79, 80, 79, 79, 79, 79, 80, 79, 80, 79, 78, 78, 80, 79, 79, 79, 79, 79, 79,
79, 83, 79, 78, 79, 80, 79, 83, 79, 81, 80, 79, 79, 80, 79, 80, 79, 80, 79, 80, 79, 80, 80, 80, 83, 80, 79, 79, 80, 79, 80, 79,
79, 82, 79, 78, 79, 80, 79, 79, 79, 80, 80, 79, 79, 79, 79, 79, 79, 79, 79, 80, 79, 80, 79, 79, 80, 80, 79, 79, 80, 79, 80, 79,
79, 81, 79, 79, 79, 79, 79, 79, 77, 79, 81, 79, 80, 79, 79, 80, 79, 78, 79, 80, 79, 81, 79, 76, 79, 81, 80, 79, 79, 79, 78, 79,
79, 80, 79, 79, 79, 80, 83, 80, 80, 80, 80, 80, 79, 75, 79, 79, 79, 79, 79, 80, 79, 79, 80, 80, 79, 80, 80, 79, 79, 80, 79, 79,
79, 79, 73, 79, 81, 79, 80, 79, 80, 82, 80, 80, 78, 80, 80, 80, 80, 80, 80, 80, 79, 79, 80, 80, 80, 80, 80, 79, 79, 73, 79, 79,
79, 79, 79, 79, 80, 79, 79, 79, 79, 80, 79, 79, 78, 79, 79, 79, 79, 79, 79, 79, 79, 76, 79, 79, 80, 79, 79, 79, 78, 79, 79, 79,
79, 79, 80, 79, 79, 78, 79, 79, 81, 80, 80, 77, 79, 80, 80, 80, 80, 81, 79, 79, 76, 79, 80, 79, 79, 79, 83, 79, 79, 80, 79, 79,
79, 79, 80, 80, 79, 77, 77, 79, 80, 77, 80, 80, 81, 80, 79, 80, 79, 79, 80, 80, 79, 80, 74, 79, 79, 76, 80, 79, 80, 80, 79, 79,
79, 80, 82, 77, 79, 80, 77, 79, 80, 80, 79, 80, 80, 83, 78, 80, 79, 76, 80, 80, 79, 79, 79, 79, 79, 79, 80, 79, 78, 79, 79, 79,
80, 79, 82, 80, 80, 79, 77, 80, 80, 79, 80, 81, 80, 79, 78, 83, 80, 79, 79, 80, 80, 79, 79, 79, 80, 79, 79, 80, 81, 79, 79, 80,
80, 79, 79, 80, 77, 79, 80, 78, 79, 79, 80, 80, 80, 78, 80, 80, 80, 81, 80, 80, 79, 79, 76, 79, 79, 79, 80, 73, 79, 79, 79, 80,
79, 80, 80, 81, 80, 84, 80, 80, 80, 79, 84, 80, 80, 80, 79, 79, 79, 80, 80, 80, 79, 83, 80, 80, 79, 80, 89, 80, 79, 80, 80, 79,
78, 79, 79, 79, 80, 79, 75, 79, 79, 79, 80, 79, 78, 79, 79, 79, 79, 79, 79, 79, 79, 79, 79, 79, 80, 73, 80, 79, 79, 79, 79, 78,
80, 79, 79, 79, 80, 80, 80, 80, 81, 79, 79, 79, 78, 77, 79, 80, 80, 79, 79, 79, 78, 79, 80, 78, 81, 79, 79, 79, 78, 79, 79, 81,
81, 79, 79, 79, 79, 80, 83, 81, 80, 79, 81, 80, 79, 80, 79, 79, 79, 79, 80, 73, 79, 80, 80, 79, 79, 79, 80, 79, 79, 79, 79, 80,
80, 78, 79, 79, 79, 79, 78, 79, 80, 80, 81, 82, 80, 80, 79, 80, 80, 78, 79, 79, 79, 79, 79, 79, 79, 79, 80, 79, 79, 79, 77, 80,
74, 79, 78, 80, 79, 79, 79, 79, 79, 80, 80, 79, 80, 80, 79, 79, 79, 79, 79, 79, 79, 79, 79, 79, 80, 80, 79, 78, 81, 80, 80, 69,
},
```

```
QP5={
57, 57, 57, 57, 57, 57, 57, 57, 57, 57, 58, 57, 57, 57, 57, 57, 57, 57, 57, 57, 57, 57, 57, 57, 58, 57, 56, 58, 58, 58, 53,
57, 57, 57, 57, 57, 57, 57, 58, 58, 58, 58, 59, 57, 58, 58, 60, 59, 58, 57, 57, 57, 57, 57, 57, 57, 57, 58, 57, 57, 57, 57, 57,
57, 57, 57, 57, 57, 58, 60, 61, 60, 57, 58, 57, 57, 57, 57, 57, 57, 57, 57, 53, 57, 58, 57, 60, 59, 57, 58, 57, 57, 57, 57, 56,
57, 57, 57, 57, 58, 59, 58, 57, 57, 57, 58, 57, 57, 56, 57, 56, 57, 57, 57, 57, 57, 57, 58, 55, 58, 58, 58, 57, 57, 57, 57, 57,
57, 57, 57, 58, 59, 57, 57, 57, 58, 57, 58, 58, 57, 57, 57, 57, 57, 57, 57, 58, 58, 57, 57, 57, 58, 55, 58, 58, 58, 57, 57, 57,
57, 57, 58, 59, 57, 57, 57, 57, 58, 55, 57, 57, 57, 57, 57, 58, 58, 57, 58, 57, 57, 56, 55, 57, 57, 57, 61, 57, 58, 57, 57, 57,
57, 57, 60, 58, 57, 57, 58, 55, 56, 57, 58, 57, 58, 59, 57, 57, 57, 57, 60, 58, 57, 57, 56, 56, 55, 58, 57, 54, 58, 60, 57, 57,
57, 58, 61, 57, 57, 57, 55, 58, 58, 58, 58, 58, 58, 58, 57, 60, 57, 57, 58, 57, 57, 57, 57, 57, 58, 57, 58, 57, 58, 59, 57, 57,
57, 58, 60, 57, 58, 58, 56, 58, 58, 58, 58, 58, 58, 60, 57, 57, 57, 56, 58, 58, 57, 58, 58, 57, 58, 57, 58, 57, 58, 58, 58, 57,
57, 58, 57, 57, 57, 55, 57, 58, 58, 58, 58, 58, 60, 58, 57, 59, 58, 57, 58, 59, 57, 58, 56, 58, 57, 57, 57, 57, 57, 57, 58, 58,
58, 58, 58, 58, 58, 57, 58, 58, 58, 58, 58, 58, 57, 58, 58, 58, 58, 58, 58, 58, 57, 58, 58, 57, 58, 58, 61, 58, 57, 58, 58, 58,
57, 59, 57, 57, 58, 57, 57, 58, 58, 58, 58, 58, 57, 58, 57, 57, 57, 57, 58, 58, 57, 55, 57, 57, 59, 57, 58, 57, 57, 58, 59, 57,
57, 57, 57, 57, 57, 57, 58, 58, 58, 60, 57, 57, 56, 57, 58, 57, 57, 58, 57, 57, 56, 57, 58, 58, 58, 58, 57, 56, 56, 57, 58, 57,
57, 58, 57, 56, 57, 57, 59, 58, 60, 58, 58, 58, 57, 51, 57, 57, 57, 57, 54, 58, 57, 58, 58, 60, 57, 57, 57, 57, 55, 57, 58, 58,
57, 58, 57, 57, 57, 57, 57, 57, 57, 57, 58, 57, 58, 57, 58, 57, 57, 57, 57, 58, 57, 58, 57, 56, 57, 58, 57, 57, 57, 57, 57, 57,
57, 60, 57, 56, 57, 58, 57, 60, 57, 59, 58, 57, 57, 57, 57, 58, 57, 58, 57, 58, 57, 58, 58, 57, 60, 57, 57, 57, 58, 57, 58, 57,
57, 59, 57, 57, 57, 58, 57, 57, 57, 58, 58, 57, 57, 57, 57, 57, 57, 57, 57, 57, 57, 58, 57, 57, 57, 57, 57, 57, 58, 57, 58, 57,
57, 58, 57, 57, 57, 57, 57, 57, 56, 57, 58, 57, 58, 57, 57, 58, 57, 57, 57, 58, 57, 59, 57, 55, 57, 58, 58, 57, 57, 57, 57, 57,
57, 57, 57, 57, 57, 58, 60, 58, 58, 58, 58, 58, 57, 54, 57, 57, 57, 57, 57, 58, 57, 57, 58, 58, 57, 58, 58, 57, 57, 58, 57, 57,
57, 57, 53, 57, 58, 57, 58, 57, 58, 59, 58, 58, 57, 58, 58, 58, 57, 58, 58, 57, 57, 57, 58, 57, 57, 57, 58, 57, 57, 53, 57, 57,
57, 57, 57, 57, 58, 57, 57, 57, 57, 57, 57, 57, 56, 57, 57, 57, 57, 57, 57, 57, 57, 55, 57, 57, 58, 57, 57, 57, 57, 57, 57, 57,
57, 57, 58, 57, 57, 56, 57, 57, 58, 58, 58, 55, 57, 58, 58, 58, 58, 59, 57, 57, 55, 57, 58, 57, 57, 57, 60, 57, 57, 58, 57, 57,
57, 57, 57, 58, 57, 55, 56, 57, 58, 56, 58, 57, 58, 58, 57, 58, 57, 57, 58, 58, 57, 58, 54, 57, 57, 55, 57, 57, 58, 58, 57, 57,
57, 57, 60, 55, 57, 57, 56, 57, 57, 58, 57, 57, 58, 60, 56, 57, 57, 55, 58, 57, 57, 57, 57, 57, 57, 57, 58, 57, 56, 57, 57, 57,
57, 57, 59, 58, 58, 57, 55, 58, 58, 57, 58, 59, 58, 57, 57, 60, 57, 57, 57, 57, 58, 57, 57, 57, 58, 57, 57, 57, 59, 57, 57, 57,
58, 57, 57, 58, 55, 57, 58, 57, 57, 57, 58, 57, 58, 57, 58, 57, 57, 58, 58, 57, 57, 57, 55, 57, 57, 57, 58, 53, 57, 57, 57, 58,
57, 58, 58, 58, 58, 61, 57, 58, 58, 57, 61, 58, 57, 57, 57, 57, 57, 58, 58, 58, 57, 60, 57, 58, 57, 58, 64, 58, 57, 58, 58, 57,
56, 57, 57, 57, 58, 57, 54, 57, 57, 57, 58, 57, 56, 57, 57, 57, 57, 57, 57, 57, 57, 57, 57, 57, 57, 53, 58, 57, 57, 57, 57, 56,
58, 57, 57, 57, 58, 58, 58, 58, 58, 57, 57, 57, 56, 55, 57, 58, 58, 57, 57, 57, 57, 57, 58, 56, 59, 57, 57, 57, 56, 57, 57, 58,
58, 57, 57, 57, 57, 57, 60, 59, 58, 57, 58, 58, 57, 57, 57, 57, 57, 57, 58, 53, 57, 58, 58, 57, 57, 57, 58, 57, 57, 57, 57, 58,
58, 57, 57, 57, 57, 57, 57, 57, 58, 58, 58, 59, 58, 58, 57, 58, 58, 57, 57, 57, 57, 57, 57, 57, 57, 57, 58, 57, 57, 57, 56, 58,
53, 57, 56, 57, 57, 57, 57, 57, 57, 58, 58, 57, 57, 58, 57, 57, 57, 57, 57, 57, 57, 57, 57, 57, 58, 57, 56, 58, 58, 58, 50,
}
```

```
QP1={
44, 44, 44, 44, 44, 44, 44, 44, 44, 44, 44, 44, 44, 44, 44, 44, 44, 44, 44, 44, 44, 44, 44, 44, 44, 43, 44, 45, 43, 43, 43, 47,
44, 44, 44, 44, 44, 44, 44, 44, 43, 43, 43, 42, 44, 43, 43, 42, 42, 43, 44, 44, 44, 44, 44, 44, 44, 44, 43, 44, 44, 44, 44, 44,
44, 44, 44, 44, 44, 43, 42, 41, 42, 44, 43, 44, 44, 44, 44, 44, 44, 44, 44, 47, 44, 43, 44, 42, 42, 44, 43, 44, 44, 44, 44, 44,
44, 44, 44, 44, 43, 42, 43, 44, 44, 44, 44, 44, 44, 45, 44, 44, 44, 44, 44, 44, 44, 44, 43, 45, 43, 43, 43, 44, 44, 44, 44, 44,
44, 44, 44, 43, 42, 44, 44, 44, 44, 44, 43, 43, 44, 44, 44, 44, 44, 44, 44, 43, 43, 44, 44, 44, 43, 45, 43, 43, 43, 44, 44, 44,
44, 44, 43, 42, 44, 44, 44, 44, 43, 46, 44, 44, 44, 44, 44, 43, 43, 44, 44, 44, 44, 44, 45, 44, 44, 44, 41, 44, 43, 44, 44, 44,
44, 44, 42, 43, 44, 44, 43, 46, 45, 44, 43, 44, 43, 42, 44, 44, 44, 44, 42, 43, 44, 44, 45, 45, 45, 43, 44, 46, 43, 42, 44, 44,
44, 44, 41, 44, 44, 44, 46, 43, 43, 43, 43, 43, 44, 43, 44, 42, 44, 44, 43, 44, 44, 44, 44, 44, 43, 44, 43, 44, 43, 43, 44, 44,
44, 43, 42, 44, 44, 43, 45, 43, 43, 43, 43, 43, 43, 42, 44, 44, 44, 45, 43, 43, 44, 43, 44, 44, 43, 44, 43, 44, 43, 44, 44, 44,
44, 43, 44, 44, 44, 46, 44, 43, 43, 43, 43, 43, 42, 43, 44, 43, 43, 44, 43, 42, 44, 43, 45, 43, 44, 44, 44, 44, 44, 44, 43, 44,
44, 43, 43, 44, 43, 44, 43, 43, 43, 43, 43, 43, 44, 43, 43, 43, 44, 43, 43, 43, 44, 44, 43, 44, 44, 43, 41, 43, 44, 43, 43, 43,
44, 42, 44, 44, 43, 44, 44, 43, 43, 43, 43, 43, 44, 43, 44, 44, 44, 44, 43, 43, 44, 45, 44, 44, 43, 44, 43, 44, 44, 44, 42, 44,
44, 44, 44, 44, 44, 44, 43, 44, 43, 42, 44, 44, 45, 44, 43, 44, 44, 43, 44, 44, 44, 44, 43, 44, 43, 43, 44, 44, 45, 44, 43, 44,
44, 43, 44, 45, 44, 44, 42, 43, 42, 43, 43, 43, 44, 49, 44, 44, 44, 44, 46, 43, 44, 43, 43, 42, 44, 44, 44, 44, 45, 44, 43, 43,
44, 43, 44, 44, 44, 44, 44, 44, 44, 44, 43, 44, 43, 44, 44, 44, 44, 44, 44, 43, 44, 43, 44, 44, 44, 43, 44, 44, 44, 44, 44, 44,
44, 42, 44, 44, 44, 43, 44, 42, 44, 43, 43, 44, 44, 44, 44, 44, 44, 43, 44, 43, 44, 43, 43, 44, 42, 44, 44, 44, 43, 44, 43, 44,
44, 42, 44, 44, 44, 43, 44, 44, 44, 43, 44, 44, 44, 44, 44, 44, 44, 44, 44, 44, 44, 43, 44, 44, 44, 44, 44, 44, 43, 44, 43, 44,
44, 43, 44, 44, 44, 44, 44, 44, 45, 44, 43, 44, 43, 44, 44, 43, 44, 44, 44, 43, 44, 43, 44, 46, 44, 43, 43, 44, 44, 44, 44, 44,
44, 44, 44, 44, 44, 44, 42, 43, 43, 43, 43, 43, 44, 46, 44, 44, 44, 44, 44, 43, 44, 44, 43, 43, 44, 43, 43, 44, 44, 43, 44, 44,
44, 44, 47, 44, 43, 44, 43, 44, 43, 42, 43, 43, 44, 43, 43, 43, 44, 43, 43, 44, 44, 44, 43, 44, 44, 44, 43, 44, 44, 47, 44, 44,
44, 44, 44, 44, 43, 44, 44, 44, 44, 44, 44, 44, 44, 44, 44, 44, 44, 44, 44, 44, 44, 45, 44, 44, 44, 44, 44, 44, 44, 44, 44, 44,
44, 44, 43, 44, 44, 44, 44, 44, 43, 43, 44, 45, 44, 43, 43, 43, 43, 43, 44, 44, 45, 44, 44, 44, 44, 44, 42, 44, 44, 43, 44, 44,
44, 44, 44, 43, 44, 45, 45, 44, 44, 45, 43, 44, 43, 43, 44, 43, 44, 44, 43, 43, 44, 44, 47, 44, 44, 45, 44, 44, 43, 43, 44, 44,
44, 44, 42, 45, 44, 44, 45, 44, 44, 43, 44, 44, 44, 42, 44, 44, 44, 46, 43, 44, 44, 44, 44, 44, 44, 44, 43, 44, 45, 44, 44, 44,
44, 44, 42, 43, 43, 44, 45, 43, 43, 44, 44, 43, 43, 44, 44, 42, 44, 44, 44, 44, 44, 44, 44, 44, 43, 44, 44, 44, 43, 44, 44, 44,
43, 44, 44, 43, 45, 44, 43, 44, 44, 44, 43, 44, 43, 44, 43, 44, 44, 43, 43, 44, 44, 44, 45, 44, 44, 44, 44, 48, 44, 44, 44, 43,
44, 43, 43, 43, 43, 41, 44, 43, 43, 44, 41, 43, 44, 44, 44, 44, 44, 43, 43, 43, 44, 42, 44, 43, 44, 44, 39, 43, 44, 43, 43, 44,
45, 44, 44, 44, 43, 44, 46, 44, 44, 44, 43, 44, 44, 44, 44, 44, 44, 44, 44, 44, 44, 44, 44, 44, 44, 48, 43, 44, 44, 44, 44, 45,
43, 44, 44, 44, 43, 43, 43, 43, 43, 44, 44, 44, 45, 45, 44, 43, 43, 44, 44, 44, 44, 44, 43, 45, 43, 44, 44, 44, 44, 44, 44, 43,
43, 44, 44, 44, 44, 44, 42, 43, 44, 44, 43, 44, 44, 44, 44, 44, 44, 44, 43, 47, 44, 43, 43, 44, 44, 44, 43, 44, 44, 44, 44, 43,
43, 44, 44, 44, 44, 44, 44, 44, 44, 43, 43, 42, 43, 43, 44, 43, 43, 44, 44, 44, 44, 44, 44, 44, 44, 44, 43, 44, 44, 44, 45, 43,
47, 44, 44, 44, 44, 44, 44, 44, 44, 44, 43, 44, 44, 43, 44, 44, 44, 44, 44, 44, 44, 44, 44, 44, 44, 43, 44, 45, 43, 43, 43, 50,
},
```

```
QP2={
52, 52, 52, 52, 52, 52, 52, 52, 52, 52, 51, 52, 52, 52, 52, 52, 52, 52, 52, 52, 52, 52, 52, 52, 51, 51, 52, 53, 51, 51, 51, 56,
52, 52, 52, 52, 52, 52, 52, 51, 51, 51, 51, 50, 52, 51, 51, 50, 50, 51, 51, 52, 52, 52, 52, 52, 52, 52, 51, 52, 52, 52, 52, 52,
52, 52, 52, 52, 52, 51, 50, 48, 49, 52, 51, 52, 52, 52, 52, 52, 52, 52, 52, 56, 52, 51, 51, 50, 50, 52, 51, 52, 52, 52, 52, 52,
52, 52, 52, 51, 51, 50, 51, 52, 51, 52, 51, 52, 52, 53, 52, 53, 52, 52, 52, 52, 52, 52, 51, 53, 51, 51, 51, 52, 52, 52, 52, 52,
52, 52, 52, 51, 50, 52, 52, 52, 51, 52, 51, 51, 51, 52, 52, 52, 52, 52, 52, 51, 51, 52, 52, 52, 51, 54, 51, 51, 51, 52, 52, 52,
52, 52, 51, 50, 52, 52, 52, 52, 51, 54, 52, 52, 52, 52, 52, 51, 51, 52, 51, 52, 52, 52, 53, 51, 52, 52, 49, 52, 51, 51, 52, 52,
52, 52, 50, 51, 52, 52, 51, 54, 53, 51, 51, 52, 51, 50, 52, 52, 52, 52, 49, 51, 52, 52, 53, 53, 53, 51, 51, 54, 51, 50, 52, 52,
52, 51, 48, 52, 52, 52, 54, 51, 51, 51, 51, 51, 51, 51, 52, 49, 52, 52, 51, 52, 52, 52, 52, 52, 51, 52, 51, 52, 51, 51, 52, 52,
52, 51, 49, 51, 51, 51, 53, 51, 51, 51, 51, 51, 51, 49, 52, 52, 52, 53, 51, 51, 52, 51, 51, 51, 51, 52, 51, 52, 51, 51, 51, 52,
52, 51, 52, 52, 52, 54, 51, 51, 51, 51, 51, 51, 49, 51, 52, 50, 51, 52, 51, 50, 51, 51, 53, 51, 52, 52, 52, 52, 52, 52, 51, 51,
51, 51, 51, 51, 51, 52, 51, 51, 51, 51, 51, 51, 51, 51, 51, 51, 51, 51, 51, 51, 52, 51, 51, 52, 51, 51, 49, 51, 52, 51, 51, 51,
52, 50, 52, 52, 51, 52, 52, 51, 51, 51, 51, 51, 52, 51, 52, 52, 52, 52, 51, 51, 52, 53, 51, 51, 51, 52, 51, 52, 52, 51, 50, 52,
52, 52, 52, 52, 51, 52, 51, 51, 51, 49, 51, 52, 53, 52, 51, 52, 52, 51, 52, 52, 52, 52, 51, 51, 51, 51, 52, 53, 53, 52, 51, 52,
52, 51, 52, 53, 52, 52, 50, 51, 49, 51, 51, 51, 52, 58, 52, 52, 52, 52, 55, 51, 52, 51, 51, 49, 52, 52, 51, 52, 53, 52, 51, 51,
52, 51, 52, 52, 52, 52, 52, 52, 52, 52, 51, 52, 51, 52, 51, 52, 52, 52, 52, 51, 52, 51, 52, 52, 52, 51, 52, 52, 52, 52, 52, 52,
52, 50, 52, 53, 52, 51, 52, 49, 52, 50, 51, 52, 52, 52, 52, 51, 52, 51, 52, 51, 52, 51, 51, 51, 49, 51, 52, 52, 51, 52, 51, 52,
52, 50, 52, 52, 52, 51, 52, 52, 52, 51, 51, 52, 52, 52, 52, 52, 52, 52, 52, 51, 52, 51, 52, 52, 51, 52, 52, 52, 51, 52, 51, 52,
52, 51, 52, 52, 52, 52, 52, 52, 53, 52, 51, 52, 51, 52, 52, 51, 52, 52, 52, 51, 52, 50, 52, 54, 52, 51, 51, 52, 52, 52, 52, 52,
52, 51, 52, 52, 52, 51, 49, 51, 51, 51, 51, 51, 52, 55, 52, 52, 52, 52, 52, 51, 52, 52, 51, 51, 52, 51, 51, 52, 52, 51, 52, 52,
52, 52, 56, 52, 51, 52, 51, 52, 51, 50, 51, 51, 52, 51, 51, 51, 51, 51, 51, 52, 52, 52, 51, 52, 51, 51, 51, 52, 52, 56, 52, 52,
52, 52, 52, 52, 51, 52, 52, 52, 52, 51, 52, 52, 52, 52, 52, 52, 52, 52, 52, 52, 52, 54, 52, 52, 51, 52, 52, 52, 52, 52, 52, 52,
52, 52, 51, 52, 52, 52, 52, 52, 51, 51, 51, 53, 52, 51, 51, 51, 51, 50, 52, 52, 54, 52, 51, 52, 52, 52, 49, 52, 52, 51, 52, 52,
52, 52, 51, 51, 52, 53, 53, 52, 51, 53, 51, 51, 51, 51, 52, 51, 52, 52, 51, 51, 52, 51, 55, 52, 52, 54, 51, 52, 51, 51, 52, 52,
52, 52, 50, 53, 52, 51, 53, 52, 51, 51, 52, 51, 51, 49, 52, 51, 52, 54, 51, 52, 52, 52, 52, 52, 52, 52, 51, 52, 53, 52, 52, 52,
51, 52, 50, 51, 51, 52, 53, 51, 51, 52, 51, 51, 51, 52, 52, 49, 51, 52, 52, 51, 51, 52, 52, 52, 51, 52, 52, 51, 51, 52, 52, 51,
51, 52, 52, 51, 54, 52, 51, 52, 52, 52, 51, 52, 51, 52, 51, 51, 52, 51, 51, 51, 52, 52, 54, 52, 52, 52, 51, 56, 52, 52, 52, 51,
52, 51, 51, 51, 51, 49, 51, 51, 51, 52, 49, 51, 52, 51, 52, 52, 52, 51, 51, 51, 52, 49, 51, 51, 52, 51, 46, 51, 52, 51, 51, 52,
53, 52, 52, 52, 51, 52, 54, 52, 52, 52, 51, 52, 53, 52, 52, 52, 52, 52, 52, 52, 52, 52, 52, 52, 51, 56, 51, 52, 52, 52, 52, 53,
51, 52, 52, 52, 51, 51, 51, 51, 51, 52, 52, 52, 53, 53, 52, 51, 51, 52, 52, 52, 52, 52, 51, 53, 51, 52, 52, 52, 52, 52, 52, 51,
51, 52, 52, 52, 52, 51, 50, 51, 51, 52, 51, 51, 52, 52, 52, 52, 52, 52, 51, 56, 52, 51, 51, 52, 52, 52, 51, 52, 52, 52, 52, 51,
51, 52, 52, 52, 52, 52, 52, 52, 51, 51, 51, 50, 51, 51, 52, 51, 51, 52, 52, 52, 52, 52, 52, 52, 52, 52, 51, 52, 52, 52, 53, 51,
56, 52, 52, 52, 52, 52, 52, 52, 52, 51, 51, 52, 52, 51, 52, 52, 52, 52, 52, 52, 52, 52, 52, 52, 51, 51, 52, 53, 51, 51, 51, 59,
},
```

```
QP3={
56, 56, 56, 56, 56, 56, 56, 56, 56, 56, 55, 56, 56, 56, 56, 56, 56, 56, 56, 56, 56, 56, 56, 56, 55, 55, 56, 57, 55, 55, 55, 60,
56, 56, 56, 56, 56, 56, 56, 55, 55, 55, 55, 54, 56, 54, 55, 53, 54, 55, 55, 56, 56, 56, 56, 55, 56, 56, 55, 56, 56, 56, 56, 56,
56, 56, 56, 56, 56, 55, 53, 52, 53, 56, 55, 56, 56, 56, 56, 56, 56, 56, 56, 60, 56, 55, 55, 53, 54, 56, 55, 56, 56, 56, 56, 56,
56, 56, 56, 55, 55, 54, 55, 56, 55, 56, 55, 55, 56, 57, 56, 57, 56, 56, 56, 56, 56, 56, 55, 58, 55, 55, 55, 56, 56, 56, 56, 55,
56, 56, 56, 55, 54, 56, 56, 56, 55, 56, 55, 55, 55, 56, 56, 56, 56, 56, 56, 55, 55, 56, 56, 56, 55, 58, 55, 55, 55, 56, 56, 56,
56, 56, 55, 54, 56, 56, 56, 56, 55, 58, 56, 55, 56, 56, 56, 55, 55, 56, 55, 56, 56, 56, 58, 55, 56, 56, 53, 56, 55, 55, 56, 56,
56, 56, 53, 55, 56, 56, 55, 58, 57, 55, 55, 56, 55, 54, 56, 56, 56, 56, 53, 55, 56, 56, 57, 57, 58, 55, 55, 59, 55, 53, 56, 56,
56, 55, 52, 56, 56, 56, 58, 55, 55, 55, 55, 55, 55, 55, 56, 53, 56, 56, 55, 56, 56, 56, 56, 56, 55, 56, 55, 56, 55, 54, 56, 56,
56, 55, 53, 55, 55, 55, 57, 55, 55, 55, 55, 55, 55, 53, 56, 55, 56, 57, 55, 55, 56, 55, 55, 55, 55, 56, 55, 56, 55, 55, 55, 56,
56, 55, 56, 56, 56, 58, 55, 55, 55, 55, 55, 55, 53, 55, 56, 54, 55, 56, 55, 54, 55, 55, 57, 55, 56, 56, 56, 56, 56, 56, 55, 55,
55, 55, 55, 55, 55, 56, 55, 55, 55, 55, 55, 55, 55, 55, 55, 55, 55, 55, 55, 55, 56, 55, 55, 56, 55, 55, 52, 55, 56, 55, 55, 55,
56, 54, 56, 55, 55, 55, 56, 55, 55, 55, 55, 55, 56, 55, 56, 56, 56, 56, 55, 55, 56, 58, 55, 55, 54, 55, 55, 56, 56, 55, 54, 56,
56, 56, 56, 56, 55, 56, 55, 55, 55, 53, 55, 56, 57, 56, 55, 56, 56, 55, 56, 56, 57, 56, 55, 55, 55, 55, 55, 57, 57, 56, 55, 55,
56, 54, 56, 57, 56, 56, 54, 55, 53, 55, 55, 55, 56, 63, 56, 55, 56, 56, 59, 55, 56, 55, 55, 53, 56, 56, 55, 56, 58, 55, 55, 55,
56, 55, 56, 56, 56, 56, 56, 56, 56, 56, 55, 56, 55, 56, 55, 56, 56, 56, 56, 55, 56, 55, 56, 57, 56, 55, 56, 56, 56, 56, 56, 56,
56, 53, 56, 57, 56, 55, 56, 53, 55, 54, 55, 56, 56, 55, 56, 55, 56, 55, 56, 55, 56, 55, 55, 55, 53, 55, 56, 56, 55, 56, 55, 56,
56, 54, 56, 56, 56, 55, 56, 56, 56, 55, 55, 56, 56, 56, 56, 56, 56, 55, 56, 55, 56, 55, 56, 56, 55, 55, 56, 56, 55, 56, 55, 56,
56, 55, 56, 56, 56, 56, 56, 56, 57, 56, 55, 56, 55, 56, 56, 55, 55, 56, 56, 55, 56, 54, 56, 58, 56, 55, 55, 56, 56, 56, 56, 56,
56, 55, 56, 56, 56, 55, 53, 55, 55, 55, 55, 55, 56, 59, 56, 56, 56, 56, 56, 55, 56, 55, 55, 55, 56, 55, 55, 56, 56, 55, 56, 56,
56, 56, 60, 56, 55, 56, 55, 56, 55, 54, 55, 55, 56, 55, 55, 55, 55, 55, 55, 55, 56, 56, 55, 55, 55, 55, 55, 56, 56, 60, 55, 56,
56, 56, 56, 56, 55, 56, 56, 56, 56, 55, 56, 56, 57, 56, 56, 56, 56, 56, 56, 56, 56, 58, 56, 56, 55, 55, 56, 56, 56, 56, 56, 56,
56, 56, 55, 56, 56, 56, 56, 56, 55, 55, 55, 58, 56, 55, 55, 55, 55, 54, 55, 56, 58, 56, 55, 56, 56, 56, 53, 56, 56, 55, 56, 56,
56, 56, 55, 55, 56, 58, 57, 56, 55, 57, 55, 55, 55, 55, 56, 55, 56, 56, 55, 55, 56, 55, 59, 56, 56, 58, 55, 56, 55, 55, 56, 56,
56, 55, 53, 58, 56, 55, 57, 56, 55, 55, 56, 55, 55, 53, 57, 55, 56, 58, 55, 55, 56, 56, 56, 56, 56, 56, 55, 56, 57, 56, 56, 56,
55, 56, 54, 55, 55, 56, 58, 55, 55, 56, 55, 54, 55, 56, 56, 53, 55, 56, 56, 55, 55, 56, 56, 56, 55, 56, 56, 55, 54, 56, 56, 55,
55, 56, 56, 55, 58, 56, 55, 56, 56, 56, 55, 55, 55, 56, 55, 55, 55, 55, 55, 55, 55, 56, 58, 56, 56, 56, 55, 61, 56, 56, 56, 55,
56, 55, 55, 55, 55, 53, 55, 55, 55, 56, 52, 55, 55, 55, 56, 56, 56, 55, 55, 55, 56, 53, 55, 55, 56, 55, 50, 55, 56, 55, 55, 56,
57, 56, 56, 56, 55, 56, 59, 56, 56, 56, 55, 56, 57, 56, 56, 56, 56, 56, 56, 56, 56, 56, 56, 56, 55, 61, 55, 56, 56, 56, 56, 57,
55, 56, 56, 56, 55, 55, 55, 55, 55, 56, 56, 56, 57, 58, 56, 55, 55, 56, 56, 56, 56, 56, 55, 57, 54, 56, 56, 56, 56, 56, 56, 55,
55, 56, 56, 56, 56, 55, 53, 54, 55, 56, 55, 55, 56, 55, 56, 56, 56, 56, 55, 60, 56, 55, 55, 56, 56, 56, 55, 56, 56, 56, 56, 55,
55, 56, 56, 56, 56, 56, 56, 56, 55, 55, 55, 54, 55, 55, 56, 55, 55, 56, 56, 55, 56, 56, 56, 56, 56, 56, 55, 56, 56, 56, 57, 55,
60, 56, 56, 55, 56, 56, 56, 56, 56, 55, 55, 56, 55, 55, 56, 56, 56, 56, 56, 56, 56, 56, 56, 56, 55, 55, 56, 57, 55, 55, 55, 64,
},
```

```
QP0={
80, 40, 40, 58, 80, 56, 52, 61, 52, 52, 61, 47, 57, 68, 57, 56, 40, 57, 56, 47, 56, 68, 53, 61, 61, 53, 61, 56, 40, 55, 82, 78,
40, 20, 20, 29, 40, 28, 26, 31, 26, 26, 32, 22, 28, 34, 29, 27, 19, 29, 28, 24, 28, 34, 26, 31, 31, 26, 31, 29, 20, 28, 40, 41,
40, 20, 20, 29, 40, 29, 26, 32, 27, 26, 31, 23, 28, 34, 28, 28, 20, 28, 28, 23, 28, 34, 26, 32, 32, 26, 31, 29, 20, 28, 40, 40,
58, 29, 29, 42, 59, 41, 38, 44, 38, 38, 44, 34, 40, 48, 42, 41, 29, 41, 41, 34, 41, 49, 37, 41, 44, 38, 43, 42, 29, 40, 58, 58,
80, 40, 40, 59, 83, 55, 52, 61, 52, 52, 61, 48, 57, 68, 56, 57, 40, 57, 58, 48, 58, 68, 52, 61, 61, 48, 62, 59, 41, 56, 80, 80,
56, 28, 29, 41, 55, 39, 36, 42, 36, 31, 42, 33, 39, 47, 39, 37, 27, 40, 39, 33, 39, 47, 30, 43, 42, 36, 46, 39, 29, 39, 55, 56,
52, 26, 26, 38, 52, 36, 34, 39, 34, 34, 40, 31, 36, 44, 37, 37, 26, 38, 37, 31, 37, 45, 36, 40, 40, 34, 40, 32, 26, 36, 52, 52,
61, 31, 32, 44, 61, 42, 39, 46, 40, 40, 47, 35, 44, 52, 43, 42, 31, 43, 43, 37, 42, 52, 40, 47, 47, 39, 47, 45, 31, 43, 62, 61,
52, 26, 27, 38, 52, 36, 34, 40, 34, 34, 40, 31, 37, 45, 37, 37, 26, 35, 37, 31, 37, 44, 34, 40, 40, 34, 40, 38, 26, 36, 52, 52,
52, 26, 26, 38, 52, 31, 34, 40, 34, 34, 40, 31, 36, 44, 37, 38, 26, 37, 37, 31, 37, 44, 37, 40, 40, 33, 40, 38, 26, 36, 52, 52,
61, 32, 31, 44, 61, 42, 40, 47, 40, 40, 46, 35, 43, 52, 44, 43, 31, 45, 43, 36, 42, 52, 40, 47, 47, 40, 50, 44, 31, 45, 63, 61,
47, 22, 23, 34, 48, 33, 31, 35, 31, 31, 35, 28, 33, 40, 33, 33, 24, 33, 34, 28, 33, 40, 31, 36, 36, 31, 36, 34, 24, 33, 45, 47,
57, 28, 28, 40, 57, 39, 36, 44, 37, 36, 43, 33, 39, 48, 40, 40, 28, 39, 40, 33, 40, 48, 36, 43, 43, 36, 43, 42, 28, 39, 55, 57,
68, 34, 34, 48, 68, 47, 44, 52, 45, 44, 52, 40, 48, 52, 48, 48, 34, 48, 45, 40, 48, 58, 44, 53, 52, 45, 52, 50, 33, 47, 69, 68,
57, 29, 28, 42, 56, 39, 37, 43, 37, 37, 44, 33, 40, 48, 41, 40, 28, 40, 40, 35, 40, 44, 37, 43, 43, 37, 42, 40, 29, 39, 56, 57,
56, 27, 28, 41, 57, 37, 37, 42, 37, 38, 43, 33, 40, 48, 40, 40, 28, 40, 40, 33, 40, 48, 38, 43, 41, 37, 42, 41, 28, 39, 58, 56,
40, 19, 20, 29, 40, 27, 26, 31, 26, 26, 31, 24, 28, 34, 28, 28, 20, 28, 28, 24, 28, 34, 26, 31, 31, 26, 30, 29, 20, 28, 41, 40,
57, 29, 28, 41, 57, 40, 38, 43, 35, 37, 45, 33, 39, 48, 40, 40, 28, 40, 40, 34, 40, 45, 37, 41, 43, 38, 43, 41, 28, 39, 56, 57,
56, 28, 28, 41, 58, 39, 37, 43, 37, 37, 43, 34, 40, 45, 40, 40, 28, 40, 40, 33, 41, 48, 37, 43, 43, 38, 43, 43, 28, 39, 57, 56,
47, 24, 23, 34, 48, 33, 31, 37, 31, 31, 36, 28, 33, 40, 35, 33, 24, 34, 33, 27, 33, 40, 30, 36, 37, 31, 36, 35, 24, 31, 47, 47,
56, 28, 28, 41, 58, 39, 37, 42, 37, 37, 42, 33, 40, 48, 40, 40, 28, 40, 41, 33, 40, 48, 37, 43, 43, 37, 43, 41, 28, 39, 57, 56,
68, 34, 34, 49, 68, 47, 45, 52, 44, 44, 52, 40, 48, 58, 44, 48, 34, 45, 48, 40, 48, 58, 45, 52, 52, 45, 56, 49, 34, 50, 68, 68,
53, 26, 26, 37, 52, 30, 36, 40, 34, 37, 40, 31, 36, 44, 37, 38, 26, 37, 37, 30, 37, 45, 39, 40, 40, 35, 40, 38, 26, 36, 52, 53,
61, 31, 32, 41, 61, 43, 40, 47, 40, 40, 47, 36, 43, 53, 43, 43, 31, 41, 43, 36, 43, 52, 40, 47, 47, 40, 47, 44, 29, 43, 61, 61,
61, 31, 32, 44, 61, 42, 40, 47, 40, 40, 47, 36, 43, 52, 43, 41, 31, 43, 43, 37, 43, 52, 40, 47, 47, 40, 47, 44, 31, 42, 61, 61,
53, 26, 26, 38, 48, 36, 34, 39, 34, 33, 40, 31, 36, 45, 37, 37, 26, 38, 38, 31, 37, 45, 35, 40, 40, 34, 39, 30, 26, 36, 52, 53,
61, 31, 31, 43, 62, 46, 40, 47, 40, 40, 50, 36, 43, 52, 42, 42, 30, 43, 43, 36, 43, 56, 40, 47, 47, 39, 54, 43, 31, 43, 61, 61,
56, 29, 29, 42, 59, 39, 32, 45, 38, 38, 44, 34, 42, 50, 40, 41, 29, 41, 43, 35, 41, 49, 38, 44, 44, 30, 43, 42, 29, 40, 58, 56,
40, 20, 20, 29, 41, 29, 26, 31, 26, 26, 31, 24, 28, 33, 29, 28, 20, 28, 28, 24, 28, 34, 26, 29, 31, 26, 31, 29, 20, 28, 40, 40,
55, 28, 28, 40, 56, 39, 36, 43, 36, 36, 45, 33, 39, 47, 39, 39, 28, 39, 39, 31, 39, 50, 36, 43, 42, 36, 43, 40, 28, 38, 56, 55,
82, 40, 40, 58, 80, 55, 52, 62, 52, 52, 63, 45, 55, 69, 56, 58, 41, 56, 57, 47, 57, 68, 52, 61, 61, 52, 61, 58, 40, 56, 78, 83,
78, 41, 40, 58, 80, 56, 52, 61, 52, 52, 61, 47, 57, 68, 57, 56, 40, 57, 56, 47, 56, 68, 53, 61, 61, 53, 61, 56, 40, 55, 83, 76,
},
```

```
QP1={
88, 44, 44, 63, 88, 61, 58, 67, 58, 58, 67, 52, 62, 75, 62, 62, 44, 62, 62, 51, 62, 75, 58, 67, 67, 58, 67, 62, 44, 61, 90, 86,
44, 22, 22, 32, 44, 30, 29, 34, 29, 29, 35, 25, 31, 38, 32, 30, 21, 31, 31, 26, 31, 37, 29, 34, 34, 29, 34, 32, 22, 31, 44, 45,
44, 22, 22, 32, 44, 31, 28, 35, 30, 28, 34, 26, 31, 37, 31, 31, 22, 31, 31, 25, 31, 38, 28, 35, 35, 28, 34, 31, 22, 30, 44, 44,
63, 32, 32, 46, 65, 45, 42, 48, 41, 41, 49, 37, 45, 53, 46, 45, 32, 45, 45, 37, 45, 54, 41, 45, 49, 42, 48, 46, 32, 44, 63, 64,
88, 44, 44, 65, 92, 61, 57, 67, 58, 57, 67, 53, 63, 75, 62, 62, 44, 62, 64, 53, 64, 75, 57, 67, 67, 53, 68, 65, 45, 61, 88, 88,
61, 30, 31, 45, 61, 43, 40, 47, 40, 34, 46, 36, 43, 52, 42, 41, 30, 44, 43, 36, 43, 52, 33, 47, 47, 40, 50, 43, 32, 43, 60, 61,
58, 29, 28, 42, 57, 40, 38, 43, 37, 38, 44, 34, 40, 48, 41, 41, 29, 42, 41, 34, 41, 49, 40, 44, 44, 38, 44, 35, 29, 40, 58, 57,
67, 34, 35, 48, 67, 47, 43, 51, 44, 44, 52, 38, 48, 57, 47, 46, 34, 48, 48, 41, 46, 57, 44, 52, 51, 43, 52, 49, 34, 47, 68, 67,
58, 29, 30, 41, 58, 40, 37, 44, 38, 37, 44, 34, 41, 49, 40, 41, 29, 39, 41, 34, 41, 48, 37, 44, 44, 37, 44, 41, 29, 40, 57, 57,
58, 29, 28, 41, 57, 34, 38, 44, 37, 38, 44, 34, 40, 49, 41, 42, 29, 41, 41, 34, 41, 49, 40, 44, 44, 37, 44, 41, 29, 40, 57, 57,
67, 35, 34, 49, 67, 46, 44, 52, 44, 44, 51, 39, 48, 57, 48, 48, 34, 49, 48, 40, 47, 57, 44, 52, 52, 44, 55, 48, 34, 50, 69, 67,
52, 25, 26, 37, 53, 36, 34, 38, 34, 34, 39, 30, 36, 44, 36, 37, 26, 37, 38, 30, 37, 44, 34, 40, 40, 34, 40, 37, 26, 36, 49, 52,
62, 31, 31, 45, 63, 43, 40, 48, 41, 40, 48, 36, 43, 53, 44, 44, 31, 43, 44, 36, 44, 53, 39, 48, 48, 40, 48, 46, 31, 43, 61, 62,
75, 38, 37, 53, 75, 52, 48, 57, 49, 49, 57, 44, 53, 57, 53, 53, 37, 53, 50, 44, 53, 64, 49, 58, 57, 50, 57, 55, 37, 52, 76, 75,
62, 32, 31, 46, 62, 42, 41, 47, 40, 41, 48, 36, 44, 53, 45, 44, 31, 44, 44, 38, 44, 49, 41, 47, 47, 41, 47, 44, 32, 43, 62, 62,
62, 30, 31, 45, 62, 41, 41, 46, 41, 42, 48, 37, 44, 53, 44, 44, 31, 44, 44, 37, 44, 53, 42, 48, 45, 41, 46, 45, 31, 43, 63, 62,
44, 21, 22, 32, 44, 30, 29, 34, 29, 29, 34, 26, 31, 37, 31, 31, 22, 31, 31, 26, 31, 37, 29, 34, 34, 29, 33, 32, 22, 31, 45, 44,
62, 31, 31, 45, 62, 44, 42, 48, 39, 41, 49, 37, 43, 53, 44, 44, 31, 44, 44, 37, 44, 50, 41, 45, 48, 42, 48, 45, 31, 43, 62, 62,
62, 31, 31, 45, 64, 43, 41, 48, 41, 41, 48, 38, 44, 50, 44, 44, 31, 44, 44, 37, 45, 53, 41, 48, 48, 42, 48, 47, 31, 43, 62, 62,
51, 26, 25, 37, 53, 36, 34, 41, 34, 34, 40, 30, 36, 44, 38, 37, 26, 37, 37, 30, 37, 44, 33, 40, 41, 34, 40, 39, 26, 34, 52, 51,
62, 31, 31, 45, 64, 43, 41, 46, 41, 41, 47, 37, 44, 53, 44, 44, 31, 44, 45, 37, 44, 53, 41, 48, 48, 41, 47, 45, 31, 43, 62, 62,
75, 37, 38, 54, 75, 52, 49, 57, 48, 49, 57, 44, 53, 64, 49, 53, 37, 50, 53, 44, 53, 64, 49, 57, 57, 49, 62, 54, 37, 55, 74, 75,
58, 29, 28, 41, 57, 33, 40, 44, 37, 40, 44, 34, 39, 49, 41, 42, 29, 41, 41, 33, 41, 49, 43, 44, 44, 39, 44, 41, 29, 40, 58, 58,
67, 34, 35, 45, 67, 47, 44, 52, 44, 44, 52, 40, 48, 58, 47, 48, 34, 45, 48, 40, 48, 57, 44, 51, 52, 44, 52, 48, 32, 47, 67, 67,
67, 34, 35, 49, 67, 47, 44, 51, 44, 44, 52, 40, 48, 57, 47, 45, 34, 48, 48, 41, 48, 57, 44, 52, 52, 44, 52, 49, 34, 47, 67, 67,
58, 29, 28, 42, 53, 40, 38, 43, 37, 37, 44, 34, 40, 50, 41, 41, 29, 42, 42, 34, 41, 49, 39, 44, 44, 38, 43, 33, 29, 40, 57, 58,
67, 34, 34, 48, 68, 50, 44, 52, 44, 44, 55, 40, 48, 57, 47, 46, 33, 48, 48, 40, 47, 62, 44, 52, 52, 43, 59, 48, 34, 47, 67, 67,
62, 32, 31, 46, 65, 43, 35, 49, 41, 41, 48, 37, 46, 55, 44, 45, 32, 45, 47, 39, 45, 54, 41, 48, 49, 33, 48, 46, 32, 44, 64, 62,
44, 22, 22, 32, 45, 32, 29, 34, 29, 29, 34, 26, 31, 37, 32, 31, 22, 31, 31, 26, 31, 37, 29, 32, 34, 29, 34, 32, 22, 31, 44, 45,
61, 31, 30, 44, 61, 43, 40, 47, 40, 40, 50, 36, 43, 52, 43, 43, 31, 43, 43, 34, 43, 55, 40, 47, 47, 40, 47, 44, 31, 42, 61, 61,
90, 44, 44, 63, 88, 60, 58, 68, 57, 57, 69, 49, 61, 76, 62, 63, 45, 62, 62, 52, 62, 74, 58, 67, 67, 57, 67, 64, 44, 61, 86, 91,
86, 45, 44, 64, 88, 61, 57, 67, 57, 57, 67, 52, 62, 75, 62, 62, 44, 62, 62, 51, 62, 75, 58, 67, 67, 58, 67, 62, 45, 61, 91, 83,
},
```

```
QP4={
128, 64, 64, 92, 128, 89, 84, 98, 84, 84, 98, 75, 91, 109, 91, 90, 64, 91, 90, 75, 90, 109, 84, 97, 98, 85, 97, 90, 65, 88, 131, 124,
64, 32, 32, 46, 64, 44, 42, 49, 42, 41, 51, 36, 45, 55, 46, 43, 31, 46, 45, 38, 45, 54, 42, 49, 49, 42, 49, 47, 32, 45, 63, 65,
64, 32, 32, 46, 64, 46, 41, 51, 43, 41, 50, 37, 45, 54, 45, 45, 32, 45, 45, 36, 45, 55, 41, 51, 51, 41, 50, 46, 32, 44, 64, 64,
92, 46, 46, 66, 95, 66, 61, 70, 60, 60, 71, 54, 65, 77, 67, 65, 46, 65, 65, 54, 65, 78, 59, 66, 71, 61, 69, 67, 46, 64, 92, 92,
128, 64, 64, 95, 134, 88, 83, 98, 84, 83, 97, 77, 92, 109, 90, 90, 64, 91, 93, 77, 93, 109, 83, 98, 98, 77, 99, 94, 65, 89, 128, 128,
89, 44, 46, 66, 88, 62, 58, 68, 58, 49, 67, 52, 63, 75, 62, 60, 43, 63, 63, 53, 63, 76, 49, 69, 68, 58, 73, 62, 47, 63, 88, 89,
84, 42, 41, 61, 83, 58, 55, 63, 54, 55, 64, 49, 58, 70, 59, 59, 42, 61, 59, 49, 59, 71, 58, 64, 64, 55, 64, 51, 42, 58, 84, 83,
98, 49, 51, 70, 98, 68, 63, 74, 64, 64, 75, 56, 70, 83, 69, 67, 49, 69, 69, 59, 67, 83, 64, 75, 75, 63, 75, 71, 49, 68, 98, 98,
84, 42, 43, 60, 84, 58, 54, 64, 55, 54, 64, 49, 59, 72, 58, 59, 42, 56, 59, 49, 59, 70, 54, 64, 64, 54, 64, 60, 42, 58, 83, 84,
84, 41, 41, 60, 83, 49, 55, 64, 54, 55, 64, 49, 58, 71, 59, 61, 42, 59, 59, 49, 59, 71, 58, 64, 64, 53, 64, 60, 42, 58, 83, 84,
98, 51, 50, 71, 97, 67, 64, 75, 64, 64, 73, 57, 70, 84, 70, 69, 49, 71, 70, 58, 68, 82, 64, 76, 76, 64, 80, 70, 49, 73, 101, 98,
75, 36, 37, 54, 77, 52, 49, 56, 49, 49, 57, 44, 53, 64, 53, 54, 38, 53, 55, 44, 53, 64, 49, 58, 57, 49, 58, 54, 38, 53, 72, 75,
91, 45, 45, 65, 92, 63, 58, 70, 59, 58, 70, 53, 63, 77, 65, 64, 45, 63, 64, 52, 64, 77, 57, 69, 69, 58, 69, 67, 45, 63, 89, 91,
109, 55, 54, 77, 109, 75, 70, 83, 72, 71, 84, 64, 77, 83, 77, 77, 54, 77, 73, 64, 77, 93, 71, 84, 83, 73, 83, 79, 54, 76, 110, 109,
91, 46, 45, 67, 90, 62, 59, 69, 58, 59, 70, 53, 65, 77, 65, 64, 45, 64, 64, 55, 64, 71, 59, 68, 69, 59, 68, 65, 47, 63, 90, 91,
90, 43, 45, 65, 90, 60, 59, 67, 59, 61, 69, 54, 64, 77, 64, 64, 45, 64, 64, 53, 64, 77, 61, 69, 66, 59, 68, 65, 45, 63, 92, 90,
64, 31, 32, 46, 64, 43, 42, 49, 42, 42, 49, 38, 45, 54, 45, 45, 32, 45, 45, 38, 45, 54, 42, 49, 49, 42, 49, 46, 32, 44, 66, 64,
91, 46, 45, 65, 91, 63, 61, 69, 56, 59, 71, 53, 63, 77, 64, 64, 45, 64, 64, 54, 64, 73, 59, 66, 69, 61, 70, 65, 46, 63, 90, 91,
90, 45, 45, 65, 93, 63, 59, 69, 59, 59, 70, 55, 64, 73, 64, 64, 45, 64, 63, 53, 65, 77, 59, 69, 69, 61, 69, 68, 45, 63, 91, 90,
75, 38, 36, 54, 77, 53, 49, 59, 49, 49, 58, 44, 52, 64, 55, 53, 38, 54, 53, 43, 53, 64, 48, 58, 59, 49, 58, 56, 38, 50, 75, 75,
90, 45, 45, 65, 93, 63, 59, 67, 59, 59, 68, 53, 64, 77, 64, 64, 45, 64, 65, 53, 64, 77, 59, 69, 69, 59, 69, 65, 45, 63, 91, 90,
109, 54, 55, 78, 109, 76, 71, 83, 70, 71, 82, 64, 77, 93, 71, 77, 54, 73, 77, 64, 77, 93, 71, 83, 83, 72, 90, 79, 54, 80, 108, 109,
84, 42, 41, 59, 83, 49, 58, 64, 54, 58, 64, 49, 57, 71, 59, 61, 42, 59, 59, 48, 59, 71, 62, 64, 64, 57, 64, 60, 41, 58, 84, 84,
97, 49, 51, 66, 98, 69, 64, 75, 64, 64, 76, 58, 69, 84, 68, 69, 49, 66, 69, 58, 69, 83, 64, 75, 75, 64, 75, 70, 46, 68, 98, 97,
98, 49, 51, 71, 98, 68, 64, 75, 64, 64, 76, 57, 69, 83, 69, 66, 49, 69, 69, 59, 69, 83, 64, 75, 75, 64, 75, 71, 49, 68, 98, 98,
85, 42, 41, 61, 77, 58, 55, 63, 54, 53, 64, 49, 58, 73, 59, 59, 42, 61, 61, 49, 59, 72, 57, 64, 64, 55, 63, 47, 42, 58, 83, 85,
97, 49, 50, 69, 99, 73, 64, 75, 64, 64, 80, 58, 69, 83, 68, 68, 49, 70, 69, 58, 69, 90, 64, 75, 75, 63, 86, 70, 49, 68, 98, 97,
90, 47, 46, 67, 94, 62, 51, 71, 60, 60, 70, 54, 67, 79, 65, 65, 46, 65, 68, 56, 65, 79, 60, 70, 71, 47, 70, 67, 46, 64, 93, 90,
65, 32, 32, 46, 65, 47, 42, 49, 42, 42, 49, 38, 45, 54, 47, 45, 32, 46, 45, 38, 45, 54, 41, 46, 49, 42, 49, 46, 32, 44, 64, 65,
88, 45, 44, 64, 89, 63, 58, 68, 58, 58, 73, 53, 63, 76, 63, 63, 44, 63, 63, 50, 63, 80, 58, 68, 68, 58, 68, 64, 44, 61, 89, 89,
131, 63, 64, 92, 128, 88, 84, 98, 83, 83, 101, 72, 89, 110, 90, 92, 66, 90, 91, 75, 91, 108, 84, 98, 98, 83, 98, 93, 64, 89, 126, 133,
124, 65, 64, 92, 128, 89, 83, 98, 84, 84, 98, 75, 91, 109, 91, 90, 64, 91, 90, 75, 90, 109, 84, 97, 98, 85, 97, 90, 65, 89, 133, 121,
},
```

```
QP1={
93, 93, 93, 93, 94, 93, 94, 93, 94, 94, 94, 93, 94, 94, 94, 93, 93, 94, 93, 93, 93, 93, 93, 93, 94, 95, 93, 92, 95, 95, 94, 87,
93, 94, 93, 93, 94, 94, 93, 94, 94, 94, 95, 97, 94, 96, 96, 98, 97, 95, 94, 94, 94, 94, 93, 94, 93, 94, 94, 94, 93, 94, 93, 93,
93, 93, 94, 93, 94, 95, 98, 100, 98, 93, 95, 94, 93, 94, 94, 93, 93, 94, 94, 87, 93, 94, 94, 97, 97, 93, 95, 93, 93, 94, 94, 92,
93, 93, 93, 94, 95, 97, 95, 94, 94, 94, 94, 94, 93, 91, 93, 92, 93, 93, 94, 94, 94, 94, 95, 90, 95, 94, 96, 93, 93, 93, 94, 94,
94, 94, 94, 95, 97, 93, 94, 94, 94, 94, 95, 95, 94, 93, 94, 94, 94, 94, 94, 96, 95, 93, 94, 94, 94, 90, 94, 95, 95, 93, 94, 93,
93, 94, 95, 97, 93, 93, 93, 94, 95, 90, 94, 94, 93, 94, 93, 95, 94, 94, 94, 94, 93, 92, 91, 94, 93, 93, 99, 93, 95, 94, 93, 93,
94, 93, 98, 95, 94, 93, 95, 90, 92, 94, 94, 93, 95, 96, 93, 94, 94, 94, 98, 95, 93, 93, 91, 91, 91, 94, 94, 89, 94, 98, 93, 93,
93, 94, 100, 94, 94, 94, 90, 94, 94, 94, 95, 95, 94, 94, 93, 98, 94, 93, 94, 93, 93, 94, 94, 93, 95, 93, 94, 93, 95, 96, 94, 93,
94, 94, 98, 94, 94, 95, 92, 94, 94, 95, 95, 94, 94, 99, 94, 94, 94, 91, 94, 94, 94, 95, 94, 94, 95, 94, 95, 94, 95, 94, 94, 94,
94, 94, 93, 94, 94, 90, 94, 94, 95, 95, 94, 95, 98, 95, 94, 96, 94, 94, 94, 97, 94, 94, 91, 94, 93, 93, 93, 94, 93, 94, 94, 94,
94, 95, 95, 94, 95, 94, 94, 95, 95, 94, 94, 94, 94, 95, 94, 94, 94, 96, 94, 94, 94, 94, 94, 94, 94, 94, 100, 95, 94, 96, 95, 94,
93, 97, 94, 94, 95, 94, 93, 95, 94, 95, 94, 95, 93, 96, 94, 94, 94, 94, 95, 95, 94, 91, 94, 94, 96, 94, 95, 94, 93, 94, 96, 94,
94, 94, 93, 93, 94, 93, 95, 94, 94, 98, 94, 93, 91, 94, 94, 94, 94, 94, 93, 93, 92, 93, 96, 94, 95, 94, 94, 92, 92, 93, 94, 94,
94, 96, 94, 91, 93, 94, 96, 94, 99, 95, 95, 96, 94, 83, 93, 94, 94, 94, 88, 94, 94, 94, 95, 99, 93, 93, 94, 93, 91, 94, 95, 94,
94, 96, 94, 93, 94, 93, 93, 93, 94, 94, 94, 94, 94, 93, 94, 94, 94, 93, 93, 95, 94, 95, 93, 92, 93, 94, 93, 93, 94, 94, 93, 94,
93, 98, 93, 92, 94, 95, 94, 98, 94, 96, 94, 94, 94, 94, 94, 94, 94, 94, 94, 94, 93, 94, 94, 94, 98, 94, 94, 94, 94, 94, 95, 94,
93, 97, 93, 93, 94, 94, 94, 94, 94, 94, 94, 94, 94, 94, 94, 94, 93, 94, 93, 94, 93, 94, 93, 94, 94, 94, 93, 94, 95, 94, 94, 94,
94, 95, 94, 93, 94, 94, 94, 93, 91, 94, 96, 94, 94, 94, 93, 94, 94, 92, 94, 95, 94, 96, 94, 89, 93, 95, 94, 93, 93, 94, 93, 94,
93, 94, 94, 94, 94, 94, 98, 94, 94, 94, 94, 95, 93, 88, 93, 94, 93, 94, 94, 94, 93, 94, 94, 95, 93, 94, 94, 94, 93, 94, 93, 94,
93, 94, 87, 94, 96, 94, 95, 93, 94, 97, 94, 95, 93, 94, 95, 94, 94, 95, 94, 94, 94, 93, 95, 94, 94, 94, 94, 94, 93, 86, 94, 93,
93, 94, 93, 94, 95, 93, 93, 93, 94, 94, 94, 94, 92, 94, 94, 93, 93, 94, 93, 94, 93, 90, 94, 94, 94, 94, 94, 94, 93, 93, 94, 94,
93, 94, 94, 94, 93, 92, 93, 94, 95, 94, 94, 91, 93, 94, 95, 94, 94, 96, 94, 93, 90, 94, 94, 94, 93, 93, 98, 93, 93, 95, 94, 93,
93, 93, 94, 95, 94, 91, 91, 94, 94, 91, 94, 94, 96, 95, 93, 94, 93, 94, 94, 95, 94, 94, 88, 94, 93, 90, 94, 94, 95, 95, 94, 93,
93, 94, 97, 90, 94, 94, 91, 93, 94, 94, 94, 94, 94, 99, 92, 94, 94, 89, 95, 94, 94, 94, 94, 94, 94, 93, 94, 93, 92, 93, 94, 93,
94, 93, 97, 95, 94, 93, 91, 95, 95, 93, 94, 96, 95, 93, 93, 98, 94, 93, 93, 94, 94, 93, 93, 94, 95, 93, 94, 94, 96, 93, 93, 94,
95, 94, 93, 94, 90, 93, 94, 93, 94, 93, 94, 94, 94, 93, 94, 94, 94, 95, 94, 94, 94, 93, 90, 93, 93, 94, 94, 86, 94, 93, 94, 94,
93, 94, 95, 96, 94, 99, 94, 94, 95, 93, 100, 95, 94, 94, 93, 94, 93, 94, 94, 94, 94, 98, 94, 94, 94, 94, 105, 94, 94, 94, 94, 93,
92, 94, 93, 93, 95, 93, 89, 93, 94, 94, 95, 94, 92, 93, 93, 94, 94, 93, 94, 94, 94, 93, 94, 93, 94, 86, 94, 93, 93, 93, 94, 92,
95, 93, 93, 93, 95, 95, 94, 95, 95, 93, 94, 93, 92, 91, 94, 94, 95, 93, 93, 93, 93, 93, 95, 92, 96, 94, 94, 93, 92, 93, 94, 96,
95, 94, 94, 93, 93, 94, 98, 96, 94, 94, 96, 94, 93, 94, 94, 94, 94, 94, 94, 86, 93, 95, 95, 93, 93, 93, 94, 93, 93, 94, 94, 94,
94, 93, 94, 94, 94, 93, 93, 94, 94, 94, 95, 96, 94, 95, 93, 95, 94, 93, 93, 94, 94, 94, 94, 94, 93, 94, 94, 94, 94, 94, 92, 95,
87, 93, 92, 94, 93, 93, 93, 93, 94, 94, 94, 94, 94, 94, 94, 94, 94, 94, 94, 93, 94, 93, 93, 93, 94, 94, 93, 92, 96, 94, 95, 81,
},
```

```
QP2={
79, 79, 79, 79, 79, 79, 79, 79, 79, 79, 80, 79, 79, 79, 79, 79, 79, 79, 79, 79, 79, 79, 79, 79, 80, 80, 79, 78, 80, 81, 80, 74,
79, 79, 79, 79, 79, 79, 78, 80, 80, 80, 81, 82, 79, 81, 81, 83, 82, 81, 80, 79, 79, 79, 79, 80, 79, 79, 80, 79, 79, 79, 78, 79,
79, 79, 79, 79, 79, 80, 83, 85, 83, 79, 80, 79, 79, 79, 79, 79, 79, 79, 79, 73, 79, 80, 80, 82, 82, 79, 80, 79, 79, 79, 79, 78,
79, 79, 79, 80, 80, 82, 80, 79, 80, 79, 80, 80, 78, 77, 79, 78, 78, 79, 79, 79, 79, 79, 80, 77, 80, 80, 81, 79, 79, 79, 79, 80,
79, 79, 79, 80, 82, 79, 79, 79, 80, 79, 80, 80, 80, 79, 79, 79, 79, 79, 79, 81, 80, 79, 79, 79, 80, 77, 80, 80, 80, 79, 79, 79,
79, 79, 80, 82, 79, 79, 79, 79, 80, 76, 79, 80, 79, 79, 78, 80, 80, 79, 80, 79, 79, 78, 77, 80, 79, 79, 84, 79, 80, 80, 79, 79,
79, 78, 83, 80, 79, 79, 80, 76, 78, 80, 80, 79, 80, 82, 78, 79, 79, 79, 83, 80, 79, 79, 77, 77, 77, 80, 80, 75, 80, 83, 78, 79,
79, 80, 85, 79, 79, 79, 76, 80, 80, 80, 80, 80, 80, 80, 79, 83, 79, 79, 80, 79, 79, 79, 79, 79, 80, 78, 80, 79, 80, 81, 79, 79,
79, 80, 83, 80, 80, 80, 78, 80, 80, 80, 81, 80, 80, 83, 79, 79, 79, 77, 80, 80, 79, 81, 80, 80, 80, 79, 80, 79, 81, 80, 80, 79,
79, 80, 79, 79, 79, 76, 80, 80, 80, 80, 80, 80, 83, 80, 79, 81, 80, 79, 80, 82, 80, 80, 77, 80, 79, 79, 79, 79, 79, 79, 80, 80,
80, 81, 80, 80, 80, 79, 80, 80, 81, 80, 80, 80, 80, 80, 80, 80, 80, 81, 80, 80, 79, 80, 80, 79, 80, 80, 84, 80, 79, 81, 81, 80,
79, 82, 79, 80, 80, 80, 79, 80, 80, 80, 80, 80, 79, 81, 79, 79, 79, 79, 80, 80, 79, 77, 80, 80, 81, 80, 80, 79, 79, 80, 82, 79,
79, 79, 79, 78, 80, 79, 80, 80, 80, 83, 80, 79, 77, 79, 80, 79, 79, 80, 79, 78, 78, 79, 81, 80, 80, 80, 80, 78, 78, 79, 80, 80,
79, 81, 79, 77, 79, 79, 82, 80, 83, 80, 80, 81, 79, 70, 79, 80, 79, 79, 75, 80, 79, 80, 80, 83, 79, 78, 80, 79, 77, 80, 80, 80,
79, 81, 79, 79, 79, 78, 78, 79, 79, 79, 80, 79, 80, 79, 80, 79, 79, 79, 79, 80, 79, 80, 79, 78, 78, 80, 79, 79, 79, 79, 79, 79,
79, 83, 79, 78, 79, 80, 79, 83, 79, 81, 80, 79, 79, 80, 79, 80, 79, 80, 79, 80, 79, 80, 80, 80, 83, 80, 79, 79, 80, 79, 80, 79,
79, 82, 79, 78, 79, 80, 79, 79, 79, 80, 80, 79, 79, 79, 79, 79, 79, 79, 79, 80, 79, 80, 79, 79, 80, 80, 79, 79, 80, 79, 80, 79,
79, 81, 79, 79, 79, 79, 79, 79, 77, 79, 81, 79, 80, 79, 79, 80, 79, 78, 79, 80, 79, 81, 79, 76, 79, 81, 80, 79, 79, 79, 78, 79,
79, 80, 79, 79, 79, 80, 83, 80, 80, 80, 80, 80, 79, 75, 79, 79, 79, 79, 79, 80, 79, 79, 80, 80, 79, 80, 80, 79, 79, 80, 79, 79,
79, 79, 73, 79, 81, 79, 80, 79, 80, 82, 80, 80, 78, 80, 80, 80, 80, 80, 80, 80, 79, 79, 80, 80, 80, 80, 80, 79, 79, 73, 79, 79,
79, 79, 79, 79, 80, 79, 79, 79, 79, 80, 79, 79, 78, 79, 79, 79, 79, 79, 79, 79, 79, 76, 79, 79, 80, 79, 79, 79, 78, 79, 79, 79,
79, 79, 80, 79, 79, 78, 79, 79, 81, 80, 80, 77, 79, 80, 80, 80, 80, 81, 79, 79, 76, 79, 80, 79, 79, 79, 83, 79, 79, 80, 79, 79,
79, 79, 80, 80, 79, 77, 77, 79, 80, 77, 80, 80, 81, 80, 79, 80, 79, 79, 80, 80, 79, 80, 74, 79, 79, 76, 80, 79, 80, 80, 79, 79,
79, 80, 82, 77, 79, 80, 77, 79, 80, 80, 79, 80, 80, 83, 78, 80, 79, 76, 80, 80, 79, 79, 79, 79, 79, 79, 80, 79, 78, 79, 79, 79,
80, 79, 82, 80, 80, 79, 77, 80, 80, 79, 80, 81, 80, 79, 78, 83, 80, 79, 79, 80, 80, 79, 79, 79, 80, 79, 79, 80, 81, 79, 79, 80,
80, 79, 79, 80, 77, 79, 80, 78, 79, 79, 80, 80, 80, 78, 80, 80, 80, 81, 80, 80, 79, 79, 76, 79, 79, 79, 80, 73, 79, 79, 79, 80,
79, 80, 80, 81, 80, 84, 80, 80, 80, 79, 84, 80, 80, 80, 79, 79, 79, 80, 80, 80, 79, 83, 80, 80, 79, 80, 89, 80, 79, 80, 80, 79,
78, 79, 79, 79, 80, 79, 75, 79, 79, 79, 80, 79, 78, 79, 79, 79, 79, 79, 79, 79, 79, 79, 79, 79, 80, 73, 80, 79, 79, 79, 79, 78,
80, 79, 79, 79, 80, 80, 80, 80, 81, 79, 79, 79, 78, 77, 79, 80, 80, 79, 79, 79, 78, 79, 80, 78, 81, 79, 79, 79, 78, 79, 79, 81,
81, 79, 79, 79, 79, 80, 83, 81, 80, 79, 81, 80, 79, 80, 79, 79, 79, 79, 80, 73, 79, 80, 80, 79, 79, 79, 80, 79, 79, 79, 79, 80,
80, 78, 79, 79, 79, 79, 78, 79, 80, 80, 81, 82, 80, 80, 79, 80, 80, 78, 79, 79, 79, 79, 79, 79, 79, 79, 80, 79, 79, 79, 77, 80,
74, 79, 78, 80, 79, 79, 79, 79, 79, 80, 80, 79, 80, 80, 79, 79, 79, 79, 79, 79, 79, 79, 79, 79, 80, 80, 79, 78, 81, 80, 80, 69,
},
```

```
QP4={
64, 64, 64, 64, 64, 64, 64, 64, 64, 64, 65, 64, 64, 65, 64, 64, 64, 64, 64, 64, 64, 64, 64, 64, 65, 65, 64, 63, 65, 66, 65, 60,
64, 64, 64, 64, 64, 64, 64, 65, 65, 65, 66, 66, 65, 66, 66, 67, 67, 66, 65, 64, 65, 64, 64, 65, 64, 64, 65, 64, 64, 64, 64, 64,
64, 64, 65, 64, 64, 65, 67, 69, 67, 64, 65, 64, 64, 64, 64, 64, 64, 64, 65, 60, 64, 65, 65, 67, 67, 64, 65, 64, 64, 64, 64, 63,
64, 64, 64, 65, 65, 66, 65, 64, 65, 64, 65, 65, 64, 63, 64, 63, 64, 64, 65, 65, 64, 64, 65, 62, 65, 65, 66, 64, 64, 64, 64, 65,
64, 64, 64, 65, 66, 64, 64, 64, 65, 64, 65, 65, 65, 64, 64, 64, 64, 64, 64, 66, 65, 64, 64, 64, 65, 62, 65, 65, 65, 64, 64, 64,
64, 64, 65, 66, 64, 64, 64, 65, 65, 62, 65, 65, 64, 64, 64, 65, 65, 64, 65, 65, 64, 63, 62, 65, 64, 64, 68, 64, 65, 65, 64, 64,
64, 64, 67, 65, 64, 64, 65, 62, 63, 65, 65, 64, 65, 66, 64, 64, 64, 64, 67, 65, 64, 64, 63, 63, 62, 65, 65, 61, 65, 67, 64, 64,
64, 65, 69, 64, 64, 65, 62, 65, 65, 65, 65, 65, 65, 65, 64, 67, 64, 64, 65, 64, 64, 64, 65, 64, 65, 64, 65, 64, 65, 66, 64, 64,
64, 65, 67, 65, 65, 65, 63, 65, 65, 65, 66, 65, 65, 68, 64, 65, 64, 62, 65, 65, 64, 66, 65, 65, 65, 65, 65, 65, 66, 65, 65, 64,
64, 65, 64, 64, 64, 62, 65, 65, 65, 65, 65, 65, 67, 65, 64, 66, 65, 65, 65, 67, 65, 65, 63, 65, 64, 64, 64, 64, 64, 64, 65, 65,
65, 66, 65, 65, 65, 65, 65, 65, 66, 65, 65, 65, 65, 65, 65, 65, 65, 66, 65, 65, 65, 65, 65, 64, 65, 65, 68, 65, 65, 66, 66, 65,
64, 66, 64, 65, 65, 65, 64, 65, 65, 65, 65, 65, 64, 66, 64, 65, 64, 65, 65, 65, 65, 62, 65, 65, 66, 65, 65, 64, 64, 65, 66, 64,
64, 65, 64, 64, 65, 64, 65, 65, 65, 67, 65, 64, 63, 64, 65, 65, 64, 65, 64, 64, 63, 64, 66, 65, 65, 65, 65, 63, 63, 64, 65, 65,
65, 66, 64, 63, 64, 64, 66, 65, 68, 65, 65, 66, 64, 57, 64, 65, 64, 64, 61, 65, 64, 65, 65, 68, 64, 64, 65, 64, 62, 65, 65, 65,
64, 66, 64, 64, 64, 64, 64, 64, 64, 64, 65, 64, 65, 64, 65, 64, 64, 64, 64, 65, 64, 65, 64, 63, 64, 65, 64, 64, 64, 64, 64, 64,
64, 67, 64, 63, 64, 65, 64, 67, 65, 66, 65, 65, 65, 65, 64, 65, 64, 65, 64, 65, 64, 65, 65, 65, 68, 65, 64, 64, 65, 64, 65, 64,
64, 67, 64, 64, 64, 65, 64, 64, 64, 65, 65, 64, 64, 64, 64, 64, 64, 65, 64, 65, 64, 65, 64, 65, 65, 65, 64, 64, 65, 65, 65, 64,
64, 66, 64, 64, 64, 64, 64, 64, 62, 65, 66, 65, 65, 64, 64, 65, 65, 64, 64, 65, 64, 66, 64, 61, 64, 66, 65, 64, 64, 64, 64, 64,
64, 65, 65, 65, 64, 65, 67, 65, 65, 65, 65, 65, 64, 61, 64, 64, 64, 64, 65, 65, 64, 65, 65, 65, 64, 65, 65, 65, 64, 65, 64, 65,
64, 64, 60, 65, 66, 65, 65, 64, 65, 67, 65, 65, 64, 65, 65, 65, 65, 65, 65, 65, 64, 64, 65, 65, 65, 65, 65, 64, 64, 59, 65, 64,
64, 65, 64, 64, 65, 64, 64, 64, 64, 65, 65, 65, 63, 64, 64, 64, 64, 64, 64, 64, 64, 62, 64, 64, 65, 65, 64, 64, 64, 64, 64, 64,
64, 64, 65, 64, 64, 63, 64, 64, 66, 65, 65, 62, 64, 65, 65, 65, 65, 66, 65, 64, 62, 65, 65, 65, 64, 64, 67, 64, 64, 65, 64, 64,
64, 64, 65, 65, 64, 62, 63, 65, 65, 63, 65, 65, 66, 65, 64, 65, 64, 64, 65, 65, 64, 65, 60, 64, 64, 62, 65, 64, 65, 65, 64, 64,
64, 65, 67, 62, 64, 65, 63, 64, 65, 65, 64, 65, 65, 68, 63, 65, 65, 61, 65, 65, 64, 65, 64, 65, 64, 64, 65, 64, 63, 64, 64, 64,
65, 64, 67, 65, 65, 64, 62, 65, 65, 64, 65, 66, 65, 64, 64, 68, 65, 64, 64, 65, 65, 64, 64, 64, 65, 64, 64, 65, 66, 64, 64, 65,
65, 64, 64, 65, 62, 64, 65, 64, 65, 64, 65, 65, 65, 64, 65, 65, 65, 66, 65, 65, 65, 64, 62, 64, 64, 64, 65, 59, 65, 64, 65, 65,
64, 65, 65, 66, 65, 68, 65, 65, 65, 64, 68, 65, 65, 65, 64, 64, 64, 65, 65, 65, 64, 67, 65, 65, 64, 65, 72, 65, 65, 65, 65, 64,
63, 64, 64, 64, 65, 64, 61, 64, 65, 64, 65, 64, 63, 64, 64, 64, 64, 64, 65, 64, 64, 64, 64, 64, 65, 59, 65, 64, 64, 64, 64, 63,
65, 64, 64, 64, 65, 65, 65, 65, 66, 64, 65, 64, 63, 62, 64, 65, 65, 64, 64, 64, 64, 64, 65, 63, 66, 65, 65, 64, 64, 64, 64, 66,
66, 64, 64, 64, 64, 65, 67, 66, 65, 64, 66, 65, 64, 65, 64, 64, 65, 64, 65, 59, 64, 65, 65, 64, 64, 64, 65, 64, 64, 64, 65, 65,
65, 64, 64, 64, 64, 64, 64, 64, 65, 65, 66, 66, 65, 65, 64, 65, 65, 64, 64, 65, 64, 64, 64, 64, 64, 65, 65, 64, 64, 65, 63, 65,
60, 64, 63, 65, 64, 64, 64, 64, 64, 65, 65, 64, 65, 65, 64, 64, 64, 64, 65, 64, 64, 64, 64, 64, 65, 65, 64, 63, 66, 65, 65, 56,
},
```

```
QP4={
32, 64, 64, 44, 32, 46, 49, 42, 49, 49, 42, 54, 45, 38, 45, 45, 64, 45, 45, 55, 45, 37, 49, 42, 42, 48, 42, 46, 63, 46, 31, 33,
64, 128, 127, 89, 64, 93, 98, 83, 98, 99, 81, 114, 92, 75, 89, 94, 132, 90, 91, 109, 90, 75, 98, 83, 83, 98, 83, 88, 127, 92, 65, 63,
64, 127, 128, 88, 64, 90, 100, 80, 95, 99, 82, 109, 90, 75, 90, 90, 128, 90, 91, 114, 92, 74, 100, 80, 80, 99, 83, 89, 128, 92, 64, 64,
44, 89, 88, 62, 43, 62, 68, 58, 68, 68, 58, 75, 63, 53, 61, 63, 89, 63, 63, 75, 63, 52, 69, 62, 58, 67, 59, 61, 89, 64, 44, 44,
32, 64, 64, 43, 31, 46, 49, 42, 49, 49, 42, 53, 45, 38, 46, 45, 64, 45, 44, 53, 44, 38, 49, 42, 42, 53, 42, 43, 63, 46, 32, 32,
46, 93, 90, 62, 46, 66, 71, 60, 70, 84, 61, 78, 65, 55, 66, 69, 95, 65, 65, 78, 65, 54, 84, 60, 60, 71, 56, 66, 88, 65, 47, 46,
49, 98, 100, 68, 49, 71, 75, 65, 76, 75, 64, 84, 70, 59, 70, 69, 98, 67, 69, 83, 69, 57, 70, 64, 64, 75, 64, 80, 97, 71, 49, 49,
42, 83, 80, 58, 42, 60, 65, 55, 64, 64, 54, 73, 59, 49, 60, 61, 83, 59, 59, 69, 61, 49, 64, 54, 55, 65, 54, 58, 83, 60, 42, 42,
49, 98, 95, 68, 49, 70, 76, 64, 75, 75, 64, 83, 69, 57, 70, 69, 98, 73, 69, 83, 69, 58, 76, 64, 64, 76, 64, 68, 97, 71, 49, 49,
49, 99, 99, 68, 49, 84, 75, 64, 75, 75, 64, 83, 70, 58, 69, 68, 98, 69, 69, 84, 69, 58, 70, 64, 64, 77, 64, 68, 97, 70, 49, 49,
42, 81, 82, 58, 42, 61, 64, 54, 64, 64, 56, 72, 59, 49, 59, 59, 84, 57, 59, 71, 60, 50, 64, 54, 54, 64, 51, 59, 83, 56, 41, 42,
54, 114, 109, 75, 53, 78, 84, 73, 83, 83, 72, 92, 78, 64, 77, 76, 109, 77, 75, 93, 77, 64, 83, 71, 71, 83, 71, 76, 109, 77, 57, 55,
45, 92, 90, 63, 45, 65, 70, 59, 69, 70, 59, 78, 65, 53, 63, 64, 90, 66, 64, 79, 64, 53, 72, 59, 59, 71, 59, 61, 91, 65, 46, 45,
38, 75, 75, 53, 38, 55, 59, 49, 57, 58, 49, 64, 53, 49, 53, 53, 76, 53, 56, 64, 54, 44, 58, 49, 49, 56, 49, 52, 77, 54, 37, 38,
45, 89, 90, 61, 46, 66, 70, 60, 70, 69, 59, 77, 63, 53, 63, 64, 90, 64, 64, 74, 64, 58, 69, 60, 59, 69, 60, 63, 88, 65, 45, 45,
45, 94, 90, 63, 45, 69, 69, 61, 69, 68, 59, 76, 64, 53, 64, 64, 90, 64, 64, 77, 64, 53, 67, 59, 62, 69, 61, 63, 90, 65, 44, 45,
64, 132, 128, 89, 64, 95, 98, 83, 98, 98, 84, 109, 90, 76, 90, 90, 128, 91, 91, 108, 91, 75, 97, 84, 84, 98, 84, 89, 127, 92, 62, 64,
45, 90, 90, 63, 45, 65, 67, 59, 73, 69, 57, 77, 66, 53, 64, 64, 91, 64, 64, 76, 64, 56, 69, 63, 59, 67, 59, 63, 90, 65, 46, 45,
45, 91, 91, 63, 44, 65, 69, 59, 69, 69, 59, 75, 64, 56, 64, 64, 91, 64, 65, 77, 63, 53, 69, 59, 59, 67, 59, 60, 90, 65, 45, 46,
55, 109, 114, 75, 53, 78, 83, 69, 83, 84, 71, 93, 79, 64, 74, 77, 108, 76, 77, 95, 77, 64, 85, 71, 69, 83, 71, 73, 109, 82, 55, 55,
45, 90, 92, 63, 44, 65, 69, 61, 69, 69, 60, 77, 64, 54, 64, 64, 91, 64, 63, 77, 64, 53, 69, 59, 59, 69, 59, 63, 90, 65, 45, 45,
37, 75, 74, 52, 38, 54, 57, 49, 58, 58, 50, 64, 53, 44, 58, 53, 75, 56, 53, 64, 53, 44, 57, 49, 49, 57, 45, 52, 76, 51, 38, 37,
49, 98, 100, 69, 49, 84, 70, 64, 76, 70, 64, 83, 72, 58, 69, 67, 97, 69, 69, 85, 69, 57, 66, 64, 64, 72, 64, 68, 99, 71, 49, 49,
42, 83, 80, 62, 42, 60, 64, 54, 64, 64, 54, 71, 59, 49, 60, 59, 84, 63, 59, 71, 59, 49, 64, 55, 54, 64, 55, 58, 89, 60, 42, 42,
42, 83, 80, 58, 42, 60, 64, 55, 64, 64, 54, 71, 59, 49, 59, 62, 84, 59, 59, 69, 59, 49, 64, 54, 55, 64, 55, 58, 83, 60, 42, 42,
48, 98, 99, 67, 53, 71, 75, 65, 76, 77, 64, 83, 71, 56, 69, 69, 98, 67, 67, 83, 69, 57, 72, 64, 64, 75, 65, 87, 97, 70, 49, 48,
42, 83, 83, 59, 42, 56, 64, 54, 64, 64, 51, 71, 59, 49, 60, 61, 84, 59, 59, 71, 59, 45, 64, 55, 55, 65, 48, 59, 84, 60, 42, 42,
46, 88, 89, 61, 43, 66, 80, 58, 68, 68, 59, 76, 61, 52, 63, 63, 89, 63, 60, 73, 63, 52, 68, 58, 58, 87, 59, 61, 89, 64, 44, 46,
63, 127, 128, 89, 63, 88, 97, 83, 97, 97, 83, 109, 91, 77, 88, 90, 127, 90, 90, 109, 90, 76, 99, 89, 83, 97, 84, 89, 128, 92, 64, 63,
46, 92, 92, 64, 46, 65, 71, 60, 71, 70, 56, 77, 65, 54, 65, 65, 92, 65, 65, 82, 65, 51, 71, 60, 60, 70, 60, 64, 92, 67, 46, 46,
31, 65, 64, 44, 32, 47, 49, 42, 49, 49, 41, 57, 46, 37, 45, 44, 62, 46, 45, 55, 45, 38, 49, 42, 42, 49, 42, 44, 64, 46, 33, 31,
33, 63, 64, 44, 32, 46, 49, 42, 49, 49, 42, 55, 45, 38, 45, 45, 64, 45, 46, 55, 45, 37, 49, 42, 42, 48, 42, 46, 63, 46, 31, 34,
},
```

```
QP0={
40, 40, 40, 40, 40, 40, 40, 40, 40, 40, 40, 40, 40, 40, 40, 40, 40, 40, 40, 40, 40, 40, 40, 40, 40, 41, 40, 39, 41, 41, 41, 37,
40, 40, 40, 40, 40, 40, 40, 45, 37, 40, 41, 42, 40, 41, 41, 42, 42, 41, 40, 40, 40, 40, 40, 37, 44, 40, 41, 40, 40, 40, 40, 40,
40, 40, 40, 40, 40, 41, 42, 43, 42, 40, 41, 40, 40, 40, 40, 40, 40, 40, 40, 37, 40, 41, 40, 42, 42, 40, 41, 40, 40, 40, 40, 40,
40, 40, 40, 40, 41, 42, 41, 47, 38, 40, 40, 40, 40, 39, 40, 40, 40, 40, 40, 40, 40, 40, 41, 36, 47, 41, 41, 40, 40, 40, 40, 40,
40, 40, 40, 41, 42, 40, 40, 40, 40, 40, 41, 41, 40, 40, 40, 40, 40, 40, 40, 41, 41, 40, 40, 40, 41, 39, 41, 41, 41, 40, 40, 40,
40, 40, 41, 42, 40, 40, 40, 43, 35, 39, 40, 40, 40, 40, 40, 41, 41, 40, 40, 40, 40, 40, 39, 35, 43, 40, 43, 40, 41, 40, 40, 40,
40, 40, 42, 41, 40, 40, 41, 39, 39, 40, 41, 40, 41, 41, 40, 40, 40, 40, 42, 41, 40, 40, 39, 39, 39, 40, 40, 38, 40, 42, 40, 40,
40, 45, 43, 47, 40, 43, 39, 65, 39, 42, 41, 68, 40, 41, 40, -39, 40, 40, 41, 24, 40, 39, 40, 30, 52, 38, 41, 35, 41, 39, 40, 36,
40, 37, 42, 38, 40, 35, 39, 39, 41, 32, 41, 40, 41, 25, 40, 40, 40, -42, 41, 41, 40, 68, 40, 42, 41, 51, 41, 43, 41, 47, 40, 44,
40, 40, 40, 40, 40, 39, 40, 42, 32, 41, 41, 41, 42, 41, 40, 41, 41, 40, 41, 42, 40, 40, 39, 32, 42, 40, 40, 40, 40, 40, 41, 40,
40, 41, 41, 40, 41, 40, 41, 41, 41, 41, 41, 41, 40, 41, 41, 40, 40, 41, 41, 41, 40, 40, 41, 40, 40, 41, 43, 41, 40, 41, 41, 41,
40, 42, 40, 40, 41, 40, 40, 68, 40, 41, 41, 41, 40, 41, 40, 40, 40, 40, 41, 41, 40, 39, 40, 40, 69, 40, 41, 40, 40, 40, 41, 40,
40, 40, 40, 40, 40, 40, 41, 40, 41, 42, 40, 40, 39, 40, 41, 40, 40, 41, 40, 40, 40, 40, 41, 40, 41, 41, 40, 40, 39, 40, 40, 40,
40, 41, 40, 39, 40, 40, 41, 41, 25, 41, 41, 41, 40, 36, 40, 40, 40, 40, 38, 41, 40, 40, 41, 25, 41, 40, 40, 40, 39, 40, 41, 41,
40, 41, 40, 40, 40, 40, 40, 40, 40, 40, 41, 40, 41, 40, 40, 40, 40, 40, 40, 41, 40, 41, 40, 40, 40, 41, 40, 40, 40, 40, 40, 40,
40, 42, 40, 40, 40, 41, 40, -39, 40, 41, 40, 40, 40, 40, 40, 40, 40, 40, 40, 40, 40, 41, 41, 40, -39, 40, 40, 40, 41, 40, 41, 40,
40, 42, 40, 40, 40, 41, 40, 40, 40, 41, 40, 40, 40, 40, 40, 40, 40, 40, 40, 40, 40, 40, 40, 40, 40, 40, 40, 40, 41, 40, 41, 40,
40, 41, 40, 40, 40, 40, 40, 40, -42, 40, 41, 40, 41, 40, 40, 40, 40, 40, 40, 41, 40, 41, 40, -42, 40, 41, 40, 40, 40, 40, 40, 40,
40, 40, 40, 40, 40, 40, 42, 41, 41, 41, 41, 41, 40, 38, 40, 40, 40, 40, 40, 41, 40, 40, 41, 41, 40, 40, 41, 40, 40, 40, 40, 40,
40, 40, 37, 40, 41, 40, 41, 24, 41, 42, 41, 41, 40, 41, 41, 40, 40, 41, 41, 40, 40, 40, 41, 41, 24, 40, 41, 40, 40, 37, 40, 40,
40, 40, 40, 40, 41, 40, 40, 40, 40, 40, 40, 40, 40, 40, 40, 40, 40, 40, 40, 40, 40, 39, 40, 40, 40, 40, 40, 40, 40, 40, 40, 40,
40, 40, 41, 40, 40, 40, 40, 39, 68, 40, 40, 39, 40, 40, 41, 41, 40, 41, 40, 40, 39, 40, 40, 67, 39, 40, 42, 40, 40, 41, 40, 40,
40, 40, 40, 41, 40, 39, 39, 40, 40, 39, 41, 40, 41, 41, 40, 41, 40, 40, 41, 41, 40, 40, 38, 40, 40, 39, 40, 40, 41, 41, 40, 40,
40, 37, 42, 36, 40, 35, 39, 30, 42, 32, 40, 40, 40, 25, 40, 40, 40, -42, 41, 41, 40, 67, 40, 44, 32, 51, 41, 43, 39, 47, 40, 44,
40, 44, 42, 47, 41, 43, 39, 52, 41, 42, 40, 69, 41, 41, 40, -39, 40, 40, 40, 24, 40, 39, 40, 32, 41, 38, 40, 35, 41, 37, 40, 37,
41, 40, 40, 41, 39, 40, 40, 38, 51, 40, 41, 40, 41, 40, 41, 40, 40, 41, 40, 40, 40, 40, 39, 51, 38, 40, 40, 37, 40, 40, 40, 41,
40, 41, 41, 41, 41, 43, 40, 41, 41, 40, 43, 41, 40, 40, 40, 40, 40, 40, 41, 41, 40, 42, 40, 41, 40, 40, 45, 41, 40, 41, 40, 40,
39, 40, 40, 40, 41, 40, 38, 35, 43, 40, 41, 40, 40, 40, 40, 40, 40, 40, 40, 40, 40, 40, 40, 43, 35, 37, 41, 40, 40, 40, 40, 39,
41, 40, 40, 40, 41, 41, 40, 41, 41, 40, 40, 40, 39, 39, 40, 41, 41, 40, 40, 40, 40, 40, 41, 39, 41, 40, 40, 40, 40, 40, 40, 41,
41, 40, 40, 40, 40, 40, 42, 39, 47, 40, 41, 40, 40, 40, 40, 40, 40, 40, 40, 37, 40, 41, 41, 47, 37, 40, 41, 40, 40, 40, 40, 40,
41, 40, 40, 40, 40, 40, 40, 40, 40, 41, 41, 41, 40, 41, 40, 41, 41, 40, 40, 40, 40, 40, 40, 40, 40, 40, 40, 40, 40, 40, 39, 41,
37, 40, 40, 40, 40, 40, 40, 36, 44, 40, 41, 40, 40, 41, 40, 40, 40, 40, 40, 40, 40, 40, 40, 44, 37, 41, 40, 39, 41, 40, 41, 35,
},
```

```
QP1={
44, 44, 44, 44, 44, 44, 44, 44, 44, 44, 44, 44, 44, 44, 44, 44, 44, 44, 44, 44, 44, 44, 44, 44, 44, 45, 44, 43, 45, 45, 45, 41,
44, 44, 44, 44, 44, 44, 44, 49, 40, 45, 45, 46, 44, 45, 45, 46, 46, 45, 44, 44, 44, 44, 44, 40, 49, 44, 45, 44, 44, 44, 44, 44,
44, 44, 44, 44, 44, 45, 46, 47, 46, 44, 45, 44, 44, 44, 44, 44, 44, 44, 44, 41, 44, 45, 44, 46, 46, 44, 45, 44, 44, 44, 44, 44,
44, 44, 44, 44, 45, 46, 45, 51, 42, 44, 44, 44, 44, 43, 44, 44, 44, 44, 44, 44, 44, 44, 45, 40, 52, 45, 45, 44, 44, 44, 44, 44,
44, 44, 44, 45, 46, 44, 44, 44, 44, 44, 45, 45, 44, 44, 44, 44, 44, 44, 44, 45, 45, 44, 44, 44, 45, 43, 45, 45, 45, 44, 44, 44,
44, 44, 45, 46, 44, 44, 44, 47, 39, 42, 44, 44, 44, 44, 44, 45, 45, 44, 44, 44, 44, 44, 43, 38, 47, 44, 47, 44, 45, 44, 44, 44,
44, 44, 46, 45, 44, 44, 45, 43, 43, 44, 45, 44, 45, 46, 44, 44, 44, 44, 46, 45, 44, 44, 43, 43, 43, 45, 44, 42, 45, 46, 44, 44,
44, 49, 47, 51, 44, 47, 43, 72, 43, 46, 45, 75, 44, 45, 44, −43, 44, 44, 45, 27, 44, 43, 44, 33, 57, 42, 45, 38, 45, 42, 44, 40,
44, 40, 46, 42, 44, 39, 43, 43, 45, 35, 45, 44, 45, 28, 44, 44, 44, −47, 45, 45, 44, 75, 44, 46, 45, 56, 45, 47, 45, 52, 44, 49,
44, 45, 44, 44, 44, 42, 44, 46, 35, 45, 45, 45, 46, 45, 44, 45, 45, 44, 45, 46, 44, 45, 43, 35, 46, 44, 44, 44, 44, 44, 45, 44,
44, 45, 45, 44, 45, 44, 45, 45, 45, 45, 45, 45, 44, 45, 45, 45, 44, 45, 45, 45, 44, 44, 45, 44, 44, 45, 47, 45, 44, 45, 45, 45,
44, 46, 44, 44, 45, 44, 44, 75, 44, 45, 45, 45, 44, 45, 44, 44, 44, 44, 45, 45, 44, 43, 44, 44, 76, 44, 45, 44, 44, 45, 46, 44,
44, 44, 44, 44, 44, 44, 45, 44, 45, 46, 44, 44, 43, 44, 45, 44, 44, 45, 44, 44, 44, 44, 45, 44, 45, 45, 44, 44, 43, 44, 45, 44,
44, 45, 44, 43, 44, 44, 46, 45, 28, 45, 45, 45, 44, 39, 44, 44, 44, 44, 42, 45, 44, 45, 45, 28, 45, 44, 44, 44, 43, 44, 45, 45,
44, 45, 44, 44, 44, 44, 44, 44, 44, 44, 45, 44, 45, 44, 44, 44, 44, 44, 44, 45, 44, 45, 44, 44, 44, 45, 44, 44, 44, 44, 44, 44,
44, 46, 44, 44, 44, 45, 44, −43, 44, 45, 45, 44, 44, 44, 44, 44, 44, 45, 44, 45, 44, 45, 45, 44, −43, 44, 44, 44, 45, 44, 45, 44,
44, 46, 44, 44, 44, 45, 44, 44, 44, 45, 44, 44, 44, 44, 44, 44, 44, 44, 44, 44, 44, 45, 44, 44, 44, 44, 44, 44, 45, 44, 45, 44,
44, 45, 44, 44, 44, 44, 44, 44, −47, 44, 45, 44, 45, 44, 44, 45, 44, 44, 44, 45, 44, 45, 44, −46, 44, 45, 45, 44, 44, 44, 44, 44,
44, 44, 44, 44, 44, 44, 46, 45, 45, 45, 45, 45, 44, 42, 44, 44, 44, 44, 44, 45, 44, 44, 45, 45, 44, 45, 45, 44, 44, 45, 44, 44,
44, 44, 41, 44, 45, 44, 45, 27, 45, 46, 45, 45, 44, 45, 45, 45, 44, 45, 45, 44, 44, 44, 45, 45, 27, 44, 45, 44, 44, 41, 44, 44,
44, 44, 44, 44, 45, 44, 44, 44, 44, 44, 44, 44, 44, 44, 44, 44, 44, 44, 44, 44, 44, 43, 44, 44, 44, 44, 44, 44, 44, 44, 44, 44,
44, 44, 45, 44, 44, 44, 44, 43, 75, 45, 44, 43, 44, 45, 45, 45, 45, 45, 44, 44, 43, 44, 44, 74, 43, 44, 46, 44, 44, 45, 44, 44,
44, 44, 44, 45, 44, 43, 43, 44, 44, 43, 45, 44, 45, 45, 44, 45, 44, 44, 45, 45, 44, 44, 41, 44, 44, 43, 44, 44, 45, 45, 44, 44,
44, 40, 46, 40, 44, 38, 43, 33, 46, 35, 44, 44, 44, 28, 44, 44, 44, −46, 45, 45, 44, 74, 44, 48, 35, 56, 45, 47, 43, 51, 44, 48,
44, 49, 46, 52, 45, 47, 43, 57, 45, 46, 44, 76, 45, 45, 44, −43, 44, 44, 44, 27, 44, 43, 44, 35, 45, 42, 44, 38, 45, 41, 44, 40,
45, 44, 44, 45, 43, 44, 45, 42, 56, 44, 45, 44, 45, 44, 45, 44, 44, 45, 45, 44, 44, 44, 43, 56, 42, 44, 44, 41, 44, 44, 44, 45,
44, 45, 45, 45, 45, 47, 44, 45, 45, 44, 47, 45, 44, 44, 44, 44, 44, 45, 45, 45, 44, 46, 44, 45, 44, 44, 50, 45, 44, 45, 45, 44,
43, 44, 44, 44, 45, 44, 42, 38, 47, 44, 45, 44, 44, 44, 44, 44, 44, 44, 44, 44, 44, 44, 44, 47, 38, 41, 45, 44, 44, 44, 44, 43,
45, 44, 44, 44, 45, 45, 45, 45, 45, 44, 44, 44, 43, 43, 44, 45, 45, 44, 44, 44, 44, 44, 45, 43, 45, 44, 44, 44, 44, 44, 44, 45,
45, 44, 44, 44, 44, 44, 46, 42, 52, 44, 45, 45, 44, 44, 44, 44, 44, 44, 45, 41, 44, 45, 45, 51, 41, 44, 45, 44, 44, 44, 44, 45,
45, 44, 44, 44, 44, 44, 44, 44, 44, 45, 45, 46, 45, 45, 44, 45, 45, 44, 44, 44, 44, 44, 44, 44, 44, 44, 45, 44, 44, 44, 43, 45,
41, 44, 44, 44, 44, 44, 44, 40, 49, 44, 45, 44, 44, 45, 44, 44, 44, 44, 44, 44, 44, 44, 44, 48, 40, 45, 44, 43, 45, 45, 45, 38,
},
```

```
QP2={
52, 52, 52, 52, 52, 52, 52, 52, 52, 52, 53, 52, 52, 52, 52, 52, 52, 52, 52, 52, 52, 52, 52, 52, 53, 53, 52, 51, 53, 53, 53, 49,
52, 52, 52, 52, 52, 52, 52, 58, 48, 53, 53, 54, 52, 53, 53, 55, 54, 53, 53, 52, 52, 52, 52, 48, 58, 52, 53, 52, 52, 52, 52, 52,
52, 52, 52, 52, 52, 53, 55, 56, 55, 52, 53, 52, 52, 52, 52, 52, 52, 52, 52, 48, 52, 53, 53, 54, 54, 52, 53, 52, 52, 52, 52, 52,
52, 52, 52, 53, 53, 54, 53, 61, 49, 52, 53, 52, 52, 51, 52, 51, 52, 52, 52, 52, 52, 52, 53, 47, 61, 53, 53, 52, 52, 52, 52, 52,
52, 52, 52, 53, 54, 52, 52, 52, 53, 52, 53, 53, 53, 52, 52, 52, 52, 52, 52, 53, 53, 52, 52, 52, 53, 51, 53, 53, 53, 52, 52, 52,
52, 52, 53, 54, 52, 52, 52, 56, 46, 50, 52, 53, 52, 52, 52, 53, 53, 52, 53, 52, 52, 52, 51, 45, 56, 52, 55, 52, 53, 53, 52, 52,
52, 52, 55, 53, 52, 52, 53, 50, 51, 53, 53, 52, 53, 54, 52, 52, 52, 52, 55, 53, 52, 52, 51, 51, 51, 53, 53, 50, 53, 55, 52, 52,
52, 58, 56, 61, 52, 56, 50, 85, 51, 55, 53, 88, 53, 54, 52, -51, 52, 52, 53, 32, 52, 51, 52, 40, 67, 50, 53, 45, 53, 50, 52, 47,
52, 48, 55, 49, 53, 46, 51, 51, 53, 42, 53, 52, 53, 33, 52, 52, 52, -55, 53, 54, 52, 89, 53, 55, 53, 66, 53, 56, 53, 61, 53, 58,
52, 53, 52, 52, 52, 50, 53, 55, 42, 53, 53, 53, 55, 53, 52, 54, 53, 52, 53, 54, 53, 53, 51, 42, 54, 52, 52, 52, 52, 52, 53, 53,
53, 53, 53, 53, 53, 52, 53, 53, 53, 53, 53, 53, 53, 53, 53, 53, 53, 53, 53, 53, 52, 53, 53, 52, 53, 53, 56, 53, 52, 53, 53, 53,
52, 54, 52, 52, 53, 53, 52, 88, 52, 53, 53, 53, 52, 53, 52, 52, 52, 52, 53, 53, 52, 51, 53, 52, 89, 53, 53, 52, 52, 53, 54, 52,
52, 52, 52, 52, 53, 52, 53, 53, 53, 55, 53, 52, 51, 52, 53, 52, 52, 53, 52, 52, 52, 52, 53, 53, 53, 53, 53, 51, 51, 52, 53, 52,
52, 53, 52, 51, 52, 52, 54, 54, 33, 53, 53, 53, 52, 46, 52, 53, 52, 52, 49, 53, 52, 53, 53, 33, 53, 52, 53, 52, 51, 52, 53, 53,
52, 53, 52, 52, 52, 52, 52, 52, 52, 52, 53, 52, 53, 52, 53, 52, 52, 52, 52, 53, 52, 53, 52, 52, 52, 53, 52, 52, 52, 52, 52, 52,
52, 55, 52, 51, 52, 53, 52, -51, 52, 54, 53, 52, 52, 53, 52, 53, 52, 53, 52, 53, 52, 53, 53, 53, -51, 53, 52, 52, 53, 52, 53, 52,
52, 54, 52, 52, 52, 53, 52, 52, 52, 53, 53, 52, 52, 52, 52, 52, 52, 52, 52, 53, 52, 53, 52, 52, 53, 52, 52, 52, 53, 52, 53, 52,
52, 53, 52, 52, 52, 52, 52, 52, -55, 52, 53, 52, 53, 52, 52, 53, 52, 52, 52, 53, 52, 54, 52, -54, 52, 53, 53, 52, 52, 52, 52, 52,
52, 53, 52, 52, 52, 53, 55, 53, 53, 53, 53, 53, 52, 49, 52, 52, 52, 52, 52, 53, 52, 52, 53, 53, 52, 53, 53, 52, 52, 53, 52, 52,
52, 52, 48, 52, 53, 52, 53, 32, 54, 54, 53, 53, 52, 53, 53, 53, 53, 53, 53, 52, 52, 52, 53, 54, 32, 53, 53, 52, 52, 48, 52, 52,
52, 52, 52, 52, 53, 52, 52, 52, 52, 53, 52, 52, 52, 52, 52, 52, 52, 52, 52, 52, 50, 52, 52, 53, 52, 52, 52, 52, 52, 52, 52, 52,
52, 52, 53, 52, 52, 52, 52, 51, 89, 53, 53, 51, 52, 53, 53, 53, 53, 54, 52, 52, 50, 52, 53, 87, 51, 52, 55, 52, 52, 53, 52, 52,
52, 52, 53, 53, 52, 51, 51, 52, 53, 51, 53, 53, 53, 53, 52, 53, 52, 52, 53, 53, 52, 53, 49, 52, 52, 50, 53, 52, 53, 53, 52, 52,
52, 48, 54, 47, 52, 45, 51, 40, 55, 42, 52, 52, 53, 33, 52, 53, 52, -54, 53, 54, 52, 87, 52, 57, 41, 66, 53, 56, 51, 60, 52, 57,
53, 58, 54, 61, 53, 56, 51, 67, 53, 54, 53, 89, 53, 53, 52, -51, 53, 52, 52, 32, 53, 51, 52, 41, 53, 50, 52, 45, 54, 49, 52, 48,
53, 52, 52, 53, 51, 52, 53, 50, 66, 52, 53, 53, 53, 52, 53, 53, 52, 53, 53, 53, 52, 52, 50, 66, 50, 52, 53, 48, 52, 52, 52, 53,
52, 53, 53, 53, 53, 55, 53, 53, 53, 52, 56, 53, 53, 53, 52, 52, 52, 53, 53, 53, 52, 55, 53, 53, 52, 53, 59, 53, 52, 53, 53, 52,
51, 52, 52, 52, 53, 52, 50, 45, 56, 52, 53, 52, 51, 52, 52, 52, 52, 52, 52, 52, 52, 52, 52, 56, 45, 48, 53, 52, 52, 52, 52, 51,
53, 52, 52, 52, 53, 53, 53, 53, 53, 52, 52, 52, 51, 51, 52, 53, 53, 52, 52, 52, 52, 52, 53, 51, 54, 52, 52, 52, 52, 52, 52, 53,
53, 52, 52, 52, 52, 53, 55, 50, 61, 52, 53, 53, 52, 52, 52, 52, 52, 52, 53, 48, 52, 53, 53, 60, 49, 52, 53, 52, 52, 52, 52, 53,
53, 52, 52, 52, 52, 52, 52, 52, 53, 53, 53, 54, 53, 53, 52, 53, 53, 52, 52, 52, 52, 52, 52, 52, 52, 52, 53, 52, 52, 52, 51, 53,
49, 52, 52, 52, 52, 52, 52, 47, 58, 53, 53, 52, 52, 53, 52, 52, 52, 52, 52, 52, 52, 52, 52, 57, 48, 53, 52, 51, 53, 53, 53, 45,
};
```

```
QP5={
72, 72, 72, 72, 72, 72, 72, 72, 72, 72, 73, 72, 73, 73, 72, 72, 72, 72, 72, 72, 72, 72, 72, 72, 73, 73, 72, 71, 73, 74, 73, 67,
72, 72, 72, 72, 72, 72, 72, 80, 66, 73, 74, 75, 73, 74, 74, 75, 75, 74, 73, 72, 73, 72, 72, 66, 80, 73, 73, 72, 72, 72, 72, 72,
72, 72, 73, 72, 72, 73, 76, 77, 76, 72, 73, 73, 72, 72, 72, 72, 72, 72, 73, 67, 72, 73, 73, 75, 75, 72, 74, 72, 72, 73, 72, 71,
72, 72, 72, 73, 73, 75, 73, 84, 68, 73, 73, 73, 72, 71, 72, 71, 72, 72, 73, 73, 72, 72, 74, 66, 85, 73, 74, 72, 72, 72, 72, 73,
72, 72, 72, 73, 75, 72, 72, 72, 73, 72, 73, 74, 73, 72, 73, 72, 72, 72, 72, 74, 73, 72, 72, 72, 73, 70, 73, 74, 73, 72, 73, 72,
72, 72, 73, 75, 72, 72, 72, 77, 63, 69, 73, 73, 72, 72, 72, 73, 73, 72, 73, 73, 72, 71, 70, 63, 77, 72, 77, 72, 73, 73, 72, 72,
72, 72, 76, 73, 72, 72, 73, 70, 71, 73, 73, 72, 73, 75, 72, 72, 72, 72, 76, 73, 72, 72, 70, 71, 70, 73, 73, 69, 73, 76, 72, 72,
72, 80, 77, 84, 72, 77, 70, 118, 70, 76, 73, 122, 73, 74, 72, -70, 72, 72, 73, 44, 72, 71, 73, 55, 93, 69, 73, 62, 73, 69, 73, 65,
72, 66, 76, 68, 73, 63, 71, 70, 73, 58, 74, 72, 73, 45, 72, 73, 72, -76, 73, 74, 73, 123, 73, 76, 73, 92, 73, 77, 74, 84, 73, 80,
72, 73, 72, 73, 72, 69, 73, 76, 58, 73, 73, 73, 76, 73, 72, 74, 73, 73, 73, 75, 73, 73, 70, 58, 75, 72, 72, 73, 72, 73, 73, 73,
73, 74, 73, 73, 73, 73, 73, 73, 74, 73, 73, 73, 73, 73, 73, 73, 73, 74, 73, 73, 73, 73, 73, 73, 73, 73, 77, 73, 73, 74, 74, 73,
72, 75, 73, 73, 74, 73, 72, 122, 72, 73, 73, 73, 72, 74, 73, 73, 72, 73, 73, 73, 73, 70, 73, 71, 124, 73, 73, 72, 72, 73, 75, 73,
73, 73, 72, 72, 73, 72, 73, 73, 73, 76, 73, 72, 71, 72, 73, 73, 73, 73, 72, 72, 71, 72, 74, 73, 73, 73, 73, 71, 71, 72, 73, 73,
73, 74, 72, 71, 72, 72, 75, 74, 45, 73, 73, 74, 72, 64, 72, 73, 72, 72, 68, 73, 72, 73, 73, 45, 74, 72, 73, 72, 70, 73, 73, 73,
72, 74, 72, 72, 73, 72, 72, 72, 72, 72, 73, 73, 73, 72, 73, 73, 72, 72, 72, 73, 72, 74, 72, 71, 72, 73, 72, 72, 72, 72, 72, 72,
72, 75, 72, 71, 72, 73, 72, -70, 73, 74, 73, 73, 73, 73, 73, 73, 72, 73, 73, 73, 72, 73, 73, 73, -70, 73, 72, 73, 73, 72, 73, 72,
72, 75, 72, 72, 72, 73, 72, 72, 72, 73, 73, 72, 73, 72, 72, 72, 72, 73, 72, 73, 72, 73, 72, 73, 73, 73, 72, 73, 73, 73, 73, 73,
72, 74, 72, 72, 72, 72, 72, 72, -76, 73, 74, 73, 73, 72, 72, 73, 73, 72, 72, 73, 73, 74, 72, -75, 72, 74, 73, 72, 72, 73, 72, 72,
72, 73, 73, 73, 72, 73, 76, 73, 73, 73, 73, 73, 72, 68, 72, 73, 72, 72, 73, 73, 72, 73, 73, 73, 72, 73, 73, 73, 72, 73, 72, 73,
72, 72, 67, 73, 74, 73, 73, 44, 74, 75, 73, 73, 72, 73, 73, 73, 73, 73, 73, 73, 73, 72, 73, 74, 44, 73, 73, 72, 72, 67, 73, 72,
72, 73, 72, 72, 73, 72, 72, 72, 73, 73, 73, 73, 71, 72, 72, 72, 72, 73, 72, 73, 72, 70, 72, 72, 73, 73, 73, 72, 72, 72, 72, 72,
72, 72, 73, 72, 72, 71, 72, 71, 123, 73, 73, 70, 72, 73, 74, 73, 73, 74, 73, 72, 70, 73, 73, 121, 71, 72, 76, 72, 72, 74, 72, 72,
72, 72, 73, 74, 72, 70, 70, 73, 73, 70, 73, 73, 74, 73, 72, 73, 72, 72, 73, 73, 72, 73, 68, 73, 72, 70, 73, 72, 73, 73, 72, 72,
72, 66, 75, 66, 72, 63, 71, 55, 76, 58, 73, 71, 73, 45, 71, 73, 73, -75, 73, 74, 72, 121, 73, 79, 57, 92, 73, 77, 71, 84, 72, 79,
73, 80, 75, 85, 73, 77, 70, 93, 73, 75, 73, 124, 73, 74, 72, -70, 73, 72, 72, 44, 73, 71, 72, 57, 73, 69, 73, 63, 74, 67, 72, 66,
73, 73, 72, 73, 70, 72, 73, 69, 92, 72, 73, 73, 73, 72, 73, 73, 73, 74, 73, 73, 73, 72, 70, 92, 69, 73, 73, 67, 73, 72, 73, 73,
72, 73, 74, 74, 73, 77, 73, 73, 73, 72, 77, 73, 73, 73, 72, 72, 72, 73, 73, 73, 73, 76, 73, 73, 73, 73, 81, 73, 73, 73, 73, 72,
71, 72, 72, 72, 74, 72, 69, 62, 77, 73, 73, 72, 71, 72, 72, 73, 73, 72, 73, 72, 72, 72, 72, 77, 63, 67, 73, 72, 72, 72, 72, 71,
73, 72, 72, 72, 73, 73, 73, 73, 74, 72, 73, 72, 71, 70, 72, 73, 73, 72, 72, 72, 72, 72, 73, 71, 74, 73, 73, 72, 71, 72, 72, 74,
74, 72, 73, 72, 72, 73, 76, 69, 84, 73, 74, 73, 72, 73, 72, 72, 73, 73, 73, 67, 72, 74, 73, 84, 67, 72, 73, 72, 72, 72, 73, 73,
73, 72, 72, 72, 73, 72, 72, 73, 73, 73, 74, 75, 73, 73, 72, 73, 73, 72, 72, 73, 72, 72, 72, 72, 72, 73, 73, 72, 72, 73, 71, 73,
67, 72, 71, 73, 72, 72, 72, 65, 80, 73, 73, 73, 73, 73, 72, 72, 73, 72, 73, 72, 72, 72, 72, 79, 66, 73, 72, 71, 74, 73, 73, 63,
}
```

```
QP0={
80, 40, 40, 58, 80, 55, 52, 61, 52, 52, 61, 47, 56, 68, 56, 57, 40, 56, 57, 47, 57, 68, 52, 61, 62, 52, 62, 59, 39, 55, 77, 83,
40, 20, 20, 29, 40, 28, 26, 30, 26, 27, 29, 25, 28, 33, 28, 29, 21, 28, 28, 23, 28, 34, 26, 31, 31, 26, 31, 29, 20, 28, 41, 40,
40, 20, 20, 29, 40, 27, 25, 29, 25, 26, 30, 24, 28, 34, 28, 28, 20, 28, 29, 25, 29, 34, 27, 30, 30, 26, 31, 29, 20, 28, 39, 40,
58, 29, 29, 42, 56, 36, 38, 44, 38, 38, 44, 34, 41, 50, 40, 41, 29, 41, 41, 34, 41, 49, 38, 44, 44, 38, 42, 41, 29, 40, 58, 57,
80, 40, 40, 56, 79, 56, 52, 61, 52, 52, 62, 46, 56, 68, 56, 57, 40, 56, 55, 46, 56, 68, 52, 61, 62, 54, 61, 57, 40, 55, 80, 80,
55, 28, 27, 36, 56, 38, 36, 43, 36, 42, 43, 33, 39, 47, 39, 40, 28, 39, 39, 33, 40, 48, 43, 42, 43, 36, 43, 41, 27, 38, 56, 55,
52, 26, 25, 38, 52, 36, 34, 41, 34, 34, 40, 31, 37, 42, 37, 37, 26, 36, 34, 31, 37, 44, 33, 40, 40, 34, 40, 45, 26, 34, 52, 52,
61, 30, 29, 44, 61, 43, 41, 48, 40, 40, 47, 39, 43, 52, 44, 45, 30, 43, 43, 35, 47, 53, 40, 47, 48, 41, 47, 44, 30, 41, 61, 61,
52, 26, 25, 38, 52, 36, 34, 40, 34, 34, 40, 31, 37, 43, 37, 37, 26, 39, 37, 31, 37, 45, 34, 40, 40, 34, 40, 38, 26, 36, 52, 52,
52, 27, 26, 38, 52, 42, 34, 40, 34, 34, 40, 31, 40, 44, 37, 36, 26, 37, 37, 33, 37, 45, 33, 40, 40, 35, 40, 38, 26, 36, 53, 52,
61, 29, 30, 44, 62, 43, 40, 47, 40, 40, 47, 36, 43, 51, 41, 43, 31, 41, 43, 36, 45, 52, 40, 46, 46, 40, 47, 45, 31, 43, 57, 61,
47, 25, 24, 34, 46, 33, 31, 39, 31, 31, 36, 28, 33, 40, 33, 33, 23, 33, 32, 28, 33, 40, 30, 36, 36, 31, 36, 34, 23, 32, 49, 47,
56, 28, 28, 41, 56, 39, 37, 43, 37, 40, 43, 33, 40, 48, 39, 40, 28, 41, 40, 34, 40, 48, 38, 43, 43, 37, 43, 39, 28, 39, 57, 56,
68, 33, 34, 50, 68, 47, 42, 52, 43, 44, 51, 40, 48, 64, 48, 48, 34, 48, 52, 40, 49, 57, 45, 51, 52, 45, 52, 48, 35, 47, 66, 68,
56, 28, 28, 40, 56, 39, 37, 44, 37, 37, 41, 33, 39, 48, 39, 40, 28, 40, 40, 32, 40, 51, 37, 44, 43, 37, 43, 41, 27, 39, 57, 56,
57, 29, 28, 41, 57, 40, 37, 45, 37, 36, 43, 33, 40, 48, 40, 40, 28, 40, 40, 33, 40, 48, 36, 43, 46, 37, 44, 41, 28, 39, 55, 57,
40, 21, 20, 29, 40, 28, 26, 30, 26, 26, 31, 23, 28, 34, 28, 28, 20, 28, 28, 23, 28, 34, 26, 31, 31, 26, 31, 29, 20, 28, 38, 40,
56, 28, 28, 41, 56, 39, 36, 43, 39, 37, 41, 33, 41, 48, 40, 40, 28, 40, 40, 33, 40, 51, 37, 46, 43, 36, 43, 41, 28, 39, 57, 56,
57, 28, 29, 41, 55, 39, 34, 43, 37, 37, 43, 32, 40, 52, 40, 40, 28, 40, 42, 33, 40, 48, 37, 43, 43, 36, 43, 39, 28, 40, 56, 57,
47, 23, 25, 34, 46, 33, 31, 35, 31, 33, 36, 28, 34, 40, 32, 33, 23, 33, 33, 29, 33, 40, 31, 36, 36, 31, 36, 32, 23, 34, 47, 47,
57, 28, 29, 41, 56, 40, 37, 47, 37, 37, 45, 33, 40, 49, 40, 40, 28, 40, 40, 33, 40, 49, 37, 44, 44, 37, 44, 41, 28, 40, 56, 57,
68, 34, 34, 49, 68, 48, 44, 53, 45, 45, 52, 40, 48, 57, 51, 48, 34, 51, 48, 40, 49, 58, 44, 51, 52, 44, 53, 49, 34, 48, 68, 68,
52, 26, 27, 38, 52, 43, 33, 40, 34, 33, 40, 30, 38, 45, 37, 36, 26, 37, 37, 31, 37, 44, 32, 40, 40, 34, 40, 37, 26, 37, 52, 52,
61, 31, 30, 44, 61, 42, 40, 47, 40, 40, 46, 36, 43, 51, 44, 43, 31, 46, 43, 36, 44, 51, 40, 47, 47, 40, 47, 44, 30, 42, 61, 61,
62, 31, 30, 44, 62, 43, 40, 48, 40, 40, 46, 36, 43, 52, 43, 46, 31, 43, 43, 36, 44, 52, 40, 47, 47, 40, 47, 44, 30, 42, 61, 61,
52, 26, 26, 38, 54, 36, 34, 41, 34, 35, 40, 31, 37, 45, 37, 37, 26, 36, 36, 31, 37, 44, 34, 40, 40, 34, 40, 46, 26, 36, 52, 52,
62, 31, 31, 42, 61, 43, 40, 47, 40, 40, 47, 36, 43, 52, 43, 44, 31, 43, 43, 36, 44, 53, 40, 47, 47, 40, 48, 44, 31, 43, 61, 62,
59, 29, 29, 41, 57, 41, 45, 44, 38, 38, 45, 34, 39, 48, 41, 41, 29, 41, 39, 32, 41, 49, 37, 44, 44, 46, 44, 41, 29, 40, 57, 59,
39, 20, 20, 29, 40, 27, 26, 30, 26, 26, 31, 23, 28, 35, 27, 28, 20, 28, 28, 23, 28, 34, 26, 30, 30, 26, 31, 29, 20, 28, 40, 39,
55, 28, 28, 40, 55, 38, 34, 41, 36, 36, 43, 32, 39, 47, 39, 39, 28, 39, 40, 34, 40, 48, 37, 42, 42, 36, 43, 40, 28, 39, 55, 55,
77, 41, 39, 58, 80, 56, 52, 61, 52, 53, 57, 49, 57, 66, 57, 55, 38, 57, 56, 47, 56, 68, 52, 61, 61, 52, 61, 57, 40, 55, 83, 76,
83, 40, 40, 57, 80, 55, 52, 61, 52, 52, 61, 47, 56, 68, 56, 57, 40, 56, 57, 47, 57, 68, 52, 61, 61, 52, 62, 59, 39, 55, 76, 86,
},
```

```
QP1={
88, 44, 44, 63, 88, 61, 57, 68, 57, 57, 68, 52, 62, 75, 62, 62, 44, 62, 63, 52, 63, 75, 57, 68, 68, 57, 68, 65, 43, 61, 85, 91,
44, 22, 22, 32, 44, 31, 29, 33, 29, 29, 32, 27, 31, 37, 31, 32, 23, 31, 31, 26, 31, 37, 29, 34, 34, 29, 34, 32, 22, 31, 45, 44,
44, 22, 22, 32, 44, 30, 27, 32, 28, 29, 33, 26, 31, 38, 31, 31, 22, 31, 32, 27, 32, 37, 29, 33, 33, 29, 34, 32, 22, 31, 43, 44,
63, 32, 32, 46, 62, 40, 41, 49, 41, 41, 49, 37, 45, 55, 44, 45, 32, 45, 45, 37, 45, 54, 42, 48, 49, 41, 46, 45, 32, 44, 64, 63,
88, 44, 44, 62, 86, 61, 57, 67, 58, 57, 68, 51, 62, 75, 62, 62, 44, 62, 60, 51, 62, 74, 57, 67, 68, 59, 67, 63, 44, 61, 88, 88,
61, 31, 30, 40, 61, 42, 40, 47, 40, 47, 48, 36, 43, 52, 43, 44, 31, 43, 43, 36, 44, 53, 47, 46, 47, 40, 47, 45, 30, 42, 61, 61,
57, 29, 27, 41, 57, 40, 37, 46, 38, 38, 44, 34, 41, 46, 41, 41, 29, 40, 38, 34, 41, 49, 36, 44, 44, 37, 44, 50, 29, 37, 58, 58,
68, 33, 32, 49, 67, 47, 46, 53, 44, 44, 52, 43, 47, 57, 48, 49, 33, 48, 47, 39, 52, 58, 44, 51, 52, 45, 51, 48, 33, 45, 67, 67,
57, 29, 28, 41, 58, 40, 38, 44, 38, 37, 44, 34, 41, 48, 41, 41, 29, 43, 41, 34, 41, 49, 38, 44, 44, 38, 44, 42, 28, 40, 57, 57,
57, 29, 29, 41, 57, 47, 38, 44, 37, 37, 44, 34, 44, 49, 41, 40, 29, 41, 40, 37, 41, 49, 36, 44, 44, 38, 44, 41, 29, 40, 58, 57,
68, 32, 33, 49, 68, 48, 44, 52, 44, 44, 52, 40, 48, 57, 45, 48, 34, 45, 47, 40, 49, 58, 44, 50, 51, 44, 52, 49, 34, 47, 63, 68,
52, 27, 26, 37, 51, 36, 34, 43, 34, 34, 40, 30, 37, 44, 37, 36, 26, 37, 36, 31, 37, 44, 34, 40, 40, 34, 39, 37, 26, 36, 54, 52,
62, 31, 31, 45, 62, 43, 41, 47, 41, 44, 48, 37, 44, 53, 43, 44, 31, 45, 44, 37, 44, 53, 42, 48, 48, 41, 48, 43, 31, 43, 63, 62,
75, 37, 38, 55, 75, 52, 46, 57, 48, 49, 57, 44, 53, 70, 53, 53, 38, 53, 57, 44, 54, 63, 49, 56, 57, 49, 57, 53, 38, 52, 73, 74,
62, 31, 31, 44, 62, 43, 41, 48, 41, 41, 45, 37, 43, 53, 43, 44, 31, 44, 44, 35, 44, 56, 41, 48, 48, 40, 48, 45, 30, 43, 63, 62,
62, 32, 31, 45, 62, 44, 41, 49, 41, 40, 48, 36, 44, 53, 44, 44, 31, 44, 44, 36, 44, 53, 39, 48, 50, 41, 48, 45, 31, 43, 60, 62,
44, 23, 22, 32, 44, 31, 29, 33, 29, 29, 34, 26, 31, 38, 31, 31, 22, 31, 31, 26, 31, 37, 29, 34, 34, 29, 34, 32, 22, 31, 42, 44,
62, 31, 31, 45, 62, 43, 40, 48, 43, 41, 45, 37, 45, 53, 44, 44, 31, 45, 44, 36, 44, 57, 41, 50, 48, 39, 48, 45, 31, 43, 63, 62,
63, 31, 32, 45, 60, 43, 38, 47, 41, 40, 47, 36, 44, 57, 44, 44, 31, 44, 46, 37, 44, 53, 41, 47, 47, 40, 48, 43, 31, 44, 62, 62,
52, 26, 27, 37, 51, 36, 34, 39, 34, 37, 40, 31, 37, 44, 35, 36, 26, 36, 37, 31, 37, 44, 35, 40, 39, 34, 40, 35, 26, 38, 52, 52,
63, 31, 32, 45, 62, 44, 41, 52, 41, 41, 49, 37, 44, 54, 44, 44, 31, 44, 44, 37, 44, 54, 40, 48, 48, 41, 48, 45, 31, 44, 62, 63,
75, 37, 37, 54, 74, 53, 49, 58, 49, 49, 58, 44, 53, 63, 56, 53, 37, 57, 53, 44, 54, 64, 49, 57, 57, 49, 58, 54, 38, 53, 75, 75,
57, 29, 29, 42, 57, 47, 36, 44, 38, 36, 44, 34, 42, 49, 41, 39, 29, 41, 41, 35, 40, 49, 35, 44, 44, 37, 44, 41, 29, 40, 57, 57,
68, 34, 33, 48, 67, 46, 44, 51, 44, 44, 50, 40, 48, 56, 48, 48, 34, 50, 47, 40, 48, 57, 44, 52, 52, 44, 51, 49, 33, 47, 67, 67,
68, 34, 33, 49, 68, 47, 44, 52, 44, 44, 51, 40, 48, 57, 48, 50, 34, 48, 47, 39, 48, 57, 44, 52, 52, 44, 51, 48, 33, 47, 67, 68,
57, 29, 29, 41, 59, 40, 37, 45, 38, 38, 44, 34, 41, 49, 40, 41, 29, 39, 40, 34, 41, 49, 37, 44, 44, 38, 44, 51, 29, 40, 57, 57,
68, 34, 34, 46, 67, 47, 44, 51, 44, 44, 52, 39, 48, 57, 48, 48, 34, 48, 48, 40, 48, 58, 44, 51, 51, 44, 52, 49, 34, 47, 67, 68,
65, 32, 32, 45, 63, 45, 50, 48, 42, 41, 49, 37, 43, 53, 45, 45, 32, 45, 43, 35, 45, 54, 41, 49, 48, 51, 49, 45, 32, 44, 63, 65,
43, 22, 22, 32, 44, 30, 29, 33, 28, 29, 34, 26, 31, 38, 30, 31, 22, 31, 31, 26, 31, 38, 29, 33, 33, 29, 34, 32, 22, 31, 44, 43,
61, 31, 31, 44, 61, 42, 37, 45, 40, 40, 47, 36, 43, 52, 43, 43, 31, 43, 44, 38, 44, 53, 40, 47, 47, 40, 47, 44, 31, 43, 60, 61,
85, 45, 43, 64, 88, 61, 58, 67, 57, 58, 63, 54, 63, 73, 63, 60, 42, 63, 62, 52, 62, 75, 57, 67, 67, 57, 67, 63, 44, 60, 91, 84,
91, 44, 44, 63, 88, 61, 58, 67, 57, 57, 68, 52, 62, 74, 62, 62, 44, 62, 62, 52, 63, 75, 57, 67, 68, 57, 68, 65, 43, 61, 84, 94,
},
```

```
QP2={
104, 52, 52, 75, 104, 72, 68, 80, 68, 68, 80, 61, 73, 88, 73, 74, 52, 73, 74, 62, 74, 88, 67, 80, 80, 67, 80, 77, 51, 72, 100, 108,
52, 26, 26, 38, 52, 36, 34, 40, 34, 34, 37, 32, 37, 44, 36, 38, 27, 36, 37, 31, 37, 44, 34, 40, 40, 34, 40, 37, 26, 36, 53, 52,
52, 26, 26, 37, 52, 35, 32, 38, 33, 34, 39, 31, 37, 44, 37, 37, 26, 37, 38, 32, 37, 44, 35, 39, 39, 34, 40, 38, 26, 36, 51, 52,
75, 38, 37, 54, 73, 47, 49, 57, 49, 49, 57, 44, 53, 65, 52, 53, 38, 53, 53, 44, 53, 64, 50, 57, 58, 49, 54, 53, 38, 52, 75, 75,
104, 52, 52, 73, 102, 72, 68, 80, 68, 68, 80, 60, 73, 88, 73, 74, 52, 73, 71, 60, 73, 88, 68, 80, 80, 70, 79, 74, 51, 72, 104, 104,
72, 36, 35, 47, 72, 50, 47, 55, 47, 55, 56, 42, 51, 62, 51, 53, 37, 51, 51, 42, 52, 63, 55, 55, 55, 47, 56, 53, 35, 49, 73, 72,
68, 34, 32, 49, 68, 47, 44, 54, 45, 44, 52, 40, 48, 55, 48, 48, 34, 47, 44, 40, 48, 58, 43, 52, 52, 44, 52, 59, 34, 44, 68, 68,
80, 40, 38, 57, 80, 55, 54, 62, 52, 52, 61, 51, 56, 68, 57, 58, 39, 57, 56, 46, 61, 68, 52, 61, 62, 53, 61, 57, 39, 54, 79, 80,
68, 34, 33, 49, 68, 47, 45, 52, 44, 44, 52, 40, 48, 56, 48, 48, 34, 50, 48, 40, 48, 58, 44, 52, 52, 45, 52, 49, 33, 47, 68, 68,
68, 34, 34, 49, 68, 55, 44, 52, 44, 44, 52, 40, 52, 58, 48, 47, 34, 48, 48, 43, 48, 58, 43, 52, 52, 45, 52, 49, 34, 47, 68, 68,
80, 37, 39, 57, 80, 56, 52, 61, 52, 52, 61, 47, 56, 67, 53, 56, 40, 54, 56, 47, 58, 68, 52, 60, 60, 52, 62, 58, 40, 56, 75, 80,
61, 32, 31, 44, 60, 42, 40, 51, 40, 40, 47, 36, 44, 52, 43, 43, 30, 43, 42, 36, 43, 52, 40, 47, 47, 40, 47, 44, 31, 42, 64, 61,
73, 37, 37, 53, 73, 51, 48, 56, 48, 52, 56, 44, 52, 62, 51, 52, 37, 53, 52, 44, 52, 62, 49, 56, 56, 49, 56, 51, 37, 51, 75, 73,
88, 44, 44, 65, 88, 62, 55, 68, 56, 58, 67, 52, 62, 83, 63, 63, 45, 63, 67, 52, 63, 75, 58, 66, 68, 58, 68, 63, 45, 61, 86, 88,
73, 36, 37, 52, 73, 51, 48, 57, 48, 48, 53, 43, 51, 63, 51, 52, 37, 52, 52, 42, 52, 66, 48, 57, 56, 48, 56, 53, 36, 51, 74, 73,
74, 38, 37, 53, 74, 53, 48, 58, 48, 47, 56, 43, 52, 63, 52, 52, 37, 52, 52, 43, 52, 63, 46, 56, 59, 48, 57, 53, 36, 51, 71, 74,
52, 27, 26, 38, 52, 37, 34, 39, 34, 34, 40, 30, 37, 45, 37, 37, 26, 37, 37, 30, 37, 44, 34, 40, 40, 34, 40, 37, 25, 36, 50, 52,
73, 36, 37, 53, 73, 51, 47, 57, 50, 48, 54, 43, 53, 63, 52, 52, 37, 53, 52, 43, 52, 67, 48, 59, 56, 46, 56, 53, 37, 51, 75, 73,
74, 37, 38, 53, 71, 51, 44, 56, 48, 48, 56, 42, 52, 67, 52, 52, 37, 52, 55, 43, 52, 62, 48, 56, 56, 47, 56, 51, 37, 52, 73, 74,
62, 31, 32, 44, 60, 42, 40, 46, 40, 43, 47, 36, 44, 52, 42, 43, 30, 43, 43, 37, 43, 52, 41, 47, 46, 40, 47, 42, 31, 45, 62, 61,
74, 37, 37, 53, 73, 52, 48, 61, 48, 48, 58, 43, 52, 63, 52, 52, 37, 52, 52, 43, 52, 64, 48, 57, 57, 48, 57, 53, 37, 52, 73, 74,
88, 44, 44, 64, 88, 63, 58, 68, 58, 58, 68, 52, 62, 75, 66, 63, 44, 67, 62, 52, 64, 75, 58, 67, 68, 57, 68, 63, 44, 63, 88, 88,
67, 34, 35, 50, 68, 55, 43, 52, 44, 43, 52, 40, 49, 58, 48, 46, 34, 48, 48, 41, 48, 58, 41, 52, 52, 44, 52, 49, 34, 48, 68, 67,
80, 40, 39, 57, 80, 55, 52, 61, 52, 52, 60, 47, 56, 66, 57, 56, 40, 59, 56, 47, 57, 67, 52, 61, 61, 52, 61, 57, 39, 55, 80, 80,
80, 40, 39, 58, 80, 55, 52, 62, 52, 52, 60, 47, 56, 68, 56, 59, 40, 56, 56, 46, 57, 68, 52, 61, 62, 52, 61, 57, 39, 55, 79, 80,
67, 34, 34, 49, 70, 47, 44, 53, 45, 45, 52, 40, 49, 58, 48, 48, 34, 46, 47, 40, 48, 57, 44, 52, 52, 44, 52, 60, 34, 47, 68, 67,
80, 40, 40, 54, 79, 56, 52, 61, 52, 52, 62, 47, 56, 68, 56, 57, 40, 56, 56, 47, 57, 68, 52, 61, 61, 52, 62, 58, 40, 55, 80, 80,
77, 37, 38, 53, 74, 53, 59, 57, 49, 49, 58, 44, 51, 63, 53, 53, 37, 53, 51, 42, 53, 63, 49, 57, 57, 60, 58, 54, 37, 52, 74, 77,
51, 26, 26, 38, 51, 35, 34, 39, 33, 34, 40, 31, 37, 45, 36, 36, 25, 37, 37, 31, 37, 44, 34, 39, 39, 34, 40, 37, 26, 36, 52, 51,
72, 36, 36, 52, 72, 49, 44, 54, 47, 47, 56, 42, 51, 61, 51, 51, 36, 51, 52, 45, 52, 63, 48, 55, 55, 47, 55, 52, 36, 50, 71, 72,
100, 53, 51, 75, 104, 73, 68, 79, 68, 68, 75, 64, 75, 86, 74, 71, 50, 75, 73, 62, 73, 88, 68, 80, 79, 68, 80, 74, 52, 71, 107, 99,
108, 52, 52, 75, 104, 72, 68, 80, 68, 68, 80, 61, 73, 88, 73, 74, 52, 73, 74, 61, 74, 88, 67, 80, 80, 67, 80, 77, 51, 72, 99, 111,
},
```

```
QP3={
112, 56, 56, 81, 112, 78, 73, 86, 73, 73, 86, 66, 79, 95, 79, 79,56, 79, 80, 66, 80, 95, 73, 86, 86, 72, 86, 83, 55, 77, 108, 116,
56, 28, 28, 40, 56, 39, 37, 43, 37, 37, 40, 35, 40, 47, 39, 41, 29, 39, 40, 33, 40, 48, 37, 43, 43, 37, 43, 40, 28, 39, 57, 56,
56, 28, 28, 40, 56, 38, 34, 41, 36, 37, 42, 33, 40, 48, 40, 40, 28, 39, 41, 35, 40, 48, 37, 42, 42, 37, 43, 41, 28, 39, 55, 56,
81, 40, 40, 58, 79, 51, 53, 62, 53, 53, 62, 47, 57, 70, 55, 58, 41, 57, 57, 47, 57, 69, 53, 62, 62, 53, 58, 58, 40, 56, 81, 80,
112, 56, 56, 79, 110, 78, 73, 86, 73, 73, 86, 65, 79, 95,,79, 79, 56, 79, 77, 65, 78, 95, 73, 86, 86, 75, 85, 80, 55, 77, 112, 112,
78, 39, 38, 51, 78, 54, 51, 60, 50, 59, 61, 46, 55, 66, 55, 57, 40, 55, 55, 46, 56, 67, 60, 59, 60, 51, 60, 57, 38, 53, 78, 78,
73, 37, 34, 53, 73, 51,47, 58, 48, 48, 56, 43, 52, 59, 52, 52, 37, 51, 48, 43, 52, 62, 46, 56, 56, 48, 56, 63, 36, 47, 73, 73,
85, 43, 41, 62, 86, 60, 58, 67, 56, 56, 66, 55, 60, 73, 61, 62, 42, 61, 60, 49, 66, 74, 56, 65, 67, 57, 65, 61, 42, 58, 85, 86,
73, 37, 36, 53, 73, 50, 48, 56, 48, 48, 55, 43, 52, 61, 52, 52, 37, 54, 52, 43, 52, 62, 48, 56, 56, 48, 56, 53, 36, 51, 73, 73,
73, 37, 37, 53, 73, 59, 48, 56, 48, 47, 56, 43, 56, 62, 52, 51, 37, 52, 51, 47, 52, 62, 46, 56, 56, 49, 56, 53, 36, 51, 74, 73,
86, 40, 42, 62, 86, 61, 56, 66, 55, 56, 66, 51, 61, 72, 57, 61, 43, 58, 60, 51, 63, 73, 56, 64, 65, 56, 66, 62, 43, 60, 80, 86,
66, 35, 33, 47, 65, 46, 43, 55, 43, 43, 51, 39, 47, 56, 46, 46, 33, 47, 45, 39, 46, 56, 43, 50, 51, 43, 50, 48, 33, 45, 69, 66,
79, 40, 40, 57, 79, 55, 52, 60, 52, 56, 61, 47, 56, 67, 55, 56, 40, 57, 56, 47, 56, 67, 53, 61, 61, 52, 61, 54, 40, 55, 80, 79,
95, 47, 48, 70, 95, 66, 59, 73, 61, 62, 72, 56, 67, 89, 67, 68, 48, 67, 72, 56, 68, 80, 63, 71, 73, 62, 73, 68, 48, 66, 93, 95,
79, 39, 40, 55, 79, 55, 52, 61, 52, 52, 57, 46, 55, 67, 55, 56, 39, 56, 56, 45, 56, 71, 52, 61, 61, 51, 61, 57, 38, 55, 80, 79,
79, 41, 40, 58, 79, 57, 52, 62, 52, 51, 61, 46, 56, 68, 56, 56, 39, 56, 56, 46, 56, 67, 50, 61, 64, 52, 61, 57, 39, 55, 76, 79,
56, 29, 28, 41, 56, 40, 37, 42, 37, 37, 43, 33, 40, 48, 39, 39, 28, 40, 40, 33, 40, 48, 36, 43, 43, 37, 43, 40, 27, 39, 54, 56,
79, 39, 39, 57, 79, 55, 61, 61, 54, 52, 58, 47, 57, 67, 56, 56, 40, 57, 56, 46, 56, 72, 52, 64, 61, 50, 61, 57, 39, 55, 80, 79,
80, 40, 41, 57, 77, 55, 48, 60, 52, 51, 60, 45, 56, 72, 56, 56, 40, 56, 59, 47, 55, 67, 52, 60, 60, 51, 61, 55, 40, 56, 78, 79,
66, 33, 35, 47, 65, 46, 43, 49, 43, 47, 51, 39, 47, 56, 45, 46, 33, 46, 47, 40, 47, 56, 44, 50, 50, 43, 50, 45, 33, 48, 66, 66,
80, 40, 40, 57, 78, 56, 52, 66, 52, 52, 63, 46, 56, 68, 56, 56, 40, 56, 55, 47, 56, 69, 52, 61, 61, 52, 62, 57, 39, 56, 79, 80,
95, 48, 48, 69, 95, 67, 62, 74, 62, 62, 73, 56, 67, 80, 71, 67, 48, 72, 67, 56, 69, 81, 62, 72, 73, 62, 74, 68, 48, 68, 95, 95,
73, 37, 37, 53, 73, 60, 46, 56, 48, 46, 56, 43, 53, 63, 52, 50, 36, 52, 52, 44, 52, 62, 45, 56, 56, 47, 56, 52, 37, 51, 73, 72,
86, 43, 42, 62, 86, 59, 56, 65, 56, 56, 64, 50, 61, 71, 61, 61, 43, 64, 60, 50, 61, 72, 56, 66, 66, 56, 66, 62, 42, 59, 86, 86,
86, 43, 42, 62, 86, 60, 56, 67, 56, 56, 65, 51, 61, 73, 61, 64, 43, 61, 60, 50, 61, 73, 56, 66, 66, 56, 65, 61, 42, 59, 86, 86,
72, 37, 37, 53, 75, 51, 48, 57, 48, 49, 56, 43, 52, 62, 51, 52, 37, 50, 51, 43, 52, 62, 47, 56, 56, 48, 56, 65, 36, 51, 73, 73,
86, 43, 43, 58, 85, 60, 56, 65, 56, 56, 66, 50, 61, 73, 61, 61, 43, 61, 61, 50, 62, 74, 56, 66, 65, 56, 67, 62, 43, 50, 86, 86,
83, 40, 41, 58, 80, 57, 63, 61, 53, 53, 62, 48, 54, 68, 57, 57, 40, 57, 55, 45, 57, 68, 52, 62, 61, 65, 62, 58, 40, 56, 80, 83,
55, 28, 28, 40, 55, 38, 36, 42, 36, 36, 43, 33, 40, 48, 38, 39, 27, 39, 40, 33, 39, 48, 37, 42, 42, 36, 43, 40, 28, 39, 56, 55,
77, 39, 39, 56, 77, 53, 47, 58, 51, 51, 60, 45, 55, 66, 55, 55, 39, 55, 56, 48, 56, 68, 51, 59, 59, 51, 60, 56, 39, 54, 77, 78,
108, 57, 55, 81, 112, 78, 73, 85, 73, 74, 80, 69, 80, 93, 80, 76, 54, 80, 78, 66, 79, 95, 73, 86, 86, 73, 86, 80, 56, 77, 116, 107,
116, 56, 56, 80, 112, 78, 73, 86, 73, 73, 86, 66, 79, 95, 79, 79, 56, 79, 79, 66, 80, 95, 72, 86, 86, 73, 86, 83, 55, 78, 107, 120,
},
```

```
QP4={
128, 64, 64, 92, 128, 89, 84, 98, 84, 84, 98, 75, 90, 108, 90, 91, 64, 90, 91, 76, 91, 109, 83, 98, 99, 83, 99, 95, 63, 89, 123, 132,
64, 32, 32, 46, 64, 45, 42, 49, 42, 42, 46, 40, 46, 54, 44, 47, 33, 45, 45, 38, 45, 54, 42, 49, 49, 42, 49, 46, 32, 44, 65, 64,
64, 32, 32, 46, 64, 44, 39, 46, 41, 42, 48, 38, 45, 55, 45, 45, 32, 45, 47, 40, 46, 54, 43, 48, 48, 42, 49, 46, 32, 45, 63, 64,
92, 46, 46, 67, 90, 58, 60, 71, 60, 60, 71, 54, 65, 80, 63, 66, 46, 65, 66, 54, 65, 78, 61, 70, 71, 60, 66, 66, 46, 64, 93, 92,
128, 64, 64, 90, 126, 89, 84, 98, 84, 84, 99, 74, 90, 108, 90, 91, 64, 90, 88, 74, 89, 108, 83, 98, 99, 86, 97, 91, 63, 88, 128, 128,
89, 45, 44, 58, 89, 61, 58, 68, 58, 68, 69, 52, 63, 76, 63, 65, 46, 62, 63, 52, 64, 77, 68, 67, 68, 58, 68, 65, 43, 61, 89, 89,
84, 42, 39, 60, 84, 58, 54, 66, 55, 55, 64, 49, 59, 67, 60, 59, 42, 58, 55, 49, 59, 71, 53, 64, 64, 54, 64, 72, 42, 54, 84, 84,
98, 49, 46, 71, 98, 68, 66, 76, 64, 64, 75, 63, 69, 83, 70, 71, 48, 70, 69, 56, 76, 84, 64, 75, 76, 66, 75, 70, 48, 66, 97, 98,
84, 42, 41, 60, 84, 58, 55, 64, 55, 54, 63, 49, 59, 69, 59, 59, 42, 62, 59, 49, 60, 71, 55, 64, 64, 55, 64, 60, 41, 58, 84, 83,
84, 42, 42, 60, 84, 68, 55, 64, 54, 54, 64, 49, 64, 71, 59, 58, 42, 59, 59, 53, 59, 71, 52, 64, 64, 56, 64, 60, 42, 58, 84, 83,
98, 46, 48, 71, 99, 69, 64, 75, 63, 64, 76, 58, 69, 82, 65, 69, 49, 66, 69, 58, 72, 84, 64, 73, 74, 64, 76, 71, 49, 69, 92, 98,
75, 40, 38, 54, 74, 52, 49, 63, 49, 49, 58, 44, 54, 64, 53, 53, 37, 53, 52, 45, 53, 63, 49, 58, 58, 49, 57, 54, 38, 52, 79, 75,
90, 46, 45, 65, 90, 63, 59, 69, 59, 64, 69, 54, 64, 77, 63, 64, 45, 65, 64, 54, 64, 77, 60, 69, 70, 60, 69, 62, 45, 63, 92, 90,
108, 54, 55, 80, 108, 76, 67, 83, 69, 71, 82, 64, 77, 102, 77, 77, 55, 77, 83, 64, 78, 92, 72, 81, 83, 71, 84, 77, 55, 75, 106, 108,
90, 44, 45, 63, 90, 63, 60, 70, 59, 59, 65, 53, 63, 77, 63, 64, 45, 64, 64, 51, 64, 81, 59, 70, 69, 59, 70, 66, 44, 63, 91, 90,
91, 47, 45, 66, 91, 65, 59, 71, 59, 58, 69, 53, 64, 77, 64, 64, 45, 64, 64, 53, 64, 77, 57, 69, 73, 59, 70, 65, 44, 63, 87, 91,
64, 33, 32, 46, 64, 46, 42, 48, 42, 42, 49, 37, 45, 55, 45, 45, 32, 45, 45, 38, 46, 54, 42, 49, 49, 42, 49, 46, 31, 44, 62, 64,
90, 45, 45, 65, 90, 62, 58, 70, 62, 59, 66, 53, 65, 77, 64, 64, 45, 65, 64, 53, 64, 82, 59, 73, 69, 57, 69, 65, 45, 63, 92, 90,
91, 45, 47, 66, 88, 63, 55, 69, 59, 59, 69, 52, 64, 83, 64, 64, 45, 64, 67, 53, 63, 77, 59, 69, 69, 58, 69, 62, 46, 64, 90, 91,
76, 38, 40, 54, 74, 52, 49, 56, 49, 53, 58, 45, 54, 64, 51, 53, 38, 53, 53, 46, 53, 64, 50, 58, 57, 49, 58, 51, 38, 55, 76, 76,
91, 45, 46, 65, 89, 64, 59, 76, 60, 59, 72, 53, 64, 78, 64, 64, 46, 64, 63, 53, 64, 79, 59, 70, 70, 59, 70, 66, 45, 64, 90, 91,
109, 54, 54, 78, 108, 77, 71, 84, 71, 71, 84, 63, 77, 92, 81, 77, 54, 82, 77, 64, 79, 93, 71, 82, 83, 71, 84, 78, 55, 77, 109, 109,
83, 42, 43, 61, 83, 68, 53, 64, 55, 52, 64, 49, 60, 72, 59, 57, 42, 59, 59, 50, 59, 71, 51, 64, 64, 54, 64, 60, 42, 59, 84, 83,
98, 49, 48, 70, 98, 67, 64, 75, 64, 64, 73, 58, 69, 81, 70, 69, 49, 73, 69, 58, 70, 82, 64, 75, 75, 64, 75, 71, 48, 68, 98, 98,
99, 49, 48, 71, 99, 68, 64, 76, 64, 64, 74, 58, 70, 83, 69, 73, 49, 69, 69, 57, 70, 83, 64, 75, 76, 64, 75, 70, 48, 68, 98, 98,
83, 42, 42, 60, 86, 58, 54, 66, 55, 56, 64, 49, 60, 71, 59, 59, 42, 57, 58, 49, 59, 71, 54, 64, 64, 55, 64, 74, 42, 58, 84, 83,
99, 49, 49, 66, 97, 68, 64, 75, 64, 64, 76, 57, 69, 84, 70, 70, 49, 69, 69, 58, 70, 84, 64, 75, 75, 64, 76, 71, 49, 68, 98, 98,
95, 46, 46, 66, 91, 65, 72, 70, 60, 60, 71, 54, 62, 77, 66, 65, 46, 65, 62, 51, 66, 78, 60, 71, 70, 74, 71, 66, 46, 64, 91, 95,
63, 32, 32, 46, 63, 43, 42, 48, 41, 42, 49, 38, 45, 55, 44, 44, 31, 45, 46, 38, 45, 55, 42, 48, 48, 42, 49, 46, 32, 44, 64, 62,
89, 44, 45, 64, 88, 61, 54, 66, 58, 58, 69, 52, 63, 75, 63, 63, 44, 63, 64, 55, 64, 77, 59, 68, 68, 58, 68, 64, 44, 62, 88, 89,
123, 65, 63, 93, 128, 89, 84, 97, 84, 84, 92, 79, 92, 106, 91, 87, 62, 92, 90, 76, 90, 109, 84, 98, 98, 84, 98, 91, 64, 88, 132, 122,
132, 64, 64, 92, 128, 89, 84, 98, 83, 83, 98, 75, 90, 108, 90, 91, 64, 90, 91, 76, 91, 109, 83, 98, 98, 83, 98, 95, 62, 89, 122, 137,
},
```

```
QP0={
80, 40, 40, 58, 80, 55, 52, 61, 52, 52, 61, 47, 56, 68, 56, 57, 40, 56, 57, 47, 57, 68, 52, 61, 62, 52, 62, 59, 39, 55, 77, 83,
40, 20, 20, 29, 40, 28, 26, 90, 26, 27, 29, 25, 28, 33, 28, 29, 21, 28, 28, 23, 26, 34, 26, 31, 31, 26, 31, 29, 20, 28, 41, 40,
40, 20, 20, 29, 40, 27, 25, 29, 28, 26, 30, 24, 28, 34, 28, 28, 20, 28, 29, 25, 29, 34, 27, 30, 30, 26, 31, 29, 20, 28, 39, 40,
58, 29, 29, 42, 56, 36, 38, 44, 38, 38, 44, 34, 41, 50, 40, 41, 29, 41, 41, 34, 41, 49, 38, 44, 44, 38, 42, 41, 29, 40, 58, 57,
80, 40, 40, 56, 79, 56, 52, 61, 52, 52, 62, 46, 56, 68, 56, 57, 40, 56, 55, 46, 56, 68, 52, 61, 62, 54, 61, 57, 40, 55, 80, 80,
55, 28, 27, 36, 56, 38, 36, 43, 36, 42, 43, 33, 39, 47, 39, 40, 28, 39, 39, 33, 40, 48, 43, 42, 43, 36, 43, 41, 27, 38, 56, 55,
52, 26, 25, 38, 52, 36, 34, 41, 34, 34, 40, 31, 37, 42, 37, 37, 26, 36, 34, 31, 37, 44, 33, 40, 40, 34, 40, 45, 26, 34, 52, 52,
61, 30, 29, 44, 61, 43, 41, 48, 40, 40, 47, 39, 43, 52, 44, 45, 30, 43, 43, 35, 47, 53, 40, 47, 48, 41, 47, 44, 30, 41, 61, 61,
52, 26, 25, 38, 52, 36, 34, 40, 34, 34, 40, 31, 37, 43, 37, 37, 26, 39, 37, 31, 37, 45, 34, 40, 40, 34, 40, 38, 26, 36, 52, 52,
52, 27, 26, 38, 52, 42, 34, 40, 34, 34, 40, 31, 40, 44, 37, 36, 26, 37, 37, 33, 37, 45, 33, 40, 40, 35, 40, 38, 26, 36, 53, 52,
61, 29, 30, 44, 62, 43, 40, 47, 40, 40, 47, 36, 43, 51, 41, 43, 31, 41, 43, 36, 45, 52, 40, 46, 46, 40, 47, 45, 31, 43, 57, 61,
47, 25, 24, 34, 46, 33, 31, 39, 31, 31, 36, 28, 33, 40, 33, 33, 23, 33, 32, 28, 33, 40, 30, 36, 36, 31, 36, 34, 23, 32, 49, 47,
56, 28, 28, 41, 56, 39, 37, 43, 37, 40, 43, 33, 40, 48, 39, 40, 28, 41, 40, 34, 40, 48, 38, 43, 43, 37, 43, 39, 28, 39, 57, 56,
68, 33, 34, 50, 68, 47, 42, 52, 43, 44, 51, 40, 48, 64, 48, 48, 34, 48, 52, 40, 49, 57, 45, 51, 52, 45, 52, 48, 35, 47, 66, 68,
56, 28, 28, 40, 56, 39, 37, 44, 37, 37, 41, 33, 38, 48, 39, 40, 28, 40, 40, 32, 40, 51, 37, 44, 43, 37, 43, 41, 27, 39, 57, 56,
57, 29, 28, 41, 57, 40, 37, 45, 37, 36, 43, 33, 40, 48, 40, 40, 28, 40, 40, 33, 40, 48, 36, 43, 46, 37, 44, 41, 28, 39, 55, 57,
40, 21, 20, 29, 40, 28, 26, 30, 26, 26. 31, 23, 28, 34, 28, 28, 20, 28, 28, 23, 28, 34, 26, 31, 31, 26, 31, 29, 20, 28, 38, 40,
56, 28, 28, 41, 56, 39, 36, 43, 39, 37, 41, 33, 41, 48, 40, 40, 28, 40, 40, 33, 40, 51, 37, 46, 43, 36, 43, 41, 28, 39, 57, 56,
57, 28, 29, 41, 55, 39, 34, 43, 37, 37, 43, 32, 40, 52, 40, 40, 28, 40, 42, 33, 40, 48, 37, 43, 43, 36, 43, 39, 28, 40, 56, 57,
47, 23, 25, 34, 46, 33, 31, 35, 31, 33, 36, 28, 34, 40, 32, 33, 23, 33, 33, 29, 33, 40, 31, 36, 36, 31, 36, 32, 23, 34, 47, 47,
57, 28, 29, 41, 56, 40, 37, 47, 37, 37, 45, 33, 40, 49, 40, 40, 28, 40, 40, 33, 40, 49, 37, 44, 44, 37, 44, 41, 28, 40, 56, 57,
68, 34, 34, 49, 68, 48, 44, 53, 45, 45, 52, 40, 48, 57, 51, 48, 34, 51, 48, 40, 49, 58, 44, 51, 52, 44, 53, 49, 34, 48, 68, 68,
52, 26, 27, 38, 52, 43, 33, 40, 34, 33, 40, 30, 38, 45, 37, 36, 26, 37, 37, 31, 37, 44, 32, 40, 40, 34, 40, 37, 26, 37, 52, 52,
61, 31, 30, 44, 61, 42, 40, 47, 40, 40, 46, 36, 43, 51, 44, 43, 31, 46, 43, 36, 44, 51, 40, 47, 47, 40, 47, 44, 30, 42, 61, 61,
62, 31, 30, 44, 62, 43, 40, 48, 40, 40, 46, 36, 43, 52, 43, 46, 31, 43, 43, 36, 44, 52, 40, 47, 47, 40, 47, 44, 30, 42, 61, 61,
52, 26, 26, 38, 54, 36, 34, 41, 34, 35, 40, 31, 37, 45, 37, 37, 26, 36, 36, 31, 37, 44, 34, 40, 40, 34, 40, 46, 26, 36, 52, 52,
62, 31, 31, 42, 61, 43, 40, 47, 40, 40, 47, 36, 43, 52, 43, 44, 31, 43, 43, 36, 44, 53, 40, 47, 47, 40, 48, 44, 31, 43, 61, 62,
59, 29, 29, 41, 57, 41, 45, 44, 38, 38, 45, 34, 39, 48, 41, 41, 29, 41, 39, 32, 41, 49, 37, 44, 44, 46, 44, 41, 29, 40, 57, 59,
39, 20, 20, 29, 40, 27, 26, 30, 26, 26, 31, 23, 28, 35, 27, 28, 20, 28, 28, 23, 28, 34, 26, 30, 30, 26, 31, 29, 20, 28, 40, 39,
55, 28, 28, 40, 55, 38, 34, 41, 36, 36, 43, 32, 39, 47, 39, 39, 28, 39, 40, 34, 40, 48, 37, 42, 42, 36, 43, 40, 28, 39, 55, 55,
77, 41, 39, 58, 80, 56, 52, 61, 52, 53, 57, 49, 57, 66, 57, 55, 38, 57, 56, 47, 56, 68, 52, 61, 61, 52, 61, 57, 40, 55, 83, 76,
83, 40, 40, 57, 80, 55, 52, 61, 52, 52, 61, 47, 56, 68, 56, 57, 40, 56, 57, 47, 57, 68, 52, 61, 61, 52, 62, 59, 39, 55, 76, 86,
},
```

```
QP3={
112, 56, 56, 81, 112, 78, 73, 86, 73, 73, 86, 66, 79, 95, 79, 79, 56, 79, 80, 66, 80, 95, 73, 86, 86, 72, 86, 83, 55, 77, 108, 116,
56, 28, 28, 40, 56, 39, 37, 43, 37, 37, 40, 35, 40, 47, 39, 41, 29, 39, 40, 33, 40, 48, 37, 43, 43, 37, 43, 40, 28, 39, 57, 56,
56, 28, 28, 40, 56, 38, 34, 41, 36, 37, 42, 33, 40, 48, 40, 40, 28, 39, 41, 35, 40, 48, 37, 42, 42, 37, 43, 41, 28, 39, 55, 56,
81, 40, 40, 58, 79, 51, 53, 62, 53, 53, 62, 47, 57, 70, 55, 58, 41, 57, 57, 47, 57, 69, 53, 62, 62, 53, 58, 58, 40, 56, 81, 80,
112, 56, 56, 79, 110, 78, 73, 86, 73, 73, 86, 65, 79, 95, 79, 79, 56, 79, 77, 65, 78, 95, 73, 86, 86, 75, 85, 80, 55, 77, 112, 112,
78, 39, 38, 51, 78, 54, 51, 60, 50, 59, 61, 46, 55, 66, 55, 57, 40, 55, 55, 46, 56, 67, 60, 59, 60, 51, 60, 57, 38, 53, 78, 78,
73, 37, 34, 53, 73, 51, 47, 58, 48, 48, 56, 43, 52, 59, 52, 52, 37, 51, 48, 43, 52, 62, 46, 56, 56, 48, 56, 63, 36, 47, 73, 73,
86, 43, 41, 62, 86, 60, 58, 67, 56, 56, 66, 55, 60, 73, 61, 62, 42, 61, 60, 49, 66, 74, 56, 65, 67, 57, 65, 61, 42, 58, 85, 86,
73, 37, 36, 53, 73, 50, 48, 56, 48, 48, 55, 43, 52, 61, 52, 52, 37, 54, 52, 43, 52, 62, 48, 56, 56, 48, 56, 53, 36, 51, 73, 73,
73, 37, 37, 53, 73, 59, 48, 56, 48, 47, 56, 43, 56, 62, 52, 51, 37, 52, 51, 47, 52, 62, 46, 56, 56, 49, 56, 53, 36, 51, 74, 73,
86, 40, 42, 62, 86, 61, 56, 66, 55, 56, 66, 51, 61, 72, 57, 61, 43, 58, 60, 51, 63, 73, 56, 64, 65, 56, 66, 62, 43, 60, 80, 86,
66, 35, 33, 47, 65, 46, 43, 55, 43, 43, 51, 39, 47, 56, 46, 46, 33, 47, 45, 39, 46, 56, 43, 50, 51, 43, 50, 48, 33, 45, 69, 66,
79, 40, 40, 57, 79, 55, 52, 60, 52, 56, 61, 47, 56, 67, 55, 56, 40, 57, 56, 47, 56, 67, 53, 61, 61, 52, 61, 54, 40, 55, 80, 79,
95, 47, 48, 70, 95, 66, 59, 73, 61, 62, 72, 56, 67, 89, 67, 68, 48, 67, 72, 56, 68, 80, 63, 71, 73, 62, 73, 68, 48, 66, 93, 95,
79, 39, 40, 55, 79, 55, 52, 61, 52, 52, 57, 46, 55, 67, 55, 56, 39, 56, 56, 45, 56, 71, 52, 61, 61, 51, 61, 57, 38, 55, 80, 79,
79, 41, 40, 58, 79, 57, 52, 62, 52, 51, 61, 46, 56, 68, 56, 56, 39, 56, 56, 46, 56, 67, 50, 61, 64, 52, 61, 57, 39, 55, 76, 79,
56, 29, 28, 41, 56, 40, 37, 42, 37, 37, 43, 33, 40, 48, 39, 39, 28, 40, 40, 33, 40, 48, 36, 43, 43, 37, 43, 40, 27, 39, 54, 56,
79, 39, 39, 57, 79, 55, 51, 61, 54, 52, 58, 47, 57, 67, 56, 56, 40, 57, 56, 46, 56, 72, 52, 64, 61, 50, 61, 57, 39, 55, 80, 79,
80, 40, 41, 57, 77, 55, 48, 60, 52, 51, 60, 45, 56, 72, 56, 56, 40, 56, 59, 47, 55, 67, 52, 60, 60, 51, 61, 55, 40, 56, 78, 79,
66, 33, 35, 47, 65, 46, 43, 49, 43, 47, 51, 39, 47, 56, 45, 46, 33, 46, 47, 40, 47, 56, 44, 50, 50, 43, 50, 45, 33, 48, 66, 66,
80, 40, 40, 57, 78, 56, 52, 66, 52, 52, 63, 46, 56, 68, 56, 56, 40, 56, 55, 47, 56, 69, 52, 61, 61, 52, 62, 57, 39, 56, 79, 80,
95, 48, 48, 69, 95, 67, 62, 74, 62, 62, 73, 56, 67, 80, 71, 67, 48, 72, 67, 56, 69, 81, 62, 72, 73, 62, 74, 68, 48, 68, 95, 95,
73, 37, 37, 53, 73, 60, 46, 56, 48, 46, 56, 43, 53, 63, 52, 50, 36, 52, 52, 44, 52, 62, 45, 56, 56, 47, 56, 52, 37, 51, 73, 72,
86, 43, 42, 62, 86, 59, 56, 65, 56, 56, 64, 50, 61, 71, 61, 61, 43, 64, 60, 50, 61, 72, 56, 66, 66, 56, 66, 62, 42, 59, 86, 86,
86, 43, 42, 62, 86, 60, 56, 67, 56, 56, 65, 51, 61, 73, 61, 64, 43, 61, 60, 50, 61, 73, 56, 66, 66, 56, 65, 61, 42, 59, 86, 86,
72, 37, 37, 53, 75, 51, 48, 57, 48, 49, 56, 43, 52, 62, 51, 52, 37, 50, 51, 43, 52, 62, 47, 56, 56, 48, 56, 65, 36, 51, 73, 73,
86, 43, 43, 58, 85, 60, 56, 65, 56, 56, 66, 50, 61, 73, 61, 61, 43, 61, 61, 50, 62, 74, 56, 66, 65, 56, 67, 62, 43, 60, 86, 86,
83, 40, 41, 58, 80, 57, 63, 61, 53, 53, 62, 48, 54, 68, 57, 57, 40, 57, 55, 45, 57, 68, 52, 62, 61, 65, 62, 58, 40, 56, 80, 83,
55, 28, 28, 40, 55, 38, 36, 42, 36, 36, 43, 33, 40, 48, 38, 39, 27, 39, 40, 33, 39, 48, 37, 42, 42, 36, 43, 40, 28, 39, 56, 55,
77, 39, 39, 56, 77, 53, 47, 58, 51, 51, 60, 45, 55, 66, 55, 55, 39, 55, 56, 48, 56, 68, 51, 59, 59, 51, 60, 56, 39, 54, 77, 78,
108, 57, 55, 81, 112, 78, 73, 85, 73, 74, 80, 69, 80, 93, 80, 76, 54, 80, 78, 66, 79, 95, 73, 86, 86, 73, 86, 80, 56, 77, 116, 107,
116, 56, 56, 80, 112, 78, 73, 86, 73, 73, 86, 66, 79, 95, 79, 79, 56, 79, 79, 66, 80, 95, 72, 86, 86, 73, 86, 83, 55, 78, 107, 120,
};
```

```
QP4={
128, 64, 64, 92, 128, 89, 84, 98, 84, 84, 98, 75, 90, 108, 90, 91, 64, 90, 91, 76, 91, 109, 83, 98, 99, 83, 99, 95, 63, 89, 123, 132,
64, 32, 32, 46, 64, 45, 42, 49, 42, 42, 46, 40, 46, 54, 44, 47, 33, 45, 45, 38, 45, 54, 42, 49, 49, 42, 49, 46, 32, 44, 65, 64,
64, 32, 32, 46, 64, 44, 39, 46, 41, 42, 48, 38, 45, 55, 45, 45, 32, 45, 47, 40, 46, 54, 43, 48, 48, 42, 49, 46, 32, 45, 63, 64,
92, 46, 46, 67, 90, 58, 60, 71, 60, 60, 71, 54, 65, 80, 63, 66, 46, 65, 66, 54, 65, 78, 61, 70, 71, 60, 66, 66, 46, 64, 93, 92,
128, 64, 64, 90, 126, 89, 84, 98, 84, 84, 99, 74, 90, 108, 90, 91, 64, 90, 88, 74, 89, 108, 83, 98, 99, 86, 97, 91, 63, 88, 128, 128,
89, 45, 44, 58, 89, 61, 58, 68, 58, 68, 69, 52, 63, 76, 63, 65, 46, 62, 63, 52, 64, 77, 68, 67, 68, 58, 68, 65, 43, 61, 89, 89,
84, 42, 39, 60, 84, 58, 54, 66, 55, 55, 64, 49, 59, 67, 60, 59, 42, 58, 55, 49, 59, 71, 53, 64, 64, 54, 64, 72, 42, 54, 84, 84,
98, 49, 46, 71, 98, 68, 66, 76, 64, 64, 75, 63, 69, 83, 70, 71, 48, 70, 69, 56, 76, 84, 64, 75, 76, 66, 75, 70, 48, 66, 97, 98,
84, 42, 41, 60, 84, 58, 55, 64, 55, 54, 63, 49, 59, 69, 59, 59, 42, 62, 59, 49, 60, 71, 55, 64, 64, 55, 64, 60, 41, 58, 84, 83,
84, 42, 42, 60, 84, 68, 55, 64, 54, 54, 64, 49, 64, 71, 59, 58, 42, 59, 59, 53, 59, 71, 52, 64, 64, 56, 64, 60, 42, 58, 84, 83,
98, 46, 48, 71, 99, 69, 64, 75, 63, 64, 76, 58, 69, 82, 65, 69, 49, 66, 69, 58, 72, 84, 64, 73, 74, 64, 76, 71, 49, 69, 92, 98,
75, 40, 38, 54, 74, 52, 49, 63, 49, 49, 58, 44, 54, 64, 53, 53, 37, 53, 52, 45, 53, 63, 49, 58, 58, 49, 57, 54, 38, 52, 79, 75,
90, 46, 45, 65, 90, 63, 59, 69, 59, 64, 69, 54, 64, 77, 63, 64, 45, 65, 64, 54, 64, 77, 60, 69, 70, 60, 69, 62, 45, 63, 92, 90,
108, 54, 55, 80, 108, 76, 67, 83, 69, 71, 82, 64, 77, 102, 77, 77, 55, 77, 83, 64, 78, 92, 72, 81, 83, 71, 84, 77, 55, 75, 106, 108,
90, 44, 45, 63, 90, 63, 60, 70, 59, 59, 65, 53, 63, 77, 63, 64, 45, 64, 64, 51, 64, 81, 59, 70, 69, 59, 70, 66, 44, 63, 91, 90,
91, 47, 45, 66, 91, 65, 59, 71, 59, 58, 69, 53, 64, 77, 64, 64, 45, 64, 64, 53, 64, 77, 57, 69, 73, 59, 70, 65, 44, 63, 87, 91,
64, 33, 32, 46, 64, 46, 42, 48, 42, 42, 49, 37, 45, 55, 45, 45, 32, 45, 45, 38, 46, 54, 42, 49, 49, 42, 49, 46, 31, 44, 62, 64,
90, 45, 45, 65, 90, 62, 58, 70, 62, 59, 66, 53, 65, 77, 64, 64, 45, 65, 64, 53, 64, 82, 59, 73, 69, 57, 69, 65, 45, 63, 92, 90,
91, 45, 47, 66, 88, 63, 55, 69, 59, 59, 69, 52, 64, 83, 64, 64, 45, 64, 67, 53, 63, 77, 59, 69, 69, 58, 69, 62, 46, 64, 90, 91,
76, 38, 40, 54, 74, 52, 49, 56, 49, 53, 58, 45, 54, 64, 51, 53, 38, 53, 53, 46, 53, 64, 50, 58, 57, 49, 58, 51, 38, 55, 76, 76,
91, 45, 46, 65, 89, 64, 59, 76, 60, 59, 72, 53, 64, 78, 64, 64, 46, 64, 63, 53, 64, 79, 59, 70, 70, 59, 70, 66, 45, 64, 90, 91,
109, 54, 54, 78, 108, 77, 71, 84, 71, 71, 84, 63, 77, 92, 81, 77, 54, 82, 77, 64, 79, 93, 71, 82, 83, 71, 84, 78, 55, 77, 109, 109,
83, 42, 43, 61, 83, 68, 53, 64, 55, 52, 64, 49, 60, 72, 59, 57, 42, 59, 59, 50, 59, 71, 51, 64, 64, 54, 64, 60, 42, 59, 84, 83,
98, 49, 48, 70, 98, 67, 64, 75, 64, 64, 73, 58, 69, 81, 70, 69, 49, 73, 69, 58, 70, 82, 64, 75, 75, 64, 75, 71, 48, 68, 98, 98,
99, 49, 48, 71, 99, 68, 64, 76, 64, 64, 74, 58, 70, 83, 69, 73, 49, 69, 69, 57, 70, 83, 64, 75, 76, 64, 75, 70, 48, 68, 98, 98,
83, 42, 42, 60, 86, 58, 54, 66, 55, 56, 64, 49, 60, 71, 59, 59, 42, 57, 58, 49, 59, 71, 54, 64, 64, 55, 64, 74, 42, 58, 84, 83,
99, 49, 49, 66, 97, 68, 64, 75, 64, 64, 76, 57, 69, 84, 70, 70, 49, 69, 69, 58, 70, 84, 64, 75, 75, 64, 76, 71, 49, 68, 98, 98,
95, 46, 46, 66, 91, 65, 72, 70, 60, 60, 71, 54, 62, 77, 66, 65, 46, 65, 62, 51, 66, 78, 60, 71, 70, 74, 71, 66, 46, 64, 91, 95,
63, 32, 32, 46, 63, 43, 42, 48, 41, 42, 49, 38, 45, 55, 44, 44, 31, 45, 46, 38, 45, 55, 42, 48, 48, 42, 49, 46, 32, 44, 64, 62,
89, 44, 45, 64, 88, 61, 54, 66, 58, 58, 69, 52, 63, 75, 63, 63, 44, 63, 64, 55, 64, 77, 59, 68, 68, 58, 68, 64, 44, 62, 88, 89,
123, 65, 63, 93, 128, 89, 84, 97, 84, 84, 92, 79, 92, 106, 91, 87, 62, 92, 90, 76, 90, 109, 84, 98, 98, 84, 98, 91, 64, 88, 132, 122,
132, 64, 64, 92, 128, 89, 84, 98, 83, 83, 98, 75, 90, 108, 90, 91, 64, 90, 91, 76, 91, 109, 83, 98, 98, 83, 98, 95, 62, 89, 122, 137,
},
```

METHOD AND DEVICE FOR TRANSFORMATION OF IMAGE AND METHOD AND DEVICE FOR REVERSE TRANSFORMATION OF IMAGE

CROSS-REFERENCE TO RELATED APPLICATIONS

This application is a Continuation of copending International Application PCT/KR2010/000443 filed on Jan. 12, 2010, which claims the benefit of U.S. Provisional Application No. 61/146,372, filed on Jan. 22, 2009, all the disclosures of which are incorporated herein in their entireties by reference.

BACKGROUND

1. Field

Apparatuses and methods consistent with exemplary embodiments relate to encoding and decoding an image, and more particularly, to transforming and inverse-transforming a block having a large size.

2. Description of the Related Art

According to a current international video coding standard, such as H.264 or MPEG-4, a video signal is hierarchically divided into a sequence, a frame, a slice, a macroblock, and a block, wherein the block is a minimum processing unit. In terms of encoding, a prediction remaining error of the block is determined via intra-frame or inter-frame prediction, block transformation is performed such that energy is focused on a coefficient of a decimal, and image data is compressed and recorded as a coded bitstream via quantization, scanning, run length coding, and entropy coding. In terms of decoding, processes are performed in the opposite order. First, a block transformation coefficient of entropy coding is extracted from a bitstream. Then, a prediction remaining error of a block is reconstructed via inverse-quantization and inverse-transformation, and prediction information is used to reconstruct video data of the block. In an encoding-decoding process, a transformation module is a base of video compression, and transformation performance of the transformation module directly affects general performance of a codec.

Discrete cosine transform (DCT) is employed in an initial video coding standard, such as MPEG-1 or H.261. After the DCT was introduced in 1974, the DCT has been widely used in image and video coding fields. Transformation performance of the DCT is excellent compared to all sub-optimal transforms since the DCT removes correlation of image elements in a transformation domain and prepares a base for high efficiency image compression. However, since a DCT matrix is expressed using a floating point number, many system resources are used due to massive floating point operations. Accordingly, a new DCT algorithm is required so as to improve transformation efficiency while performing transformation on a block having a large size.

SUMMARY

One or more exemplary embodiments provide methods and apparatuses for transforming and inverse-transforming an image by using an effective discrete cosine transform (DCT).

One or more exemplary embodiments also provide methods and apparatuses for transforming and inverse-transforming an image by using an effective discrete cosine transform (DCT), wherein calculation complexity is reduced by using a changed transformation matrix obtained by replacing an irrational number of a transformation matrix by a rational number, and reducing a number of multiplications during the transform.

One or more exemplary embodiments also provide methods and apparatuses for transforming and inverse-transforming an image by using an effective discrete cosine transform (DCT), wherein calculation complexity is reduced by using a changed transformation matrix obtained by replacing an irrational number of a transformation matrix by a rational number, and reducing a number of multiplications during the transform.

According to an aspect of an exemplary embodiment, there is provided a method of transforming an image, the method including: generating a substituted N×N transformation matrix by substituting elements of an N×N transformation matrix used for a 1-dimensional (1D) discrete cosine transform (DCT) of a N×N block with values based on N variables, wherein N is an integer; obtaining a multiplication matrix of the substituted N×N transformation matrix and a transposed matrix of the substituted N×N transformation matrix; obtaining the N variables that enable a sum of squares of elements excluding diagonal components of the obtained multiplication matrix to be a minimum; and transforming the N×N block by using the substituted N×N transformation matrix, which is substituted with the values based on the obtained N variables.

According to an aspect of another exemplary embodiment, there is provided a method of transforming an image, the method including: performing a 1-dimensional (1D) DCT on any one of a row unit and a column unit of an N×N block, wherein N is an integer, and the performing of the 1D DCT is performed based on a changed butterfly structure obtained by substituting a trigonometrical function component from among multiplication factors of a butterfly structure with a rational number and replacing 4 multiplication operation and 2 addition operation processes of the butterfly structure with 3 multiplication operation and 3 addition operation processes.

According to an aspect of another exemplary embodiment, there is provided an apparatus for transforming an image, the apparatus including a transformer which generates a substituted N×N transformation matrix by: substituting elements of an N×N transformation matrix used for a 1-dimensional (1D) discrete cosine transform (DCT) of a N×N block with values based on N variables, wherein N is an integer; obtaining a multiplication matrix of the substituted N×N transformation matrix and a transposed matrix of the substituted N×N transformation matrix; obtaining the N variables that enable a sum of squares of elements excluding diagonal components of the obtained multiplication matrix to be a minimum; and transforming the N×N block by using the substituted N×N transformation matrix, which is substituted with the values based on the obtained N variables.

According to an aspect of another exemplary embodiment, there is provided an apparatus for transforming an image, the apparatus including a transformer which performs a 1-dimensional (1D) DCT on any one of a row unit and a column unit of an N×N block based on a changed butterfly structure obtained by substituting a trigonometrical function component from among multiplication factors of a butterfly structure with a rational number and replacing 4 multiplication operation and 2 addition operation processes of the butterfly structure with 3 multiplication operation and 3 addition operation processes, wherein N is an integer.

According to an aspect of another exemplary embodiment, there is provided a method of inverse-transforming an image, the method including: receiving quantized transformation coefficients of an N×N block forming an image to be decoded, wherein N is an integer; inverse-quantizing the received quantized transformation coefficients; and generating a substituted N×N transformation matrix by substituting elements of an N×N transformation matrix used for a 1-dimensional (1D) discrete cosine transform (DCT) of the N×N block with values based on N variables, obtaining a multiplication matrix of the substituted N×N transformation matrix and a transposed matrix of the substituted N×N transformation matrix, obtaining the N variables that enable a sum of squares of elements excluding diagonal components of the obtained multiplication matrix to be a minimum, and inverse-transforming inverse-quantized transformation coefficients of the N×N block by using an N×N inverse transformation matrix constituting an inverse matrix of the substituted N×N transformation matrix, which is substituted with the values based on the obtained N variables.

According to an aspect of another exemplary embodiment, there is provided a method of inverse-transforming an image, the method including: receiving quantized transformation coefficients of an N×N block forming an image to be decoded, wherein N is an integer; inverse-quantizing the received quantized transformation coefficients; and performing a 1-dimensional (1D) discrete cosine inverse transform on the inverse-quantized transformation coefficients, wherein the performing of the 1D discrete cosine inverse transform is performed based on a changed butterfly structure obtained by substituting a trigonometrical function component from among multiplication factors of a butterfly structure with a rational number and replacing 4 multiplication operation and 2 addition operation processes of the butterfly structure with 3 multiplication operation and 3 addition operation processes.

According to an aspect of another exemplary embodiment, there is provided an apparatus for inverse-transforming an image, the apparatus including an inverse-transformer which: generates a substituted N×N transformation matrix by: substituting elements of an N×N transformation matrix used for a 1-dimensional (1D) discrete cosine transform (DCT) of a N×N block forming an image to be decoded with values based on N variables, wherein N is an integer; obtaining a multiplication matrix of the substituted N×N transformation matrix and a transposed matrix of the substituted N×N transformation matrix; obtaining the N variables that enable a sum of squares of elements excluding diagonal components of the obtained multiplication matrix to be a minimum; and inverse-transforming inverse-quantized transformation coefficients of the N×N block by using an N×N inverse transformation matrix constituting an inverse matrix of the substituted N×N transformation matrix, which is substituted with the values based on the obtained N variables.

According to an aspect of another exemplary embodiment, there is provided an apparatus for inverse-transforming an image, the apparatus including an inverse-transformer which performs a 1-dimensional (1D) discrete cosine inverse transform on any one of a row unit and a column unit of an N×N block to be decoded based on a changed butterfly structure obtained by substituting a trigonometrical function component from among multiplication factors of a butterfly structure with a rational number and replacing 4 multiplication operation and 2 addition operation processes of the butterfly structure with 3 multiplication operation and 3 addition operation processes, wherein N is an integer.

BRIEF DESCRIPTION OF THE DRAWINGS

FIG. 4 is a reference diagram showing elements of a substituted N×N transformation matrix, wherein a trigonometrical function component in an element of a 16×16 transformation matrix is substituted with variables;

FIG. 7 illustrates a scaling matrix according to a quantization parameter used while transforming a 16×16 block, according to an exemplary embodiment;

FIG. 8 illustrates an inverse-scaling matrix according to a quantization parameter applied to a 16×16 block, according to an exemplary embodiment;

FIGS. 9 through 14 illustrate scaling matrices according to a quantization parameter applied to a 32×32 block, according to exemplary embodiments;

FIGS. 22 through 27 illustrate scaling matrices according to a quantization parameter of a 32×32 input block when the changed butterfly structure on the right of FIG. 18 is applied;

Figure 28:
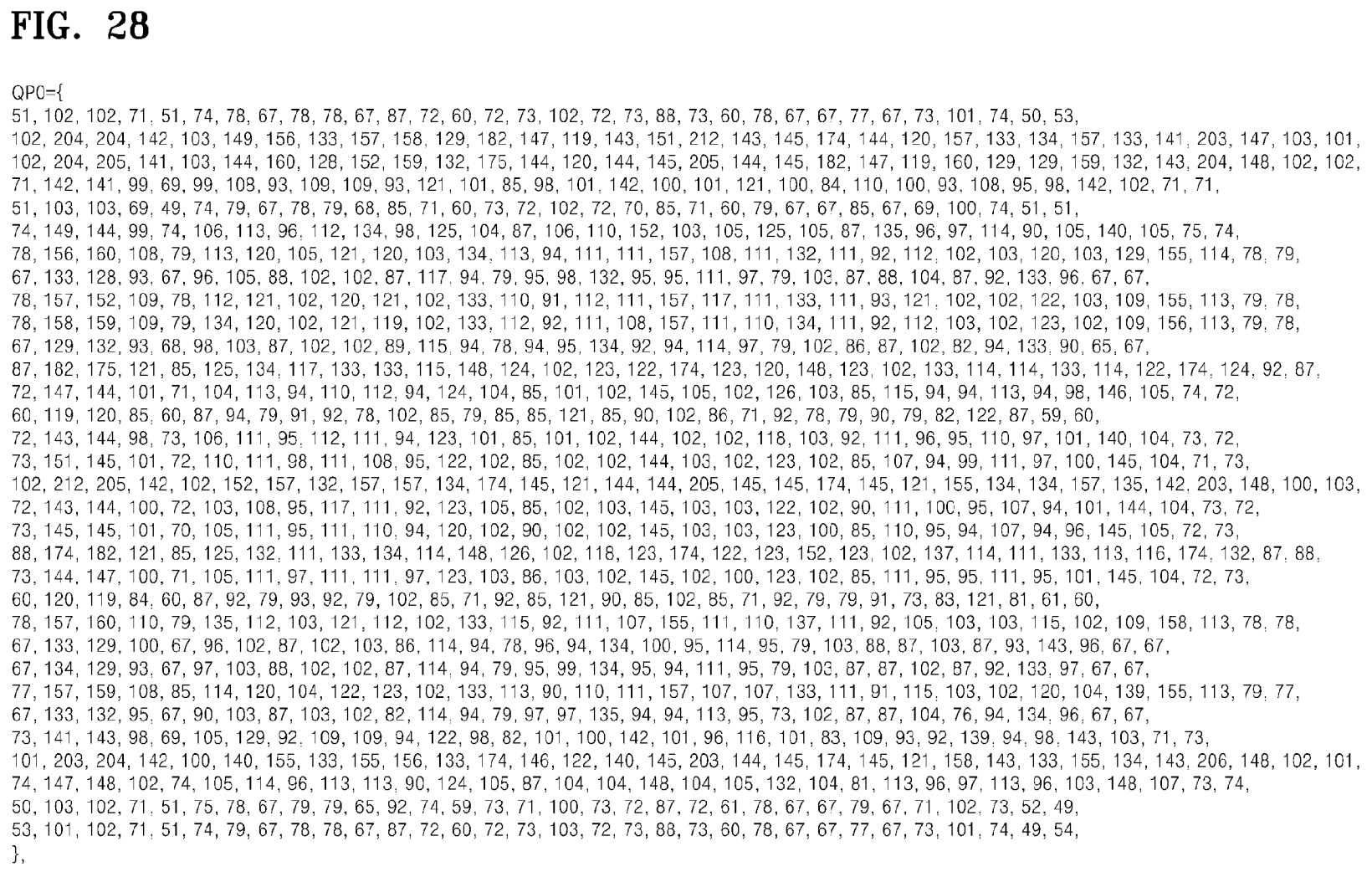
Figure 29:
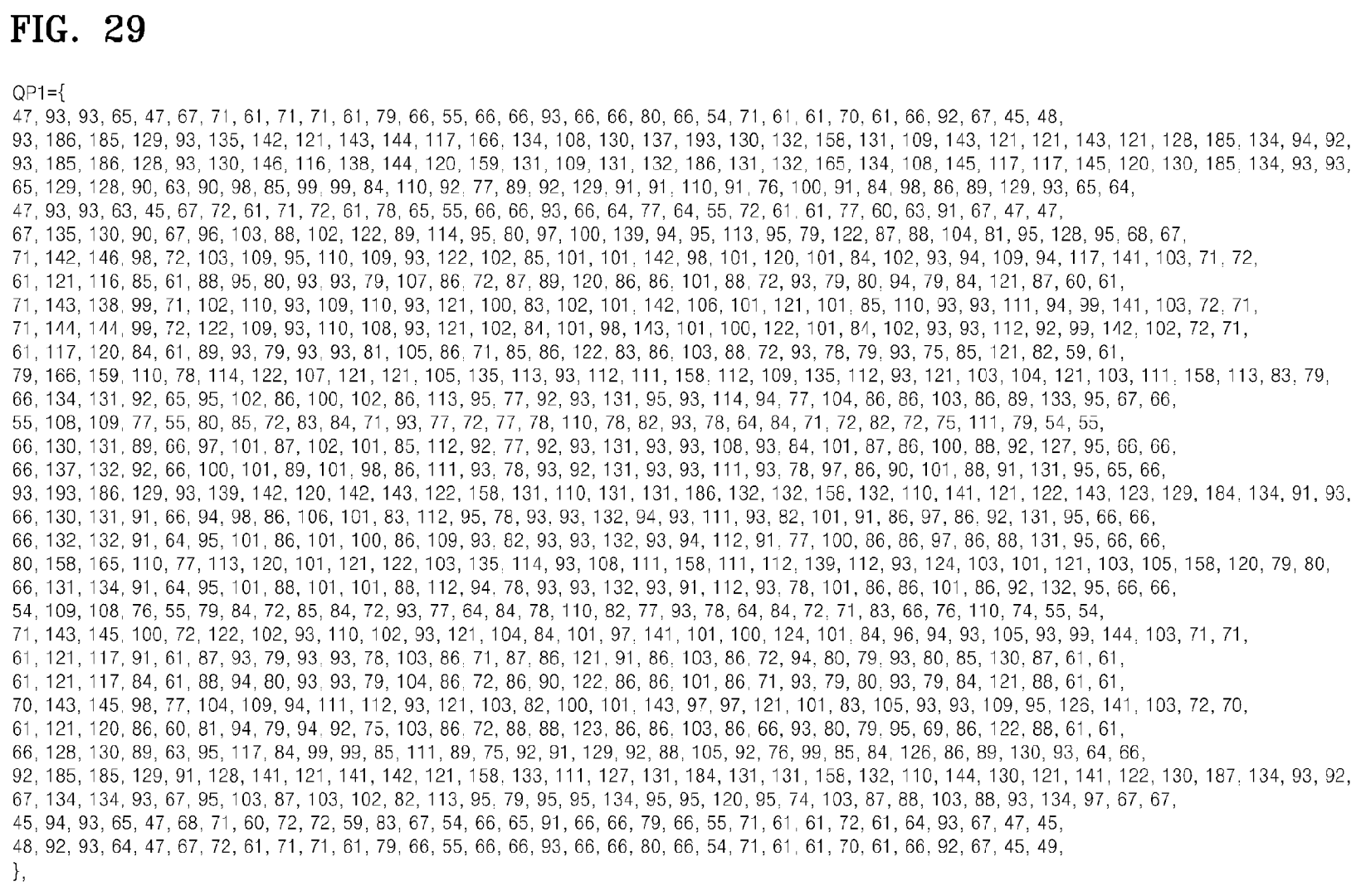

FIGS. 28 through 33 illustrate scaling matrices according to a quantization parameter of a 32×32 input block when the changed butterfly structure on the right of FIG. 19 is applied;

FIGS. 34 through 39 illustrate inverse-scaling matrices according to a quantization parameter of a 32×32 input block when the changed butterfly structure on the right of FIG. 18 is applied;

Figure 43:
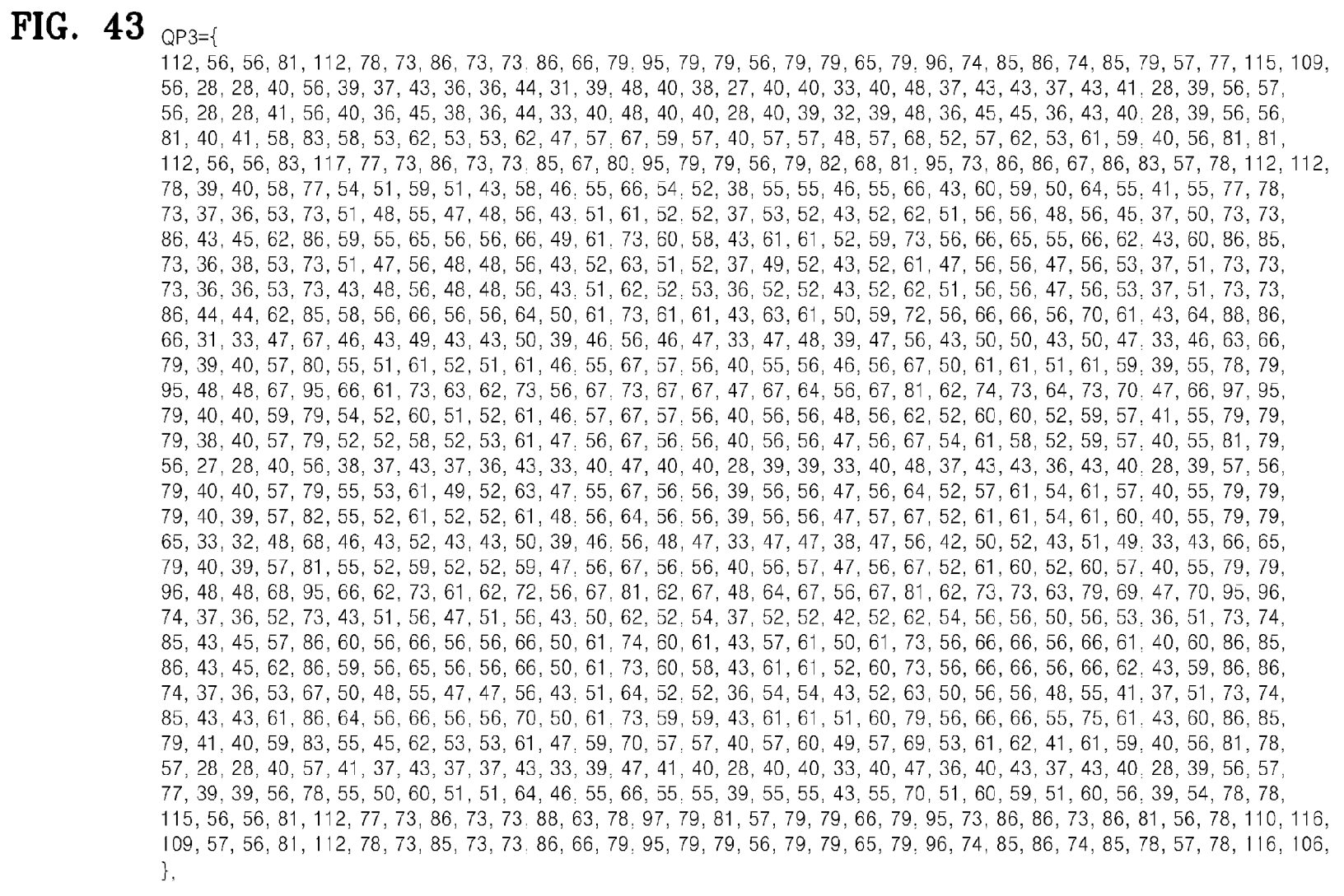
Figure 45:
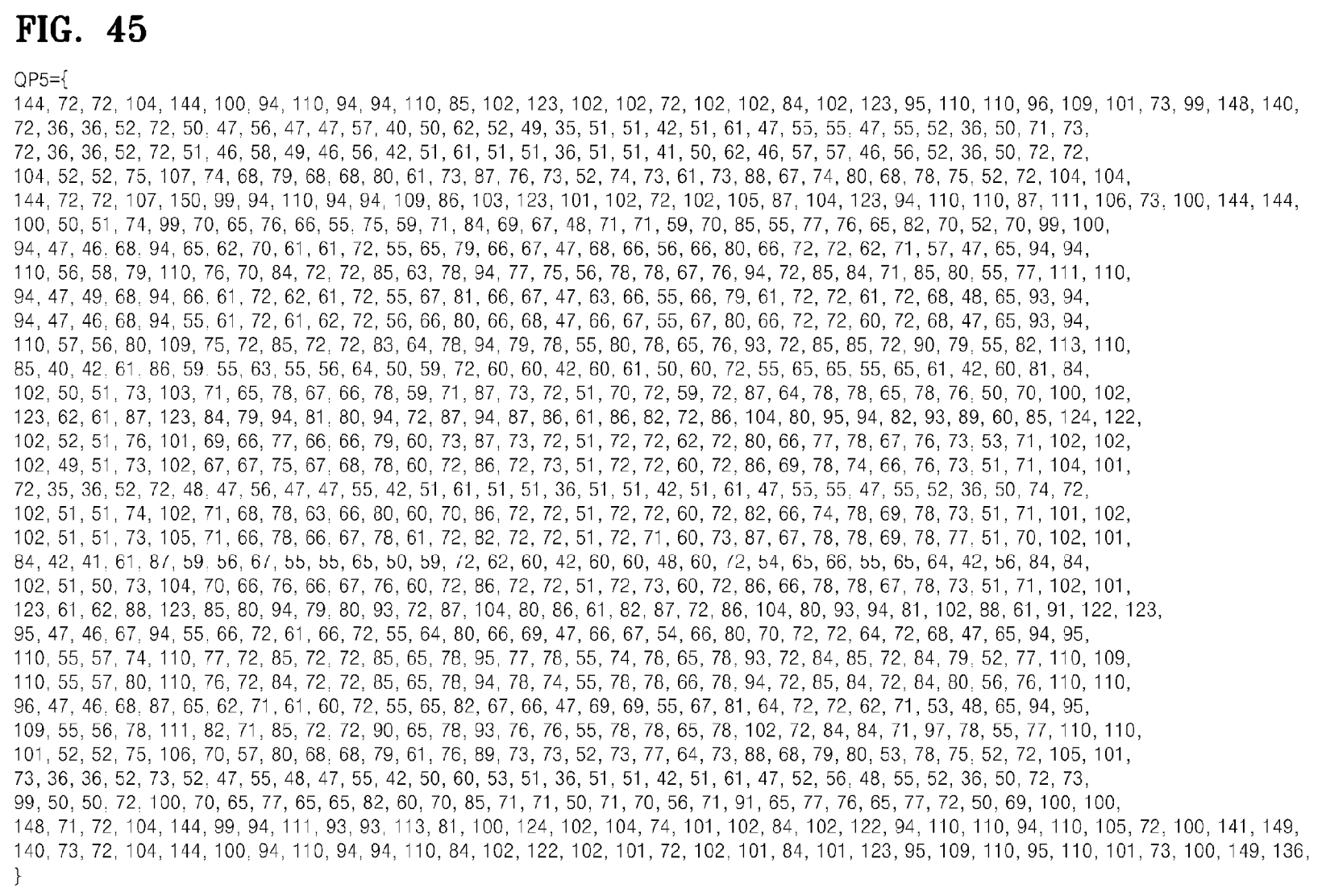

FIGS. 40 through 45 illustrate inverse-scaling matrices according to a quantization parameter of a 32×32 input block when the changed butterfly structure on the right of FIG. 19 is applied;

Figure 46:
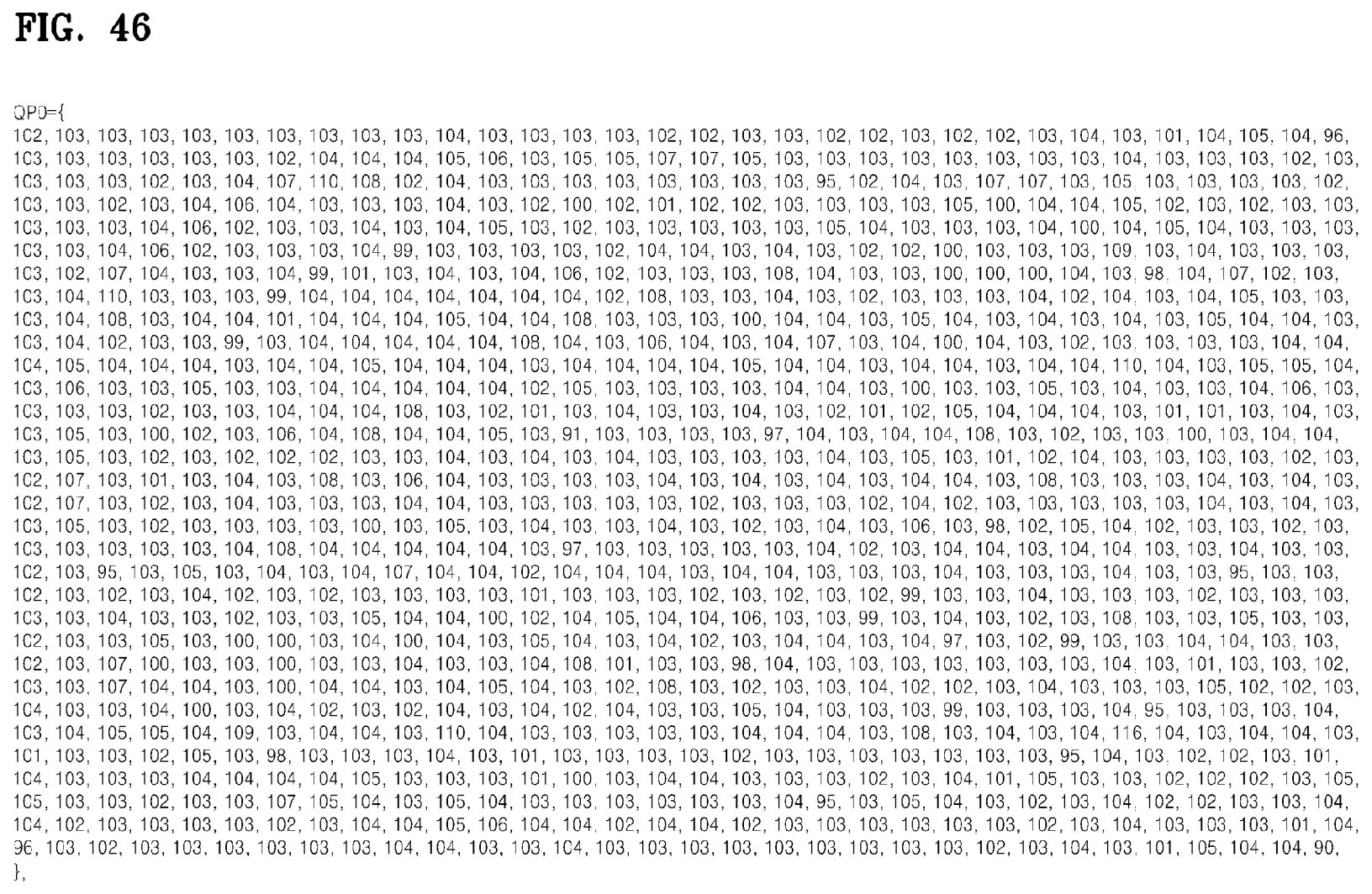
Figure 49:
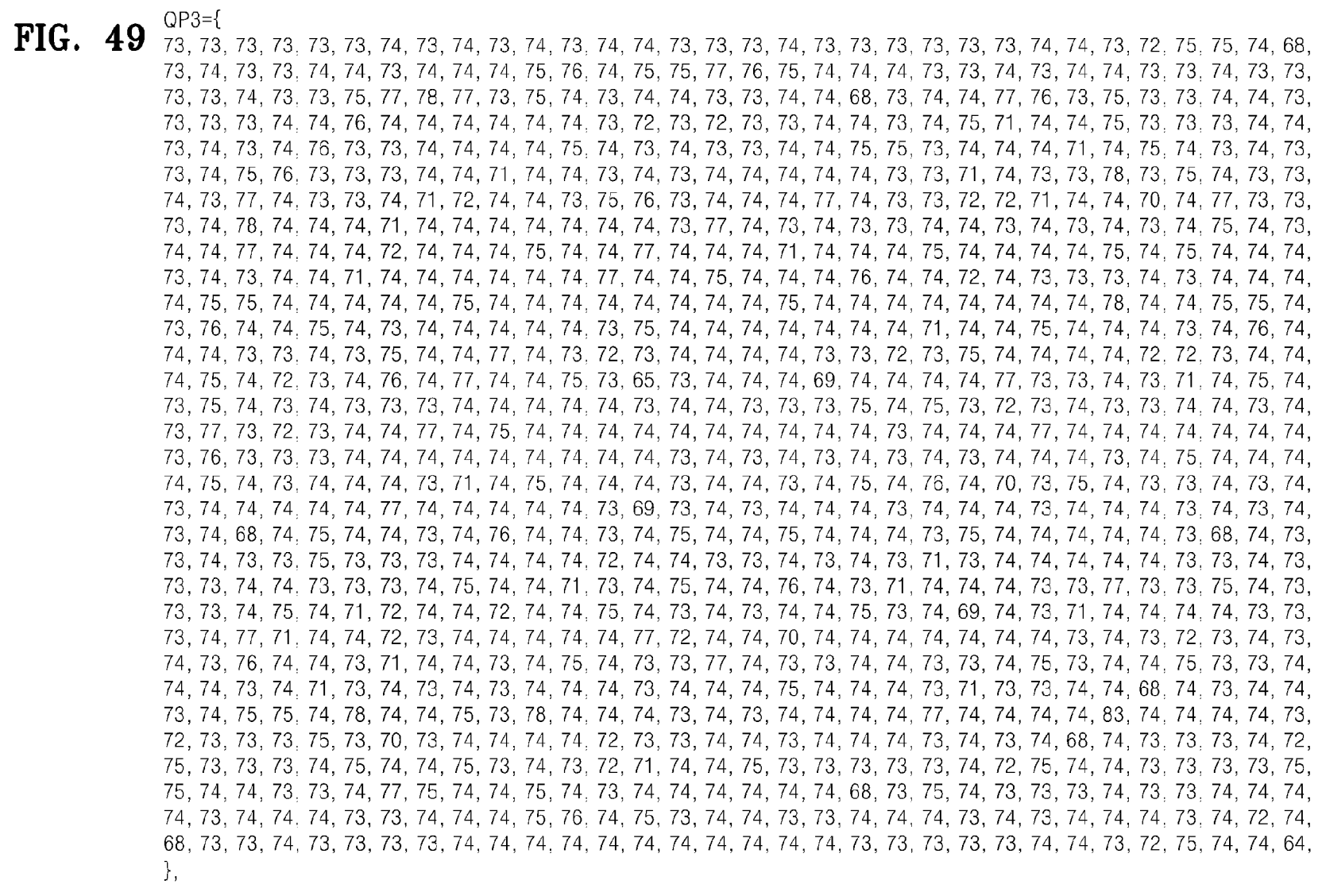

FIGS. 46 through 51 illustrate scaling matrices according to a quantization parameter of a 32×32 input block when the changed butterfly structure on the right of FIG. 18 is applied;

Figure 52:
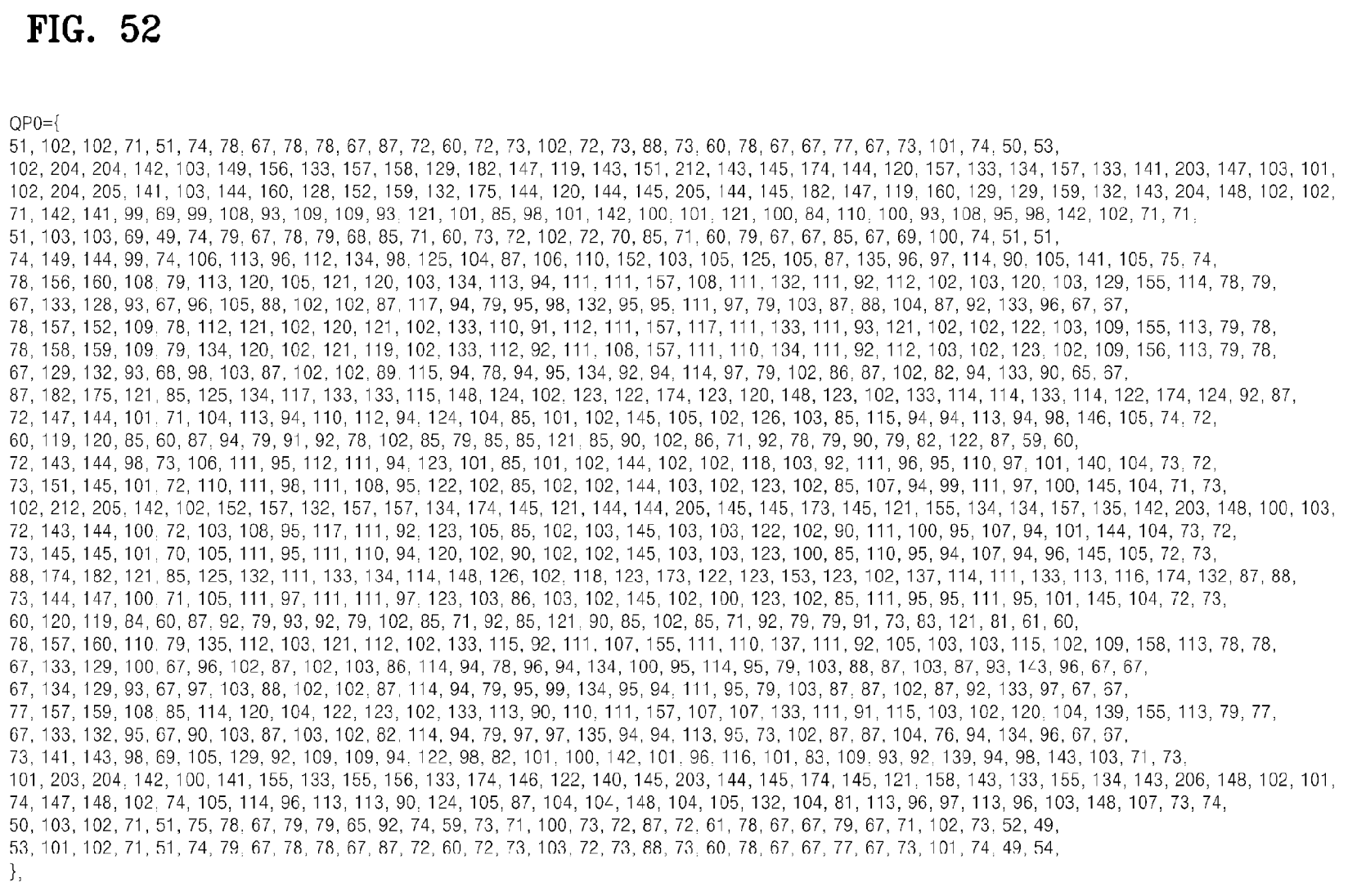
Figure 53:
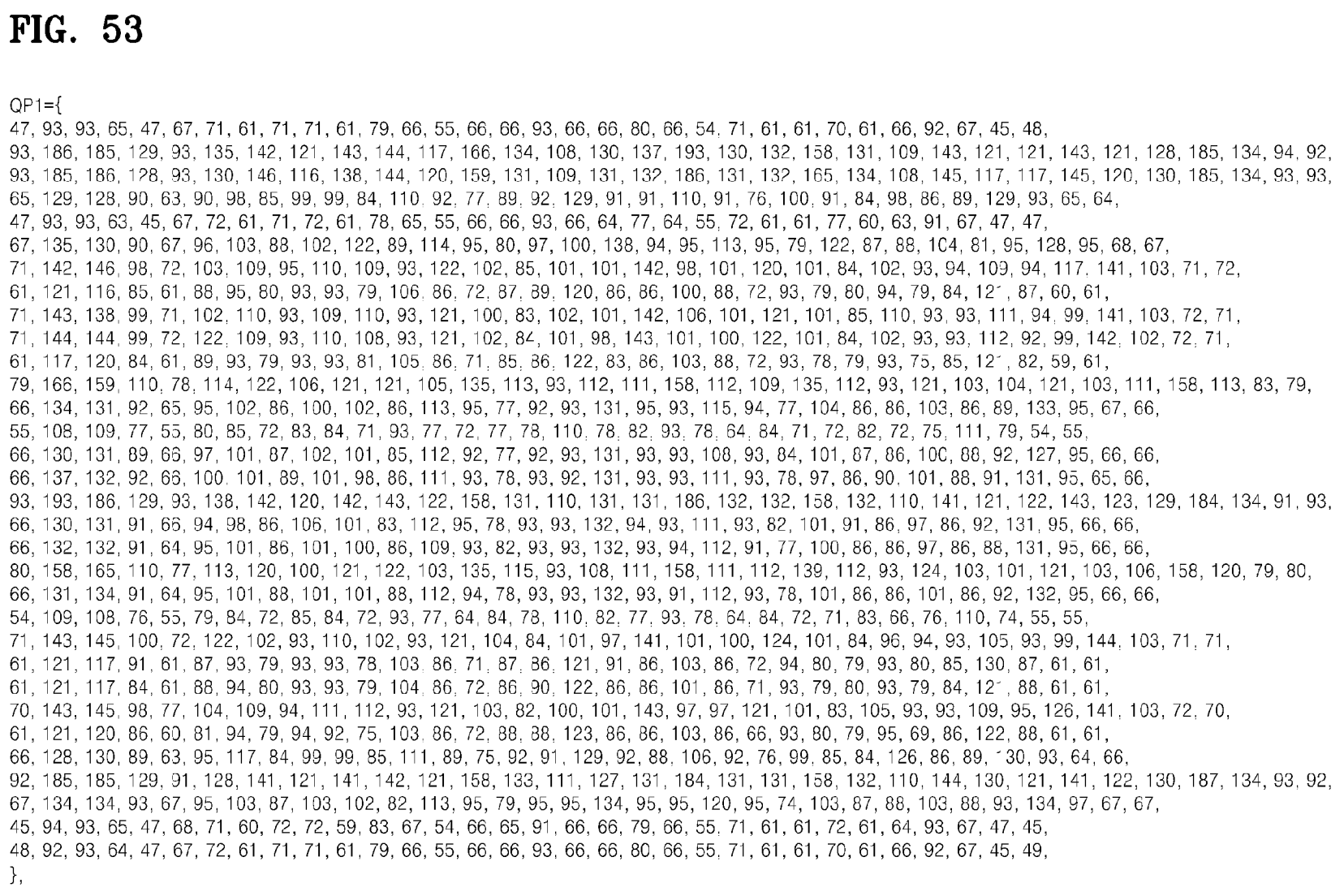

FIGS. 52 through 57 illustrate scaling matrices according to a quantization parameter of a 32×32 input block when the changed butterfly structure on the right of FIG. 19 is applied;

Figure 58:
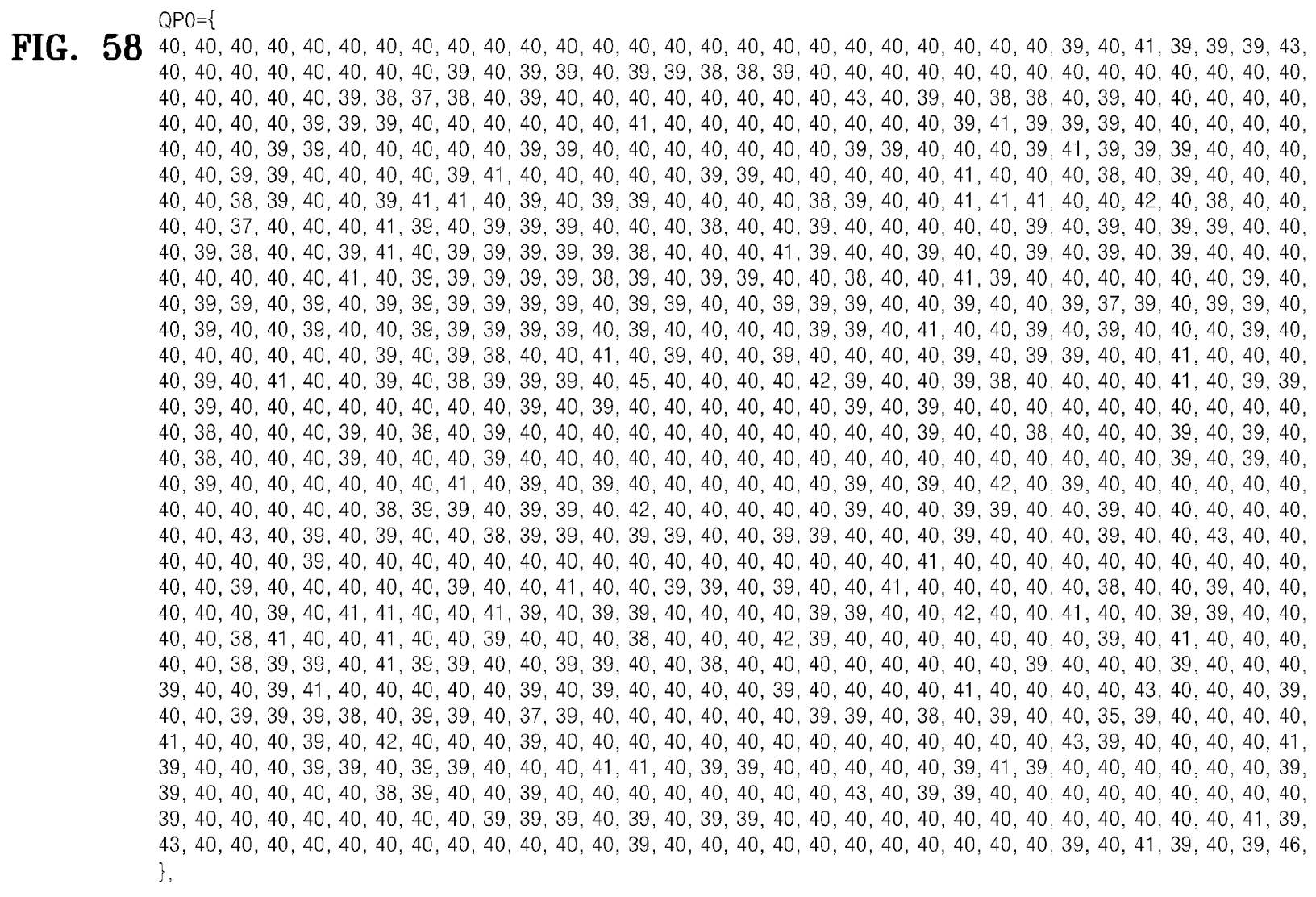
Figure 62:
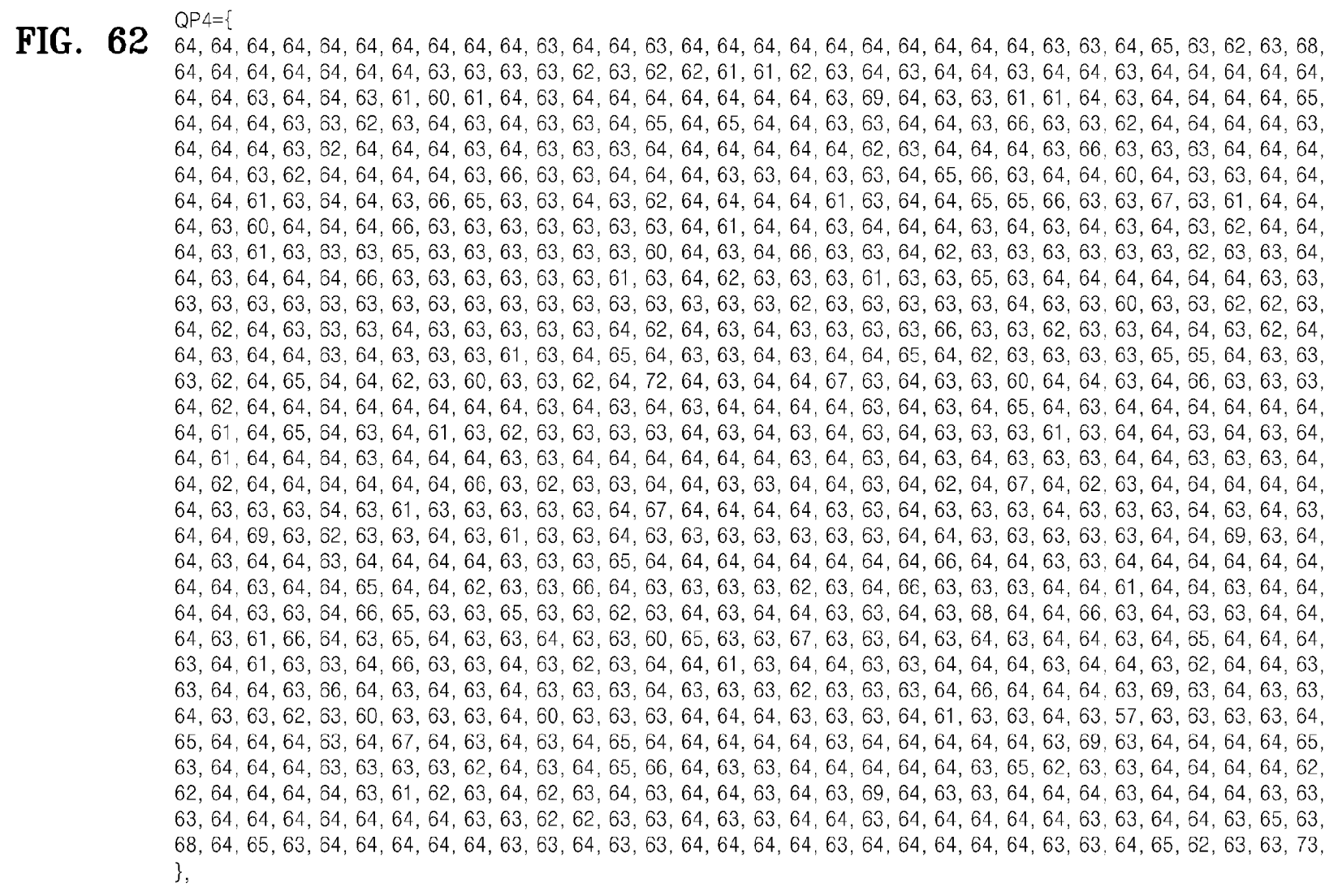
Figure 63:
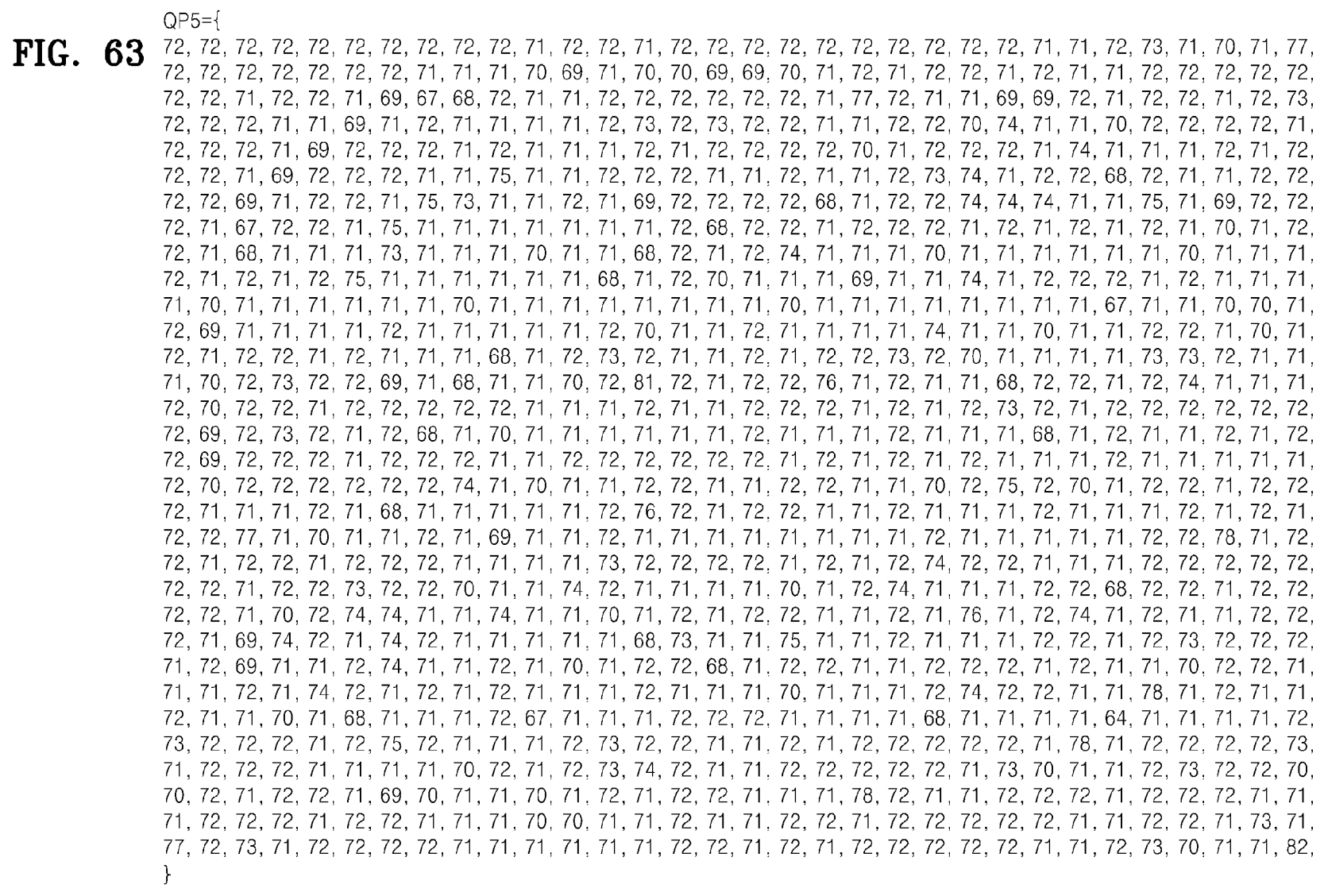

FIGS. 58 through 63 illustrate inverse-scaling matrices according to a quantization parameter of a 32×32 input block when the changed butterfly structure on the right of FIG. 18 is applied;

Figure 67:
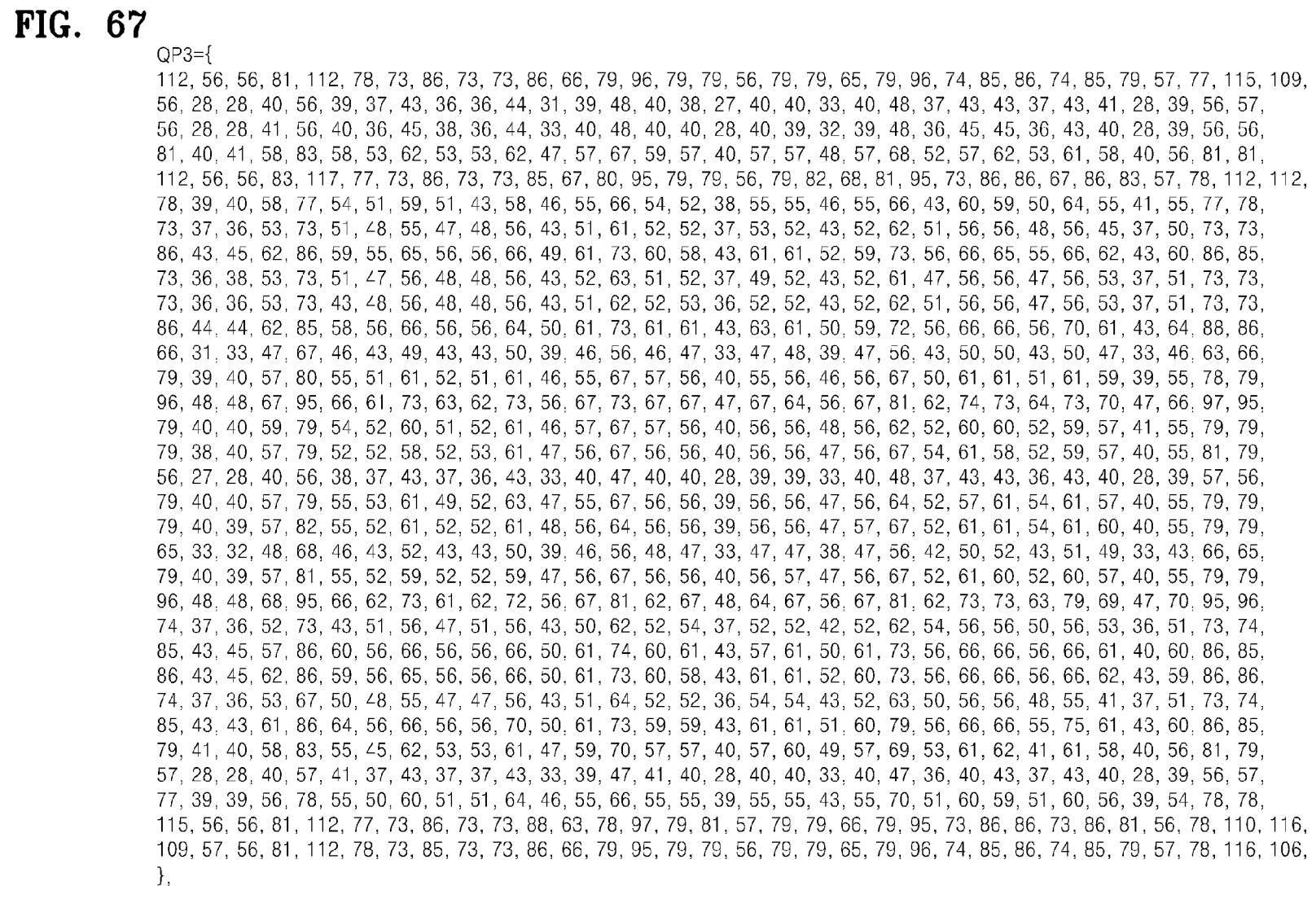
Figure 69:
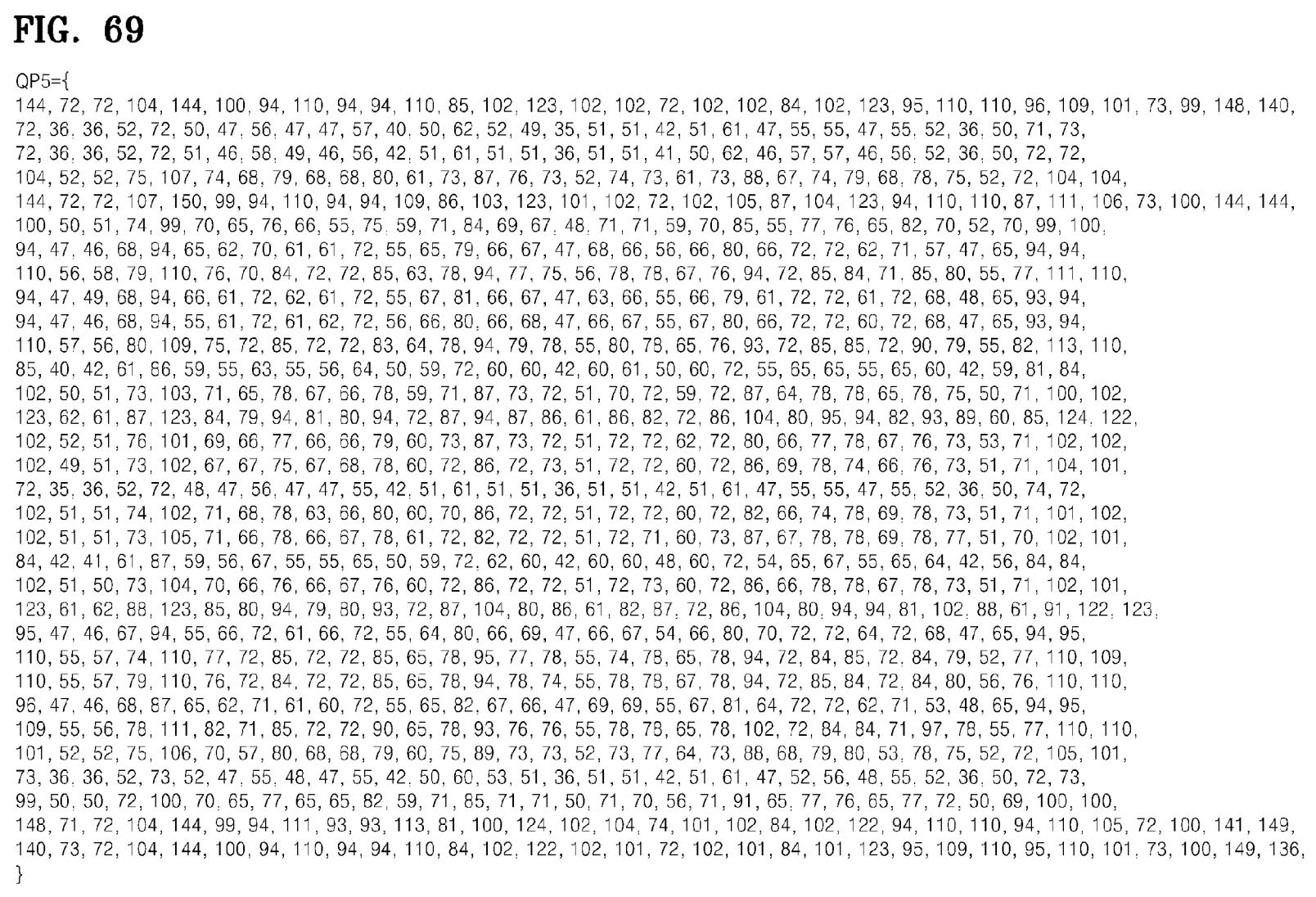

FIGS. 64 through 69 illustrate inverse-scaling matrices according to a quantization parameter of a 32×32 input block when the changed butterfly structure on the right of FIG. 19 is applied;

Figure 70:
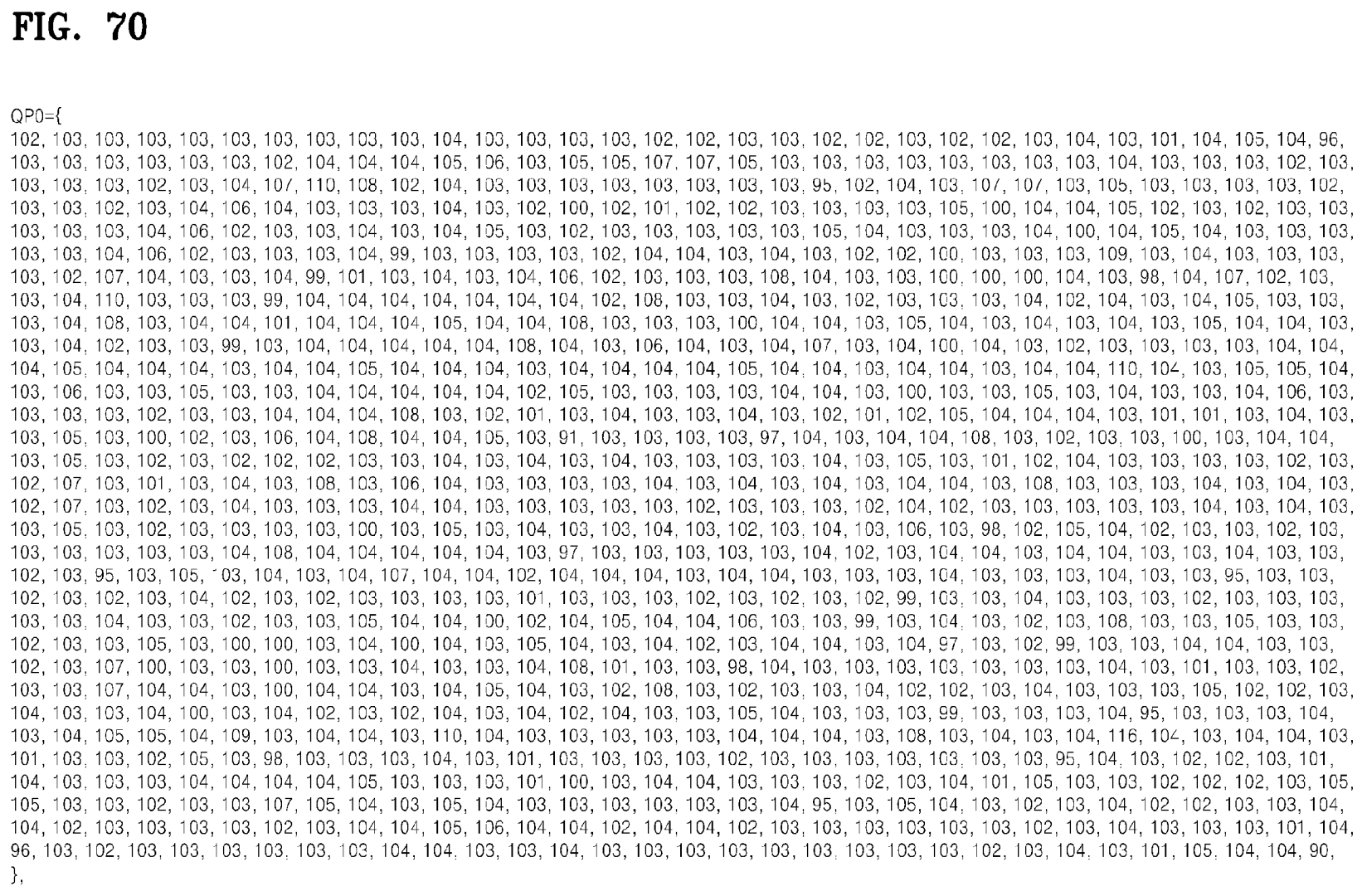
Figure 73:
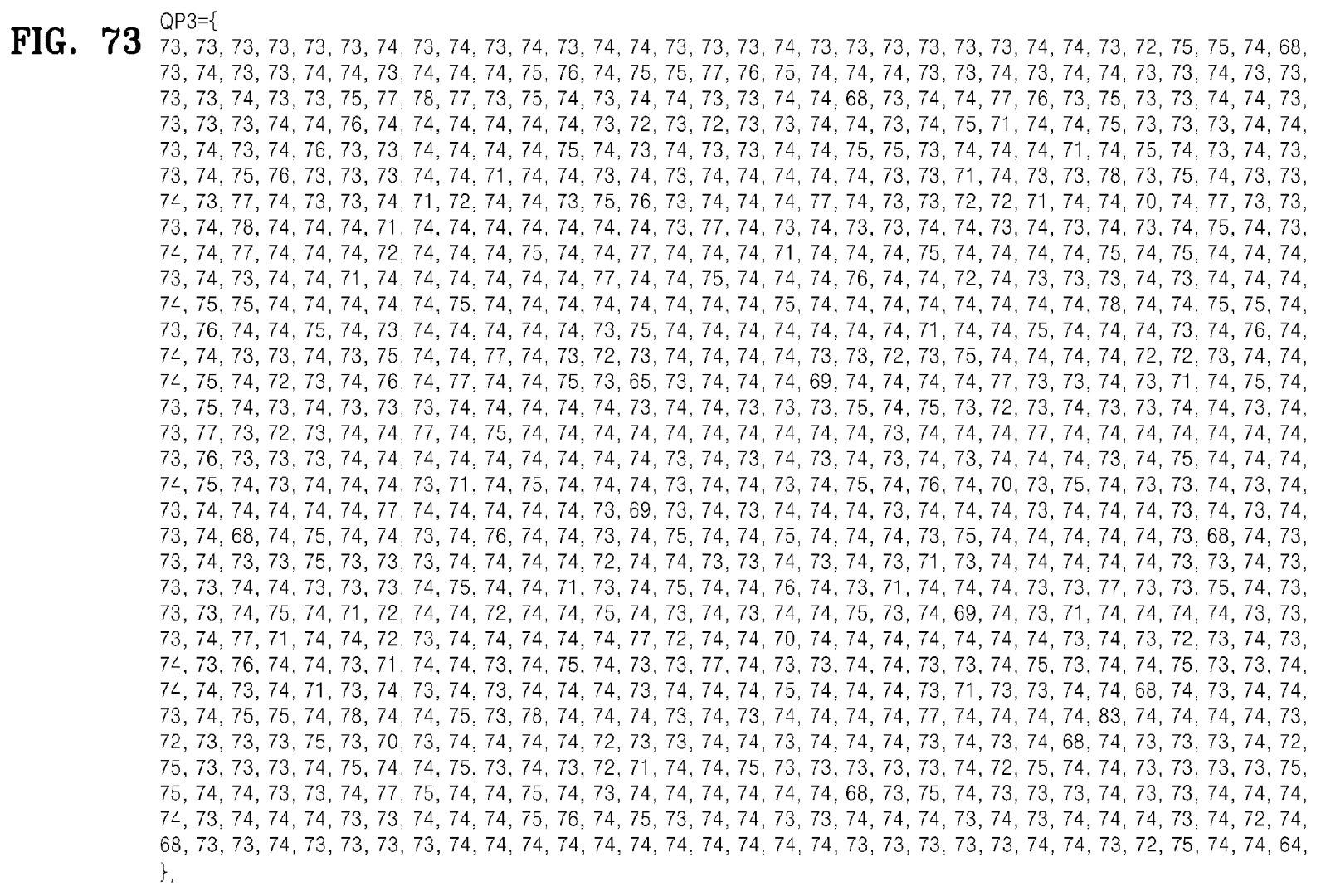

FIGS. 70 through 75 illustrate scaling matrices according to a quantization parameter of a 32×32 input block when the changed butterfly structure on the right of FIG. 18 is applied;

Figure 76:
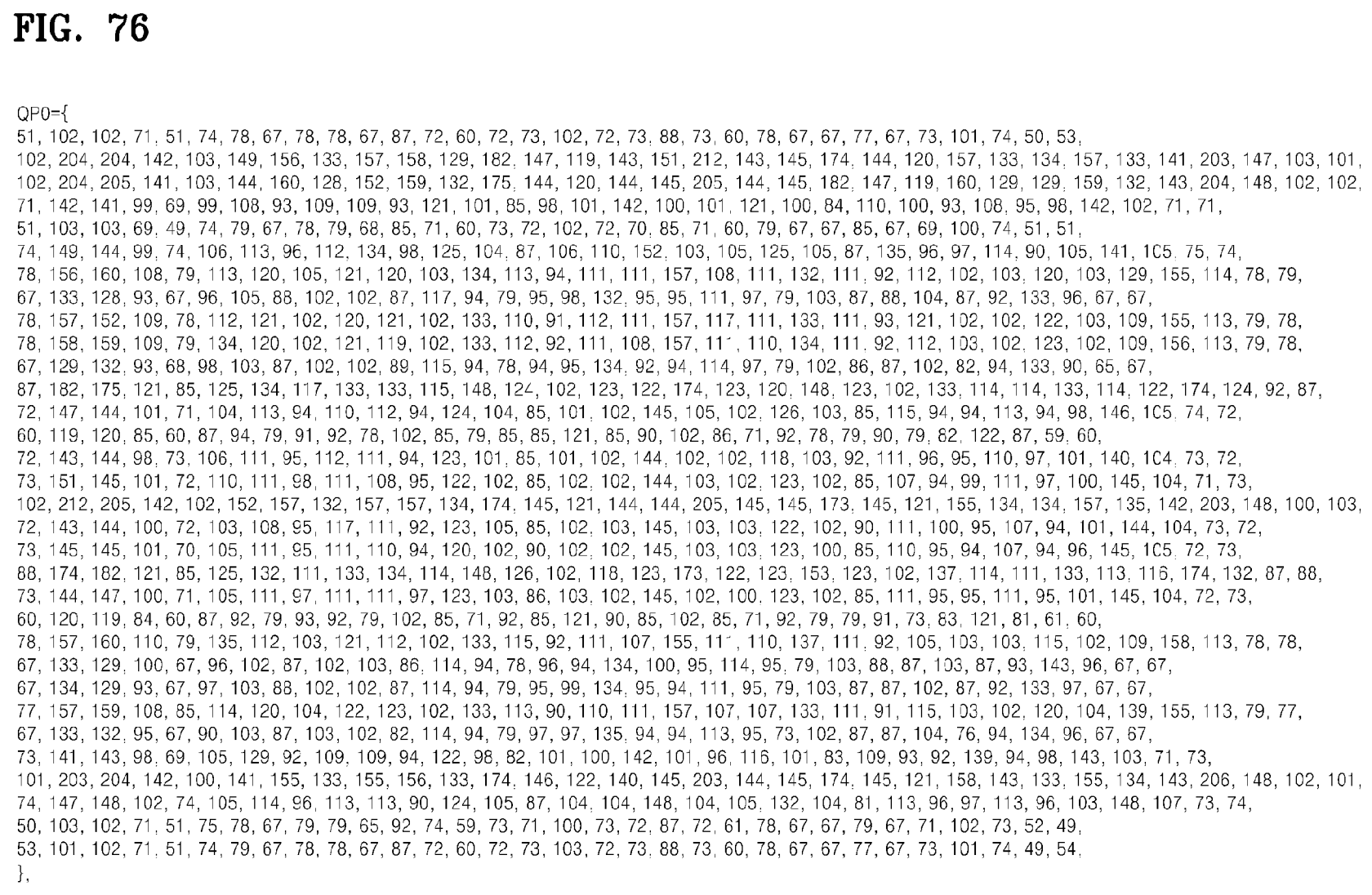
Figure 77:
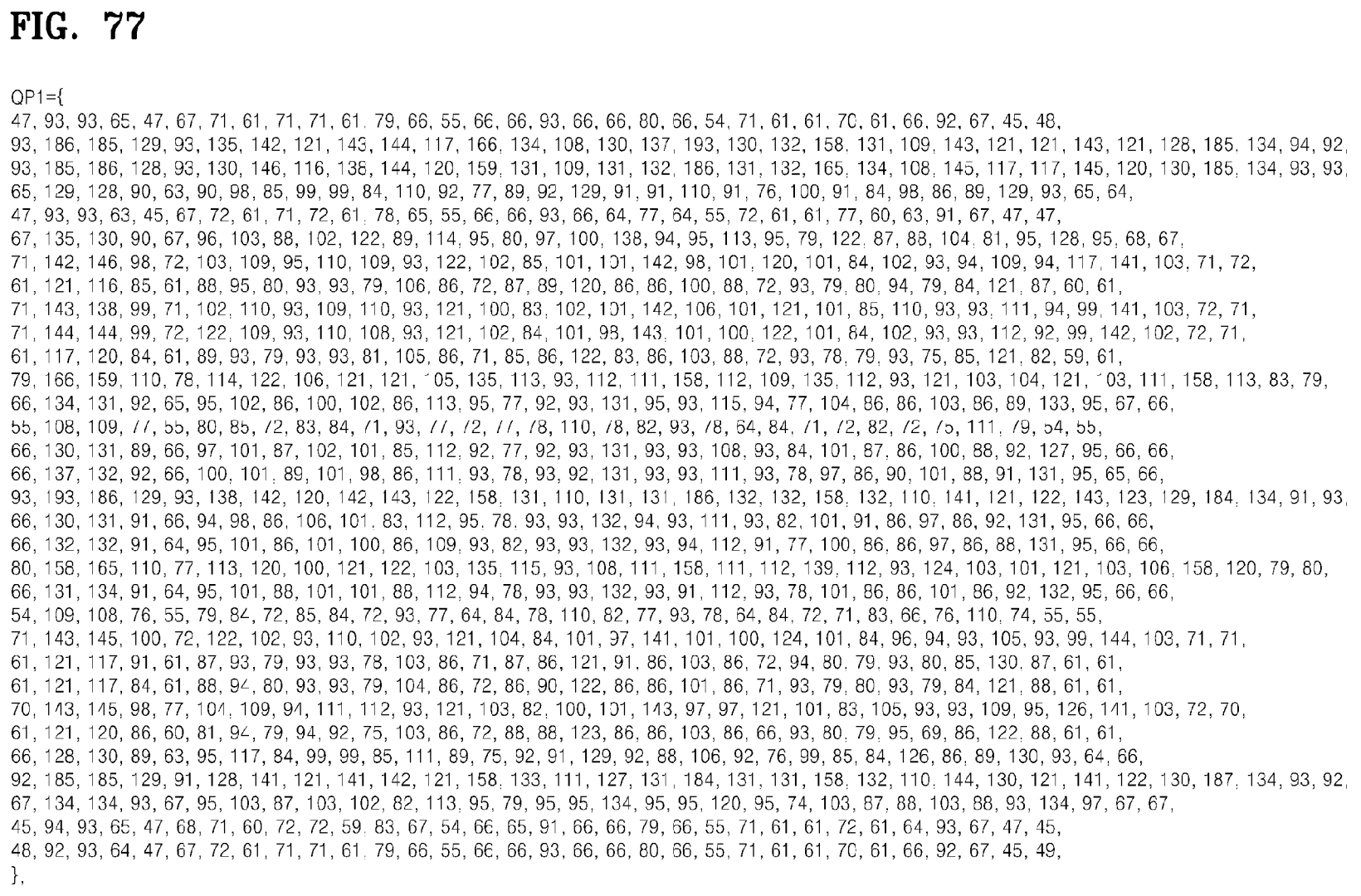

FIGS. 76 through 81 illustrate scaling matrices according to a quantization parameter of a 32×32 input block when the changed butterfly structure on the right of FIG. 19 is applied;

Figure 85:
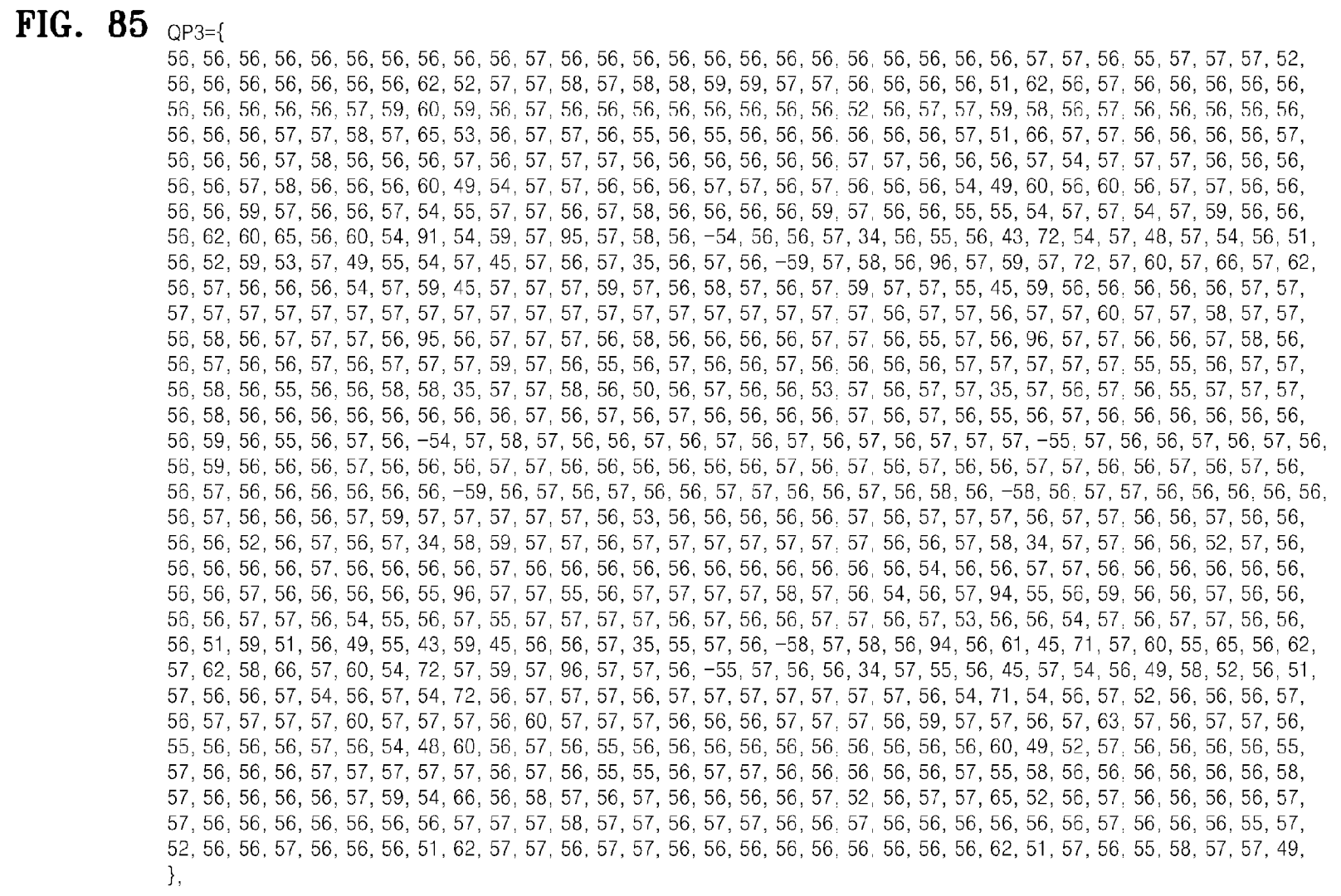

FIGS. 82 through 87 illustrate inverse-scaling matrices according to a quantization parameter of a 32×32 input block when the changed butterfly structure on the right of FIG. 18 is applied;

Figure 93:
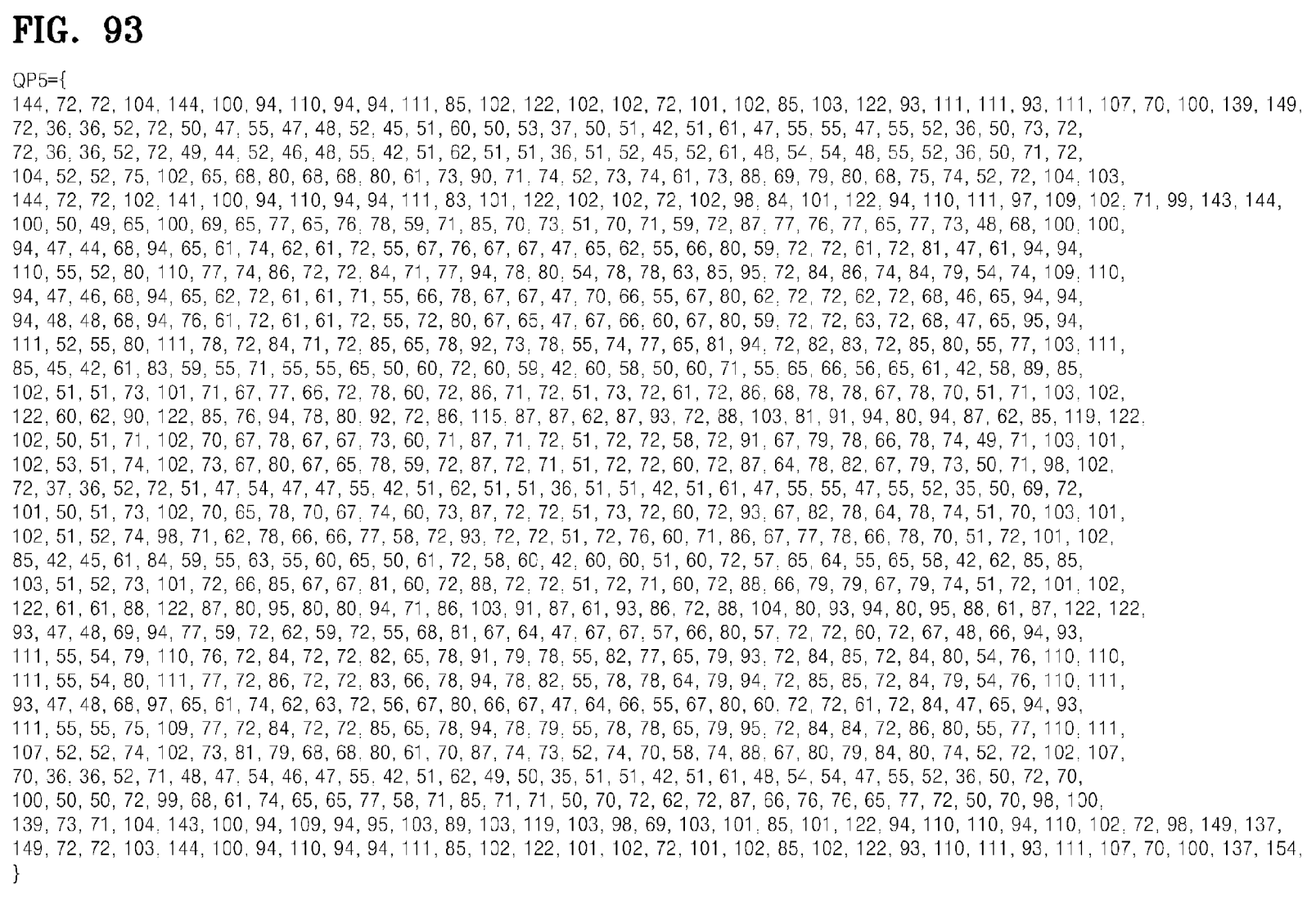

FIGS. 88 through 93 illustrate inverse-scaling matrices according to a quantization parameter of a 32×32 input block when the changed butterfly structure on the right of FIG. 19 is applied;

Figure 99:
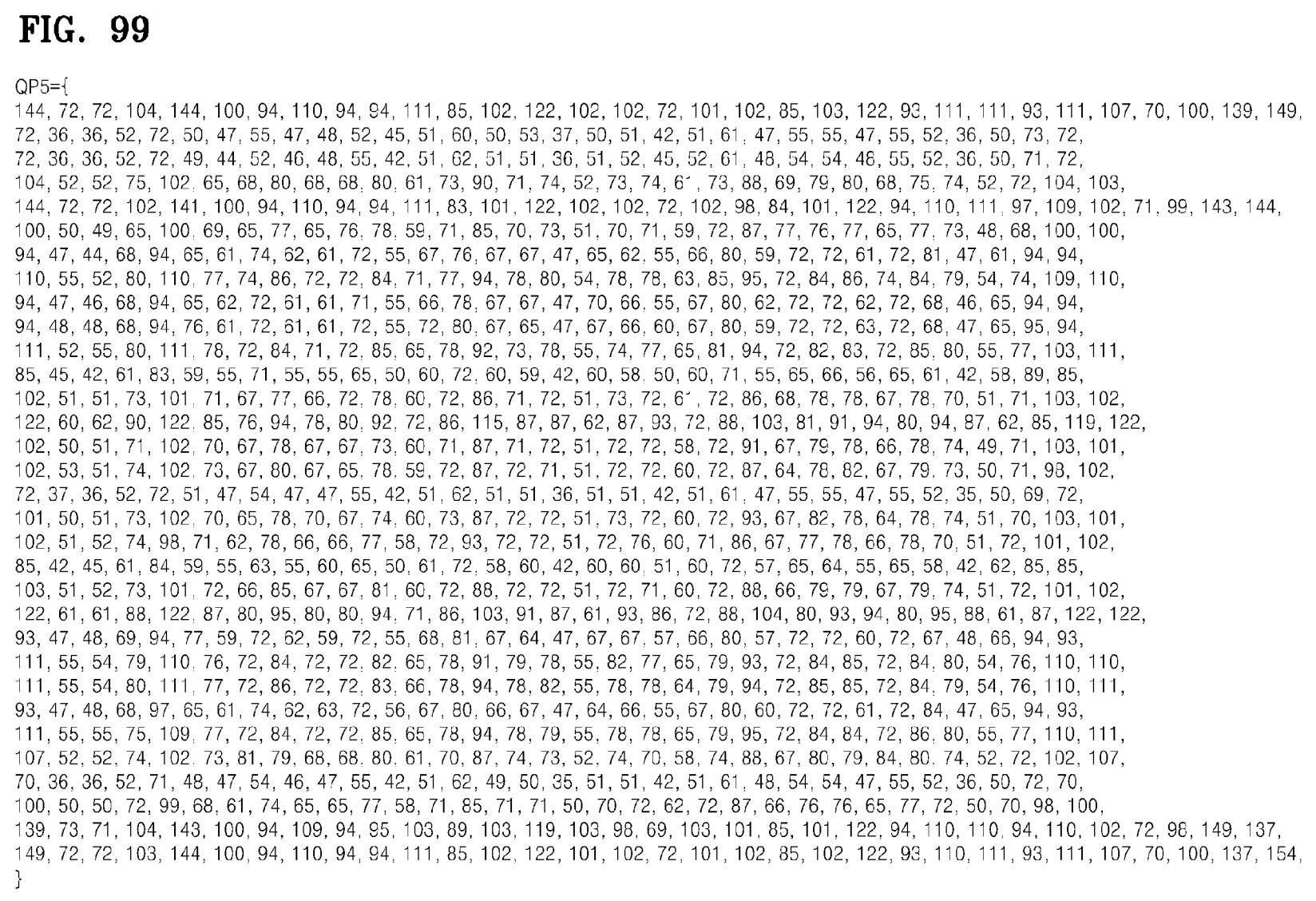

FIGS. 94 through 99 illustrate inverse-scaling matrices according to a quantization parameter applied to a 32×32 block, according to exemplary embodiments;

DETAILED DESCRIPTION OF EXEMPLARY EMBODIMENTS

Hereinafter, exemplary embodiments will be described more fully with reference to the accompanying drawings.

Figure 1:
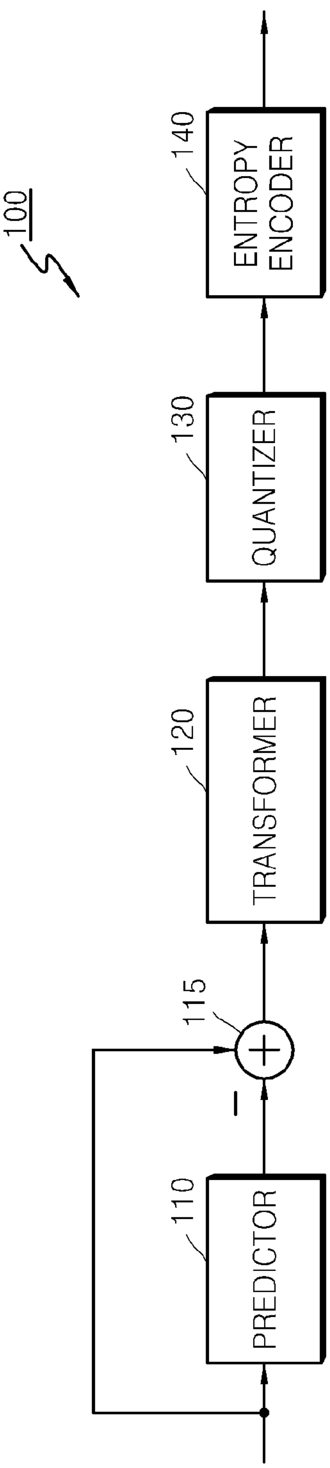
FIG. 1 is a block diagram of an image encoding apparatus according to an exemplary embodiment.

FIG. 1 is a block diagram of an image encoding apparatus 100 according to an exemplary embodiment.

Referring to FIG. 1, the image encoding apparatus 100 includes a predictor 110, a subtracter 115, a transformer 120, a quantizer 130, and an entropy encoder 140.

The predictor 110 divides an input image into blocks having a predetermined size, and generates a prediction block by performing inter prediction or intra prediction on each block. In detail, the predictor 110 performs inter prediction for generating a prediction block through motion prediction and compensation processes, which generate a motion vector indicating a region similar to a current block within a predetermined search range of a reference picture that is pre-encoded and restored, and intra prediction for generating a prediction block by using data of an adjacent block that is adjacent to a current block.

The subtracter 115 generates a residual by subtracting the prediction block of the current block from original image data.

The transformer 120 transforms the residual to a frequency region. Specifically, exemplary embodiments provide a new discrete cosine transform (DCT) that may be applied to a block having a size of at least 16×16 by enlarging the DCT defined with respect to a block having a relatively small size, such as 4×4 or 8×8. As will be described later, the transformer 120 performs DCT according to addition and subtraction calculations based on an integer and a shift operation, instead of a floating point operation, by substituting elements of a transformation matrix used for DCT with rational numbers, thereby reducing calculation complexity while increasing an operation speed. Alternatively, the transformer 120 performs transformation based on a changed butterfly structure obtained by substituting a trigonometrical function component from among multiplication factors of a butterfly structure while performing a 1-dimensional (1D) DCT of the butterfly structure with a rational number, and replacing 4 multiplication operation and 2 addition operation processes of the butterfly structure with 3 multiplication operation and 3 addition operation processes, thereby reducing multiplication operations having high complexity in terms of hardware and reducing overall calculation complexity.

The quantizer 130 quantizes the transformed residual. Specifically, the quantizer 130 applies a predetermined scaling factor to a transformation value so as to reduce an error value between a value transformed by using the transformation matrix approximated by the transformer 120 and a value obtained via DCT based on an actual floating point operation. As such, the quantizer 130 reduces an error value between a result value obtained via DCT based on a floating point operation using a scaling factor and a result value obtained via approximated DCT based on a rational number. Details about scaling and quantizing processes will be described in detail later.

The entropy encoder 140 generates a bitstream by performing variable length encoding on quantized image data.

A method of transforming an image according to an exemplary embodiment will now be described in detail.

DCT is an effective coding technology for compressing an image. A spatial region of an image may be transformed to a frequency region by using the DCT, and since image data is not changed much, a low frequency, specifically 0 frequency (direct current (DC)) component, has a large value and a high frequency component has a relatively small value, and thus most information is pushed toward a low frequency. Thus, by performing a suitable quantization process, a compression image having a high compression rate and excellent quality may be obtained.

There are various DCT methods that may be used to encode an image. Examples of the DCT methods include a method of using an integer, which has a quick processing speed but low accuracy, and a method of using a floating point operation, which has a slow processing speed but high accuracy. Each DCT method is generally performed in a row unit and a column unit, i.e., in 1D DCT.

Figure 2:
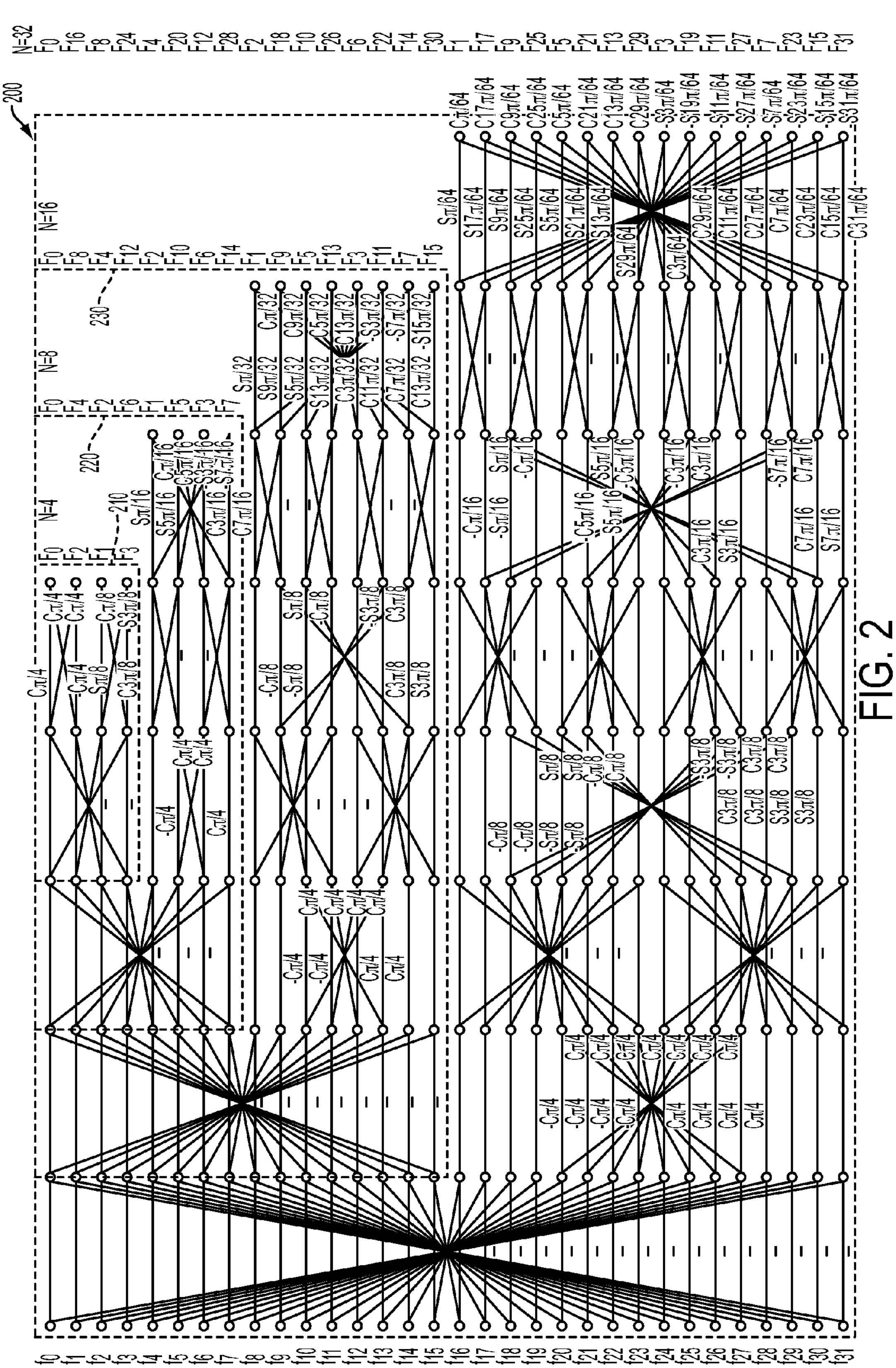
FIG. 2 is a flow graph of 4 point, 8 point, 16 point, and 32 point discrete cosine transform (DCT), according to an exemplary embodiment.

FIG. 2 is a flow graph 200 of 4 point, 8 point, 16 point, and 32 point DCT, according to an exemplary embodiment.

Referring to FIG. 2, f0 through f31 denote input values of 1D transform and at the same time, denote output values of 1D inverse transform. Also, F0 through F31 denote output values of 1D transform and at the same time, denote input values of 1D inverse transform. During transform, a data process direction is from left to right, and during inverse transform, a data process direction is from right to left. Two lines crossing at a point denote an addition of 2 numbers. A value above each line denotes a multiplication according to a corresponding coefficient. $c\theta$ denotes $\cos\theta$, $s\theta$ denotes $\sin\theta$, and '–' denotes negation. A reference numeral 210 indicated in a dotted line is a flow graph of 4 point 1D DCT, a reference numeral 220 indicated in a dotted line is a flow graph of 8 point 1D DCT, a reference numeral 230 indicated in a dotted line is a flow graph of 16 point 1D DCT, and a reference numeral 240 indicated in a dotted line is a flow graph of 32 point 1D DCT.

As shown in the flow graph 200, $c\theta$ and $s\theta$ may become irrational numbers according to a value of $\theta$ in the 1D DCT, and thus calculation complexity may increase. Accordingly, even if an input value is an integer, a final transform result value may be mapped in an irrational number. Such a process of the 1D DCT may increase complexity when realized using hardware. Accordingly, the method according to an exemplary embodiment provides a method of transforming to be close to a result value of original DCT by using coefficients substituted with rational numbers, instead of irrational numbers used for DCT.

Figure 3:
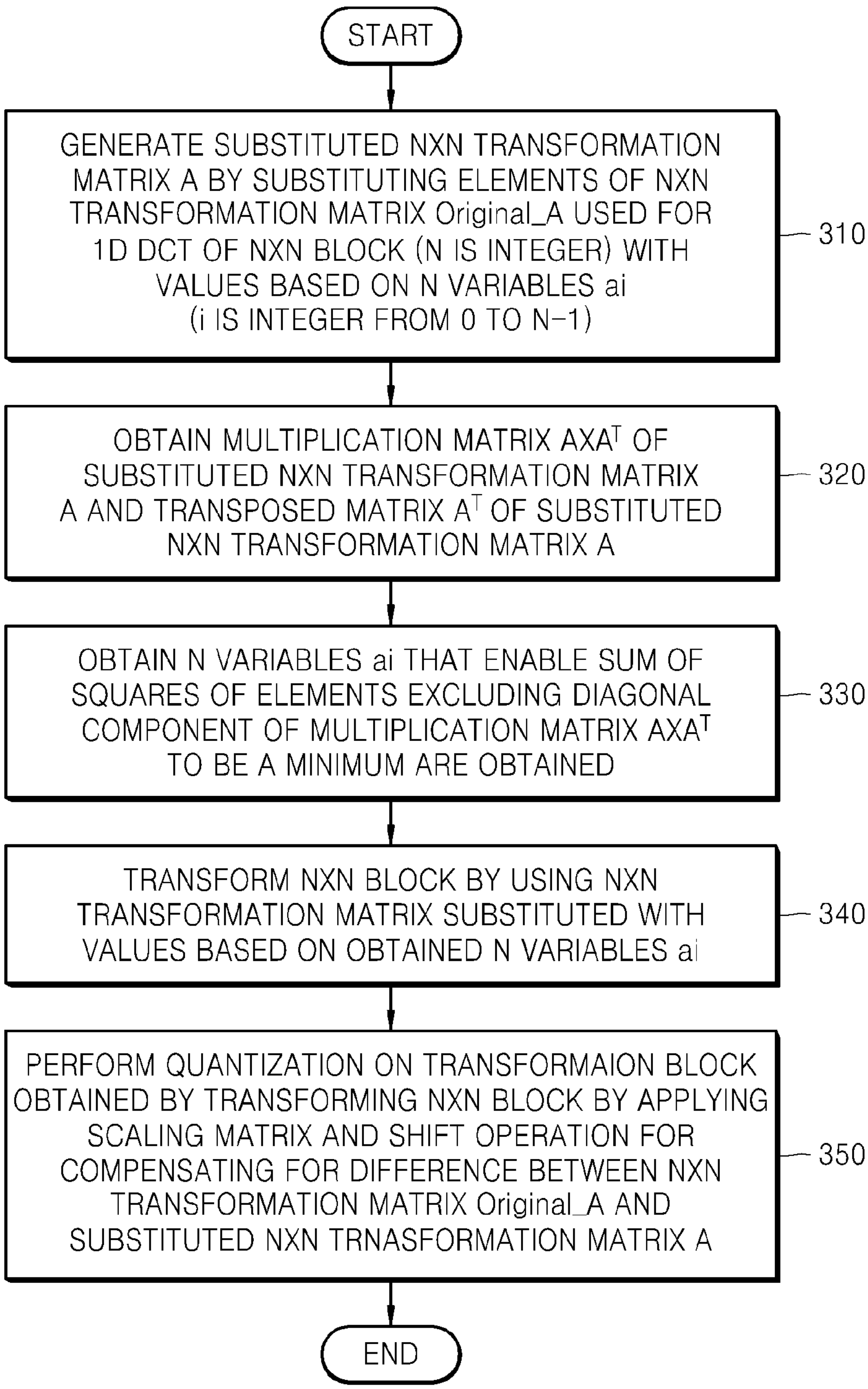
FIG. 3 is a flowchart illustrating a method of transforming an image, according to an exemplary embodiment.

FIG. 3 is a flowchart illustrating a method of transforming an image, according to an exemplary embodiment.

Referring to FIG. 3, a substituted N×N transformation matrix A is generated by substituting elements of an N×N transformation matrix Original_A used for 1D DCT of an N×N block, wherein N is an integer, with values based on N variables ai, wherein i is an integer from 0 to N−1.

Referring back to FIG. 2, when N is 16, i.e., when 1D DCT is performed on a 16×16 block, the 1D DCT is performed according to 16 row units and 16 column units of the 16×16 block according to the flow graph 230. When f=[f0, f1, f2, . . . , f14, f15]$^T$ denotes 16 input values, F=[F0, F1, F2, . . . , F14, F15]$^T$ denotes transform result values, and Original_A denotes a transformation matrix showing a transform process of the input values according to the flow graph 230, F=Original_A×f denotes the 1D DCT.

As described above, since cos θ and sin θ may become irrational numbers according to a value of θ, cos θ and sin θ included in the elements of the N×N transformation matrix Original_A are substituted with rational numbers. In detail, a component cos(π×(i/2)/N) of the elements of the N×N transformation matrix Original_A is substituted with N ai variables constituting rational numbers. In the above example, if N is 16, cos 0 is substituted with a0, cos(π×(1/2)/16) is substituted with a1, cos(π×(2/2)/16) is substituted with a2, cos (π×(3/2)/16) is substituted with a3, cos(π×(4/2)/16) is substituted with a4, cos(π×(5/2)/16) is substituted with a5, cos(π×(6/2)/16) is substituted with a6, cos(π×(7/2)/16) is substituted with a7, cos(π×(8/2)/16) is substituted with a8, cos(π×(9/2)/16) is substituted with a9, cos(π×(10/2)/16) is substituted with a10, cos(π×(11/2)/16) is substituted with a11, cos(π×(12/2)/16) is substituted with a12, cos(π×(13/2)/16) is substituted with a13, cos(π×(14/2)/16) is substituted with a14, and cos(π×(15/2)/16) is substituted with a15. Similarly, sin θ may be substituted with ai variables by using a relationship of sin θ=cos(90−θ).

FIG. 4 is a reference diagram showing the elements of the substituted N×N transformation matrix A, wherein a trigonometrical function component in an element of a 16×16 transformation matrix is substituted with variables. Referring to FIG. 4, elements of the 16×16 transformation matrix may be expressed in values based on 16 variables ai.

Referring back to FIG. 3, a multiplication matrix A×A$^T$ of the substituted N×N transformation matrix A and a transposed matrix A$^T$ of the substituted N×N transformation matrix A are obtained in operation 320.

One of conditions fulfilled by the substituted N×N transformation matrix A is orthogonality. In order for the substituted N×N transformation matrix A to be orthogonal, values of elements excluding a diagonal component of the multiplication matrix A×A$^T$ should be 0. Since the irrational numbers are substituted with variables ai constituting the rational numbers, the values of the elements excluding the diagonal component of the multiplication matrix A×A$^T$ may not be 0. However, for maximum orthogonality, the N variables ai that enable a sum of squares of the elements excluding the diagonal component of the multiplication matrix A×A$^T$ to be a minimum are obtained in operation 330. When a multiplication matrix of the transformation matrix of a 16×16 block as shown in FIG. 4 and a transposed matrix of the transformation matrix is obtained, a sum of squares of elements excluding a diagonal component of the multiplication matrix is represented by equation f below:

$$
\begin{aligned}
f=\;&128*a8^{4}*a15^{2}*a4^{2}*a11^{2}*a12^{2}+\\
&128*a8^{4}*a1^{2}*a4^{2}*a5^{2}*a12^{2}-\\
&64*a8^{2}*a13^{2}*a9^{2}-\\
&64*a5^{2}*a4^{4}*a7^{2}*a8^{2}+\\
&32*a11^{2}*a12^{2}*a9^{2}*a4^{2}+\\
&128*a8^{4}*a15^{2}*a12^{2}*a3^{2}*a4^{2}+\\
&64*a8^{4}*a5^{2}*a12^{4}*a7^{2}+\\
&64*a8^{4}*a5^{2}*a4^{4}*a7^{2}+\\
&128*a1^{2}*a4^{2}*a7^{2}*a8^{2}*a12^{2}+\\
&32*a15^{2}*a12^{2}*a9^{2}*a4^{2}-\\
&256*a8^{2}*a2^{2}*a6^{2}+256*a8^{4}*a14^{2}*a10^{2}-\\
&256*a14^{2}*a10^{2}*a8^{2}+16*a15^{2}*a13^{2}+\\
&16*a7^{2}*a12^{4}*a11^{2}+16*a9^{2}*a4^{4}*a5^{2}+\\
&16*a11^{2}*a4^{4}*a7^{2}+16*a5^{2}*a12^{4}*a9^{2}-\\
&64*a8^{2}*a11^{2}*a9^{2}-64*a8^{2}*a5^{2}*a7^{2}+\\
&64*a8^{4}*a5^{2}*a7^{2}+64*a8^{2}*a13^{2}*a11^{2}+\\
&64*a8^{4}*a13^{2}*a11^{2}-32*a11^{2}*a12^{2}*a13^{2}+\\
&16*a11^{2}*a12^{4}*a13^{2}-32*a5^{2}*a4^{2}*a3^{2}+\\
&16*a5^{2}*a4^{4}*a3^{2}-32*a3^{2}*a12^{2}*a5^{2}+\\
&16*a3^{2}*a12^{4}*a5^{2}-32*a13^{2}*a4^{2}*a11^{2}+\\
&64*a8^{2}*a3^{2}*a5^{2}+64*a8^{4}*a3^{2}*a5^{2}+\\
&16*a15^{2}*a11^{2}+16*a1^{2}*a5^{2}+\\
&64*a2^{2}*a10^{2}-32*a7^{2}*a12^{2}*a1^{2}+\\
&16*a7^{2}*a12^{4}*a1^{2}-32*a9^{2}*a4^{2}*a15^{2}+\\
&16*a9^{2}*a4^{4}*a15^{2}-32*a15^{2}*a12^{2}*a9^{2}+\\
&16*a15^{2}*a12^{4}*a9^{2}-32*a1^{2}*a4^{2}*a7^{2}+\\
&16*a1^{2}*a4^{4}*a7^{2}+64*a8^{2}*a15^{2}*a9^{2}+\\
&64*a8^{4}*a15^{2}*a9^{2}+64*a8^{2}*a1^{2}*a7^{2}+\\
&64*a8^{4}*a1^{2}*a7^{2}+64*a8^{4}*a13^{2}*a9^{2}+\\
&16*a15^{2}*a12^{4}*a11^{2}+16*a1^{2}*a4^{4}*a5^{2}+\\
&16*a15^{2}*a4^{4}*a11^{2}+16*a1^{2}*a12^{4}*a5^{2}-\\
&64*a8^{2}*a15^{2}*a5^{2}-64*a8^{2}*a1^{2}*a11^{2}+\\
&64*a8^{4}*a1^{2}*a11^{2}+64*a8^{2}*a13^{2}*a5^{2}+\\
&64*a8^{4}*a13^{2}*a5^{2}-32*a3^{2}*a12^{2}*a11^{2}+\\
&16*a3^{2}*a12^{4}*a11^{2}-32*a3^{2}*a4^{2}*a11^{2}+\\
&16*a3^{2}*a4^{4}*a11^{2}-32*a13^{2}*a4^{2}*a5^{2}+\\
&16*a13^{2}*a4^{4}*a5^{2}-32*a13^{2}*a12^{2}*a5^{2}+\\
&16*a13^{2}*a12^{4}*a5^{2}+16*a3^{2}*a12^{4}*a7^{2}+\\
&16*a13^{2}*a4^{4}*a9^{2}+16*a3^{2}*a4^{4}*a7^{2}+\\
&16*a13^{2}*a12^{4}*a9^{2}-64*a8^{2}*a3^{2}*a9^{2}+\\
&64*a8^{4}*a3^{2}*a9^{2}+64*a8^{4}*a13^{2}*a7^{2}+\\
&64*a8^{4}*a3^{2}*a11^{2}+16*a11^{2}*a9^{2}+\\
&16*a3^{2}*a7^{2}-64*a8^{2}*a15^{2}*a3^{2}+\\
&64*a8^{4}*a15^{2}*a3^{2}-64*a8^{2}*a1^{2}*a13^{2}+\\
&64*a8^{4}*a1^{2}*a13^{2}+16*a1^{2}*a4^{4}*a3^{2}+\\
&16*a15^{2}*a4^{4}*a13^{2}+16*a1^{2}*a12^{4}*a3^{2}+\\
&16*a15^{2}*a12^{4}*a13^{2}-256*a2^{2}*a10^{2}*a8^{2}+\\
&16*a15^{2}*a7^{2}+\\
&128*a8^{4}*a1^{2}*a4^{2}*a13^{2}*a12^{2}+\\
&16*a5^{2}*a9^{2}+16*a3^{2}*a5^{2}-\\
&64*a7^{2}*a12^{4}*a11^{2}*a8^{2}+\\
&64*a8^{4}*a7^{2}*a12^{4}*a11^{2}+\\
&64*a13^{2}*a4^{4}*a5^{2}*a8^{2}+\\
&32*a3^{2}*a4^{2}*a11^{2}*a12^{2}+\\
&64*a3^{2}*a4^{4}*a11^{2}*a8^{2}+\\
&64*a3^{2}*a12^{4}*a11^{2}*a8^{2}-\\
&128*a8^{4}*a13^{2}*a5^{2}*a4^{2}-\\
&128*a8^{4}*a13^{2}*a5^{2}*a12^{2}+\\
&32*a13^{2}*a12^{2}*a7^{2}*a4^{2}+64*a2^{2}*a6^{2}+\\
&64*a8^{4}*a11^{2}*a4^{4}*a7^{2}-\\
&128*a8^{4}*a15^{2}*a7^{2}*a12^{2}+\\
&32*a1^{2}*a4^{2}*a9^{2}*a12^{2}+\\
&64*a1^{2}*a4^{4}*a9^{2}*a8^{2}+\\
&64*a1^{2}*a12^{4}*a9^{2}*a8^{2}+\\
&32*a15^{2}*a12^{2}*a7^{2}*a4^{2}+\\
&64*a15^{2}*a12^{4}*a7^{2}*a8^{2}+\\
&64*a8^{4}*a15^{2}*a4^{4}*a7^{2}+\\
&16*a1^{2}*a4^{4}*a9^{2}-\\
&128*a1^{2}*a12^{2}*a5^{2}*a8^{2}*a4^{2}-\\
&128*a15^{2}*a4^{2}*a11^{2}*a8^{2}*a12^{2}-\\
&64*a1^{2}*a4^{4}*a5^{2}*a8^{2}+16*a15^{2}*a5^{2}+\\
&16*a13^{2}*a11^{2}+64*a14^{2}*a10^{2}+\\
&128*a3^{2}*a4^{2}*a11^{2}*a8^{2}*a12^{2}+\\
&16*a1^{2}*a12^{4}*a13^{2}+\\
&128*a13^{2}*a4^{2}*a11^{2}*a8^{2}*a12^{2}+\\
&128*a3^{2}*a12^{2}*a5^{2}*a8^{2}*a4^{2}-\\
&128*a3^{2}*a4^{2}*a7^{2}*a8^{2}*a12^{2}+\\
&16*a3^{2}*a9^{2}+32*a5^{2}*a4^{2}*a7^{2}*a12^{2}-\\
&128*a1^{2}*a12^{2}*a3^{2}*a8^{2}*a4^{2}+\\
&128*a1^{2}*a4^{2}*a9^{2}*a8^{2}*a12^{2}-\\
&128*a15^{2}*a12^{2}*a13^{2}*a8^{2}*a4^{2}+\\
&16*a15^{2}*a3^{2}+64*a5^{2}*a4^{4}*a3^{2}*a8^{2}-\\
&128*a11^{2}*a12^{2}*a13^{2}*a8^{2}+\\
&64*a11^{2}*a12^{4}*a13^{2}*a8^{2}-\\
&128*a8^{4}*a13^{2}*a11^{2}*a4^{2}-\\
&128*a8^{4}*a13^{2}*a11^{2}*a12^{2}+\\
&64*a8^{4}*a3^{2}*a12^{4}*a5^{2}-\\
&128*a3^{2}*a4^{2}*a9^{2}*a8^{2}*a12^{2}-\\
&128*a8^{2}*a1^{2}*a9^{2}*a4^{2}+
\end{aligned}
$$

64*a8^4*a5^2*a9^2+64*a8^4*a11^2*a7^2−
64*a8^2*a11^2*a7^2+16*a5^2*a4^4*a7^2+
16*a5^2*a12^4*a7^2+16*a11^2*a12^4*a9^2+
128*a8^4*a3^2*a12^2*a11^2*a4^2+
64*a8^4*a3^2*a4^4*a11^2+
64*a8^4*a3^2*a12^4*a11^2+16*a13^2*a5^2+
64*a8^4*a5^2*a4^4*a3^2+
128*a8^4*a3^2*a12^2*a5^2*a4^2+
256*a8^4*a14^2*a6^2+
64*a8^4*a3^2*a12^4*a7^2+
64*a8^4*a3^2*a4^4*a7^2−
256*a8^2*a14^2*a6^2+
32*a5^2*a12^2*a9^2*a4^2+
128*a15^2*a12^2*a7^2*a8^2*a4^2+
16*a15^2*a4^4*a7^2−32*a15^2*a4^2*a7^2+
64*a15^2*a4^4*a7^2*a8^2+
256*a8^4*a2^2*a10^2+
64*a8^4*a15^2*a12^4*a3^2+
64*a8^4*a15^2*a4^4*a3^2+
64*a8^4*a1^2*a4^4*a13^2+
64*a8^4*a1^2*a12^4*a13^2+
32*a1^2*a12^2*a5^2*a4^2−
64*a1^2*a12^4*a5^2*a8^2+
32*a15^2*a4^2*a11^2*a12^2−
64*a15^2*a4^4*a11^2*a8^2−
64*a15^2*a12^4*a11^2*a8^2+
64*a8^4*a15^2*a4^4*a11^2+
64*a8^4*a1^2*a4^4*a5^2+
64*a8^4*a1^2*a12^4*a5^2−
64*a8^2*a15^2*a13^2+64*a8^4*a15^2*a13^2−
64*a8^2*a1^2*a3^2+64*a8^4*a1^2*a3^2+
16*a15^2*a12^4*a3^2+16*a15^2*a4^4*a3^2+
16*a1^2*a4^4*a13^2−
128*a1^2*a12^2*a11^2*a8^2*a4^2−
64*a1^2*a4^4*a11^2*a8^2−
64*a13^2*a12^4*a7^2*a8^2−
64*a13^2*a4^4*a7^2*a8^2+
64*a8^4*a3^2*a7^2−64*a8^2*a3^2*a7^2+
16*a13^2*a12^4*a7^2+16*a3^2*a4^4*a9^2+
16*a3^2*a12^4*a9^2−
64*a15^2*a4^4*a5^2*a8^2−
64*a15^2*a12^4*a5^2*a8^2+
64*a8^4*a15^2*a12^4*a5^2+
64*a8^4*a15^2*a4^4*a5^2−
128*a1^2*a12^2*a13^2*a8^2*a4^2−
64*a1^2*a12^4*a13^2*a8^2−
64*a1^2*a4^4*a13^2*a8^2+16*a1^2*a3^2−
64*a8^2*a5^2*a9^2+16*a13^2*a7^2−
64*a1^2*a5^2*a8^2−64*a15^2*a11^2*a8^2+
64*a8^4*a1^2*a5^2+64*a8^4*a15^2*a11^2+
16*a1^2*a12^4*a11^2+16*a1^2*a4^4*a11^2−
128*a5^2*a12^2*a9^2*a8^2*a4^2−
128*a11^2*a4^2*a7^2*a8^2*a12^2−
64*a5^2*a12^4*a9^2*a8^2+
32*a11^2*a4^2*a7^2*a12^2−
64*a11^2*a4^4*a7^2*a8^2−
64*a9^2*a4^4*a5^2*a8^2+
64*a8^4*a15^2*a5^2−
128*a8^2*a1^2*a7^2*a4^2−
128*a8^2*a1^2*a7^2*a12^2−
128*a8^4*a1^2*a7^2*a12^2−
128*a8^4*a1^2*a7^2*a4^2−
128*a8^2*a15^2*a9^2*a12^2−
128*a8^2*a15^2*a9^2*a4^2−
128*a8^4*a15^2*a9^2*a4^2−
128*a8^4*a15^2*a9^2*a12^2+
32*a1^2*a4^2*a7^2*a12^2+
64*a1^2*a4^4*a7^2*a8^2+
128*a8^4*a5^2*a12^2*a7^2*a4^2+
128*a8^4*a15^2*a12^2*a13^2*a4^2+
64*a8^4*a9^2*a4^4*a15^2+
64*a8^4*a15^2*a12^4*a9^2+
64*a8^4*a3^2*a12^4*a9^2+
128*a8^4*a3^2*a4^2*a9^2*a12^2+
128*a8^4*a13^2*a4^2*a7^2*a12^2+
16*a13^2*a9^2+
128*a8^4*a7^2*a12^2*a11^2*a4^2+
64*a8^4*a5^2*a12^4*a9^2+
64*a8^4*a9^2*a4^4*a5^2+16*a5^2*a7^2+
64*a14^2*a6^2+32*a15^2*a4^2*a3^2*a12^2−
64*a15^2*a4^4*a3^2*a8^2−
64*a15^2*a12^4*a3^2*a8^2+
16*a15^2*a4^4*a5^2+16*a15^2*a12^4*a5^2+
32*a15^2*a4^2*a5^2*a12^2+
64*a8^4*a1^2*a4^4*a3^2+
64*a8^4*a1^2*a12^4*a3^2+
64*a8^4*a7^2*a12^4*a1^2+
128*a8^4*a7^2*a12^2*a1^2*a4^2+
32*a1^2*a12^2*a13^2*a4^2−
128*a8^2*a3^2*a11^2*a12^2−
128*a8^4*a3^2*a11^2*a12^2−
128*a8^4*a3^2*a11^2*a4^2+
32*a13^2*a12^2*a5^2*a4^2−
128*a13^2*a12^2*a5^2*a8^2+
64*a13^2*a12^4*a5^2*a8^2+
64*a8^2*a3^2*a11^2−
128*a8^2*a3^2*a11^2*a4^2+
128*a8^4*a9^2*a4^2*a15^2*a12^2+
64*a8^4*a15^2*a12^4*a11^2−
64*a1^2*a4^4*a3^2*a8^2+
64*a8^4*a15^2*a12^4*a13^2+
64*a8^4*a15^2*a4^4*a13^2+16*a1^2*a13^2+
64*a8^4*a11^2*a9^2+
128*a8^4*a15^2*a4^2*a7^2*a12^2+
64*a8^4*a15^2*a12^4*a7^2+
64*a8^4*a1^2*a12^4*a9^2+
64*a8^4*a1^2*a4^4*a9^2−
128*a15^2*a4^2*a5^2*a8^2*a12^2+
32*a15^2*a12^2*a13^2*a4^2−
64*a15^2*a12^4*a13^2*a8^2+
32*a1^2*a12^2*a3^2*a4^2−
64*a1^2*a12^4*a3^2*a8^2−
64*a15^2*a4^4*a13^2*a8^2+
64*a8^4*a13^2*a4^4*a5^2+
64*a8^4*a13^2*a12^4*a5^2+16*a3^2*a11^2−
64*a13^2*a12^4*a9^2*a8^2+
64*a8^4*a13^2*a4^4*a11^2+
64*a8^4*a11^2*a12^4*a13^2−
128*a11^2*a12^2*a9^2*a8^2*a4^2−
64*a11^2*a12^4*a9^2*a8^2−
64*a11^2*a4^4*a9^2*a8^2+
64*a8^4*a11^2*a4^4*a9^2+
64*a8^4*a11^2*a12^4*a9^2+
16*a11^2*a4^4*a9^2−
128*a5^2*a4^2*a7^2*a8^2*a12^2−
64*a5^2*a12^4*a7^2*a8^2+
128*a8^4*a15^2*a12^2*a5^2*a4^2+
128*a8^4*a11^2*a4^2*a9^2*a12^2+
16*a11^2*a7^2+
128*a8^4*a13^2*a4^2*a5^2*a12^2+
64*a8^4*a1^2*a4^4*a7^2−
128*a15^2*a4^2*a3^2*a8^2*a12^2+
16*a15^2*a9^2−128*a8^2*a3^2*a5^2*a12^2−
128*a8^2*a3^2*a5^2*a4^2−
128*a8^4*a3^2*a5^2*a12^2−
128*a8^4*a3^2*a5^2*a4^2+
32*a13^2*a4^2*a11^2*a12^2−
128*a13^2*a4^2*a11^2*a8^2+
64*a13^2*a4^4*a11^2*a8^2+
32*a3^2*a12^2*a5^2*a4^2+
64*a3^2*a12^4*a5^2*a8^2−
128*a13^2*a12^2*a7^2*a8^2*a4^2+
16*a13^2*a4^4*a7^2+
128*a8^4*a1^2*a4^2*a3^2*a12^2+
256*a8^4*a2^2*a6^2+16*a1^2*a11^2−
64*a3^2*a12^4*a7^2*a8^2+
64*a8^4*a13^2*a4^4*a9^2+
64*a8^4*a13^2*a12^4*a9^2+
128*a8^4*a1^2*a12^2*a9^2*a4^2+
16*a1^2*a7^2+
128*a15^2*a12^2*a9^2*a8^2*a4^2+
64*a15^2*a12^4*a9^2*a8^2+
64*a9^2*a4^4*a15^2*a8^2+
64*a7^2*a12^4*a1^2*a8^2+
128*a13^2*a12^2*a5^2*a8^2*a4^2−
128*a13^2*a4^2*a5^2*a8^2+
128*a8^4*a1^2*a4^2*a11^2*a12^2+
128*a8^4*a13^2*a4^2*a9^2*a12^2+
64*a8^4*a1^2*a9^2+64*a8^2*a1^2*a9^2+
64*a8^4*a15^2*a7^2+64*a8^2*a15^2*a7^2−
32*a1^2*a4^2*a9^2+16*a1^2*a12^4*a9^2−
32*a1^2*a12^2*a9^2+16*a15^2*a12^4*a7^2−
32*a15^2*a12^2*a7^2−
128*a13^2*a12^2*a9^2*a8^2*a4^2+
64*a8^4*a1^2*a4^4*a11^2+
64*a8^4*a1^2*a12^4*a11^2−

64*a8^2*a13^2*a7^2+
32*a13^2*a12^2*a9^2*a4^2+
32*a3^2*a4^2*a9^2*a12^2−
64*a3^2*a4^4*a9^2*a8^2−
64*a3^2*a12^4*a9^2*a8^2+
64*a8^4*a3^2*a4^4*a9^2+
64*a8^4*a13^2*a4^4*a7^2+
64*a8^4*a13^2*a12^4*a7^2+
128*a8^4*a13^2*a4^2*a11^2*a12^2+
128*a8^4*a5^2*a12^2*a9^2*a4^2+
16*a13^2*a4^4*a11^2+
32*a1^2*a12^2*a11^2*a4^2−
64*a1^2*a12^4*a11^2*a8^2−
128*a8^2*a1^2*a9^2*a12^2−
128*a8^4*a1^2*a9^2*a12^2−
128*a8^4*a1^2*a9^2*a4^2−
128*a8^2*a15^2*a7^2*a12^2−
128*a8^2*a15^2*a7^2*a4^2+16*a1^2*a9^2−
128*a8^4*a15^2*a7^2*a4^2+
32*a3^2*a4^2*a7^2*a12^2−
64*a3^2*a4^4*a7^2*a8^2−
64*a13^2*a4^4*a9^2*a8^2+
128*a8^4*a3^2*a12^2*a7^2*a4^2

The variables ai that enable the value of f to be the minimum may be calculated by applying any optimum algorithm. While applying the optimum algorithm, the variables ai may be rational numbers, wherein a denominator has a value of a power of 2 capable of a shift operation. The variable ai is limited to a dyadic rational number because if the denominator is in a power of 2, the calculation may be performed by only using a right shift operation (>>).

For example, when N is 16, variables ai may be the following values by applying the optimum algorithm; a1=63/64, a2=62/64, a3=61/64, a4=59/64, a5=56/64, a6=53/64, a7=49/64, a8=45/64, a9=40/64, a10=35/64, a11=30/64, a12=24/64, a13=18/64, a14=12/64, and a15=6/64.

The N×N block is transformed in operation 340 by using the substituted N×N transformation matrix A substituted with the values based on the obtained N variables ai. In other words, if an input value is X, AX is calculated to perform N point 1D DCT. The substituted N×N transformation matrix A is stored in a predetermined memory after being obtained via above processes, and then may be applied to an input block having a predetermined size to transform the input block. In other words, a transformation matrix is not calculated every time for the transforming process, but transformation matrices that are pre-obtained and stored according to input blocks having various sizes may be used.

As described above, if N is 16, 1D DCT performed by using the substituted 16×16 transformation matrix A substituted with respect to the 16×16 block may be expressed according to the following operation processes, wherein X0 through X15 denote input values to be transformed, B0 through B15, C0 through C15, D0 through D15, E0 through E15, F0 through F15, and G0 through G15 denote intermediate values, and Y0 through Y15 denote transformed values:

B0=X0+X15; B15=X0−X15; B1=X1+X14; B14=X1−X14; B2=X2+X13;

B13=X2−X13; B3=X3+X12; B12=X3−X12; B4=X4+X11; B11=X4−X11;

B5=X5+X10; B10=X5−X10; B6=X6+X9; B9=X6−X9; B7=X7+X8;

B8=X7−X8; C7=B0−B7; C1=B1+B6; C6=B1−B6; C2=B2+B5; C5=B2−B5;

C3=B3+B4; C4=B3−B4; C8=B8; C14=B14; C10=(45*(B13−B10))>>6;

C13=(45*(B13+B10))>>6; C9=B9; C15=B15; C11=(45*(B12−B11))>>6

C12=(45*(B12+B11))>>6; D0=C0+C3; D3=C0−C3; D8=C8+C11;

D11=C8−C11; D12=C15−C12; D15=C15+C12; D1=C1+C2; D2=C1−C2;

D9=C9+C10; D10=C9−C10; D13=C14−C13; D14=C14+C13; D4=C4;

D5=(45*(C6−C5))>>6; D6=(45*(C6+C5))>>6;

D7=C7; E0=(45*(D0+D1))>>6; E1=(45*(D0−D1))>>6;

E2=(59*D3+24*D2)>>6; E3=(24*D3−59*D2)>>6; E4=D4+D5;

E5=D4−D5; E6=D7−D6; E7=D7+D6; E8=D8; E9=(24*D14−59*D9)>>6;

E10=(−59*D13−24*D10)>>6; E11=D11; E12=D12;

E13=(24*D13−59*D10)>>6; E14=(59*D14+24*D9)>>6; E15=D15

F0=E0; F1=E1; F2=E2; F3=E3; F4=(12*E4+62*E7)>>6

F5=(53*E5+35*E6)>>6; F6=(53*E6−35*E5)>>6

F7=(12*E7−62*E4)>>6; F8=E8+E9; F9=E8−E9; F10=E11−E10

F11=E11+E10; F12=E12+E13; F13=E12−E13; F14=E15−E14;

F15=E15+E14; G0=F0; G1=F1; G2=F2; G3=F3; G4=F4

G5=F5; G6=F6; G7=F7; G8=(6*F8+63*F15)>>6

G9=(49*F9+40*F14)>>6; G10=(30*F10+56*F13)>>6

G11=(61*F11+18*F12)>>6; G12=(61*F12−18*F11)>>6

G13=(30*F13−56*F10)>>6; G14=(49*F14−40*F9)>>6

G15=(6*F15−63*F8)>>6

Y0=G0; Y1=G8; Y2=G4; Y3=G12; Y4=G2; Y5=G10; Y6=G6

Y7=G14; Y8=G1; Y9=G9; Y10=G5; Y11=G13; Y12=G3

Y13=G11; Y14=G7; Y15=G15;

In the operation processes, if a result value is unchanging, for example, if the same values, such as F0=E0=G0=Y0, are continuously mapped, F0 may be directly mapped as a result value Y0 by omitting an intermediate process.

Also, in a right shift operation (>>) corresponding to a division in the operation processes, an x>>y operation may be substituted with a (x+(1<<(y−1)))>>y operation or a (abs(x)+(1<<(y−1)))>>y operation so as to reduce a rounding error.

Alternatively, if N is 32, like when N is 16, a substituted N×N transformation matrix A is generated by substituting elements of a 32×32 transformation matrix Original_A used for 1D DCT of a 32×32 block with values based on 32 variables ai, wherein i is an integer from 0 to 31. Referring back to FIG. 2, if N is 32, i.e., during the 1D DCT on a 32×32 block, the 1D DCT is performed according to 32 row units and 32 column units of the 32×32 block according to the flow graph 240. When f=[f0, f1, f2, . . . , f30, f31]$^T$ denote 32 input values, F=[F0, F1, F2, . . . , F30, F31]$^T$ denote transform result values, and Original_A denotes a transform matrix indicating a transforming process of the input values according to the flow graph 240, F=Original_A×f denotes the 1D DCT. A component constituting cos(π×(i/2)/32) (where i is an integer from 0 to 31) of elements of the 32×32 transformation matrix Original_A is substituted with 32 variables ai constituting rational numbers. A multiplication matrix A×A$^T$ of the substituted 32×32 transformation matrix A and a transposed matrix A$^T$ of the substituted 32×32 transformation matrix A is obtained, and 32 variables ai that enable a sum of squares of elements excluding a diagonal component of the elements of the multiplication matrix A×A$^T$ to be a minimum are obtained by applying an optimum algorithm.

When N is 32, the variables ai may have the following values, by applying the optimum algorithm: a1=255/256, a2=254/256, a3=253/256, a4=251/256, a5=248/256, a6=244/256, a7=241/256, a8=236/256, a9=231/256, a10=225/256, a11=219/256, a12=212/256, a13=205/256, a14=197/256, a15=189/256, a16=181/256, a17=171/256, a18=162/256, a19=152/256, a20=142/256, a21=131/256, a22=120/256, a23=109/256, a24=97/256, a25=86/256, a26=74/256, a27=62/256, a28=49/256, a29=37/256, a30=25/256, and a31=12/256.

The 32×32 block is transformed by using the substituted 32×32 transformation matrix A substituted with values based on the obtained 32 variables ai.

When N is 32, i.e., the 1D DCT performed by using the substituted 32×32 transformation matrix A may be expressed as the following operation processes, wherein X0 through X31 denote input values to be transformed, A0 through A31, B0 through B31, C0 through C31, D0 through D31, E0 through E31, F0 through F31, G0 through G31, and H0 through H31 denote intermediate values, and Y0 through Y31 denote transformed values:

A0=X0+X31; A31=X0−X31; A1=X1+X30; A30=X1−X30; A2=X2+X29;

A29=X2−X29; A3=X3+X28; A28=X3−X28; A4=X4+X27; A27=X4−X27

A5=X5+X26; A26=X5−X26; A6=X6+X25; A25=X6−X25; A7=X7+X24;

A24=X7−X24; A8=X8+X23; A23=X8−X23; A9=X9+X22; A22=X9−X22;

A10=X10+X21; A21=X10−X21; A11=X11+X20; A20=X11−X20;

A12=X12+X19; A19=X12−X19; A13=X13+X18; A18=X13−X18;

A14=X14+X17; A17=X14−X17; A15=X15+X16; A16=X15−X16;

B0=A0+A15; B15=A0−A15; B1=A1+A14; B14=A1−A14; B2=A2+A13;

B13=A2−A13; B3=A3+A12; B12=A3−A12; B4=A4+A11; B11=A4−A11;

B5=A5+A10; B10=A5−A10; B6=A6+A9; B9=A6−A9; B7=A7+A8;

B8=A7−A8; B16=A16; B28=A28; B20=(181*(A27−A20))>>8;

B27=(181*(A27+A20))>>8; B17=A17; B29=A29;

B21=(181*(A26−A21))>>8; B26=(181*(A26+A21))>>8;

B18=A18; B30=A30; B22=(181*(A25−A22))>>8;

B25=(181*(A25+A22))>>8; B19=A19; B31=A31;

B23=(181*(A24−A23))>>8; B24=(181*(A24+A23))>>8;

C0=B0+B7; C7=B0−B7; C1=B1+B6; C6=B1−B6; C2=B2+B5;

C5=B2−B5; C3=B3+B4; C4=B3−B4; C8=B8; C14=B14;

C10=(181*(B13−B10))>>8; C13=(181*(B13+B10))>>8;

C9=B9; C15=B15; 011=(181*(B12−B11))>>8;

C12=(181*(B12+B11))>>8; C16=B16+B23; C23=B16−B23;

C24=B31−B24; C31=B31+B24; C17=B17+B22; C22=B17−B22;

C25=B30−B25; C30=B30+B25; C18=B18+B21; C21=B18−B21;

C26=B29−B26; C29=B29+B26; C19=B19+B20; C20=B19−B20;

C27=B28−B27; C28=B28+B27; D0=C0+C3; D3=C0−C3; D8=C8+C11;

D11=C8−C11; D12=C15−C12; D15=C15+C12; D1=C1+C2; 2=C1−C2;

D9=C9+C10; D10=C9−C10; D13=C14−C13; D14=C14+C13; D4=C4;

D5=(181*(C6−C5))>>8; D6=(181*(C6+C5))>>8; D7=C7;

D16=C16; D18=(97*C29−236*C18)>>8; D20=(−236*C27−97*C20)>>8;

D22=C22; D24=C24; D26=(−236*C21+97*C26)>>8;

D28=(97*C19+236*C28)>>8; D30=C30; D17=C17;

D19=(97*C28−236*C19)>>8; D21=(−236*C26−97*C21)>>8;

D23=C23; D25=C25; D27=(−236*C20+97*C27)>>8;

D29=(97*C18+236*C29)>>8; D31=C31; E0=(181*(D0+D1))>>8;

E1=(181*(D0−D1))>>8; E2=(236*D3+97*D2)>>8;

E3=(97*D3−236*D2)>>8; E4=D4+D5; E5=D4−D5; E6=D7−D6;

E7=D7+D6; E8=D8; E9=(97*D14−236*D9)>>8;

E10=(−236*D13−97*D10)>>8; E11=D11; E12=D12;

E13=(97*D13−236*D10)>>8; E14=(236*D14+97*D9)>>8;

E15=D15; E16=D16+D19; E19=D16−D19; E20=D23−D20; E23=D23+D20;

E24=D24+D27; E27=D24−D27; E28=D31−D28; E31=D31+D28;

E17=D17+D18; E18=D17−D18; E21=D22−D21; E22=D22+D21;

E25=D25+D26; E26=D25−D26; E29=D30−D29; E30=D30+D29;

F0=E0; F1=E1; F2=E2; F3=E3; F4=(49*E4+251*E7)>>8;

F5=(212*E5+142*E6)>>8; F6=(212*E6−142*E5)>>8

F7=(49*E7−251*E4)>>8; F8=E8+E9; F9=E8−E9; F10=E11−E10;

F11=E11+E10; F12=E12+E13; F13=E12−E13; F14=E15−E14;

F15=E15+E14; F16=E16; F17=(49*E30−251*E17)>>8;

F18=(−251*E29−49*E18)>>8; F19=E19; F20=E20;

F21=(212*E26−142*E21)>>8; F22=(−142*E25−212*E22)>>8;

F23=E23; F24=E24; F25=(212*E25−142*E22)>>8;

F26=(142*E26+212*E21)>>8;

F27=E27; F28=E28; F29=(49*E29−251*E18)>>8;

F30=(251*E30+49*E17)>>8; F31=E31; G0=F0; G1=F1;

G2=F2; G3=F3; G4=F4; G5=F5; G6=F6; G7=F7;

G8=(25*F8+254*F15)>>8; G9=(197*F9+162*F14)>>8;

G10=(120*F10+225*F13)>>8; G11=(244*F11+74*F12)>>8;

G12=(244*F12−74*F11)>>8; G13=(120*F13−225*F10)>>8;

G14=(197*F14−162*F9)>>8; G15=(25*F15−254*F8)>>8;

G16=F16+F17; G17=F16-F17; G18=F19−F18; G19=F19+F18;

G20=F20+F21; G21=F20−F21; G22=F23−F22; G23=F23+F22;

G24=F24+F25; G25=F24−F25; G26=F27−F26; G27=F27+F26;

G28=F28+F29; G29=F28−F29; G30=F31−F30; G31=F31+F30;

H0=G0; H1=G1; H2=G2; H3=G3; H4=G4; H5=G5; H6=G6;

H7=G7; H8=G8; H9=G9; H10=G10; H11=G11; H12=G12;

H13=G13; H14=G14; H15=G15; H16=(12*G16+255*G31)>>8;

H17=(189*G17+171*G30)>>8; H18=(109*G18+231*G29)>>8;

H19=(241*G19+86*G28)>>8; H20=(62*G20+248*G27)>>8;

H21=(219*G21+131*G26)>>8; H22=(152*G22+205*G25)>>8;

H23=(253*G23+37*G24)>>8; H24=(253*G24−37*G23)>>8;

H25=(152*G25−205*G22)>>8; H26=(219*G26−131*G21)>>8;

H27=(62*G27−248*G20)>>8; H28=(241*G28−86*G19)>>8;

H29=(109*G29−231*G18)>>8; H30=(189*G30−171*G17)>>8;

H31=(12*G31−255*G16)>>8;

Y0=H0; Y1=H16; Y2=H8; Y3=H24; Y4=H4; Y5=H20;

Y6=H12; Y7=H28; Y8=H2; Y9=H18; Y10=H10; Y11=H26

Y12=H6; Y13=H22; Y14=H14; Y15=H30; Y16=H1;

Y17=H17; Y18=H9; Y19=H25; Y20=H5; Y21=H21;

Y22=H13; Y23=H29; Y24=H3; Y25=H19; Y26=H11; and

Y27=H27; Y28=H7; Y29=H23; Y30=H15; Y31=H31

Alternatively, when N is 64, a substituted 64×64 transformation matrix A is generated by substituting elements of a 64×64 transformation matrix Original_A used for 1D DCT of a 64×64 block with values based on 64 variables ai, wherein i is an integer from 0 to 63, a multiplication matrix $A\times A^T$ of the substituted 64×64 transformation matrix A and a transposed matrix $A^T$ of the substituted 64×64 transformation matrix A is obtained, and 64 variables ai that enable a sum of squares of elements excluding a diagonal component of the elements of the multiplication matrix $A\times A^T$ to be a minimum are obtained by applying an optimum algorithm.

When N is 64, the variables ai may have the following values by applying the optimum algorithm: a1=1024/1024, a2=1023/1024, a3=1021/1024, a4=1019/1024, a5=1016/1024, a6=1013/1024, a7=1009/1024, a8=1004/1024, a9=999/1024, a10=993/1024, a11=987/1024, a12=980/1024, a13=972/1024, a14=964/1024, a15=955/1024, a16=946/1024, a17=936/1024, a18=926/1024, a19=915/1024, a20=903/1024, a21=891/1024, a22=878/1024, a23=865/1024, a24=851/1024, a25=837/1024, a26=822/1024, a27=807/1024, a28=792/1024, a29=775/1024, a30=759/1024, a31=742/1024, a32=724/1024, a33=706/1024, a34=688/1024, a35=669/1024, a36=650/1024, a37=630/1024, a38=610/1024, a39=590/1024, a40=569/1024, a41=548/1024, a42=526/1024, a43=505/1024, a44=483/1024, a45=460/1024, a46=438/1024, a47=415/1024, a48=392/1024, a49=369/1024, a50=345/1024, a51=321/1024, a52=297/1024, a53=273/1024, a54=249/1024, a55=224/1024, a56=200/1024, a57=175/1024, a58=150/1024, a59=125/1024, a60=100/1024, a61=75/1024, a62=50/1024, and a63=25/1024.

The 64×64 block is transformed by using the substituted 64×64 transformation matrix A substituted with values based on the obtained 64 variables ai.

When N is 64, i.e., 1D DCT performed by using the substituted 64×64 transformation matrix A substituted with respect to the 64×64 block may be expressed according to the following operation processes, wherein X0 through X63 denote input values to be transformed, A0 through B63, B0 through B63, C0 through C63, D0 through D63, E0 through E63, F0 through F63, G0 through G63, H0 through H63, I0 through I63, and O0 through O63 denote intermediate values, and Y0 through Y63 denote transformed values:

O0=X0+X63; O63=X0−X63; O1=X1+X62; O62=X1−X62; O2=X2+X61; O61=X2−X61; O3=X3+X60; O60=X3−X60; O4=X4+X59; O59=X4−X59; O5=X5+X58; O58=X5−X58; O6=X6+X57; O57=X6−X57; O7=X7+X56; O56=X7−X56; O8=X8+X55; O55=X8−X55; O9=X9+X54; O54=X9−X54; O10=X10+X53; O53=X10−X53; O11=X11+X52; O52=X11−X52; O12=X12+X51; O51=X12−X51; O13=X13+X50; O50=X13−X50; O14=X14+X49; O49=X14−X49; O15=X15+X48; O48=X15−X48; O16=X16+X47; O47=X16−X47; O17=X17+X46; O46=X17−X46; O18=X18+X45; O45=X18−X45; O19=X19+X44; O44=X19−X44; O20=X20+X43; O43=X20−X43; O21=X21+X42; O42=X21−X42; O22=X22+X41; O41=X22−X41; O23=X23+X40; O40=X23−X40; O24=X24+X39; O39=X24−X39; O25=X25+X38; O38=X25−X38; O26=X26+X37; O37=X26−X37; O27=X27+X36; O36=X27−X36; O28=X28+X35; O35=X28−X35; O29=X29+X34; O34=X29−X34; O30=X30+X33; O33=X30−X33; O31=X31+X32; O32=X31−X32; A0=O0+O31; A31=O0−O31; A1=O1+O30; A30=O1−O30; A2=O2+O29; A29=O2−O29; A3=O3+O28; A28=O3−O28; A4=O4+O27; A27=O4−O27; A5=O5+O26; A26=O5−O26; A6=O6+O25; A25=O6−O25; A7=O7+O24; A24=O7−O24; A8=O8+O23; A23=O8−O23; A9=O9+O22; A22=O9−O22; A10=O10+O21; A21=O10−O21; A11=O11+O20; A20=O11−O20; A12=O12+O19; A19=O12−O19; A13=O13+O18; A18=O13−O18; A14=O14+O17; A17=O14−O17; A15=O15+O16; A16=O15−O16; A32=O32; A56=O56; A40=(724*(O55−O40))>>10; A55=(724*(O55+040))>>10; A33=O33; A57=O57; A41=(724*(O54−O41))>>10; A54=(724*(O54+O41))>>10; A34=O34; A58=O58; A42=(724*(O53−O42))>>10; A53=(724*(O53+O42))>>10; A35=O35; A59=O59; A43=(724*(O52−O43))>>10; A52=(724*(O52+O43))>>10; A36=O36; A60=O60; A44=(724*(O51−O44))>>10; A51=(724*(O51+O44))>>10; A37=O37; A61=O61; A45=(724*(O50−O45))>>10; A50=(724*(O50+O45))>>10; A38=O38; A62=O62; A46=(724*(O49−O46))>>10; A49=(724*(O49+O46))>>10; A39=O39; A63=O63; A47=(724*(O48−O47))>>10; A48=(724*(O48+O47))>>10; B0=A0+A15; B15=A0−A15; B1=A1+A14; B14=A1−A14; B2=A2+A13; B13=A2−A13; B3=A3+A12; B12=A3−A12; B4=A4+A11; B11=A4−A11; B5=A5+A10; B10=A5−A10; B6=A6+A9; B9=A6−A9; B7=A7+A8; B8=A7−A8; B16=A16; B28=A28; B20=(724*(A27−A20))>>10; B27=(724*(A27+A20))>>10; B17=A17; B29=A29; B21=(724*(A26−A21))>>10; B26=(724*(A26+A21))>>10; B18=A18; B30=A30; B22=(724*(A25−A22))>>10; B25=(724*(A25+A22))>>10; B19=A19; B31=A31; B23=(724*(A24−A23))>>10; B24=(724*(A24+A23))>>10; B32=A32+A47; B47=A32−A47; B48=A63−A48; B63=A63+A48; B33=A33+A46; B46=A33−A46; B49=A62−A49; B62=A62+A49; B34=A34+A45; B45=A34−A45; B50=A61−A50; B61=A61+A50; B35=A35+A44; B44=A35−A44; B51=A60−A51; B60=A60+A51; B36=A36+A43; B43=A36−A43; B52=A59−A52; B59=A59+A52; B37=A37+A42; B42=A37−A42; B53=A58−A53; B58=A58+A53; B38=A38+A41; B41=A38−A41; B54=A57−A54; B57=A57+A54; B39=A39+A40; B40=A39−A40; B55=A56−A55; B56=A56+A55; C0=B0+B7; C7=B0−B7; C1=B1+B6; C6=B1−B6; C2=B2+B5; C5=B2−B5; C3=B3+B4; C4=B3−B4; C8=B8; C14=B14; C10=(724*(B13−B10))>>10; C13=(724*(B13+B10))>>10; C9=B9; C15=B15; O11=(724*(B12−B11))>>10; C12=(724*(B12+B11))>>10; C16=B16+B23; C23=B16−B23; C24=B31−B24; C31=B31+B24; C17=B17+B22; C22=B17−B22; C25=B30−B25; C30=B30+B25; C18=B18+B21; C21=B18−B21; C26=B29−B26; C29=B29+B26; C19=B19+B20; C20=B19−B20; C27=B28−B27; C28=B28+B27; C32=B32; C36=(392*B59−946*B36)>>10; C40=(−946*B55−392*B40)>>10; C44=B44; C48=B48; C52=(−946*B43+392*B52)>>10; C56=(392*B39+946*B56)>>10; C60=B60; C33=B33; C37=(392*B58−946*B37)>>10; C41=(−946*B54−392*B41)>>10; C45=B45; C49=B49; C53=(−946*B42+392*B53)>>10; C57=(392*B38+946*B57)>>10;

C61=B61; C34=B34; C38=(392*B57−946*B38)>>10; C42=(−946*B53−392*B42)>>10; C46=B46; C50=B50; C54=(−946*B41+392*B54)>>10; C58=(392*B37+946*B58)>>10; C62=B62; C35=B35; C39=(392*B56−946*B39)>>10; C43=(−946*B52−392*B43)>>10; C47=B47; C51=B51; C55=(−946*B40+392*B55)>>10; C59=(392*B36+946*B59)>>10; C63=B63; D0=C0+C3; D3=C0−C3; D8=C8+C11; D11=C8−C11; D12=C15−C12; D15=C15+C12; D1=C1+C2; D2=C1−C2; D9=C9+C10; D10=C9−C10; D13=C14−C13; D14=C14+C13; D4=C4; D5=(724*(C6−C5))>>10; D6=(724*(C6+C5))>>10; D7=C7; D16=C16; D18=(392*C29−946*C18)>>10; D20=(−946*C27−392*C20)>>10; D22=C22; D24=C24; D26=(−946*C21+392*C26)>>10; D28=(392*C19+946*C28)>>10; D30=C30; D17=C17; D19=(392*C28−946*C19)>>10; D21=(−946*C26−392*C21)>>10; D23=C23; D25=C25; D27=(−946*C20+392*C27)>>10; D29=(392*C18+946*C29)>>10; D31=C31; D32=C32+C39; D39=C32−C39; D40=C47−C40; D47=C47+C40; D48=C48+C55; D55=C48−C55; D56=C63−C56; D63=C63+C56; D33=C33+C38; D38=C33−C38; D41=C46−C41; D46=C46+C41; D49=C49+C54; D54=C49−C54; D57=C62−O57; D62=C62+C57; D34=C34+C37; D37=C34−C37; D42=C45−C42; D45=C45+C42; D50=C50+C53; D53=C50−C53; D58=C61−C58; D61=C61+C58; D35=C35+C36; D36=C35−C36; D43=C44−C43; D44=C44+C43; D51=C51+C52; D52=C51−C52; D59=C60−C59; D60=C60+C59; E0=(724*(D0+D1))>>10; E1=(724*(D0−D1))>>10; E2=(946*D3+392*D2)>>10; E3=(392*D3−946*D2)>>10; E4=D4+D5; E5=D4−D5; E6=D7−D6; E7=D7+D6; E8=D8; E9=(392*D14−946*D9)>>10; E10=(−946*D13−392*D10)>>10; E11=D11; E12=D12; E13=(392*D13−946*D10)>>10; E14=(946*D14+392*D9)>>10; E15=D15; E16=D16+D19; E19=D16−D19; E20=D23−D20; E23=D23+D20; E24=D24+D27; E27=D24−D2; E28=D31−D28; E31=D31+D28; E17=D17+D18; E18=D17−D18; E21=D22−D21; E22=D22+D21; E25=D25+D26; E26=D25−D26; E29=D30−D29; E30=D30+D29; E32=D32; E33=D33; E34=(200*D61−1004*D34)>>10; E35=(200*D60−1004*D35)>>10; E36=(−1004*D59−200*D36)>>10; E37=(−1004*D58−200*D37)>>10; E38=D38; E39=D39; E40=D40; E41=D41; E42=(851*D53−569*D42)>>10; E43=(851*D52−569*D43)>>10; E44=(−569*D51−851*D44)>>10; E45=(−569*D50−851*D45)>>10; E46=D46; E47=D47; E48=D48; E49=D49; E50=(851*D50−569*D45)>>10; E51=(851*D51−569*D44)>>10; E52=(569*D52+851*D43)>>10; E53=(569*D53+851*D42)>>10; E54=D54; E55=D55; E56=D56; E57=D57; E58=(200*D58−1004*D37)>>10; E59=(200*D59−1004*D36)>>10; E60=(1004*D60+200*D35)>>10; E61=(1004*D61+200*D34)>>10; E62=D62; E63=D63; F0=E0; F1=E1; F2=E2; F3=E3; F4=(200*E4+1004*E7)>>10; F5=(851*E5+569*E6)>>10; F6=(851*E6−569*E5)>>10; F7=(200*E7−1004*E4)>>10; F8=E8+E9; F9=E8−E9; F10=E11−E10; F11=E11+E10; F12=E12+E13; F13=E12−E13; F14=E15−E14; F15=E15+E14; F16=E16; F17=(200*E30−1004*E17)>>10; F18=(−1004*E29−200*E18)>>10; F19=E19; F20=E20; F21=(851*E26−569*E21)>>10; F22=(−569*E25−851*E22)>>10; F23=E23; F24=E24; F25=(851*E25−569*E22)>>10; F26=(569*E26+851*E21)>>10; F27=E27; F28=E28; F29=(200*E29−1004*E18)>>10; F30=(1004*E30+200*E17)>>10; F31=E31; F32=E32+E35; F33=E33+E34; F34=E33−E34; F35=E32−E35; F36=E39−E36; F37=E38−E37; F38=E38+E37; F39=E39+E36; F40=E40+E43; F41=E41+E42; F42=E41−E42; F43=E40−E43; F44=E47−E44; F45=E46−E45; F46=E46+E45; F47=E47+E44; F48=E48+E51; F49=E49+E50; F50=E49−E50; F51=E48−E51; F52=E55−E52; F53=E54−E53; F54=E54+E53; F55=E55+E52; F56=E56+E59; F57=; E57+E58; F58=E57−E58; F59=E56−E59; F60=E63−E60; F61=E62−E61; F62=E62+E61; F63=E63+E60; G0=F0; G1=F1; G2=F2; G3=F3; G4=F4; G5=F5; G6=F6; G7=F7; G8=(100*F8+1019*F15)>>10; G9=(792*F9+650*F14)>>10; G10=(483*F10+903*F13)>>10; G11=(980*F11+297*F12)>>10; G12=(980*F12−297*F11)>>10; G13=(483*F13−903*F10)>>10; G14=(792*F14−650*F9)>>10; G15=(100*F15−1019*F8)>>10; G16=F16+F17; G17=F16−F17; G18=F19−F18; G19=F19+F18; G20=F20+F21; G21=F20−F21; G22=F23−F22; G23=F23+F22; G24=F24+F25; G25=F24−F25; G26=F27−F26; G27=F27+F26; G28=F28+F29; G29=F28−F29; G30=F31−F30; G31=F31+F30; G32=F32; G33=(100*F62−1019*F33)>>10; G34=(−1019*F61−100*F34)>>10; G35=F35; G36=F36; G37=(792*F58−650*F37)>>10; G38=(−650*F57−792*F38)>>10; G39=F39; G40=F40; G41=(483*F54−903*F41)>>10; G42=(−903*F53−483*F42)>>10; G43=F43; G44=F44; G45=(980*F50−297*F45)>>10; G46=(−297*F49−980*F46)>>10; G47=F47; G48=F48; G49=(980*F49−297*F46)>>10; G50=(297*F50+980*F45)>>10; G51=F51; G52=F52; G53=(483*F53−903*F42)>>10; G54=(903*F54+483*F41)>>10; G55=F55; G56=F56; G57=(792*F57−650*F38)>>10; G58=(650*F58+792*F37)>>10; G59=F59; G60=F60; G61=(100*F61−1019*F34)>>10; G62=(1019*F62+100*F33)>>10; G63=F63; H0=G0; H1=G1; H2=G2; H3=G3; H4=G4; H5=G5; H6=G6; H7=G7; H8=G8; H9=G9; H10=G10; H11=G11; H12=G12; H13=G13; H14=G14; H15=G15; H16=(50*G16+1023*G31)>>10; H17=(759*G17+688*G30)>>10; H18=(438*G18+926*G29)>>10; H19=(964*G19+345*G28)>>10; H20=(249*G20+993*G27)>>10; H21=(878*G21+526*G26)>>10; H22=(610*G22+822*G25)>>10; H23=(1013*G23+150*G24)>>10; H24=(1013*G24−150*G23)>>10; H25=(610*G25−822*G22)>>10; H26=(878*G26−526*G21)>>10; H27=(249*G27−993*G20)>>10; H28=(964*G28−345*G19)>>10; H29=(438*G29−926*G18)>>10; H30=(759*G30−688*G17)>>10; H31=(50*G31−1023*G16)>>10; H32=G32+G33; H33=G32−G33; H34=G35−G34; H35=G35+G34; H36=G36+G37; H37=G36−G37; H38=G39−G38; H39=G39+G38; H40=G40+G41; H41=G40−G41; H42=G43−G42; H43=G43+G42; H44=G44+G45; H45=G44−G45; H46=G47−G46; H47=G47+G46; H48=G48+G49; H49=G48−G49; H50=G51−G50; H51=G51+G50; H52=G52+G53; H53=G52−G53; H54=G55−G54; H55=G55+G54; H56=G56+G57; H57=G56−G57; H58=G59−G58; H59=G59+G58; H60=G60+G61; H61=G60−G61; H62=G63−G62; H63=G63+G62; I0=H0; I1=H1; I2=H2; I3=H3; I4=H4; I5=H5; I6=H6; I7=H7; I8=H8; I9=H9; I10=H10; I11=H11; I12=H12; I13=H13; I14=H14; I15=H15; I16=H16; I17=H17; I18=H18; I19=H19; I20=H20; I21=H21; I22=H22; I23=H23; I24=H24; I25=H25; I26=H26; I27=H27; I28=H28; I29=H29; I30=H30; I31=H31; I32=(25*H32+1024*H63)>>10; I33=(742*H33+706*H62)>>10; I34=(415*H34+936*H61)>>10; I35=(955*H35+369*H60)>>10; I36=(224*H36+999*H59)>>10; I37=(865*H37+548*H58)>>10; I38=(590*H38+837*H57)>>10; I39=(1009*H39+175*H56)>>10; I40=(125*H40+1016*H55)>>10; I41=(807*H41+630*H54)>>10; I42=(505*H42+891*H53)>>10; I43=

(987*H43+273*H52)>>10; I44=(321*H44+972*H51)>>10; I45=(915*H45+460*H50)>>10; I46=(669*H46+775*H49)>>10; I47=(1021*H47+75*H48)>>10; I48=(1021*H48−75*H47)>>10; I49=(669*H49−775*H46)>>10; I50=(915*H50−460*H45)>>10; I51=(321*H51−972*H44)>>10; I52=(987*H52−273*H43)>>10; I53=(505*H53−891*H42)>>10; I54=(807*H54−630*H41)>>10; I55=(125*H55−1016*H40)>>10; I56=(1009*H56−175*H39)>>10; I57=(590*H57−837*H38)>>10; I58=(865*H58−548*H37)>>10; I59=(224*H59−999*H36)>>10; I60=(955*H60−369*H35)>>10; I61=(415*H61−936*H34)>>10; I62=(742*H62−706*H33)>>10; I63=(25*H63−1024*H32)>>10; Y0=I0; Y1=I32; Y2=I16; Y3=I48; Y4=I8; Y5=I40; Y6=I24; Y7=I56; Y8=I4; Y9=I36; Y10=I20; Y11=I52; Y12=I12; Y13=I44; Y14=I28; Y15=I60; Y16=I2; Y17=I34; Y18=I18; Y19=I50; Y20=I10; Y21=I42; Y22=I26; Y23=I58; Y24=I6; Y25=I38; Y26=I22; Y27=I54; Y28=I14; Y29=I46; Y30=I30; Y31=I62; Y32=I1; Y33=I33; Y34=I17; Y35=I49; Y36=I9; Y37=I41; Y38=I25; Y39=I57; Y40=I5; Y41=I37; Y42=I21; Y43=I53; Y44=I13; Y45=I45; Y46=I29; Y47=I61; Y48=I3; Y49=I35; Y50=I19; Y51=I51; Y52=I11; Y53=I43; Y54=I27; Y55=I59; Y56=I7; Y57=I39; Y58=I23; Y59=I55; Y60=I15; Y61=I47; Y62=I31; Y63=I63

Referring back to FIG. 3, in operation 350, quantization is performed on a transformation block obtained by transforming the N×N block by applying a scaling matrix and a shift operation for compensating for a difference between the N×N transformation matrix Original_A and the substituted N×N transformation matrix A.

As described above, since cos θ and sin θ included in the N×N transformation matrix Original_A are substituted with the variables ai constituting the rational numbers, there is an error between result values of the N×N transformation matrix Original_A and the substituted N×N transformation matrix A. Thus, the error is minimized by applying the scaling matrix during a scaling process that is performed simultaneously with a quantization process.

Figure 5:
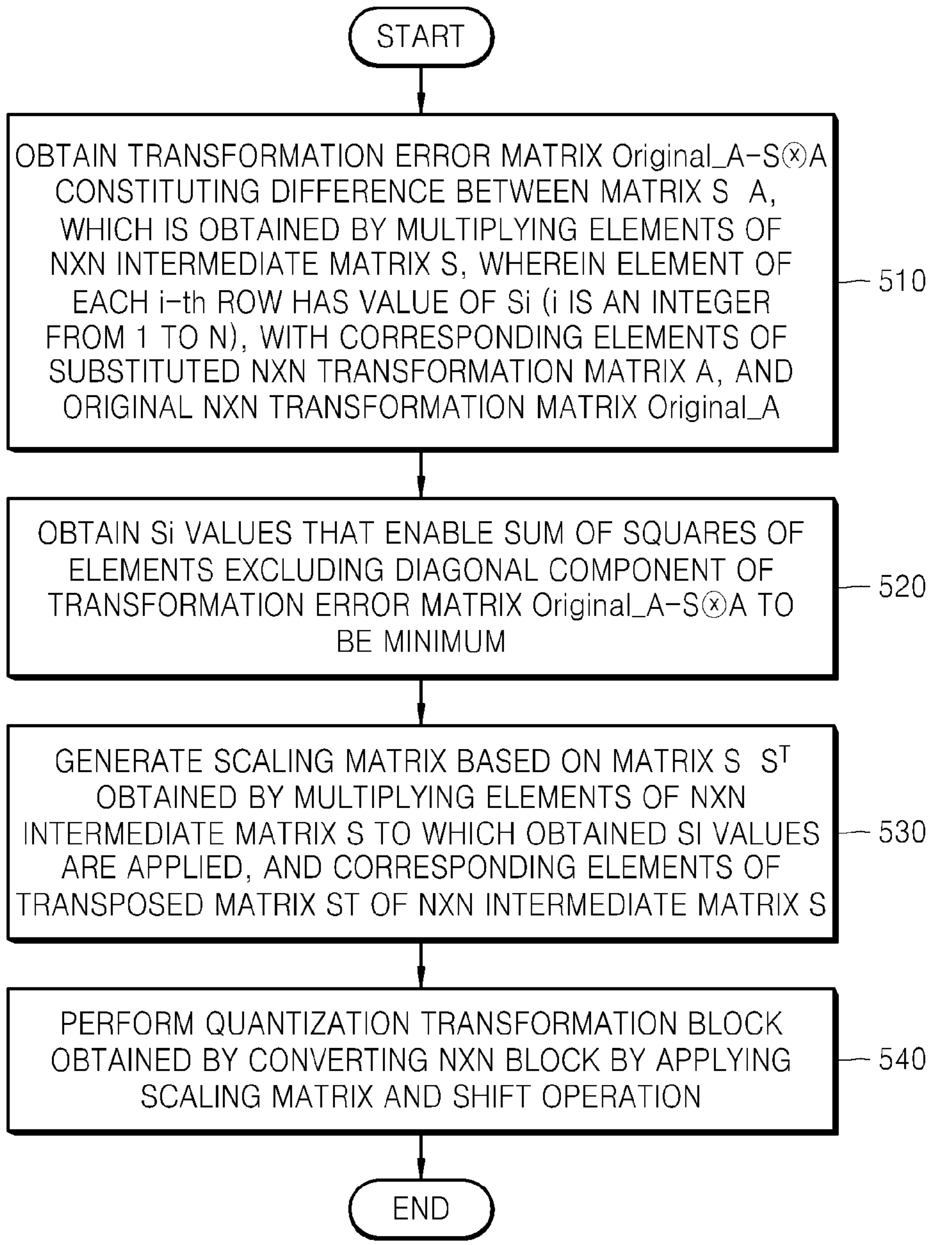
FIG. 5 is a flowchart of a quantization process according to an exemplary embodiment.

FIG. 5 is a flowchart of a quantization process according to an exemplary embodiment.

Referring to FIG. 5, in operation 510, a transformation error matrix Original_A−S$\otimes$A constituting a difference between matrix S$\otimes$A, which is obtained by multiplying elements of an N×N intermediate matrix S, wherein an element of each i-th row has a value of Si (i is an integer from 1 to N), with corresponding elements of a substituted N×N transformation matrix A, and an original N×N transformation matrix Original_A is obtained. $\otimes$ indicates an element-by-element multiplication (element-wise multiplication), and elements at the same locations in matrices are multiplied For example, a 16×16 intermediate matrix S is as follows.

$$S = \begin{pmatrix} S1 & S1 & \dots & S1 & S1 \\ S2 & S2 & \dots & S2 & S2 \\ \dots & \dots & \dots & \dots & \dots \\ S16 & S16 & \dots & S16 & S16 \end{pmatrix}$$

In operation 520, Si values that enable a sum of squares of elements excluding a diagonal component of the transformation error matrix Original_A−S$\otimes$A to be a minimum are obtained. The Si values may be determined by using any optimum algorithm. For example, an initial value of S1 may be (¼*2^(½)), and the Si values may be obtained by applying an optimum algorithm, such as a Nelder-Mead Simplex method.

In operation 530, a scaling matrix is generated based on a matrix S$\otimes$$S^T$ obtained by multiplying elements of the N×N intermediate matrix S to which the obtained Si values are applied, and corresponding elements of a transposed matrix $S^T$ of the N×N intermediate matrix S.

When PF denotes the matrix S$\otimes$$S^T$ and MF denotes the scaling matrix, the scaling matrix MF may be calculated according to; MF=PF*2^m/Qstep. Here, Qstep denotes a quantization step and m is a positive integer.

In operation 540, quantization is performed on a transformation block obtained by converting an N×N block by applying the scaling matrix MF and a shift operation. In detail, the quantization is performed by performing a bit shift operation on a value obtained by multiplying the scaling matrix MF and the transformation block and then adding a predetermined offset, by a q bit of the following equation: q=floor(QP/6)+m. When Zij denotes a quantized coefficient value, Wij denotes a transformation coefficient, and f denotes an offset, |Zij|=(|Wij|.MF+f)>>qbits and sign(|Zin|)=sign(|Wij|). Here, '.MF' denotes a vector product operation for multiplying the elements at the same locations in matrices. As described above, the vector product operation may be indicated as $\otimes$.

FIG. 7 illustrates a scaling matrix MF according to a quantization parameter QP used while transforming a 16×16 block, according to an exemplary embodiment. In FIG. 7, m is 10.

The scaling matrix MF shown in FIG. 7 is defined with respect to (0.625, 0.6875, 0.8125, 0.875, 1, 1.25), which are Qstep values of initial 6 steps without having to be defined with respect to all quantization steps Qstep, because when the quantization parameter QP increases by 6, the quantization step Qstep increases twice, and thus the scaling matrix MF may be defined with respect to the Qstep values of the initial 6 steps and the scaling matrix MF according to other quantization parameters QP may be selected according to a (QP mod 6) value.

Such a scaling matrix MF may be obtained for a 32×32 block or a 64×64 block in a similar manner as obtaining the scaling matrix MF for the 16×16 block. FIGS. 9 through 14 illustrate scaling matrices MF according to a quantization parameter QP applied to a 32×32 block, which are obtained as above. A scaling matrix MF according to a quantization parameter QP applied to a 64×64 block may be defined as follows.

<Examples of Scaling Matrix MF on 64×64 Block>

When m=11, Q0=102*ONES/Q1=93*ONES/Q2=79*ONES/Q3=73*ONES/Q4=64*ONES/Q5=57*ONES When m=10, Q0=51*ONES/Q1=47*ONES/Q2=39*ONES/Q3=37*ONES/Q4=32*ONES/Q5=28*ONES When m=9, Q0=26*ONES/Q1=23*ONES/Q2=20*ONES/Q3=18*ONES/Q4=16*ONES/Q5=14*ONES In the above examples, a value of # in Q# is (QP mod 6), and ONES denote a 64×64 matrix in which all elements are 1.

Meanwhile, in an inverse-quantization step, inverse-quantization is performed by applying an inverse-scaling matrix and a shift operation for compensating for a difference between an original N×N inverse transformation matrix used for discrete cosine inverse transform, and an N×N inverse transformation matrix constituting an inverse matrix of a substituted N×N transformation matrix.

According to an exemplary embodiment, an inverse-scaling matrix V may be generated based on the matrix PF that is also used to generate the scaling matrix MF, wherein the matrix PF is the matrix $S \otimes S^T$ obtained by multiplying the elements of the intermediate matrix S and the corresponding elements of the transposed matrix $S^T$ of the intermediate matrix S. In detail, when Qstep denotes the quantization step, PF denotes the matrix $S \otimes S^T$, and n is a positive integer, the inverse-scaling matrix V is obtained according to the following equation: V=Qstep*PF*2^n.

As described above, when the inverse-scaling matrix V is determined, the inverse quantization may be performed by performing a bit shift operation on a value obtained by multiplying the inverse-scaling matrix V and a quantized transformation coefficient, by a floor(QP/6) bit, wherein floor[x] is a maximum integer smaller than or equal to x and QP denotes a quantization parameter. In other words, when Zij denotes a quantized coefficient and Wij denotes a transformation coefficient, Wij obtained by inverse-quantizing the quantized coefficient Zij may be obtained according to the following equation: Wij=(Zij)<<floor(QP/6).

FIG. 8 illustrates an inverse-scaling matrix V according to a quantization parameter QP applied to a 16×16 block, according to an exemplary embodiment. In FIG. 8, m is 10. The inverse-scaling matrix V is defined with respect to (0.625, 0.6875, 0.8125, 0.875, 1, 1.25), which are Qstep values of initial 6 steps without having to be defined with respect to all quantization steps Qstep like the scaling matrix MF of FIG. 7. The inverse-scaling matrix V according to other quantization parameters QP may be selected according to a (QP mod 6) value.

Similarly, the inverse-scaling matrix V according to the quantization parameter QP applied to the 32×32 block and the 64×64 block may be obtained in a process similar to the inverse-scaling matrix V applied to the 16×16 block. FIGS. 94 through 99 illustrate inverse-scaling matrices V according to a quantization parameter QP applied to a 32×32 block, according to exemplary embodiments.

The inverse-scaling matrix V according to the quantization parameter

QP applied to the 64×64 block may be defined as follows.

<Examples of Inverse-Scaling Matrix V on 64×64 Block>

When n=11, Q0=40*ONES/Q1=44*ONES/Q2=52*ONES/Q3=56*ONES/Q4=64*ONES/Q5=72*ONES When n=10, Q0=20*ONES/Q1=22*ONES/Q2=26*ONES/Q3=28*ONES/Q4=32*ONES/Q5=36*ONES When n=9, Q0=10*ONES/Q1=11*ONES/Q2=13*ONES/Q3=14*ONES/Q4=16*ONES/Q5=18*ONES In the above examples, a value of # in Q# is a value of (QP mod 6) and ONES denotes a 64×64 matrix in which all elements are 1.

Figure 6:
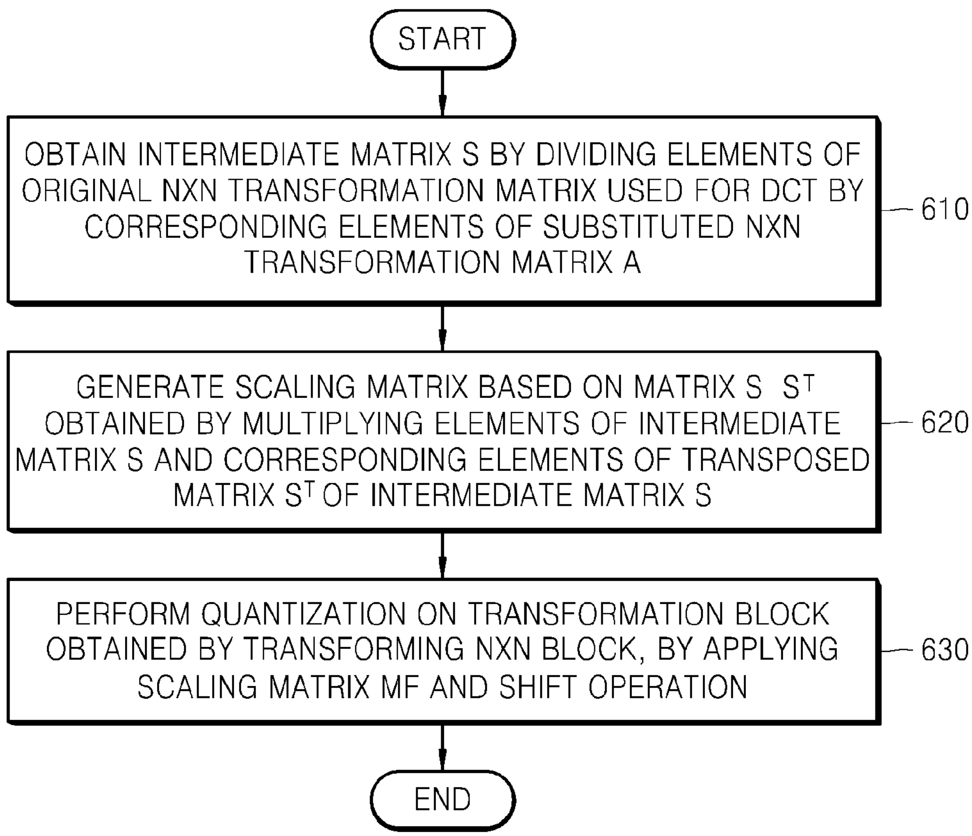
FIG. 6 is a flowchart of a quantization process according to another exemplary embodiment.

FIG. 6 is a flowchart of a quantization process according to another exemplary embodiment. The quantization process of FIG. 6 is similar to the quantization process of FIG. 5, except a process of generating an intermediate matrix S used to generate a scaling matrix.

In detail, referring to FIG. 6, in operation 610, an intermediate matrix S is obtained by dividing elements of an original N×N transformation matrix used for DCT by corresponding elements of a substituted N×N transformation matrix A.

In operation 620, a scaling matrix is generated based on a matrix $S \otimes S^T$ obtained by multiplying elements of the intermediate matrix S and corresponding elements of a transposed matrix $S^T$ of the intermediate matrix S. In detail, when PF denotes the matrix $S \otimes S^T$ and MF denotes the scaling matrix, the scaling matrix MF may be calculated according to the following equation: MF=PF*2^m/Qstep. Here, Qstep is a quantization step and m is a positive integer.

In operation 630, quantization is performed on a transformation block obtained by transforming an N×N block, by applying the scaling matrix MF and a shift operation. In detail, the quantization is performed by performing a bit shift operation on a value obtained by multiplying the scaling matrix MF and the transformation block and then adding a predetermined offset, by a q bit of an equation; q=floor(QP/6)+m. When Zij denotes a quantized coefficient value, Wij denotes a transformation coefficient, and f denotes an offset, |Zij|=(|Wij|.MF+f)>>qbits and sign(|Zin|)=sign(|Wij|). Here, '.MF' denotes a vector product operation for multiplying the elements at the same locations in matrices.

Figure 15:
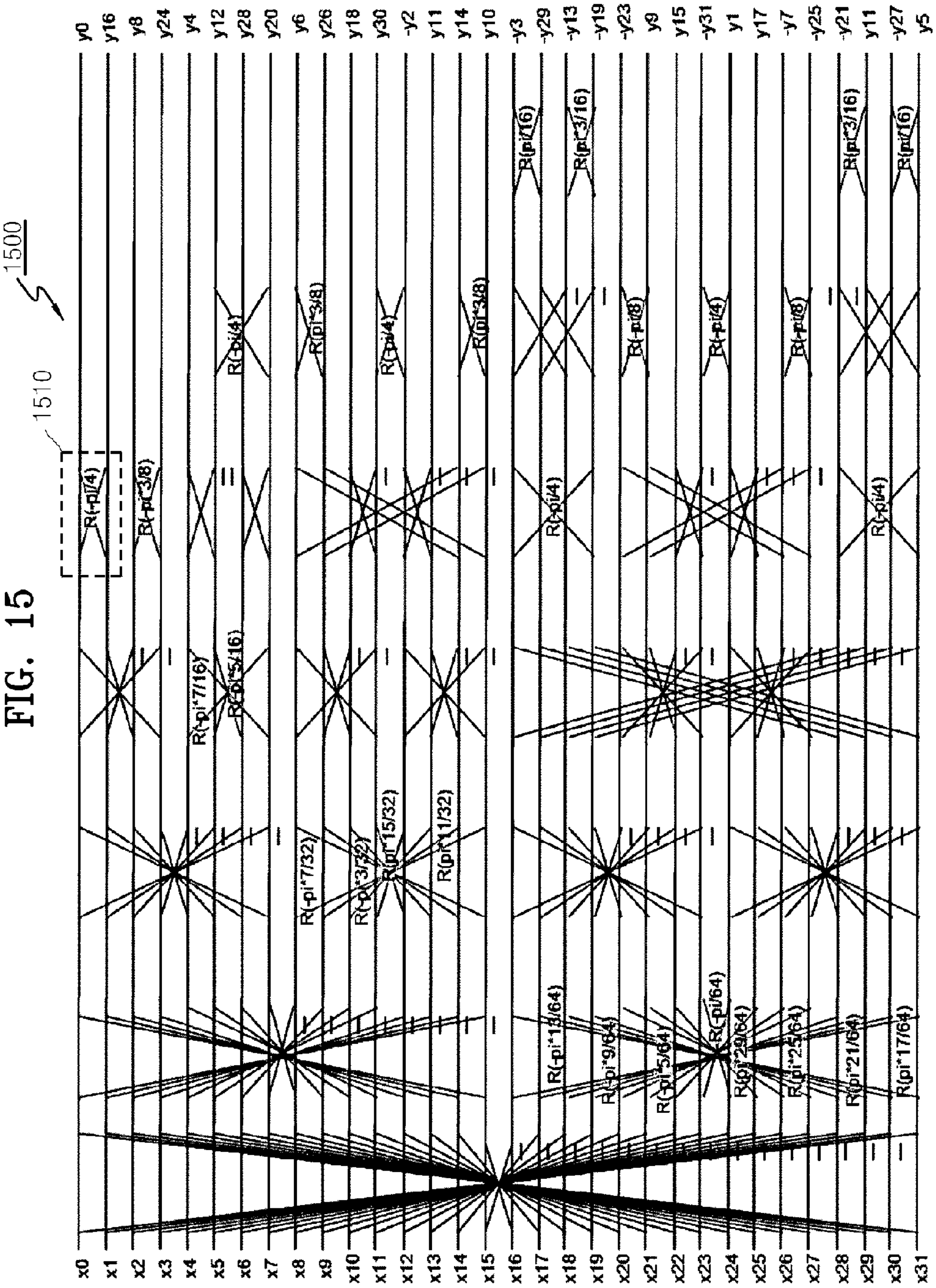
FIG. 15 is a flow graph of a 32 point DCT according to another exemplary embodiment.

FIG. 15 is a flow graph of a 32 point DCT according to another exemplary embodiment.

Referring to FIG. 15, x0 through x31 denote input values, and y0 through y31 denote output values of DCT. A data processing direction during transformation is from left to right, and a data processing direction during inverse-transformation is from right to left. Two lines crossing at a point denote an addition of two numbers, and '−' denotes a negation. A value R(θ) above each line denotes an operation process based on a butterfly structure as shown in FIG. 16.

Figure 16:
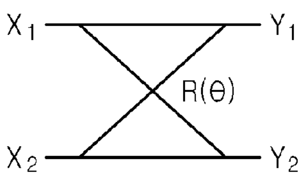
FIG. 16 is a reference diagram of an operation process of a butterfly structure forming the 32 point DCT of FIG. 15.

FIG. 16 is a reference diagram of the operation process of the butterfly structure forming the 32 point DCT of FIG. 15.

Referring to FIG. 16, the operation process of the butterfly structure outputs an output value [Y1, Y2] via the equation $$\begin{bmatrix} Y1 \\ Y2 \end{bmatrix} = \begin{bmatrix} \cos\theta & -\sin\theta \\ \sin\theta & \cos\theta \end{bmatrix} \begin{bmatrix} X1 \\ X2 \end{bmatrix},$$

with respect to an input value [X1,X2]. During the operation process of the butterfly structure, a total of 4 multiplication operations and 2 addition operations are performed while mapping 2 input values to 2 output values.

Generally, a multiplication operation is complex and consumes more operation time compared to addition, subtraction, and shift operations, and thus slows down an overall operation. Accordingly, a method of transforming an image, according to another exemplary embodiment, transforms an image based on a changed butterfly structure, wherein 4 multiplication and 2 addition operation processes based on a butterfly structure are replaced with 3 multiplication and 3 addition operation processes.

Figure 17:
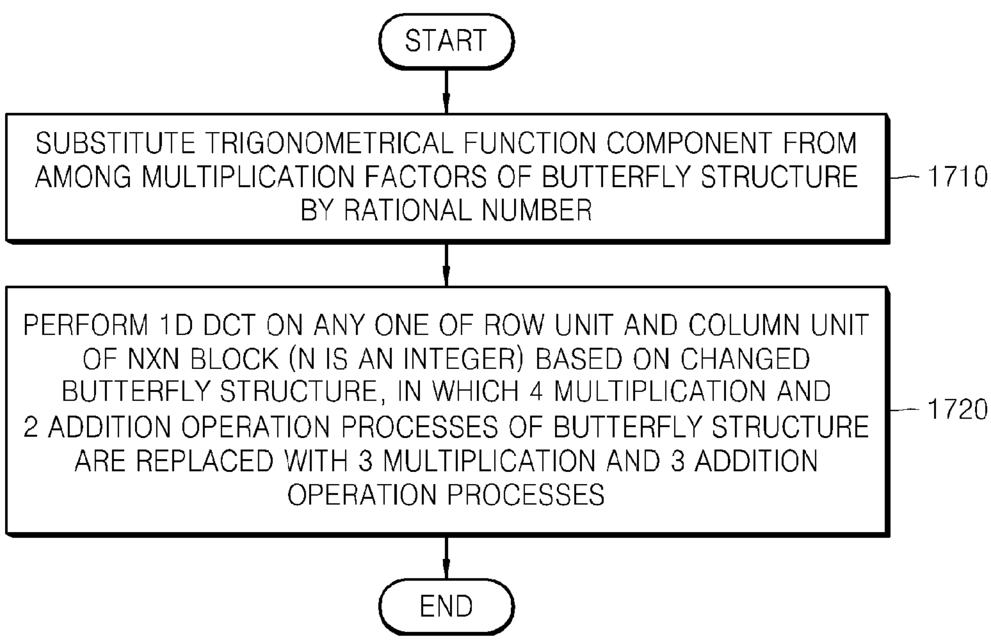
FIG. 17 is a flowchart illustrating a method of transforming an image, according to another exemplary embodiment.

FIG. 17 is a flowchart illustrating a method of transforming an image, according to another exemplary embodiment. Referring to FIG. 17, in operation 1710, a trigonometrical function component from among multiplication factors of a butterfly structure is substituted with a rational number. As described above, cos θ and sin θ are used according to R(θ) for the 32 point DCT as shown in FIG. 15. Alternatively, an approximated rational number as follows may be used as cos θ and sin θ according to a value of θ. In the approximated rational number, a denominator may use a dyadic rational number.

cos(pi/64)=255/256; sin(pi/64)=3/64; cos(pi*5/64)=31/32; sin(pi*5/64)=31/128; cos(pi*9/64)=231/256; sin(pi*9/64)=109/256; cos(pi*13/64)=205/256; sin(pi*13/64)=19/32; cos(pi*17/64)=171/256; sin(pi*17/64)=189/256; cos(pi*21/64)=131/256; sin(pi*21/64)=219/256; cos(pi*25/64)=43/128; sin(pi*25/64)=241/256; cos(pi*29/64)=37/256; sin (pi*29/64)=253/256; cos(pi*3/32)=61/64; sin(pi*3/32)=37/

128; cos(pi*7/32)=197/256; sin(pi*7/32)=81/128; cos(pi*11/32)=15/32; sin(pi*11/32)=225/256; cos(pi*15/32)=25/256; sin(pi*15/32)=127/128; cos(pi/16)=251/256; sin(pi/16)=49/256; cos(pi*3/16)=53/64; sin(pi*3/16)=71/128; cos(pi*5/16)=71/128; sin(pi*5/16)=53/64; cos(pi*7/16)=49/256; sin(pi*7/16)=251/256; cos(pi/8)=59/64; sin(pi/8)=97/256; cos(pi*3/8)=97/256; sin(pi*3/8)=59/64; cos(pi/4)=181/256; sin(pi/4)=181/256

In operation 1720, 1D DCT is performed on any one of a row unit and a column unit of an N×N block (N is an integer) based on a changed butterfly structure, in which 4 multiplication and 2 addition operation processes of a butterfly structure are replaced by 3 multiplication and 3 addition operation processes.

Figure 18:
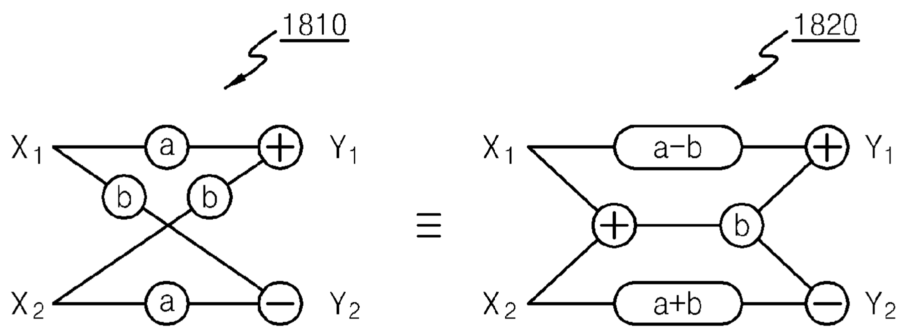
FIG. 18 is a diagram of a changed butterfly structure, according to an exemplary embodiment.

FIG. 18 is a diagram of a changed butterfly structure 1820, according to an exemplary embodiment. Referring to FIG. 18, output values Y1 and Y2 with respect to input values X1 and X2 according to an operation of a butterfly structure 1810 are calculated as follows:

$$Y1=a*X1+b*X2;\ Y2=b*X1-a*X2$$

In the butterfly structure 1810, a total of 4 multiplication and 2 addition or subtraction operations are required to obtain the output values Y1 and Y2. Meanwhile, output values Y1 and Y2 with respect to input values X1 and X2 according to an operation of the changed butterfly structure 1820 are calculated as follows:

$$Y1=X1*(a-b)+b*(X1+X2)=a*X1+b*X2;$$

$$Y2=b*(X1+X2)-X2*(a+b)=b*X1-a*X2$$

In the changed butterfly structure 1820, a total of 3 multiplication and 3 addition or subtraction operations are required since one multiplication operation is performed to calculate b*(X1+X2) and a result of b*(X1+X2) is used to calculate both the output values Y1 and Y2. Accordingly, an operation speed may be improved by reducing a complex multiplication operation process while having the same results by using the changed butterfly structure 1820. Meanwhile, when the changed butterfly structure 1820 is applied to the 32 point DCT of FIG. 15, a linear combination value of sine and cosine may be required. At this time, the following approximated rational numbers may be used.

cos(pi*30/64)=25/256; cos(pi*30/64)+sin(pi*30/64)=279/256; cos(pi*30/64)−sin(pi*30/64)=−229/256; cos(pi*12/64)=53/64; cos(pi*12/64)+sin(pi*12/64)=355/256; cos(pi*12/64)-sin(pi*12/64)=35/128; cos(pi*4/64)=251/256; cos(pi*4/64)+sin(pi*4/64)=301/256; cos(pi*4/64)−sin(pi*4/64)=201/256; cos(pi*24/64)=97/256; cos(pi*24/64)+sin(pi*24/64)=167/128; cos(pi*24/64)−sin(pi*24/64)=−69/128; cos(pi*8/64)=59/64; cos(pi*8/64)+sin(pi*8/64)=167/128; cos(pi*8/64)−sin(pi*8/64)=69/128; cos(pi*28/64)=49/256; cos(pi*28/64)+sin(pi*28/64)=301/256; cos(pi*28/64)−sin(pi*28/64)=−201/256; cos(pi*20/64)=71/128; cos(pi*20/64)+sin(pi*20/64)=355/256; cos(pi*20/64)−sin(pi*20/64)=−35/128

Figure 19:
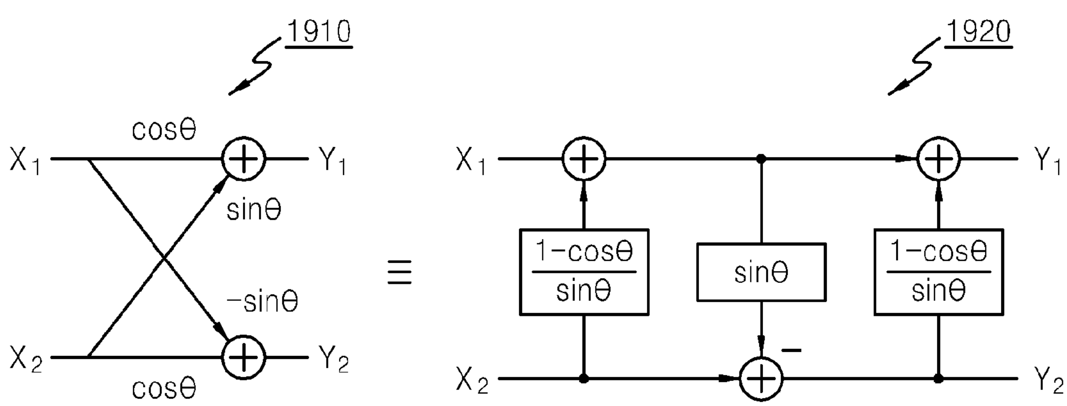
FIG. 19 is a diagram of a changed butterfly structure, according to another exemplary embodiment.

FIG. 19 is a diagram of a changed butterfly structure 1920, according to another exemplary embodiment. Referring to FIG. 19, output values Y1 and Y2 with respect to input values X1 and X1 according to an operation of a butterfly structure 1910 may be calculated as follows:

$$Y1=\cos\theta*X1+\sin\theta*X2;\ Y2=-\sin\theta*X1+\cos\theta*X2$$

In order to obtain the output values Y1 and Y2 in the operation of the butterfly structure 1910, a total of 4 multiplication and 2 addition or subtraction operations are required. When output values Y1 and Y2 with respect to input values X1 and X2 according to an operation of the changed butterfly structure 1920 are arranged by using a trigonometrical function formula, the changed butterfly structure 1920 outputs the same results as the butterfly structure 1910. A total of 3 multiplication and 3 addition or subtraction operations are required in an operation process of the changed butterfly structure 1920. Thus, an operation speed may be improved by reducing a complex multiplication operation process while having the same results by using the changed butterfly structure 1920. Meanwhile, when the changed butterfly structure 1920 is applied to the 32 point DCT of FIG. 15, fraction values and tangent values of sine and cosine may be required. At this time, approximated rational numbers as follows may be used.

(1−cos(pi*17/64))/sin(pi*17/64)=113/256; (1−cos(pi*13/64))/sin(pi*13/64)=21/64; (1−cos(pi*21/64))/sin(pi*21/64)=145/256; (1−cos(pi*9/64))/sin(pi*9/64)=57/256; (1−cos(pi*25/64))/sin(pi*25/64)=45/64; (1−cos(pi*5/64))/sin(pi*5/64)=31/256; (1−cos(pi*29/64))/sin(pi*29/64)=55/64; (1−cos(pi*1/64))/sin(pi*1/64)=3/128; (1−cos(pi*16/64))/sin(pi*16/64)=53/128; tan(pi*8/64)=53/128; sin(pi*8/64)*cos(pi*8/64)=45/128; tan(pi*4/64)=25/128; sin(pi*4/64)*cos(pi*4/64)=3/16; tan(pi*12/64)=171/256; sin(pi*12/64)*cos(pi*12/64)=59/128; tan(pi*16/64)=255/256; sin(pi*16/64)*cos(pi*16/64)=1/2; (1−cos(pi*7/32))/sin(pi*7/32)=91/256; sin(pi*7/32)=81/128; (1−cos(pi*11/32))/sin(pi*11/32)=153/256; sin(pi*11/32)=225/256; (1−cos(pi*3/32))/sin(pi*3/32)=37/256; sin(pi*3/32)=37/128; (1−cos(pi*15/32))/sin(pi*15/32)=29/32; sin(pi*15/32)=127/128; (1−cos(pi*6/32))/sin(pi*6/32)=77/256; sin(pi*6/32)=71/128; (1−cos(pi*2/32))/sin(pi*2/32)=25/256; sin(pi*2/32)=49/256; 1/tan(pi*3/8)=53/128; sin(pi*3/8)*cos(pi*3/8)=45/128

Figure 20:
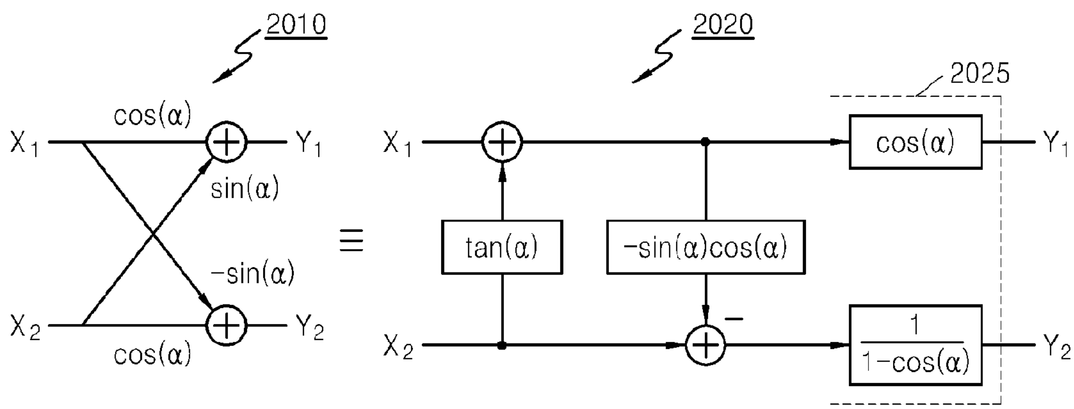
FIG. 20 is a diagram of a changed butterfly structure, according to another exemplary embodiment.

FIG. 20 is a diagram of a changed butterfly structure 2020, according to another exemplary embodiment. Referring to FIG. 20, a butterfly structure 2010 may be changed to the changed butterfly structure 2020 that outputs the same result. Alternatively, in the changed butterfly structure 2020, each operation result is multiplied by cos α and (1/(1−cos α)) as indicated by a reference numeral 2025 before output values Y1 and Y2 constituting final results are obtained. The multiplication operation indicated by the reference numeral 2025 is not performed during a transformation process, but reflected to a scaling matrix used during a quantization process. In other words, a multiplication factor indicated by the reference numeral 2025 is multiplied by each element of the scaling matrix so as to reduce a multiplication operation during the transformation operation, and the multiplication operation may be combined with the quantization process. As such, if the multiplication operation indicated by the reference numeral 2025 is combined with the quantization process and is skipped in the transformation operation, the changed butterfly structure 2020 may include only a total of 2 multiplication and 2 addition operations.

Figure 21:
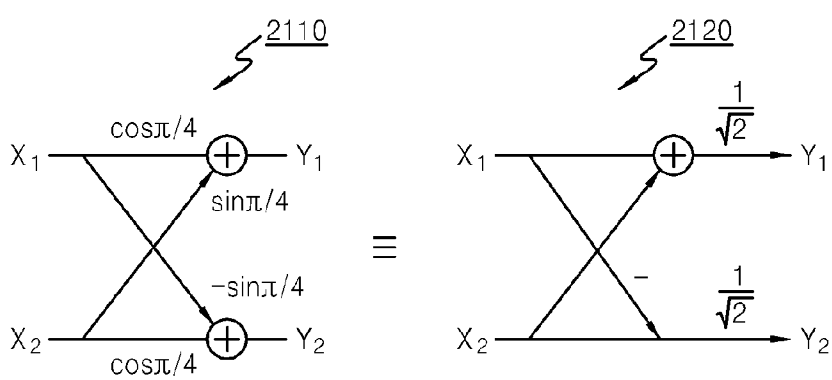
FIG. 21 is a diagram of a changed butterfly structure, according to another exemplary embodiment.

FIG. 21 is a diagram of a changed butterfly structure 2120, according to another exemplary embodiment. In FIG. 21, when θ of R(θ) corresponding to a variable has a special value, for example, when θ=π/4, the changed butterfly structure 2120 outputs the same results as a butterfly structure 2110. An operation process of the changed butterfly structure 2120 has less operations than an operation process of the butterfly structure 2110.

When X0 through X31 denote input values to be transformed, A0 through A31, B0 through B31, C0 through C31, D0 through D31, E0 through E31, and F0 through F31 denote intermediate values, t denotes an auxiliary variable, and Y0 through Y31 denote transformed values, the transformed values Y0 through Y31 may be obtained according to the following operation processes, if 32 point DCT is performed by applying the operation of the changed butterfly structure 1820 of FIG. 18 to the butterfly structure of FIG. 15:

A0=X0+X31; A31=X0−X31; A1=X1+X30; A30=X1−X30; A2=X2+X29; A29=X2−X29; A3=X3+X28; A28=X3−X28; A4=X4+X27; A27=X4−X27; A5=X5+X26; A26=X5−X26; A6=X6+X25; A25=X6−X25; A7=X7+X24; A24=X7−X24; A8=X8+X23; A23=X8−X23; A9=X9+X22; A22=X9−X22; A10=X10+X21; A21=X10−X21; A11=X11+X20; A20=X11−X20; A12=X12+X19; A19=X12−X19; A13=X13+X18; A18=X13−X18; A14=X14+X17; A17=X14−X17; A15=X15+X16; A16=X15−X16;

B0=A0+A15; B15=A0−A15; B1=A1+A14; B14=A1−A14; B2=A2+A13; B13=A2−A13; B3=A3+A12; B12=A3−A12; B4=A4+A11; B11=A4−A11; B5=A5+A10; B10=A5−A10; B6=A6+A9; B9=A6−A9; B7=A7+A8; B8=A7−A8;

t=((171*(A16+A31)>>8); B16=t−((361*A31)>>8); B31=t−((−17*A16)>>8);

t=((205*(A17+A30)>>8); B17=t−((53*A30)>>8); B30=t−((358*A17)>>8);

t=((131*(A18+A29)>>8); B18=t−((351*A29)>>8); B29=t−((−87*A18)>>8);

t=((231*(A19+A28)>>8); B19=t−((121*A28)>>8); B28=t−((340*A19)>>8);

t=((86*(A20+A27)>>8); B20=t−((327*A27)>>8); B27=t−((−77*A20)>>8);

t=((248*(A21+A26)>>8); B21=t−((186*A26)>>8); B26=t−((310*A21)>>8);

t=((37*(A22+A25)>>8); B22=t−((290*A25)>>8); B25=t−((−215*A22)>>8);

t=((255*(A23+A24)>>8); B23=t−((243*A24)>>8); B24=t−((268*A23)>>8);

C0=B0+B7; C7=B0−B7; C1=B1+B6; C6=B1−B6; C2=B2+B5; C5=B2−B5; C3=B3+B4; C4=B3−B4;

t=((197*(B8+B15)>>8); C8=t−((35*B15)>>8); C15=t−((360*B8)>>8);

t=((120*(B9+B14)>>8); C9=t−((346*B14)>>8); C14=t−((−105*B9)>>8);

t=((244*(B10+B13)>>8); C10=t−((170*B13)>>8); C13=t−((319*B10)>>8);

t=((25*(B11+B12)>>8); C11=t−((279*B12)>>8); C12=t−((−229*B11)>>8);

C16=B16+B23; C23=B16−B23; C17=B17+B22; C22=B17−B22; C18=B18+B21; C21=B18−B21; C19=B19+B20; C20=B19−B20; C24=B24+B31; C31=B24−B31; C25=B25+B30; C30=B25−B30; C26=B26+B29; C29=B26−B29; C27=B27+B28; C28=B27−B28;

D0=C0+C3; D3=C0−C3; D1=C1+C2; D2=C1−C2; t=((49*(C4+C7)>>8); D4=t−((−201*C7)>>8); D7=t−((301*C4)>>8);

t=((142*(C5+C6)>>8); D5=t−((−70*C6)>>8); D6=t−((355*C5)>>8); D8=C8+C11; D11=C8−C11; D9=C9+C10; D10=C9−C10; D12=C12+C15; D15=C12−C15; D13=C13+C14; D14=C13−C14; D16=C16+C28; D28=C16−C28; D17=C17+C29; D29=C17−C29; D18=C18+C30; D30=C18−C30; D19=C19+C31; D31=C19−C31; D20=C20+C23; D23=C20−C23; D21=C21+C22; D22=C21−C22; D24=C24+C27; D27=C24−C27; D25=C25+C26; D26=C25−C26;

E0=((D0+D1)*181>>8); E1=((D0−D1)*181>>8);

t=(97*(D2+D3)>>8); E2=t−((−138*D3)>>8); E3=t−((334*D2)>>8); E4=D4+D5; E5=D4−D5; E6=−D6+D7; E7=D6+D7; E8=D8+D14; E14=D8−D14; E9=D9+D15; E15=D9−D15; E10=D10+D11; E11=D10−D11; E12=D12+D13; E13=D12−D13; E16=((D16+D19)*181>>8); E19=((D16−D19)*181>>8); E20=D20+D26; E26=D20−D26; E21=D21+D27; E27=D21−D27; E22=D22+D23; E23=D22−D23; E24=D24+D25; E25=D24−D25; E28=((D28+D31)*181>>8); E31=((D28−D31)*181>>8);

F5=((E5+E7)*181>>8); F7=((E5−E7)*181>>8);

t=(97*(E8+E9)>>8); F8=t−((334*E9)>>8); F9=t−((−138*E8)>>8); F11=((E11+E12)*181>>8); F12=((E12−F11)*181>>8);

t=(97*(E14+E15)>>8); F14=t−((334*E15)>>8); F15=t−((−138*E14)>>8); F16=E16+D18; F18=E16−D18; F17=D17+E19; F19=D17−E19;

t=(236*(E20+E21)>>8); F20=t−((138*E21)>>8); F21=t−((334*E20)>>8); F23=((E23+E24)*181>>8); F24=((E23−E24)*181>>8);

t=((236*(E26+E27))>>8); F26=t−((138*E27)>>8); F27=t−((334*E26)>>8); F28=−E28+D30; F30=E28+D30; F29=−D29+E31; F31=D29+E31;

t=(251*(F16+F17)>>8); G16=t−((301*F17)>>8); G17=t−((201*F16)>>8);

t=(212*(F18+F19)>>8); G18=t−((355*F19)>>8); G19=t−((70*F18)>>8);

t=(212*(F28+F29)>>8); G28=t−((355*F29)>>8); G29=t−((70*F28)>>8);

t=(251*(F30+F31)>>8); G30=t−((301*F31)>>8); G31=t−((201*F30)>>8);

Y0=E0; Y1=F24; Y2=−F12; Y3=−G16; Y4=E4; Y5=G31; Y6=F8; Y7=−F26; Y8=E2; Y9=F21; Y10=F15; Y11=G29; Y12=F5; Y13=−G18; Y14=E13; Y15=E22; Y16=E1; Y17=E25; Y18=E10; Y19=−G19; Y20=F7; Y21=−G28; Y22=F14; Y23=−F20; Y24=E3; Y25=−F27; Y26=F9; Y27=−G30; Y28=E6; Y29=−G17; Y30=F11; Y31=−F23

When X0 through X31 denote input values to be transformed, A0 through A31, B0 through B31, C0 through C31, D0 through D31, E0 through E31, F0 through F31, and G0 through G31 denote intermediate values, and Y0 through Y31 denote transformed values, the transformed values Y0 through Y31 may be obtained according to the following operation processes, if 32 point DCT is performed by applying the operation of the changed butterfly structure 1920 of FIG. 19 to the butterfly structure of FIG. 15:

A0=X0+X31; A31=X0−X31; A1=X1+X30; A30=X1−X30; A2=X2+X29; A29=X2−X29; A3=X3+X28; A28=X3−X28; A4=X4+X27; A27=X4−X27; A5=X5+X26; A26=X5−X26; A6=X6+X25; A25=X6−X25; A7=X7+X24; A24=X7−X24; A8=X8+X23; A23=X8−X23; A9=X9+X22; A22=X9−X22; A10=X10+X21; A21=X10−X21; A11=X11+X20; A20=X11−X20; A12=X12+X19; A19=X12−X19; A13=X13+X18; A18=X13−X18; A14=X14+X17; A17=X14−X17; A15=X15+X16; A16=X15−X16;

B0=A0+A15; B15=A0−A15; B1=A1+A14; B14=A1−A14; B2=A2+A13; B13=A2−A13; B3=A3+A12; B12=A3−A12; B4=A4+A11; B11=A4−A11; B5=A5+A10; B10=A5−A10; B6=A6+A9; B9=A6−A9; B7=A7+A8; B8=A7−A8; B16=A16−((113*A31)>>8); B31=A31+((189*B16)>>8); B16=B16−((113*B31)>>8); B17=A17+((21*A30)>>6); B30=A30−((152*B17)>>8); B17=B17+((21*B30)>>6); B18=A18−((145*A29)>>8); B29=A29+((219*B18)>>8); B18=B18−((145*B29)>>8); B19=A19+((57*A28)>>8); B28=A28−((109*B19)>>8); B19=B19+((57*B28)>>8); B20=A20−((45*A27)>>6); B27=A27+((241*B20)>>8); B20=B20−((45*B27)>>6); B21=A21+((31*A26)>>8); B26=A26−((31*B21)>>7); B21=B21+((31*B26)>>8); B22=A22−((55*A25)>>6); B25=A25+((253*B22)>>8); B22=B22−((55*B25)>>6); B23=A23+((3*A24)>>7); B24=A24−((3*B23)>>6); B23=B23+((3*B24)>>7);

C0=B0+B7; C7=B0−B7; C1=B1+B6; C6=B1−B6; C2=B2+B5; C5=B2−B5; C3=B3+B4; C4=B3−B4; C15=B15−((B8*91)>>8); C8=B8+((C15*81)>>7); C15=C15−((C8*91)>>8); C9=B9−((B14*153)>>8); C14=B14+((C9*225)>>8); C9=C9−((C14*153)>>8); C13=B13−((B10*37)>>8); C10=B10+((C13*37)>>7); C13=C13−((C10*37)>>8); C11=B11−((B12*29)>>5); C12=B12+((C11*127)>>7); C11=C11−((C12*29)>>5); C16=B16+B23; C23=B16−B23; C17=B17+B22; C22=B17−B22; C18=B18+B21; C21=B18−B21; C19=B19+B20; C20=B19−B20; C24=B24+B31; C31=B24−B31; C25=B25+B30; C30=B25−B30; C26=B26+B29; C29=B26−B29; C27=B27+B28; C28=B27−B28;

D0=C0+C3; D3=C0−C3; D1=C1+C2; D2=C1−C2; D7=C7−((C4*77)>>8); D4=C4+((D7*71)>>7); D7=D7−((D4*77)>>8); D6=C6−((C5*25)>>8); D5=C5+((D6*49)>>8); D6=D6−((D5*25)>>8); D8=C8+C11; D11=C8−C11; D9=C9+C10; D10=C9−C10; D12=C12+C15; D15=C12−C15; D13=C13+C14; D14=C13−C14; D16=C16+C28; D28=C16−C28; D17=C17+C29; D29=C17−C29; D18=C18+C30; D30=C18−C30; D19=C19+C31; D31=C19−C31; D20=C20+C23; D23=C20−C23; D21=C21+C22; D22=C21−C22; D24=C24+C27; D27=C24−C27; D25=C25+C26; D26=C25−C26;

E0=D0+D1; E1=(E0>>1)−D1; E2=−D2+((D3*53)>>7); E3=D3−((E2*45)>>7); E4=D4+D6; E6=D4−D6; E5=D7−D5; E7=D7+D5; E8=D8+D14; E14=D8−D14; E9=D9+D15; E15=D9−D15; E10=D10+D11; E11=D10−D11; E12=D12+D13; E13=D12−D13; E16=((D16+D19)*181)>>8; E19=((−D16+D19)*181)>>8;

E20=D20+D26; E26=D20−D26; E21=D21+D27; E27=D21−D27; E22=D22+D23; E23=D22−D23; E24=D24+D25; E25=D24−D25; E28=((D28+D31)*181)>>8; E31=((−D28+D31)*181)>>8;

F7=E7+E4; F4=(F7>>1)−E4; F8=E8+((E9*53)>>7); F9=−E9+((F8*45)>>7); F11=E11+E12; F12=E12−(F11>>1); F14=E14+((E15*53)>>7); F15=E15−((F14*45)>>7); F16=E16+D18; F18=E16−D18; F17=D17+E19; F19=D17−E19; F20=E20+((E21*53)>>7); F21=E21−((F20*45)>>7); F23=E23+((E24*255)>>8); F24=E24−(F23>>1); F26=E26+((E27*53)>>7); F27=E27−((F26*45)>>7); F28=−E28+D30; F30=E28+D30; F29=−D29+E31; F31=D29+E31; G16=F16−((F17*25)>>7); G17=F17+((G16*3)>>4); G18=F18−((F19*171)>>8); G19=F19+((G18*59)>>7); G28=F28−((F29*171)>>8); G29=F29+((G28*59)>>7); G30=F30−((F31*25)>>7); G31=F31+((G30*3)>>4);

Y0=E0; Y1=F24; Y2=F12; Y3=−G16; Y4=F7; Y5=G31; Y6=F9; Y7=−F26; Y8=E3; Y9=F21; Y10=F14; Y11=G29; Y12=E5; Y13=−G18; Y14=E13; Y15=E22; Y16=E1; Y17=E25; Y18=E10; Y19=−G19; Y20=E6; Y21=−G28; Y22=F15; Y23=−F20; Y24=E2; Y25=−F27; Y26=F8; Y27=−G30; Y28=F4; Y29=−G17; Y30=F11; Y31=−F23

Meanwhile, if A denotes a changed DCT matrix for transforming a 32×32 block based on the changed butterfly structure 1820 or 1920 of FIG. 18 or 19, quantization may be performed on a transformation block obtained by transforming an N×N block by applying a scaling matrix and a shift operation for compensating for a difference between the original N×N transformation matrix Original_A used for DCT of a 32×32 block and the changed DCT matrix A, based on the flow graph of FIG. 15.

As described with reference to FIG. 5, the scaling matrix may be generated based on a matrix $S \otimes S^T$ obtained by obtaining a transformation error matrix Original_A−$S \otimes A$ constituting a difference between matrix $S \otimes A$, which is obtained by multiplying elements of an N×N intermediate matrix S, wherein an element of each i-th row has a value of Si and i is an integer from 1 to N, with corresponding elements of the changed DCT matrix A, and the original N×N transformation matrix, obtaining the Si enabling a sum of squares of elements excluding a diagonal component of the transformation error matrix Original_A−$S \otimes A$ to be a minimum, and multiplying elements of the N×N intermediate matrix S to which the obtained Si is applied and corresponding elements of a transposed matrix $S^T$ of the intermediate matrix S. Since details thereof are identical to operations 530 and 540 of FIG. 5, except for the original N×N transformation matrix Original_A, descriptions will not be repeated herein. FIGS. 22 through 27 illustrate scaling matrices MF according to a quantization parameter QP of a 32×32 input block when the changed butterfly structure 1820 of FIG. 18 is applied. In FIGS. 22 through 27, m is 10. FIGS. 28 through 33 illustrate scaling matrices MF according to a quantization parameter QP of a 32×32 input block when the changed butterfly structure 1920 of FIG. 19 is applied. In FIGS. 28 through 33, m is 10.

Meanwhile, in an inverse-quantization operation, quantization is performed by applying an inverse-scaling matrix and a shift operation for compensating for a difference between an original N×N inverse transformation matrix used for discrete cosine inverse transform, and an N×N inverse transformation matrix constituting an inverse matrix of a substituted N×N transformation matrix. The inverse-scaling matrix is also changed since a matrix indicating DCT is changed when the changed butterfly structure 1820 or 1920 of FIG. 18 or 19 is used.

The inverse-scaling matrix V may be generated based on a matrix PF corresponding to the matrix $S \otimes S^T$ obtained by multiplying the elements of the intermediate matrix S and the transposed matrix $S^T$, which is also used to generate the scaling matrix MF. In detail, when Qstep denotes a quantization step, PF denotes the matrix $S \otimes S^T$, and n is a positive integer, the inverse-scaling matrix V is obtained according to the following equation: V=Qstep*PF*2^n.

When the inverse-scaling matrix V is obtained as above, inverse-quantization may be performed by performing a bit shift operation on a value obtained by multiplying the inverse-scaling matrix V and a quantized transformation coefficient, by a floor(QP/6) bit, wherein floor[x] is a maximum integer smaller than or equal to x and QP denotes a quantization parameter. In other words, when Zij denotes a quantized coefficient value and Wij denotes a transformation coefficient, Wij may be obtained by inverse-quantizing a quantized coefficient via the following equation: Wij=(Zij)<<floor(QP/6).

FIGS. 34 through 39 illustrate inverse-scaling matrices V according to a quantization parameter QP of a 32×32 input block when the changed butterfly structure 1820 of FIG. 18 is applied. In FIGS. 34 through 39, n is 10. Also, FIGS. 40 through 45 illustrate inverse-scaling matrices V according to a quantization parameter QP of a 32×32 input block when the changed butterfly structure 1920 of FIG. 19 is applied. In FIGS. 40 through 45, n is 10.

Also, like the description of FIG. 6 above, a scaling matrix may be obtained by multiplying elements of an intermediate matrix, which is obtained by dividing elements of an original N×N transformation matrix used for DCT by corresponding elements of a changed DCT matrix A, with corresponding elements of a transposed matrix of the intermediate matrix. Since details thereof are identical to FIG. 6 except that the changed DCT matrix A indicates N point 1D DCT wherein the changed butterfly structure 1820 or 1920 of FIG. 18 or 19 is applied to the algorithm 15, descriptions thereof will not be repeated herein. FIGS. 46 through 51 illustrate scaling matrices MF according to a quantization parameter QP of a 32×32 input block when the changed butterfly structure 1820 of FIG. 18 is applied. In FIGS. 46 through 51, m is 10. Also, FIGS. 52 through 57 illustrate scaling matrices MF according to a quantization parameter QP of a 32×32 input block when the changed butterfly structure 1920 of FIG. 19 is applied. In FIGS. 52 through 57, m is 10.

When a scaling matrix is obtained by multiplying elements of an intermediate matrix, which is obtained by dividing elements of an original N×N transformation matrix used for DCT by corresponding elements of a changed DCT matrix, with corresponding elements of a transposed matrix of the intermediate matrix, an inverse-scaling matrix V is also changed due to a difference of the original N×N transformation matrix. FIGS. 58 through 63 illustrate inverse-scaling matrices V according to a quantization parameter QP of a 32×32 input block when the changed butterfly structure 1820 of FIG. 18 is applied. In FIGS. 58 through 63, n is 10. FIGS. 64 through 69 illustrate inverse-scaling matrices V according to a quantization parameter QP of a 32×32 input block when the changed butterfly structure 1920 of FIG. 19 is applied. In FIGS. 64 through 69, n is 10.

Meanwhile, like the description of FIG. 6, a scaling matrix is obtained by multiplying elements of an intermediate matrix, which is obtained by dividing elements of an original N×N transformation matrix used for DCT by corresponding elements of a changed DCT matrix, with corresponding elements of a transposed matrix of the intermediate matrix, while an inverse-scaling matrix V may be determined by using, instead of an intermediate matrix S, an intermediate matrix R obtained by directly dividing elements of an original 32 point discrete cosine inverse transformation matrix Original_InverseA by corresponding elements of a 32 point discrete cosine transformation matrix Inverse A corresponding to a changed butterfly structure according to an exemplary embodiment. Here, the inverse-scaling matrix V is generated based on a matrix $R \otimes R^T$ obtained by multiplying elements of the intermediate matrix R with corresponding elements of a transposed matrix $R^T$ of the intermediate matrix R. In detail, when BF denotes the matrix $R \otimes R^T$ and n is a positive integer, the inverse-scaling matrix V is obtained according to the equation V=Qstep*BF*2^n. FIGS. 70 through 75 illustrate scaling matrices MF according to a quantization parameter QP of a 32×32 input block when the changed butterfly structure 1820 of FIG. 18 is applied. In FIGS. 70 through 75, m is 10. FIGS. 76 through 81 illustrate scaling matrices MF according to a quantization parameter QP of a 32×32 input block when the changed butterfly structure 1920 of FIG. 19 is applied. In FIGS. 76 through 81, m is 10. FIGS. 82 through 87 illustrate inverse-scaling matrices V according to a quantization parameter QP of a 32×32 input block when the changed butterfly structure 1820 of FIG. 18 is applied. In FIGS. 82 through 87, n is 10. Also, FIGS. 88 through 93 illustrate inverse-scaling matrices V according to a quantization parameter QP of a 32×32 input block when the changed butterfly structure 1920 of FIG. 19 is applied. In FIGS. 88 through 93, n is 10.

Figure 100:
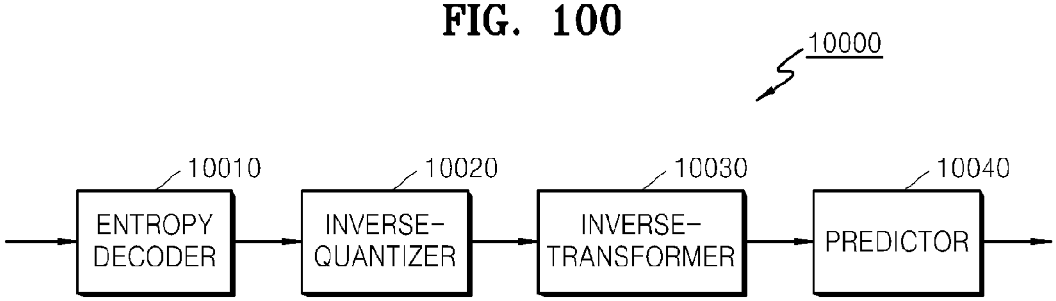
FIG. 100 is a block diagram of an image decoding apparatus according to an exemplary embodiment.

FIG. 100 is a block diagram of an image decoding apparatus 10000 according to an exemplary embodiment.

Referring to FIG. 100, the image decoding apparatus 10000 includes an entropy decoder 10010, an inverse-quantizer 10020, an inverse-transformer 10030, and a predictor 10040.

The entropy encoder 10010 extracts prediction mode information, reference picture information, and residual information of a current block to be decoded, from an input bitstream.

The inverse-quantizer 10020 inverse-quantizes quantized transformation coefficients, which are entropy-decoded by the entropy decoder 10010. As described above, when an inverse-scaling matrix V is determined, the inverse-quantizer 10020 performs inverse quantization by performing a bit shift operation on a value obtained by multiplying the inverse-scaling matrix V and the quantized transformation coefficients by a floor(QP/6) bit, wherein floor[x] is a maximum integer smaller than or equal to x, and QP is a quantization parameter. In other words, when Zij denotes a quantized coefficient value and Wij denotes a transformation coefficient, Wij obtained by inverse-quantizing the quantized coefficient may be obtained according to the equation Wij=(Zij)<<floor(QP/6).

The inverse-transformer 10030 inverse-transforms the inverse-quantized transformation coefficients. Accordingly, residual values in a block unit are restored. Such an inverse-transforming process may be performed via N point discrete cosine inverse transform using an inverse matrix $A^{-1}$ of a substituted N×N transformation matrix A obtained according to an exemplary embodiment.

1D discrete cosine inverse transform using the inverse transformation matrix $A^{-1}$ of the substituted N×N transformation matrix A with respect to a 16×16 block transformed according to the exemplary embodiment of FIG. 3 may be expressed as the following operation processes, wherein X0 through X15 denote input values to be inverse-transformed, B0 through B15, C0 through C15, D0 through D15, E0 through E15, F0 through F15, and G0 through G15 denote intermediate values, and Y0 through Y15 denote inverse-transformed values:

G0=X0; G8=X1; G4=X2; G12=X3; G2=X4; G10=X5; G6=X6; G14=X7; G1=X8; G9=X9; G5=X10; G13=X11; G3=X12; G11=X13; G7=X14; G15=X15; F0=G0; F1=G1; F2=G2; F3=G3; F4=G4; F5=G5; F6=G6; F7=G7; F8=(6*G8−63*G15)>>6; F9=(49*G9−40*G14)>>6; F10=(30*G10−56*G13)>>6; F11=(61*G11−18*G12)>>6; F12=(61*G12+18*G11)>>6; F13=(30*G13+56*G10)>>6; F14=(49*G14+40*G9)>>6; F15=(6*G15+63*G8)>>6; E0=F0; E1=F1; E2=F2; E3=F3; E4=(12*F4−62*F7)>>6; E5=(53*F5−35*F6)>>6; E6=(53*F6+35*F5)>>6; E7=(12*F7+62*F4)>>6; E8=F8+F9; E9=F8-F9; E10=F11−F10; E11=F11+F10; E12=F12+F13; E13=F12−F13; E14=F15−F14; E15=F15+F14; D0=(45*(E0+E1))>>6; D1=(45*(E0−E1))>>6; D2=(24*E2−59*E3)>>6; D3=(59*E2+24*E3)>>6; D4=E4+E5; D5=E4−E5; D6=E7−E6; D7=E7+E6; D8=E8; D9=(24*E14−59*E9)>>6; D10=(−59*E13−24*E10)>>6; D11=E11; D12=E12; D13=(24*E13−59*E10)>>6; D14=(59*E14+24*E9)>>6; D15=E15; C0=D0+D3; C3=D0−D3; C8=D8+D11; C11=D8−D11; C12=D15−D12; C15=D15+D12; C1=D1+D2; C2=D1−D2; C9=D9+D10; C10=D9−D10; C13=D14−D13; C14=D14+D13; C4=D4; C5=(45*(D6−D5))>>6; C6=(45*(D6+D5))>>6; C7=D7; B0=C0+C7; B7=C0−C7; B1=C1+C6; B6=C1−C6; B2=C2+C5; B5=C2−C5; B3=C3+C4; B4=C3−C4; B8=C8; B14=C14; B10=(45*(C13−C10))>>6; B13=(45*(C13+C10))>>6; B9=C9; B15=C15; B11=(45*(C12−C11))>>6; B12=(45*(C12+C11))>>6; Y0=B0+B15;

Y15=B0−B15; Y1=B1+B14; Y14=B1−B14; Y2=B2+B13; Y13=B2−B13; Y3=B3+B12; Y12=B3−B12; Y4=B4+B11; Y11=B4−B11; Y5=B5+B10; Y10=B5−B10; Y6=B6+B9; Y9=B6−B9; Y7=B7+B8; Y8=B7−B8

1D discrete cosine inverse transform using the inverse transformation matrix $A^{-1}$ of the substituted 32×32 transformation matrix A with respect to a 32×32 block transformed according to the exemplary embodiment of FIG. 3 may be expressed as the following operation processes, wherein X0 through X31 denote input values to be inverse-transformed, A0 through A31, B0 through B31, C0 through C31, D0 through D31, E0 through E31, F0 through F31, G0 through G31, and H0 through H31 denote intermediate values, and Y0 through Y31 denote inverse-transformed values:

H0=X0; H16=X1; H8=X2; H24=X3; H4=X4; H20=X5; H12=X6; H28=X7; H2=X8; H18=X9; H10=X10; H26=X11; H6=X12; H22=X13; H14=X14; H30=X15; H1=X16; H17=X17; H9=X18; H25=X19; H5=X20; H21=X21; H13=X22; H29=X23; H3=X24; H19=X25; H11=X26; H27=X27; H7=X28; H23=X29; H15=X30; H31=X31; G0=H0; G1=H1; G2=H2; G3=H3; G4=H4; G5=H5; G6=H6; G7=H7; G8=H8; G9=H9; G10=H10; G11=H11; G12=H12; G13=H13; G14=H14; G15=H15; G16=(12*H16−255*H31)>>8; G17=(189*H17−171*H30)>>8; G18=(109*H18−231*H29)>>8; G19=(241*H19−86*H28)>>8; G20=(62*H20−248*H27)>>8; G21=(219*H21−131*H26)>>8; G22=(152*H22−205*H25)>>8; G23=(253*H23−37*H24)>>8; G24=(253*H24+37*H23)>>8; G25=(152*H25+205*H22)>>8; G26=(219*H26+131*H21)>>8; G27=(62*H27+248*H20)>>8; G28=(241*H28+86*H19)>>8; G29=(109*H29+231*H18)>>8; G30=(189*H30+171*H17)>>8; G31=(12*H31+255*H16)>>8; F0=G0; F1=G1; F2=G2; F3=G3; F4=G4; F5=G5; F6=G6; F7=G7; F8=(25*G8−254*G15)>>8; F9=(197*G9−162*G14)>>8; F10=(120*G10−225*G13)>>8; F11=(244*G11−74*G12)>>8; F12=(244*G12+74*G11)>>8; F13=(120*G13+225*G10)>>8; F14=(197*G14+162*G9)>>8; F15=(25*G15+254*G8)>>8; F16=G16+G17; F17=G16−G17; F18=G19−G18; F19=G19+G18; F20=G20+G21; F21=G20−G21; F22=G23−G22; F23=G23+G22; F24=G24+G25; F25=G24−G25; F26=G27−G26; F27=G27+G26; F28=G28+G29; F29=G28−G29; F30=G31−G30; F31=G31+G30; E0=F0; E1=F1; E2=F2; E3=F3; E4=(49*F4−251*F7)>>8; E5=(212*F5−142*F6)>>8; E6=(212*F6+142*F5)>>8; E7=(49*F7+251*F4)>>8; E8=F8+F9; E9=F8−F9; E10=F11−F10; E11=F11+F10; E12=F12+F13; E13=F12−F13; E14=F15−F14; E15=F15+F14; E16=F16; E17=(49*F30−251*F17)>>8; E18=(−251*F29−49*F18)>>8; E19=F19; E20=F20; E21=(212*F26−142*F21)>>8; E22=(−142*F25−212*F22)>>8; E23=F23; E24=F24; E25=(212*F25−142*F22)>>8; E26=(142*F26+212*F21)>>8; E27=F27; E28=F28; E29=(49*F29−251*F18)>>8; E30=(251*F30+49*F17)>>8; E31=F31; D0=(181*(E0+E1))>>8; D1=(181*(E0−E1))>>8; D2=(97*E2−236*E3)>>8; D3=(236*E2+97*E3)>>8; D4=E4+E5; D5=E4−E5; D6=E7−E6; D7=E7+E6; D8=E8; D9=(97*E14−236*E9)>>8; D10=(−236*E13−97*E10)>>8; D11=E11; D12=E12; D13=(97*E13−236*E10)>>8; D14=(236*E14+97*E9)>>8; D15=E15; D16=E16+E19; D19=E16−E19; D20=E23−E20; D23=E23+E20; D24=E24+E27; D27=E24−E27; D28=E31−E28; D31=E31+E28; D17=E17+E18; D18=E17−E18; D21=E22−E21; D22=E22+E21; D25=E25+E26; D26=E25−E26; D29=E30−E29; D30=E30+E29; C0=D0+D3; C3=D0−D3; C8=D8+D11; C11=D8−D11; C12=D15−D12; C15=D15+D12; C1=D1+D2; C2=D1−D2; C9=D9+D10; C10=D9−D10; C13=D14−D13; C14=D14+D13; C4=D4; C5=(181*(D6−D5))>>8; C6=(181*(D6+D5))>>8; C7=D7; C16=D16; C18=(97*D29−236*D18)>>8; C20=(−236*D27−97*D20)>>8; C22=D22; C24=D24; C26=(−236*D21+97*D26)>>8; C28=(97*D19+236*D28)>>8; C30=D30; C17=D17; C19=(97*D28−236*D19)>>8; C21=(−236*D26−97*D21)>>8; C23=D23; C25=D25; C27=(−236*D20+97*D27)>>8; C29=(97*D18+236*D29)>>8; C31=D31; B0=C0+C7; B7=C0−C7; B1=C1+C6; B6=C1−C6; B2=C2+C5; B5=C2−C5; B3=C3+C4; B4=C3−C4; B8=C8; B14=C14; B10=(181*(C13−C10))>>8; B13=(181*(C13+C10))>>8; B9=C9; B15=C15; B11=(181*(C12−C11))>>8; B12=(181*(C12+C11))>>8; B16=C16+C23; B23=C16−C23; B24=C31−C24; B31=C31+C24; B17=C17+C22; B22=C17−C22; B25=C30−C25; B30=C30+C25; B18=C18+C21; B21=C18−C21; B26=C29−C26; B29=C29+C26; B19=C19+C20; B20=C19−C20; B27=C28−C27; B28=C28+C27; A0=B0+B15; A15=B0−B15; A1=B1+B14; A14=B1−B14; A2=B2+B13; A13=B2−B13; A3=B3+B12; A12=B3−B12; A4=B4+B11; A11=B4−B11; A5=B5+B10; A10=B5−B10; A6=B6+B9; A9=B6−B9; A7=B7+B8; A8=B7−B8; A16=B16; A28=B28; A20=(181*(B27−B20))>>8; A27=(181*(B27+B20))>>8; A17=B17; A29=B29; A21=(181*(B26−B21))>>8; A26=(181*(B26+B21))>>8; A18=B18; A30=B30; A22=(181*(B25−B22))>>8; A25=(181*(B25+B22))>>8; A19=B19; A31=B31; A23=(181*(B24−B23))>>8; A24=(181*(B24+B23))>>8; Y0=(A0+A31); Y31=(A0−A31); Y1=(A1+A30); Y30=(A1−A30); Y2=(A2+A29); Y29=(A2−A29); Y3=(A3+A28); Y28=(A3−A28); Y4=(A4+A27); Y27=(A4−A27); Y5=(A5+A26); Y26=(A5−A26); Y6=(A6+A25); Y25=(A6−A25); Y7=(A7+A24); Y24=(A7−A24); Y8=(A8+A23); Y23=(A8−A23); Y9=(A9+A22); Y22=(A9−A22); Y10=(A10+A21); Y21=(A10−A21); Y11=(A11+A20); Y20=(A11−A20); Y12=(A12+A19); Y19=(A12−A19); Y13=(A13+A18); Y18=(A13−A18); Y14=(A14+A17); Y17=(A14−A17); Y15=(A15+A16); Y16=(A15−A16)

1D discrete cosine inverse transform using the inverse transformation matrix $A^{-1}$ of the substituted 64×64 transformation matrix A with respect to a 64×64 block transformed according to the exemplary embodiment of FIG. 3 may be expressed as the following operation processes, wherein X0 through X63 denote input values to be inverse-transformed, A0 through A63, B0 through B63, C0 through C63, D0 through D63, E0 through E63, F0 through F63, G0 through G63, H0 through H63, I0 through I63, and O0 through O63 denote intermediate values, and Y0 through Y63 denote inverse-transformed values:

I0=X0; I32=X1; I16=X2; I48=X3; I8=X4; I40=X5; I24=X6; I56=X7; I4=X8; I36=X9; I20=X10; I52=X11; I12=X12; I44=X13; I28=X14; I60=X15; I2=X16; I34=X17; I18=X18; I50=X19; I10=X20; I42=X21; I26=X22; I58=X23; I6=X24; I38=X25; I22=X26; I54=X27; I14=X28; I46=X29; I30=X30; I62=X31; I1=X32; I33=X33; I17=X34; I49=X35; I9=X36; I41=X37; I25=X38; I57=X39; I5=X40; I37=X41; I21=X42; I53=X43; I13=X44; I45=X45; I29=X46; I61=X47; I3=X48; I35=X49; I19=X50; I51=X51; I11=X52; I43=X53; I27=X54; I59=X55; I7=X56; I39=X57; I23=X58; I55=X59; I15=X60; I47=X61; I31=X62; I63=X63; H0=I0; H1=I1; H2=I2; H3=I3; H4=I4; H5=I5; H6=I6; H7=I7; H8=I8; H9=I9; H10=I10; H11=I11; H12=I12; H13=I13; H14=I14; H15=I15; H16=I16; H17=I17; H18=I18; H19=I19; H20=I20; H21=I21; H22=I22; H23=I23; H24=I24; H25=I25; H26=I26; H27=I27; H28=I28; H29=I29; H30=I30; H31=I31; H32=(25*I32−1024*I63)>>10; H33=(742*I33−706*I62)>>10; H34=(415*I34−936*I61)>>10; H35=(955*I35−

369*I60)>>10; H36=(224*I36−999*I59)>>10; H37=(865*I37−548*I58)>>10; H38=(590*I38−837*I57)>>10; H39=(1009*I39−175*I56)>>10; H40=(125*I40−1016*I55)>>10; H41=(807*I41−630*I54)>>10; H42=(505*I42−891*I53)>>10; H43=(987*I43−273*I52)>>10; H44=(321*I44−972*I51)>>10; H45=(915*I45−460*I50)>>10; H46=(669*I46−775*I49)>>10; H47=(1021*I47−75*I48)>>10; H48=(1021*I48+75*I47)>>10; H49=(669*I49+775*I46)>>10; H50=(915*I50+460*I45)>>10; H51=(321*I51+972*I44)>>10; H52=(987*I52+273*I43)>>10; H53=(505*I53+891*I42)>>10; H54=(807*I54+630*I41)>>10; H55=(125*I55+1016*I40)>>10; H56=(1009*I56+175*I39)>>10; H57=(590*I57+837*I38)>>10; H58=(865*I58+548*I37)>>10; H59=(224*I59+999*I36)>>10; H60=(955*I60+369*I35)>>10; H61=(415*I61+936*I34)>>10; H62=(742*I62+706*I33)>>10; H63=(25*I63+1024*I32)>>10; G0=H0; G1=H1; G2=H2; G3=H3; G4=H4; G5=H5; G6=H6; G7=H7; G8=H8; G9=H9; G10=H10; G11=H11; G12=H12; G13=H13; G14=H14; G15=H15; G16=(50*H16−1023*H31)>>10; G17=(759*H17−688*H30)>>10; G18=(438*H18−926*H29)>>10; G19=(964*H19−345*H28)>>10; G20=(249*H20−993*H27)>>10; G21=(878*H21−526*H26)>>10; G22=(610*H22−822*H25)>>10; G23=(1013*H23−150*H24)>>10; G24=(1013*H24+150*H23)>>10; G25=(610*H25+822*H22)>>10; G26=(878*H26+526*H21)>>10; G27=(249*H27+993*H20)>>10; G28=(964*H28+345*H19)>>10; G29=(438*H29+926*H18)>>10; G30=(759*H30+688*H17)>>10; G31=(50*H31+1023*H16)>>10; G32=H32+H33; G33=H32−H33; G34=H35−H34; G35=H35+H34; G36=H36+H37; G37=H36−H37; G38=H39−H38; G39=H39+H38; G40=H40+H41; G41=H40−H41; G42=H43−H42; G43=H43+H42; G44=H44+H45; G45=H44−H45; G46=H47−H46; G47=H47+H46; G48=H48+H49; G49=H48−H49; G50=H51−H50; G51=H51+H50; G52=H52+H53; G53=H52−H53; G54=H55−H54; G55=H55+H54; G56=H56+H57; G57=H56−H57; G58=H59−H58; G59=H59+H58; G60=H60+H61; G61=H60−H61; G62=H63−H62; G63=H63+H62; F0=G0; F1=G1; F2=G2; F3=G3; F4=G4; F5=G5; F6=G6; F7=G7; F8=(100*G8−1019*G15)>>10; F9=(792*G9−650*G14)>>10; F10=(483*G10−903*G13)>>10; F11=(980*G11−297*G12)>>10; F12=(980*G12+297*G11)>>10; F13=(483*G13+903*G10)>>10; F14=(792*G14+650*G9)>>10; F15=(100*G15+1019*G8)>>10; F16=G16+G17; F17=G16−G17; F18=G19−G18; F19=G19+G18; F20=G20+G21; F21=G20−G21; F22=G23−G22; F23=G23+G22; F24=G24+G25; F25=G24−G25; F26=G27−G26; F27=G27+G26; F28=G28+G29; F29=G28−G29; F30=G31−G30; F31=G31+G30; F32=G32; F33=(100*G62−1019*G33)>>10; F34=(−1019*G61−100*G34)>>10; F35=G35; F36=G36; F37=(792*G58−650*G37)>>10; F38=(−650*G57−792*G38)>>10; F39=G39; F40=G40; F41=(483*G54−903*G41)>>10; F42=(−903*G53−483*G42)>>10; F43=G43; F44=G44; F45=(980*G50−297*G45)>>10; F46=(−297*G49−980*G46)>>10; F47=G47; F48=G48; F49=(980*G49−297*G46)>>10; F50=(297*G50+980*G45)>>10; F51=G51; F52=G52; F53=(483*G53−903*G42)>>10; F54=(903*G54+483*G41)>>10; F55=G55; F56=G56; F57=(792*G57−650*G38)>>10; F58=(650*G58+792*G37)>>10; F59=G59; F60=G60; F61=(100*G61−1019*G34)>>10; F62=(1019*G62+100*G33)>>10; F63=G63; E0=F0; E1=F1; E2=F2; E3=F3; E4=(200*F4−1004*F7)>>10; E5=(851*F5−569*F6)>>10; E6=(851*F6+569*F5)>>10; E7=(200*F7+1004*F4)>>10; E8=F8+F9; E9=F8-F9; E10=F11−F10; E11=F11+F10; E12=F12+F13; E13=F12−F13; E14=F15−F14; E15=F15+F14; E16=F16; E17=(200*F30−1004*F17)>>10; E18=(−1004*F29−200*F18)>>10; E19=F19; E20=F20; E21=(851*F26−569*F21)>>10; E22=(−569*F25−851*F22)>>10; E23=F23; E24=F24; E25=(851*F25−569*F22)>>10; E26=(569*F26+851*F21)>>10; E27=F27; E28=F28; E29=(200*F29−1004*F18)>>10; E30=(1004*F30+200*F17)>>10; E31=F31; E32=F32+F35; E33=F33+F34; E34=F33−F34; E35=F32−F35; E36=F39−F36; E37=F38−F37; E38=F38+F37; E39=F39+F36; E40=F40+F43; E41=F41+F42; E42=F41−F42; E43=F40-F43; E44=F47-F44; E45=F46−F45; E46=F46+F45; E47=F47+F44; E48=F48+F51; E49=F49+F50; E50=F49−F50; E51=F48−F51; E52=F55−F52; E53=F54−F53; E54=F54+F53; E55=F55+F52; E56=F56+F59; E57=F57+F58; E58=F57−F58; E59=F56−F59; E60=F63−F60; E61=F62−F61; E62=F62+F61; E63=F63+F60; D0=(724*(E0+E1))>>10; D1=(724*(E0−E1))>>10; D2=(392*E2−946*E3)>>10; D3=(946*E2+392*E3)>>10; D4=E4+E5; D5=E4−E5; D6=E7−E6; D7=E7+E6; D8=E8; D9=(392*E14−946*E9)>>10; D10=(−946*E13−392*E10)>>10; D11=E11; D12=E12; D13=(392*E13−946*E10)>>10; D14=(946*E14+392*E9)>>10; D15=E15; D16=E16+E19; D19=E16−E19; D20=E23−E20; D23=E23+E20; D24=E24+E27; D27=E24−E27; D28=E31−E28; D31=E31+E28; D17=E17+E18; D18=E17−E18; D21=E22−E21; D22=E22+E21; D25=E25+E26; D26=E25−E26; D29=E30−E29; D30=E30+E29; D32=E32; D33=E33; D34=(200*E61−1004*E34)>>10; D35=(200*E60−1004*E35)>>10; D36=(−1004*E59−200*E36)>>10; D37=(−1004*E58−200*E37)>>10; D38=E38; D39=E39; D40=E40; D41=E41; D42=(851*E53−569*E42)>>10; D43=(851*E52−569*E43)>>10; D44=(−569*E51−851*E44)>>10; D45=(−569*E50−851*E45)>>10; D46=E46; D47=E47; D48=E48; D49=E49; D50=(851*E50−569*E45)>>10; D51=(851*E51−569*E44)>>10; D52=(569*E52+851*E43)>>10; D53=(569*E53+851*E42)>>10; D54=E54; D55=E55; D56=E56; D57=E57; D58=(200*E58−1004*E37)>>10; D59=(200*E59−1004*E36)>>10; D60=(1004*E60+200*E35)>>10; D61=(1004*E61+200*E34)>>10; D62=E62; D63=E63; C0=D0+D3; C3=D0−D3; C8=D8+D11; C11=D8−D11; C12=D15−D12; C15=D15+D12; C1=D1+D2; C2=D1−D2; C9=D9+D10; C10=D9−D10; C13=D14−D13; C14=D14+D13; C4=D4; C5=(724*(D6−D5))>>10; C6=(724*(D6+D5))>>10; C7=D7; C16=D16; C18=(392*D29−946*D18)>>10; C20=(−946*D27−392*D20)>>10; C22=D22; C24=D24; C26=(−946*D21+392*D26)>>10; C28=(392*D19+946*D28)>>10; C30=D30; C17=D17; C19=(392*D28−946*D19)>>10; C21=(−946*D26−392*D21)>>10; C23=D23; C25=D25; C27=(−946*D20+392*D27)>>10; C29=(392*D18+946*D29)>>10; C31=D31; C32=D32+D39; C39=D32−D39; C40=D47−D40; C47=D47+D40; C48=D48+D55; C55=D48−D55; C56=D63−D56; C63=D63+D56; C33=D33+D38; C38=D33−D38; C41=D46−D41; C46=D46+D41; C49=D49+D54; C54=D49−D54; C57=D62−D57; C62=D62+D57; C34=D34+D37; C37=D34−D37; C42=D45−D42; C45=D45+D42; C50=D50+D53; C53=D50−D53; C58=D61−D58; C61=D61+D58; C35=D35+D36; C36=D35−D36; C43=D44−D43; C44=D44+D43; C51=D51+D52; C52=D51−D52; C59=D60−D59; C60=D60+D59; B0=C0+C7; B7=C0−C7; B1=C1+C6; B6=C1−C6; B2=C2+C5; B5=C2−C5; B3=C3+C4; B4=C3−C4; B8=C8; B14=C14; B10=(724*(C13−C10))>>10; B13=(724*(C13+C10))>>10; B9=C9; B15=C15; B11=(724*(C12−C11))>>10; B12=(724*(C12+C11))>>10; B16=C16+C23; B23=C16−C23; B24=C31−C24; B31=C31+C24;

B17=C17+C22; B22=C17−C22; B25=C30−C25; B30=C30+C25; B18=C18+C21; B21=C18−C21; B26=C29−C26; B29=C29+C26; B19=C19+C20; B20=C19−C20; B27=C28−C27; B28=C28+C27; B32=C32; B36=(392*C59−946*C36)>>10; B40=(−946*C55−392*C40)>>10; B44=C44; B48=C48; B52=(−946*C43+392*C52)>>10; B56=(392*C39+946*C56)>>10; B60=C60; B33=C33; B37=(392*C58−946*C37)>>10; B41=(−946*C54−392*C41)>>10; B45=C45; B49=C49; B53=(−946*C42+392*C53)>>10; B57=(392*C38+946*C57)>>10; B61=C61; B34=C34; B38=(392*C57−946*C38)>>10; B42=(−946*C53−392*C42)>>10; B46=C46; B50=C50; B54=(−946*C41+392*C54)>>10; B58=(392*C37+946*C58)>>10; B62=C62; B35=C35; B39=(392*C56−946*C39)>>10; B43=(−946*C52−392*C43)>>10; B47=C47; B51=C51; B55=(−946*C40+392*C55)>>10; B59=(392*C36+946*C59)>>10; B63=C63; A0=B0+B15; A15=B0−B15; A1=B1+B14; A14=B1−B14; A2=B2+B13; A13=B2−B13; A3=B3+B12; A12=B3−B12; A4=B4+B11; A11=B4−B11; A5=B5+B10; A10=B5−B10; A6=B6+B9; A9=B6−B9; A7=B7+B8; A8=B7−B8; A16=B16; A28=B28; A20=(724*(B27−B20))>>10; A27=(724*(B27+B20))>>10; A17=B17; A29=B29; A21=(724*(B26−B21))>>10; A26=(724*(B26+B21))>>10; A18=B18; A30=B30; A22=(724*(B25−B22))>>10; A25=(724*(B25+B22))>>10; A19=B19; A31=B31; A23=(724*(B24−B23))>>10; A24=(724*(B24+B23))>>10; A32=B32+B47; A47=B32−B47; A48=B63−B48; A63=B63+B48; A33=B33+B46; A46=B33−B46; A49=B62−B49; A62=B62+B49; A34=B34+B45; A45=B34−B45; A50=B61−B50; A61=B61+B50; A35=B35+B44; A44=B35−B44; A51=B60−B51; A60=B60+B51; A36=B36+B43; A43=B36−B43; A52=B59−B52; A59=B59+B52; A37=B37+B42; A42=B37−B42; A53=B58−B53; A58=B58+B53; A38=B38+B41; A41=B38−B41; A54=B57−B54; A57=B57+B54; A39=B39+B40; A40=B39−B40; A55=B56−B55; A56=B56+B55; O0=A0+A31; O31=A0−A31; O1=A1+A30; O30=A1−A30; O2=A2+A29; O29=A2−A29; O3=A3+A28; O28=A3−A28; O4=A4+A27; O27=A4−A27; O5=A5+A26; O26=A5−A26; O6=A6+A25; O25=A6−A25; O7=A7+A24; O24=A7−A24; O8=A8+A23; O23=A8−A23; O9=A9+A22; O22=A9−A22; O10=A10+A21; O21=A10−A21; O11=A11+A20; O20=A11−A20; O12=A12+A19; O19=A12−A19; O13=A13+A18; O18=A13−A18; O14=A14+A17; O17=A14−A17; O15=A15+A16; O16=A15−A16; O32=A32; O56=A56; O40=(724*(A55−A40))>>10; O55=(724*(A55+A40))>>10; O33=A33; O57=A57; O41=(724*(A54−A41))>>10; O54=(724*(A54+A41))>>10; O34=A34; O58=A58; O42=(724*(A53−A42))>>10; O53=(724*(A53+A42))>>10; O35=A35; O59=A59; O43=(724*(A52−A43))>>10; O52=(724*(A52+A43))>>10; O36=A36; O60=A60; O44=(724*(A51−A44))>>10; O51=(724*(A51+A44))>>10; O37=A37; O61=A61; O45=(724*(A50−A45))>>10; O50=(724*(A50+A45))>>10; O38=A38; O62=A62; O46=(724*(A49−A46))>>10; O49=(724*(A49+A46))>>10; O39=A39; O63=A63; O47=(724*(A48−A47))>>10; O48=(724*(A48+A47))>>10; Y0=O0+O63; Y63=O0−O63; Y1=O1+O62; Y62=O1−O62; Y2=O2+O61; Y61=O2−O61; Y3=O3+O60; Y60=O3−O60; Y4=O4+O59; Y59=O4−O59; Y5=O5+O58; Y58=O5−O58; Y6=O6+O57; Y57=O6−O57; Y7=O7+O56; Y56=O7−O56; Y8=O8+O55; Y55=O8−O55; Y9=O9−O54; Y54=O9−O54; Y10=O10+O53; Y53=O10−O53; Y11=O11+O52; Y52=O11−O52; Y12=O12+O51; Y51=O12−O51; Y13=O13+O50; Y50=O13−O50; Y14=O14+O49; Y49=O14−O49; Y15=O15+O48; Y48=O15−O48; Y16=O16+O47; Y47=O16−O47; Y17=O17+O46; Y46=O17−O46; Y18=O18+O45; Y45=O18−O45; Y19=O19+O44; Y44=O19−O44; Y20=O20+O43; Y43=O20−O43; Y21=O21+O42; Y42=O21−O42; Y22=O22+O41; Y41=O22−O41; Y23=O23+O40; Y40=O23−O40; Y24=O24+O39; Y39=O24−O39; Y25=O25+O38; Y38=O25−O38; Y26=O26+O37; Y37=O26−O37; Y27=O27+O36; Y36=O27−O36; Y28=O28+O35; Y35=O28−O35; Y29=O29+O34; Y34=O29−O34; Y30=O30+O33; Y33=O30−O33; Y31=O31+O32; Y32=O31−O32

1D discrete cosine inverse transform with respect to a 32×32 block transformed according to the changed butterfly structure 1820 of FIG. 18 may be expressed as the following operation processes, wherein X0 through X31 denote input values to be inverse-transformed, A0 through A31, B0 through B31, C0 through C31, D0 through D31, E0 through E31, F0 through F31, G0 through G31, and H0 through H31 denote intermediate values, t denotes an auxiliary variable, and Y0 through Y31 denote inverse-transformed values:

E0=X0; F24=X1; F12=−X2; G16=−X3; E4=X4; G31=X5; F8=X6; F26=−X7; E2=X8; F21=X9; F15=X10; G29=X11; F5=X12; G18=−X13; E13=X14; E22=X15; E1=X16; E25=X17; E10=X18; G19=−X19; F7=X20; G28=−X21; F14=X22; F20=−X23; E3=X24; F27=−X25; F9=X26; G30=−X27; E6=X28; G17=−X29; F11=X30; F23=−X31; t=(251*(G16+G17)>>8); F16=t−((201*G17)>>8); F17=t−((301*G16)>>8); t=(212*(G18+G19)>>8); F18=t−((70*G19)>>8); F19=t−((355*G18)>>8); t=((212*(G28+G29))>>8); F28=t−((70*G29)>>8); F29=t−((355*G28)>>8); t=(251*(G30+G31)>>8); F30=t−((201*G31)>>8); F31=t−((301*G30)>>8); E5=((F5+F7)*181>>8); E7=((F5−F7)*181>>8); t=(97*(F8+F9)>>8); E8=t−((−138*F9)>>8); E9=t−((334*F8)>>8); E11=((F11+F12)*181>>8); E12=((F11−F12)*181>>8); t=(97*(F14+F15)>>8); E14=t−((−138*F15)>>8); E15=t−((334*F14)>>8); E16=F16+F18; D18=F16−F18; D17=F17+F19; E19=F17−F19; t=(236*(F20+F21)>>8); E20=t−((334*F21)>>8); E21=t−((138*F20)>>8); E23=((F23+F24)*181>>8); E24=((F23−F24)*181>>8); t=(236*(F26+F27)>>8); E26=t−((334*F27)>>8); E27=t−((138*F26)>>8); E28=−F28+F30; D30=F28+F30; D29=−F29+F31; E31=F29+F31; D0=((E0+E1)*181>>8); D1=((E0−E1)*181>>8); t=(97*(E2+E3)>>8); D2=t−((334*E3)>>8); D3=t−((−138*E2)>>8); D4=E4+E5; D5=E4−E5; D6=−E6+E7; D7=E6+E7; D8=E8+E14; D14=E8−E14; D9=E9+E15; D15=E9−E15; D10=E10+E11; D11=E10−E11; D12=E12+E13; D13=E12−E13; D16=((E16+E19)*181>>8); D19=((E16−E19)*181>>8); D20=E20+E26; D26=E20−E26; D21=E21+E27; D27=E21−E27; D22=E22+E23; D23=E22−E23; D24=E24+E25; D25=E24−E25; D28=((E28+E31)*181>>8); D31=((E28−E31)*181>>8); C0=D0+D3; C3=D0−D3; C1=D1+D2; C2=D1−D2; t=(49*(D4+D7)>>8); C4=t−((301*D7)>>8); C7=t−((−201*D4)>>8); t=(142*(D5+D6)>>8); C5=t−((355*D6)>>8); C6=t−((−70*D5)>>8); C8=D8+D11; C11=D8−D11; C9=D9+D10; C10=D9−D10; C12=D12+D15; C15=D12−D15; C13=D13+D14; C14=D13−D14; C16=D16+D28; C28=D16−D28; C17=D17+D29; C29=D17−D29; C18=D18+D30; C30=D18−D30; C19=D19+D31; C31=D19−D31; C20=D20+D23; C23=D20−D23; C21=D21+D22; C22=D21−D22; C24=D24+D27; C27=D24−D27; C25=D25+D26; C26=D25−D26; B0=C0+C7; B7=C0−C7; B1=C1+C6; B6=C1−C6; B2=C2+C5; B5=C2−C5; B3=C3+C4; B4=C3−C4; t=(197*(C8+C15)>>8); B8=t−((360*C15)>>8); B15=t−((35*C8)>>8); t=(120*(C9+C14)>>8); B9=t−((−105*C14)>>8); B14=t−((346*C9)>>

8); t=(244*(C10+C13)>>8); B10=t-((319*C13)>>8); B13=t-((170*C10)>>8); t=(25*(C11+C12)>>8); B11=t-((-229*C12)>>8); B12=t-((279*C11)>>8); B16=C16+C23; B23=C16-C23; B17=C17+C22; B22=C17-C22; B18=C18+C21; B21=C18-C21; B19=C19+C20; B20=C19-C20; B24=C24+C31; B31=C24-C31; B25=C25+C30; B30=C25-C30; B26=C26+C29; B29=C26-C29; B27=C27+C28; B28=C27-C28; A0=B0+B15; A1=B1+B14; A2=B2+B13; A3=B3+B12; A4=B4+B11; A5=B5+B10; A6=B6+B9; A7=B7+B8; A8=B7-B8; A9=B6-B9; A10=B5-B10; A11=B4-B11; A12=B3-B12; A13=B2-B13; A14=B1-B14; A15=B0-B15; t=(171*(B16+B31)>>8); A16=t-((-17*B31)>>8); A31=t-((361*B16)>>8); t=(205*(B17+B30)>>8); A17=t-((358*B30)>>8); A30=t-((53*B17)>>8); t=(131*(B18+B29)>>8); A18=t-((-871329)>>8); A29=t-((351*B18)>>8); t=(231*(B19+B28)>>8); A19=t-((340*B28)>>8); A28=t-((121*B19)>>8); t=(86*(B20+B27)>>8); A20=t-((-154*B27)>>8); A27=t-((327*B20)>>8); t=(248*(B21+B26)>>8); A21=t-((310*B26)>>8); A26=t-((186*B21)>>8); t=(37*(B22+B25)>>8); A22=t-((-215*B25)>>8); A25=t-((290*B22)>>8); t=(255*(B23+B24)>>8); A23=t-((243*B24)>>8); A24=t-((268*B23)>>8); Y0=A0+A31; Y31=A0-A31; Y1=A1+A30; Y30=A1-A30; Y2=A2+A29; Y29=A2-A29; Y3=A3+A28; Y28=A3-A28; Y4=A4+A27; Y27=A4-A27; Y5=A5+A26; Y26=A5-A26; Y6=A6+A25; Y25=A6-A25; Y7=A7+A24; Y24=A7-A24; Y8=A8+A23; Y23=A8-A23; Y9=A9+A22; Y22=A9-A22; Y10=A10+A21; Y21=A10-A21; Y11=A11+A20; Y20=A11-A20; Y12=A12+A19; Y19=A12-A19; Y13=A13+A18; Y18=A13-A18; Y14=A14+A17; Y17=A14-A17; Y15=A15+A16; Y16=A15-A16 E0=X0; F24=X1; F12=-X2; G16=-X3; E4=X4; G31=X5; F8=X6; F26=-X7; E2=X8; F21=X9; F15=X10; G29=X11; F5=X12; G18=-X13; E13=X14; E22=X15; E1=X16; E25=X17; E10=X18; G19=-X19; F7=X20; G28=-X21; F14=X22; F20=-X23; E3=X24; F27=-X25; F9=X26; G30=-X27; E6=X28; G17=-X29; F11=X30; F23=-X31; t=(251*(G16+G17)>>8); F16=t-((201*G17)>>8); F17=t-((301*G16)>>8); t=(212*(G18+G19)>>8); F18=t-((70*G19)>>8); F19=t-((355*G18)>>8); t=((212*(G28+G29))>>8); F28=t-((70*G29)>>8); F29=t-((355*G28)>>8); t=(251*(G30+G31)>>8); F30=t-((201*G31)>>8); F31=t-((301*G30)>>8); E5=((F5+F7)*181>>8); E7=((F5-F7)*181>>8); t=(97*(F8+F9)>>8); E8=t-((-138*F9)>>8); E9=t-((334*F8)>>8); E11=((F11+F12)*181>>8); E12=((F11-F12)*181>>8); t=(97*(F14+F15)>>8); E14=t-((-138*F15)>>8); E15=t-((334*F14)>>8); E16=F16+F18; D18=F16-F18; D17=F17+F19; E19=F17-F19; t=(236*(F20+F21)>>8); E20=t-((334*F21)>>8); E21=t-((138*F20)>>8); E23=((F23+F24)*181>>8); E24=((F23-F24)*181>>8); t=(236*(F26+F27)>>8); E26=t-((334*F27)>>8); E27=t-((138*F26)>>8); E28=-F28+F30; D30=F28+F30; D29=-F29+F31; E31=F29+F31; D0=((E0+E1)*181>>8); D1=((E0-E1)*181>>8); t=(97*(E2+E3)>>8); D2=t-((334*E3)>>8); D3=t-((-138*E2)>>8); D4=E4+E5; D5=E4-E5; D6=-E6+E7; D7=E6+E7; D8=E8+E14; D14=E8-E14; D9=E9+E15; D15=E9-E15; D10=E10+E11; D11=E10-E11; D12=E12+E13; D13=E12-E13; D16=((E16+E19)*181>>8); D19=((E16-E19)*181>>8); D20=E20+E26; D26=E20-E26; D21=E21+E27; D27=E21-E27; D22=E22+E23; D23=E22-E23; D24=E24+E25; D25=E24-E25; D28=((E28+E31)*181>>8); D31=((E28-E31)*181>>8); C0=D0+D3; C3=D0-D3; C1=D1+D2; C2=D1-D2; t=(49*(D4+D7)>>8); C4=t-((301*D7)>>8); C7=t-((-201*D4)>>8); t=(142*(D5+D6)>>8); C5=t-((355*D6)>>8); C6=t-((-70*D5)>>8); C8=D8+D11; C11=D8-D11; C9=D9+D10; C10=D9-D10; C12=D12+D15; C15=D12-D15; C13=D13+D14; C14=D13-D14; C16=D16+D28; C28=D16-D28; C17=D17+D29; C29=D17-D29; C18=D18+D30; C30=D18-D30; C19=D19+D31; C31=D19-D31; C20=D20+D23; C23=D20-D23; C21=D21+D22; C22=D21-D22; C24=D24+D27; C27=D24-D27; C25=D25+D26; C26=D25-D26; B0=C0+C7; B7=C0-C7; B1=C1+C6; B6=C1-C6; B2=C2+C5; B5=C2-C5; B3=C3+C4; B4=C3-C4; t=(197*(C8+C15)>>8); B8=t-((360*C15)>>8); B15=t-((35*C8)>>8); t=(120*(C9+C14)>>8); B9=t-((-105*C14)>>8); B14=t-((346*C9)>>8); t=(244*(C10+C13)>>8); B10=t-((319*C13)>>8); B13=t-((170*C10)>>8); t=(25*(C11+C12)>>8); B11=t-((-229*C12)>>8); B12=t-((279*C11)>>8); B16=C16+C23; B23=C16-C23; B17=C17+C22; B22=C17-C22; B18=C18+C21; B21=C18-C21; B19=C19+C20; B20=C19-C20; B24=C24+C31; B31=C24-C31; B25=C25+C30; B30=C25-C30; B26=C26+C29; B29=C26-C29; B27=C27+C28; B28=C27-C28; A0=B0+B15; A1=B1+B14; A2=B2+B13; A3=B3+B12; A4=B4+B11; A5=B5+B10; A6=B6+B9; A7=B7+B8; A8=B7-B8; A9=B6-B9; A10=B5-B10; A11=B4-B11; A12=B3-B12; A13=B2-B13; A14=B1-B14; A15=B0-B15; t=(171*(B16+B31)>>8); A16=t-((-17*B31)>>8); A31=t-((361*B16)>>8); t=(205*(B17+B30)>>8); A17=t-((358*B30)>>8); A30=t-((53*B17)>>8); t=(131*(B18+B29)>>8); A18=t-((-87*B29)>>8); A29=t-((351*B18)>>8); t=(231*(B19+B28)>>8); A19=t-((340*B28)>>8); A28=t-((121*B19)>>8); t=(86*(B20+B27)>>8); A20=t-((-154*B27)>>8); A27=t-((327*B20)>>8); t=(248*(B21+B26)>>8); A21=t-((310*B26)>>8); A26=t-((186*B21)>>8); t=(37*(B22+B25)>>8); A22=t-((-215*B25)>>8); A25=t-((290*B22)>>8); t=(255*(B23+B24)>>8); A23=t-((243*B24)>>8); A24=t-((268*B23)>>8); Y0=A0+A31; Y31=A0-A31; Y1=A1+A30; Y30=A1-A30; Y2=A2+A29; Y29=A2-A29; Y3=A3+A28; Y28=A3-A28; Y4=A4+A27; Y27=A4-A27; Y5=A5+A26; Y26=A5-A26; Y6=A6+A25; Y25=A6-A25; Y7=A7+A24; Y24=A7-A24; Y8=A8+A23; Y23=A8-A23; Y9=A9+A22; Y22=A9-A22; Y10=A10+A21; Y21=A10-A21; Y11=A11+A20; Y20=A11-A20; Y12=A12+A19; Y19=A12-A19; Y13=A13+A18; Y18=A13-A18; Y14=A14+A17; Y17=A14-A17; Y15=A15+A16; Y16=A15-A16 E0=X0; F24=X1; F12=-X2; G16=-X3; E4=X4; G31=X5; F8=X6; F26=-X7; E2=X8; F21=X9; F15=X10; G29=X11; F5=X12; G18=-X13; E13=X14; E22=X15; E1=X16; E25=X17; E10=X18; G19=-X19; F7=X20; G28=-X21; F14=X22; F20=-X23; E3=X24; F27=-X25; F9=X26; G30=-X27; E6=X28; G17=-X29; F11=X30; F23=-X31; t=(251*(G16+G17)>>8); F16=t-((201*G17)>>8); F17=t-((301*G16)>>8); t=(212*(G18+G19)>>8); F18=t-((70*G19)>>8); F19=t-((355*G18)>>8); t=((212*(G28+G29))>>8); F28=t-((70*G29)>>8); F29=t-((355*G28)>>8); t=(251*(G30+G31)>>8); F30=t-((201*G31)>>8); F31=t-((301*G30)>>8); E5=((F5+F7)*181>>8); E7=((F5-F7)*181>>8); t=(97*(F8+F9)>>8); E8=t-((-138*F9)>>8); E9=t-((334*F8)>>8); E11=((F11+F12)*181>>8); E12=((F11-F12)*181>>8); t=(97*(F14+F15)>>8); E14=t-((-138*F15)>>8); E15=t-((334*F14)>>8); E16=F16+F18; D18=F16-F18; D17=F17+F19; E19=F17-F19; t=(236*(F20+F21)>>8); E20=t-((334*F21)>>8); E21=t-((138*F20)>>8); E23=((F23+F24)*181>>8); E24=((F23-F24)*181>>8); t=(236*(F26+F27)>>8); E26=t-((334*F27)>>8); E27=t-((138*F26)>>8); E28=-F28+F30; D30=F28+F30; D29=-F29+F31; E31=F29+F31; D0=((E0+E1)*181>>8); D1=((E0-E1)*181>>8); t=(97*(E2+E3)>>8); D2=t-((334*E3)>>8); D3=t-((-138*E2)>>8); D4=E4+E5; D5=E4-E5; D6=-E6+E7; D7=E6+E7; D8=E8+E14;

D14=E8−E14; D9=E9+E15; D15=E9−E15; D10=E10+E11; D11=E10−E11; D12=E12+E13; D13=E12−E13; D16=((E16+E19)*181>>8); D19=((E16−E19)*181>>8); D20=E20+E26; D26=E20−E26; D21=E21+E27; D27=E21−E27; D22=E22+E23; D23=E22−E23; D24=E24+E25; D25=E24−E25; D28=((E28+E31)*181>>8); D31=((E28−E31)*181>>8); C0=D0+D3; C3=D0−D3; C1=D1+D2; C2=D1−D2; t=(49*(D4+D7)>>8); C4=t−((301*D7)>>8); C7=t−((−201*D4)>>8); t=(142*(D5+D6)>>8); C5=t−((355*D6)>>8); C6=t−((−70*D5)>>8); C8=D8+D11; C11=D8−D11; C9=D9+D10; C10=D9−D10; C12=D12+D15; C15=D12−D15; C13=D13+D14; C14=D13−D14; C16=D16+D28; C28=D16−D28; C17=D17+D29; C29=D17−D29; C18=D18+D30; C30=D18−D30; C19=D19+D31; C31=D19−D31; C20=D20+D23; C23=D20−D23; C21=D21+D22; C22=D21−D22; C24=D24+D27; C27=D24−D27; C25=D25+D26; C26=D25−D26; B0=C0+C7; B7=C0−C7; B1=C1+C6; B6=C1−C6; B2=C2+C5; B5=C2−C5; B3=C3+C4; B4=C3−C4; t=(197*(C8+C15)>>8); B8=t−((360*C15)>>8); B15=t−((35*C8)>>8); t=(120*(C9+C14)>>8); B9=t−((−105*C14)>>8); B14=t−((346*C9)>>8); t=(244*(C10+C13)>>8); B10=t−((319*C13)>>8); B13=t−((170*C10)>>8); t=(25*(C11+C12)>>8); B11=t−((−229*C12)>>8); B12=t−((279*C11)>>8); B16=C16+C23; B23=C16−C23; B17=C17+C22; B22=C17−C22; B18=C18+C21; B21=C18−C21; B19=C19+C20; B20=C19−C20; B24=C24+C31; B31=C24−C31; B25=C25+C30; B30=C25−C30; B26=C26+C29; B29=C26−C29; B27=C27+C28; B28=C27−C28; A0=B0+B15; A1=B1+B14; A2=B2+B13; A3=B3+B12; A4=B4+B11; A5=B5+B10; A6=B6+B9; A7=B7+B8; A8=B7−B8; A9=B6−B9; A10=B5−B10; A11=B4−B11; A12=B3−B12; A13=B2−B13; A14=B1−B14; A15=B0−B15; t=(171*(B16+B31)>>8); A16=t−((−17*B31)>>8); A31=t−((361*B16)>>8); t=(205*(B17+B30)>>8); A17=t−((358*B30)>>8); A30=t−((53*B17)>>8); t=(131*(B18+B29)>>8); A18=t−((−87*B29)>>8); A29=t−((351*B18)>>8); t=(231*(B19+B28)>>8); A19=t−((340*B28)>>8); A28=t−((121*B19)>>8); t=(86*(B20+B27)>>8); A20=t−((−154*B27)>>8); A27=t−((327*B20)>>8); t=(248*(B21+B26)>>8); A21=t−((310*B26)>>8); A26=t−((186*B21)>>8); t=(37*(B22+B25)>>8); A22=t−((−215*B25)>>8); A25=t−((290*B22)>>8); t=(255*(B23+B24)>>8); A23=t−((243*B24)>>8); A24=t−((268*B23)>>8); Y0=A0+A31; Y31=A0−A31; Y1=A1+A30; Y30=A1−A30; Y2=A2+A29; Y29=A2−A29; Y3=A3+A28; Y28=A3−A28; Y4=A4+A27; Y27=A4−A27; Y5=A5+A26; Y26=A5−A26; Y6=A6+A25; Y25=A6−A25; Y7=A7+A24; Y24=A7−A24; Y8=A8+A23; Y23=A8−A23; Y9=A9+A22; Y22=A9−A22; Y10=A10+A21; Y21=A10−A21; Y11=A11+A20; Y20=A11−A20; Y12=A12+A19; Y19=A12−A19; Y13=A13+A18; Y18=A13−A18; Y14=A14+A17; Y17=A14−A17; Y15=A15+A16; Y16=A15−A16 E0=X0; F24=X1; F12=−X2; G16=−X3; E4=X4; G31=X5; F8=X6; F26=−X7; E2=X8; F21=X9; F15=X10; G29=X11; F5=X12; G18=−X13; E13=X14; E22=X15; E1=X16; E25=X17; E10=X18; G19=−X19; F7=X20; G28=−X21; F14=X22; F20=−X23; E3=X24; F27=−X25; F9=X26; G30=−X27; E6=X28; G17=−X29; F11=X30; F23=−X31; t=(251*(G16+G17)>>8); F16=t−((201*G17)>>8); F17=t−((301*G16)>>8); t=(212*(G18+G19)>>8); F18=t−((70*G19)>>8); F19=t−((355*G18)>>8); t=((212*(G28+G29))>>8); F28=t−((70*G29)>>8); F29=t−((355*G28)>>8); t=(251*(G30+G31)>>8); F30=t−((201*G31)>>8); F31=t−((301*G30)>>8); E5=((F5+F7)*181>>8); E7=((F5−F7)*181>>8); t=(97*(F8+F9)>>8); E8=t−((−138*F9)>>8); E9=t−((334*F8)>>8); E11=((F11+F12)*181>>8); E12=((F11−F12)*181>>8); t=(97*(F14+F15)>>8); E14=t−((−138*F15)>>8); E15=t−((334*F14)>>8); E16=F16+F18; D18=F16−F18; D17=F17+F19; E19=F17−F19; t=(236*(F20+F21)>>8); E20=t−((334*F21)>>8); E21=t−((138*F20)>>8); E23=((F23+F24)*181>>8); E24=((F23−F24)*181>>8); t=(236*(F26+F27)>>8); E26=t−((334*F27)>>8); E27=t−((138*F26)>>8); E28=−F28+F30; D30=F28+F30; D29=−F29+F31; E31=F29+F31; D0=((E0+E1)*181>>8); D1=((E0−E1)*181>>8); t=(97*(E2+E3)>>8); D2=t−((334*E3)>>8); D3=t−((−138*E2)>>8); D4=E4+E5; D5=E4−E5; D6=−E6+E7; D7=E6+E7; D8=E8+E14; D14=E8−E14; D9=E9+E15; D15=E9−E15; D10=E10+E11; D11=E10−E11; D12=E12+E13; D13=E12−E13; D16=((E16+E19)*181>>8); D19=((E16−E19)*181>>8); D20=E20+E26; D26=E20−E26; D21=E21+E27; D27=E21−E27; D22=E22+E23; D23=E22−E23; D24=E24+E25; D25=E24−E25; D28=((E28+E31)*181>>8); D31=((E28−E31)*181>>8); C0=D0+D3; C3=D0−D3; C1=D1+D2; C2=D1−D2; t=(49*(D4+D7)>>8); C4=t−((301*D7)>>8); C7=t−((−201*D4)>>8); t=(142*(D5+D6)>>8); C5=t−((355*D6)>>8); C6=t−((−70*D5)>>8); C8=D8+D11; C11=D8−D11; C9=D9+D10; C10=D9−D10; C12=D12+D15; C15=D12−D15; C13=D13+D14; C14=D13−D14; C16=D16+D28; C28=D16−D28; C17=D17+D29; C29=D17−D29; C18=D18+D30; C30=D18−D30; C19=D19+D31; C31=D19−D31; C20=D20+D23; C23=D20−D23; C21=D21+D22; C22=D21−D22; C24=D24+D27; C27=D24−D27; C25=D25+D26; C26=D25−D26; B0=C0+C7; B7=C0−C7; B1=C1+C6; B6=C1−C6; B2=C2+C5; B5=C2−C5; B3=C3+C4; B4=C3−C4; t=(197*(C8+C15)>>8); B8=t−((360*C15)>>8); B15=t−((35*C8)>>8); t=(120*(C9+C14)>>8); B9=t−((−105*C14)>>8); B14=t−((346*C9)>>8); t=(244*(C10+C13)>>8); B10=t−((319*C13)>>8); B13=t−((170*C10)>>8); t=(25*(C11+C12)>>8); B11=t−((−229*C12)>>8); B12=t−((279*C11)>>8); B16=C16+C23; B23=C16−C23; B17=C17+C22; B22=C17−C22; B18=C18+C21; B21=C18−C21; B19=C19+C20; B20=C19−C20; B24=C24+C31; B31=C24−C31; B25=C25+C30; B30=C25−C30; B26=C26+C29; B29=C26−C29; B27=C27+C28; B28=C27−C28; A0=B0+B15; A1=B1+B14; A2=B2+B13; A3=B3+B12; A4=B4+B11; A5=B5+B10; A6=B6+B9; A7=B7+B8; A8=B7−B8; A9=B6−B9; A10=B5−B10; A11=B4−B11; A12=B3−B12; A13=B2−B13; A14=B1−B14; A15=B0−B15; t=(171*(B16+B31)>>8); A16=t−((−17*B31)>>8); A31=t−((361*B16)>>8); t=(205*(B17+B30)>>8); A17=t−((358*B30)>>8); A30=t−((53*B17)>>8); t=(131*(B18+B29)>>8); A18=t−((−87*B29)>>8); A29=t−((351*B18)>>8); t=(231*(B19+B28)>>8); A19=t−((340*B28)>>8); A28=t−((121*B19)>>8); t=(86*(B20+B27)>>8); A20=t−((−154*B27)>>8); A27=t−((327*B20)>>8); t=(248*(B21+B26)>>8); A21=t−((310*B26)>>8); A26=t−((186*B21)>>8); t=(37*(B22+B25)>>8); A22=t−((−215*B25)>>8); A25=t−((290*B22)>>8); t=(255*(B23+B24)>>8); A23=t−((243*B24)>>8); A24=t−((268*B23)>>8); Y0=A0+A31; Y31=A0−A31; Y1=A1+A30; Y30=A1−A30; Y2=A2+A29; Y29=A2−A29; Y3=A3+A28; Y28=A3−A28; Y4=A4+A27; Y27=A4−A27; Y5=A5+A26; Y26=A5=A26; Y6=A6+A25; Y25=A6−A25; Y7=A7+A24; Y24=A7−A24; Y8=A8+A23; Y23=A8−A23; Y9=A9+A22; Y22=A9−A22; Y10=A10+A21; Y21=A10−A21; Y11=A11+A20; Y20=A11−A20; Y12=A12+A19; Y19=A12−A19; Y13=A13+A18; Y18=A13−A18; Y14=A14+A17; Y17=A14−A17; Y15=A15+A16; Y16=A15−A16 E0=X0; F24=X1; F12=−X2; G16=−X3; E4=X4; G31=X5; F8=X6; F26=−X7; E2=X8; F21=X9; F15=X10; G29=X11; F5=X12; G18=−X13; E13=X14;

E22=X15; E1=X16; E25=X17; E10=X18; G19=−X19; F7=X20; G28=−X21; F14=X22; F20=−X23; E3=X24; F27=−X25; F9=X26; G30=−X27; E6=X28; G17=−X29; F11=X30; F23=−X31; t=(251*(G16+G17)>>8); F16=t−((201*G17)>>8); F17=t−((301*G16)>>8); t=(212*(G18+G19)>>8); F18=t−((70*G19)>>8); F19=t−((355*G18)>>8); t=((212*(G28+G29))>>8); F28=t−((70*G29)>>8); F29=t−((355*G28)>>8); t=(251*(G30+G31)>>8); F30=t−((201*G31)>>8); F31=t−((301*G30)>>8); E5=((F5+F7)*181>>8); E7=((F5−F7)*181>>8); t=(97*(F8+F9)>>8); E8=t−((−138*F9)>>8); E9=t−((334*F8)>>8); E11=((F11+F12)*181>>8); E12=((F11−F12)*181>>8); t=(97*(F14+F15)>>8); E14=t−((−138*F15)>>8); E15=t−((334*F14)>>8); E16=F16+F18; D18=F16−F18; D17=F17+F19; E19=F17−F19; t=(236*(F20+F21)>>8); E20=t−((334*F21)>>8); E21=t−((138*F20)>>8); E23=((F23+F24)*181>>8); E24=((F23−F24)*181>>8); t=(236*(F26+F27)>>8); E26=t−((334*F27)>>8); E27=t−((138*F26)>>8); E28=−F28+F30; D30=F28+F30; D29=−F29+F31; E31=F29+F31; D0=((E0+E1)*181>>8); D1=((E0−E1)*181>>8); t=(97*(E2+E3)>>8); D2=t−((334*E3)>>8); D3=t−((−138*E2)>>8); D4=E4+E5; D5=E4−E5; D6=−E6+E7; D7=E6+E7; D8=E8+E14; D14=E8−E14; D9=E9+E15; D15=E9−E15; D10=E10+E11; D11=E10−E11; D12=E12+E13; D13=E12−E13; D16=((E16+E19)*181>>8); D19=((E16−E19)*181>>8); D20=E20+E26; D26=E20−E26; D21=E21+E27; D27=E21−E27; D22=E22+E23; D23=E22−E23; D24=E24+E25; D25=E24−E25; D28=((E28+E31)*181>>8); D31=((E28−E31)*181>>8); C0=D0+D3; C3=D0−D3; C1=D1+D2; C2=D1−D2; t=(49*(D4+D7)>>8); C4=t−((301*D7)>>8); C7=t−((−201*D4)>>8); t=(142*(D5+D6)>>8); C5=t−((355*D6)>>8); C6=t−((−70*D5)>>8); C8=D8+D11; C11=D8−D11; C9=D9+D10; C10=D9−D10; C12=D12+D15; C15=D12−D15; C13=D13+D14; C14=D13−D14; C16=D16+D28; C28=D16−D28; C17=D17+D29; C29=D17−D29; C18=D18+D30; C30=D18−D30; C19=D19+D31; C31=D19−D31; C20=D20+D23; C23=D20−D23; C21=D21+D22; C22=D21−D22; C24=D24+D27; C27=D24−D27; C25=D25+D26; C26=D25−D26; B0=C0+C7; B7=C0−C7; B1=C1+C6; B6=C1−C6; B2=C2+C5; B5=C2−C5; B3=C3+C4; B4=C3−C4; t=(197*(C8+C15)>>8); B8=t−((360*C15)>>8); B15=t−((35*C8)>>8); t=(120*(C9+C14)>>8); B9=t−((−105*C14)>>8); B14=t−((346*C9)>>8); t=(244*(C10+C13)>>8); B10=t−((319*C13)>>8); B13=t−((170*C10)>>8); t=(25*(C11+C12)>>8); B11=t−((−229*C12)>>8); B12=t−((279*C11)>>8); B16=C16+C23; B23=C16−C23; B17=C17+C22; B22=C17−C22; B18=C18+C21; B21=C18−C21; B19=C19+C20; B20=C19−C20; B24=C24+C31; B31=C24−C31; B25=C25+C30; B30=C25−C30; B26=C26+C29; B29=C26−C29; B27=C27+C28; B28=C27−C28; A0=B0+B15; A1=B1+B14; A2=B2+B13; A3=B3+B12; A4=B4+B11; A5=B5+B10; A6=B6+B9; A7=B7+B8; A8=B7−B8; A9=B6−B9; A10=B5−B10; A11=B4−B11; A12=B3−B12; A13=B2−B13; A14=B1−B14; A15=B0−B15; t=(171*(B16+B31)>>8); A16=t−((−17*B31)>>8); A31=t−((361*B16)>>8); t=(205*(B17+B30)>>8); A17=t−((358*B30)>>8); A30=t−((53*B17)>>8); t=(131*(B18+B29)>>8); A18=t−((−87*B29)>>8); A29=t−((351*B18)>>8); t=(231*(B19+B28)>>8); A19=t−((340*B28)>>8); A28=t−((121*B19)>>8); t=(86*(B20+B27)>>8); A20=t−((−154*B27)>>8); A27=t−((327*B20)>>8); t=(248*(B21+B26)>>8); A21=t−((310*B26)>>8); A26=t−((186*B21)>>8); t=(37*(B22+B25)>>8); A22=t−((−215*B25)>>8); A25=t−((290*B22)>>8); t=(255*(B23+B24)>>8); A23=t−((243*B24)>>8); A24=t−((268*B23)>>8); Y0=A0+A31; Y31=A0−A31; Y1=A1+A30; Y30=A1−A30; Y2=A2+A29; Y29=A2−A29; Y3=A3+A28; Y28=A3−A28; Y4=A4+A27; Y27=A4−A27; Y5=A5+A26; Y26=A5−A26; Y6=A6+A25; Y25=A6−A25; Y7=A7+A24; Y24=A7−A24; Y8=A8+A23; Y23=A8−A23; Y9=A9+A22; Y22=A9−A22; Y10=A10+A21; Y21=A10−A21; Y11=A11+A20; Y20=A11−A20; Y12=A12+A19; Y19=A12−A19; Y13=A13+A18; Y18=A13−A18; Y14=A14+A17; Y17=A14−A17; Y15=A15+A16; Y16=A15−A16

E0=X0; F24=X1; F12=−X2; G16=−X3; E4=X4; G31=X5; F8=X6; F26=−X7; E2=X8; F21=X9; F15=X10; G29=X11; F5=X12; G18=−X13; E13=X14; E22=X15; E1=X16; E25=X17; E10=X18; G19=−X19; F7=X20; G28=−X21; F14=X22; F20=−X23; E3=X24; F27=−X25; F9=X26; G30=−X27; E6=X28; G17=−X29; F11=X30; F23=−X31; t=(251*(G16+G17)>>8); F16=t−((201*G17)>>8); F17=t−((301*G16)>>8); t=(212*(G18+G19)>>8); F18=t−((70*G19)>>8); F19=t−((355*G18)>>8); t=((212*(G28+G29))>>8); F28=t−((70*G29)>>8); F29=t−((355*G28)>>8); t=(251*(G30+G31)>>8); F30=t−((201*G31)>>8); F31=t−((301*G30)>>8); E5=((F5+F7)*181>>8); E7=((F5−F7)*181>>8); t=(97*(F8+F9)>>8); E8=t−((−138*F9)>>8); E9=t−((334*F8)>>8); E11=((F11+F12)*181>>8); E12=((F11−F12)*181>>8); t=(97*(F14+F15)>>8); E14=t−((−138*F15)>>8); E15=t−((334*F14)>>8); E16=F16+F18; D18=F16−F18; D17=F17+F19; E19=F17−F19; t=(236*(F20+F21)>>8); E20=t−((334*F21)>>8); E21=t−((138*F20)>>8); E23=((F23+F24)*181>>8); E24=((F23−F24)*181>>8); t=(236*(F26+F27)>>8); E26=t−((334*F27)>>8); E27=t−((138*F26)>>8); E28=−F28+F30; D30=F28+F30; D29=−F29+F31; E31=F29+F31; D0=((E0+E1)*181>>8); D1=((E0−E1)*181>>8); t=(97*(E2+E3)>>8); D2=t−((334*E3)>>8); D3=t−((−138*E2)>>8); D4=E4+E5; D5=E4−E5; D6=−E6+E7; D7=E6+E7; D8=E8+E14; D14=E8−E14; D9=E9+E15; D15=E9−E15; D10=E10+E11; D11=E10−E11; D12=E12+E13; D13=E12−E13; D16=((E16+E19)*181>>8); D19=((E16−E19)*181>>8); D20=E20+E26; D26=E20−E26; D21=E21+E27; D27=E21−E27; D22=E22+E23; D23=E22−E23; D24=E24+E25; D25=E24−E25; D28=((E28+E31)*181>>8); D31=((E28−E31)*181>>8); C0=D0+D3; C3=D0−D3; C1=D1+D2; C2=D1−D2; t=(49*(D4+D7)>>8); C4=t−((301*D7)>>8); C7=t−((−201*D4)>>8); t=(142*(D5+D6)>>8); C5=t−((355*D6)>>8); C6=t−((−70*D5)>>8); C8=D8+D11; C11=D8−D11; C9=D9+D10; C10=D9−D10; C12=D12+D15; C15=D12−D15; C13=D13+D14; C14=D13−D14; C16=D16+D28; C28=D16−D28; C17=D17+D29; C29=D17−D29; C18=D18+D30; C30=D18−D30; C19=D19+D31; C31=D19−D31; C20=D20+D23; C23=D20−D23; C21=D21+D22; C22=D21−D22; C24=D24+D27; C27=D24−D27; C25=D25+D26; C26=D25−D26; B0=C0+C7; B7=C0−C7; B1=C1+C6; B6=C1−C6; B2=C2+C5; B5=C2−C5; B3=C3+C4; B4=C3−C4; t=(197*(C8+O15)>>8); B8=t−((360*C15)>>8); B15=t−((35*C8)>>8); t=(120*(C9+C14)>>8); B9=t−((−105*C14)>>8); B14=t−((346*C9)>>8); t=(244*(C10+C13)>>8); B10=t−((319*C13)>>8); B13=t−((170*C10)>>8); t=(25*(C11+C12)>>8); B11=t−((−229*C12)>>8); B12=t−((279*C11)>>8); B16=C16+C23; B23=C16−C23; B17=C17+C22; B22=C17−C22; B18=C18+C21; B21=C18−C21; B19=C19+C20; B20=C19−C20; B24=C24+C31; B31=C24−C31; B25=C25+C30; B30=C25−C30; B26=C26+C29; B29=C26−C29; B27=C27+C28; B28=C27−C28; A0=B0+B15; A1=B1+B14; A2=B2+B13; A3=B3+B12; A4=B4+B11; A5=B5+B10; A6=B6+B9; A7=B7+B8; A8=B7−B8; A9=B6−B9; A10=B5−B10; A11=B4−B11; A12=B3−B12; A13=B2−B13; A14=B1−B14; A15=B0−B15; t=(171*(B16+B31)>>

8); A16=t−((−17*B31)>>8); A31=t−((361*B16)>>8); t=(205*(B17+B30)>>8); A17=t−((358*B30)>>8); A30=t−((53*B17)>>8); t=(131*(B18+B29)>>8); A18=t−((−87*B29)>>8); A29=t−((351*B18)>>8); t=(231*(B19+B28)>>8); A19=t−((340*B28)>>8); A28=t−((121*B19)>>8); t=(86*(B20+B27)>>8); A20=t−((−154*B27)>>8); A27=t−((327*B20)>>8); t=(248*(B21+B26)>>8); A21=t−((310*B26)>>8); A26=t−((186*B21)>>8); t=(37*(B22+B25)>>8); A22=t−((−215*B25)>>8); A25=t−((290*B22)>>8); t=(255*(B23+B24)>>8); A23=t−((243*B24)>>8); A24=t−((268*B23)>>8); Y0=A0+A31; Y31=A0−A31; Y1=A1+A30; Y30=A1−A30; Y2=A2+A29; Y29=A2−A29; Y3=A3+A28; Y28=A3−A28; Y4=A4+A27; Y27=A4−A27; Y5=A5+A26; Y26=A5−A26; Y6=A6+A25; Y25=A6−A25; Y7=A7+A24; Y24=A7−A24; Y8=A8+A23; Y23=A8−A23; Y9=A9+A22; Y22=A9−A22; Y10=A10+A21; Y21=A10−A21; Y11=A11+A20; Y20=A11−A20; Y12=A12+A19; Y19=A12−A19; Y13=A13+A18; Y18=A13−A18; Y14=A14+A17; Y17=A14−A17; Y15=A15+A16; Y16=A15−A16 E0=X0; F24=X1; F12=−X2; G16=−X3; E4=X4; G31=X5; F8=X6; F26=−X7; E2=X8; F21=X9; F15=X10; G29=X11; F5=X12; G18=−X13; E13=X14; E22=X15; E1=X16; E25=X17; E10=X18; G19=−X19; F7=X20; G28=−X21; F14=X22; F20=−X23; E3=X24; F27=−X25; F9=X26; G30=−X27; E6=X28; G17=−X29; F11=X30; F23=−X31; t=(251*(G16+G17)>>8); F16=t−((201*G17)>>8); F17=t−((301*G16)>>8); t=(212*(G18+G19)>>8); F18=t−((70*G19)>>8); F19=t−((355*G18)>>8); t=((212*(G28+G29))>>8); F28=t−((70*G29)>>8); F29=t−((355*G28)>>8); t=(251*(G30+G31)>>8); F30=t−((201*G31)>>8); F31=t−((301*G30)>>8); E5=((F5+F7)*181>>8); E7=((F5−F7)*181>>8); t=(97*(F8+F9)>>8); E8=t−((−138*F9)>>8); E9=t−((334*F8)>>8); E11=((F11+F12)*181>>8); E12=((F11−F12)*181>>8); t=(97*(F14+F15)>>8); E14=t−((−138*F15)>>8); E15=t−((334*F14)>>8); E16=F16+F18; D18=F16−F18; D17=F17+F19; E19=F17−F19; t=(236*(F20+F21)>>8); E20=t−((334*F21)>>8); E21=t−((138*F20)>>8); E23=((F23+F24)*181>>8); E24=((F23−F24)*181>>8); t=(236*(F26+F27)>>8); E26=t−((334*F27)>>8); E27=t−((138*F26)>>8); E28=−F28+F30; D30=F28+F30; D29=−F29+F31; E31=F29+F31; D0=((E0+E1)*181>>8); D1=((E0−E1)*181>>8); t=(97*(E2+E3)>>8); D2=t−((334*E3)>>8); D3=t−((−138*E2)>>8); D4=E4+E5; D5=E4−E5; D6=−E6+E7; D7=E6+E7; D8=E8+E14; D14=E8−E14; D9=E9+E15; D15=E9−E15; D10=E10+E11; D11=E10−E11; D12=E12+E13; D13=E12−E13; D16=((E16+E19)*181>>8); D19=((E16−E19)*181>>8); D20=E20+E26; D26=E20−E26; D21=E21+E27; D27=E21−E27; D22=E22+E23; D23=E22−E23; D24=E24+E25; D25=E24−E25; D28=((E28+E31)*181>>8); D31=((E28−E31)*181>>8); C0=D0+D3; C3=D0−D3; C1=D1+D2; C2=D1−D2; t=(49*(D4+D7)>>8); C4=t−((301*D7)>>8); C7=t−((−201*D4)>>8); t=(142*(D5+D6)>>8); C5=t−((355*D6)>>8); C6=t−((−70*D5)>>8); C8=D8+D11; C11=D8−D11; C9=D9+D10; C10=D9−D10; C12=D12+D15; C15=D12−D15; C13=D13+D14; C14=D13−D14; C16=D16+D28; C28=D16−D28; C17=D17+D29; C29=D17−D29; C18=D18+D30; C30=D18−D30; C19=D19+D31; C31=D19−D31; C20=D20+D23; C23=D20−D23; C21=D21+D22; C22=D21−D22; C24=D24+D27; C27=D24−D27; C25=D25+D26; C26=D25−D26; B0=C0+C7; B7=C0−C7; B1=C1+C6; B6=C1−C6; B2=C2+C5; B5=C2−C5; B3=C3+C4; B4=C3−C4; t=(197*(C8+C15)>>8); B8=t−((360*C15)>>8); B15=t−((35*C8)>>8); t=(120*(C9+C14)>>8); B9=t−((−105*C14)>>8); B14=t−((346*C9)>>8); t=(244*(C10+C13)>>8); B10=t−((319*C13)>>8); B13=t−((170*C10)>>8); t=(25*(C11+C12)>>8); B11=t−((−229*C12)>>8); B12=t−((279*C11)>>8); B16=C16+C23; B23=C16−C23; B17=C17+C22; B22=C17−C22; B18=C18+C21; B21=C18−C21; B19=C19+C20; B20=C19−C20; B24=C24+C31; B31=C24−C31; B25=C25+C30; B30=C25−C30; B26=C26+C29; B29=C26−C29; B27=C27+C28; B28=C27−C28; A0=B0+B15; A1=B1+B14; A2=B2+B13; A3=B3+B12; A4=B4+B11; A5=B5+B10; A6=B6+B9; A7=B7+B8; A8=B7−B8; A9=B6−B9; A10=B5−B10; A11=B4−B11; A12=B3−B12; A13=B2−B13; A14=B1−B14; A15=B0−B15; t=(171*(B16+B31)>>8); A16=t−((−17*B31)>>8); A31=t−((361*B16)>>8); t=(205*(B17+B30)>>8); A17=t−((358*B30)>>8); A30=t−((53*B17)>>8); t=(131*(B18+B29)>>8); A18=t−((−87*B29)>>8); A29=t−((351*B18)>>8); t=(231*(B19+B28)>>8); A19=t−((340*B28)>>8); A28=t−((121*B19)>>8); t=(86*(B20+B27)>>8); A20=t−((−154*B27)>>8); A27=t−((327*B20)>>8); t=(248*(B21+B26)>>8); A21=t−((310*B26)>>8); A26=t−((186*B21)>>8); t=(37*(B22+B25)>>8); A22=t−((−215*B25)>>8); A25=t−((290*B22)>>8); t=(255*(B23+B24)>>8); A23=t−((243*B24)>>8); A24=t−((268*B23)>>8); Y0=A0+A31; Y31=A0−A31; Y1=A1+A30; Y30=A1−A30; Y2=A2+A29; Y29=A2−A29; Y3=A3+A28; Y28=A3−A28; Y4=A4+A27; Y27=A4−A27; Y5=A5+A26; Y26=A5−A26; Y6=A6+A25; Y25=A6−A25; Y7=A7+A24; Y24=A7−A24; Y8=A8+A23; Y23=A8−A23; Y9=A9+A22; Y22=A9−A22; Y10=A10+A21; Y21=A10−A21; Y11=A11+A20; Y20=A11−A20; Y12=A12+A19; Y19=A12−A19; Y13=A13+A18; Y18=A13−A18; Y14=A14+A17; Y17=A14−A17; Y15=A15+A16; Y16=A15−A16

1D discrete cosine inverse transform with respect to a 32×32 block transformed according to the changed butterfly structure 1920 of FIG. 19 may be expressed as the following operation processes, wherein X0 through X31 denote input values to be inverse-transformed, A0 through A31, B0 through B31, C0 through C31, D0 through D31, E0 through E31, F0 through F31, G0 through G31, and H0 through H31 denote intermediate values, t denotes an auxiliary variable, and Y0 through Y31 denote inverse-transformed values:

E0=X0; F24=X1; F12=X2; G16=−X3; F7=X4; G31=X5; F9=X6; F26=−X7; E3=X8; F21=X9; F14=X10; G29=X11; E5=X12; G18=−X13; E13=X14; E22=X15; E1=X16; E25=X17; E10=X18; G19=−X19; E6=X20; G28=−X21; F15=X22; F20=−X23; E2=X24; F27=−X25; F8=X26; G30=−X27; F4=X28; G17=−X29; F11=X30; F23=−X31; F17=G17−((G16*3)>>4); F16=G16+((F17*25)>>7); F19=G19−((G18*59)>>7); F18=G18+((F19*171)>>8); F29=G29−((G28*59)>>7); F28=G28+((F29*171)>>8); F31=G31−((G30*3)>>4); F30=G30+((F31*25)>>7); E4=(F7>>1)−F4; E7=F7−E4; E9=−F9+((F8*45)>>7); E8=F8−((E9*53)>>7); E12=F12+(F11>>1); E11=F11−E12; E15=F15+((F14*45)>>7); E14=F14−((E15*53)>>7); E16=F16+F18; D18=F16−F18; D17=F17+F19; E19=F17−F19; E21=F21+((F20*45)>>7); E20=F20−((E21*53)>>7); E24=F24+(F23>>1); E23=F23−((E24*255)>>8); E27=F27+((F26*45)>>7); E26=F26−((E27*53)>>7); E28=−F28+F30; D30=F28+F30; D29=−F29+F31; E31=F29+F31; D1=(E0>>1)−E1; D0=E0−D1; D3=E3+((E2*45)>>7); D2=((D3*53)>>7)−E2; D4=E4+E6; D6=E4−E6; D5=E7−E5; D7=E7+E5; D8=E8+E14; D14=E8−E14; D9=E9+E15; D15=E9−E15; D10=E10+E11; D11=E10−E11; D12=E12+E13; D13=E12−E13; D16=((E16−E19)*181)>>8; D19=((E16+E19)*181)>>8; D20=E20+E26; D26=E20−E26; D21=E21+E27; D27=E21−E27; D22=E22+E23; D23=E22−E23; D24=E24+E25; D25=E24−E25; D28=((E28−E31)*181)>>8; D31=((E28+E31)*181)>>8;

C0=D0+D3; C3=D0−D3; C1=D1+D2; C2=D1−D2; D7=D7+((D4*77)>>8); C4=D4−((D7*71)>>7); C7=D7+((C4*77)>>8); D6=D6+((D5*25)>>8); C5=D5−((D6*49)>>8); C6=D6+((C5*25)>>8); C8=D8+D11; C11=D8−D11; C9=D9+D10; C10=D9−D10; C12=D12+D15; C15=D12−D15; C13=D13+D14; C14=D13−D14; C16=D16+D28; C28=D16−D28; C17=D17+D29; C29=D17−D29; C18=D18+D30; C30=D18−D30; C19=D19+D31; C31=D19−D31; C20=D20+D23; C23=D20−D23; C21=D21+D22; C22=D21−D22; C24=D24+D27; C27=D24−D27; C25=D25+D26; C26=D25−D26; B0=C0+C7; B7=C0−C7; B1=C1+C6; B6=C1−C6; B2=C2+C5; B5=C2−C5; B3=C3+C4; B4=C3−C4; C15=C15+((C8*91)>>8); B8=C8−((C15*81)>>7); B15=C15+((B8*91)>>8); C9=C9+((C14*153)>>8); B14=C14−((C9*225)>>8); B9=C9+((B14*153)>>8); C13=C13+((C10*37)>>8); B10=C10−((C13*37)>>7); B13=C13+((B10*37)>>8); C11=C11+((C12*29)>>5); B12=C12−((C11*127)>>7); B11=C11+((B12*29)>>5); B16=C16+C23; B23=C16−C23; B17=C17+C22; B22=C17−C22; B18=C18+C21; B21=C18−C21; B19=C19+C20; B20=C19−C20; B24=C24+C31; B31=C24−C31; B25=C25+C30; B30=C25−C30; B26=C26+C29; B29=C26−C29; B27=C27+C28; B28=C27−C28; A0=B0+B15; A1=B1+B14; A2=B2+B13; A3=B3+B12; A4=B4+B11; A5=B5+B10; A6=B6+B9; A7=B7+B8; A8=B7−B8; A9=B6−B9; A10=B5−B10; A11=B4−B11; A12=B3−B12; A13=B2−B13; A14=B1−B14; A15=B0−B15; B16=B16+((113*B31)>>8); A31=B31−((189*B16)>>8); A16=B16+((113*A31)>>8); B17=B17−((21*B30)>>6); A30=B30+((19*B17)>>5); A17=B17−((21*A30)>>6); B18=B18+((145*B29)>>8); A29=B29−((219*B18)>>8); A18=B18+((145*A29)>>8); B19=B19−((57*B28)>>8); A28=B28+((109*B19)>>8); A19=B19−((57*A28)>>8); B20=B20+((45*B27)>>6); A27=B27−((241*B20)>>8); A20=B20+((45*A27)>>6); B21=B21−((31*B26)>>8); A26=B26+((31*B21)>>7); A21=B21−((31*A26)>>8); B22=B22+((55*B25)>>6); A25=B25−((253*B22)>>8); A22=B22+((55*A25)>>6); B23=B23−((3*B24)>>7); A24=B24+((3*B23)>>6); A23=B23−((3*A24)>>7); Y0=A0+A31; Y31=A0−A31; Y1=A1+A30; Y30=A1−A30; Y2=A2+A29; Y29=A2−A29; Y3=A3+A28; Y28=A3−A28; Y4=A4+A27; Y27=A4−A27; Y5=A5+A26; Y26=A5=A26; Y6=A6+A25; Y25=A6−A25; Y7=A7+A24; Y24=A7−A24; Y8=A8+A23; Y23=A8−A23; Y9=A9+A22; Y22=A9−A22; Y10=A10+A21; Y21=A10−A21; Y11=A11+A20; Y20=A11−A20; Y12=A12+A19; Y19=A12−A19; Y13=A13+A18; Y18=A13−A18; Y14=A14+A17; Y17=A14−A17; Y15=A15+A16; Y16=A15−A16

The predictor 10040 generates a prediction block of the current block that is decoded via inter prediction or intra prediction, and restores the current block by adding a residual value output from the inverse-transformer 10030 and the prediction block.

Figure 101:
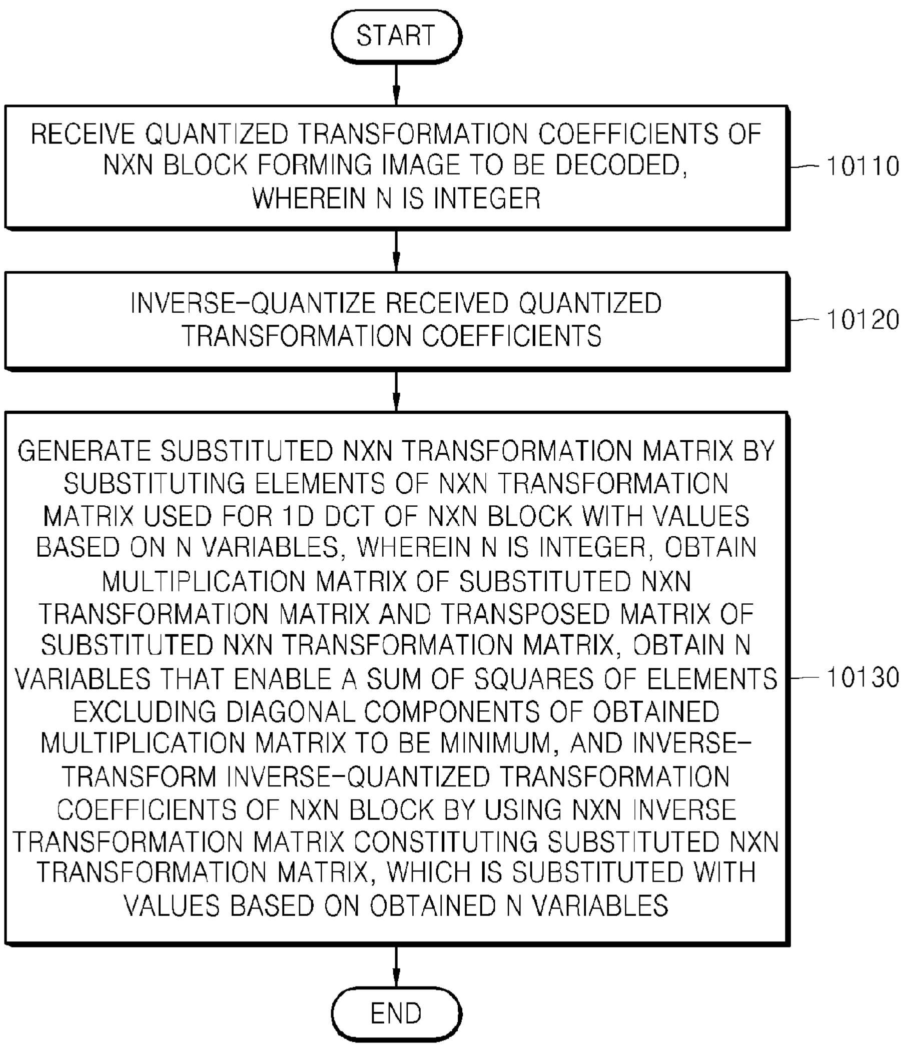
FIG. 101 is a flowchart illustrating a method of inverse transforming an image, according to an exemplary embodiment of the present invention.

FIG. 101 is a flowchart illustrating a method of inverse transforming an image, according to an exemplary embodiment.

Referring to FIG. 101, quantized transformation coefficients of an N×N block forming an image to be decoded are received in operation 10110, where N is an integer.

In operation 10120, the received quantized transformation coefficients are inverse-quantized. As described above, the inverse-quantization may be performed by performing a bit shift operation on a value obtained by multiplying the inverse-scaling matrix V with a quantized transformation coefficient, by a floor(QP/6) bit, where floor[x] is a maximum integer smaller than or equal to x and QP denotes a quantization parameter.

In operation 10130, a substituted N×N transformation matrix is generated by substituting elements of an N×N transformation matrix used for a 1D DCT of a N×N block with values based on N variables, wherein N is an integer, a multiplication matrix of the substituted N×N transformation matrix and a transposed matrix of the substituted N×N transformation matrix is obtained, the N variables that enable a sum of squares of elements excluding diagonal components of the obtained multiplication matrix to be a minimum are obtained, and the inverse-quantized transformation coefficients of the N×N block are inverse-transformed by using an N×N inverse transformation matrix constituting the substituted N×N transformation matrix, which is substituted with the values based on the obtained N variables.

Figure 102:
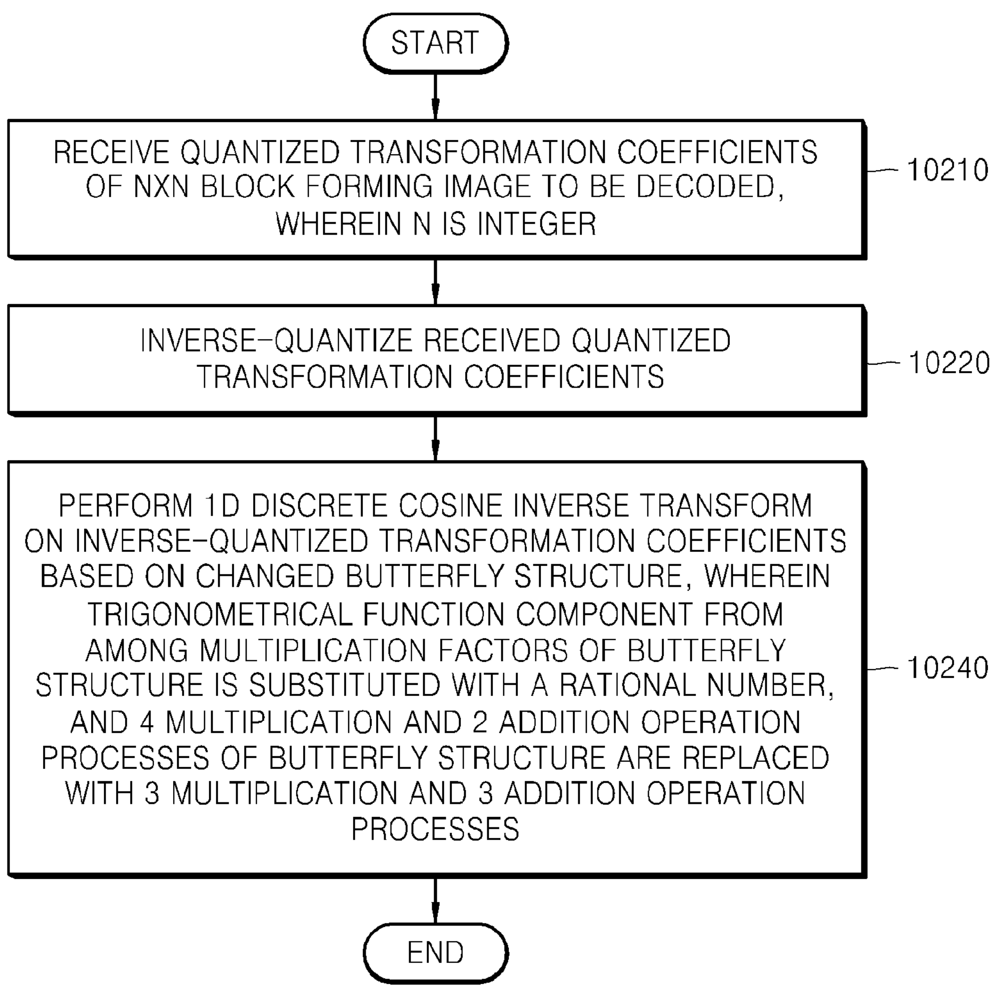
FIG. 102 is a flowchart illustrating a method of inverse transforming an image, according to another exemplary embodiment.

FIG. 102 is a flowchart illustrating a method of inverse transforming an image, according to another exemplary embodiment.

Referring to FIG. 102, quantized transformation coefficients of an N×N block forming an image to be decoded are received in operation 10210, wherein N is an integer.

In operation 10220, the received quantized transformation coefficients are inverse-quantized. Here, the inverse-quantization may be performed by using an inverse matrix of a transformation matrix corresponding to the changed butterfly structure 1820 or 1920 of FIG. 18 or 19.

In operation 10230, 1D discrete cosine inverse transform is performed on the inverse-quantized transformation coefficients based on a changed butterfly structure, wherein a trigonometrical function component from among multiplication factors of a butterfly structure is substituted with a rational number, and 4 multiplication and 2 addition operation processes of the butterfly structure are replaced by 3 multiplication and 3 addition operation processes.

Meanwhile, 16×16, 32×32, and 64×64 transforming and inverse-transforming processes described above may not include multiplication. In detail, a denominator during each transforming process is expressed in a multiplication of a dyadic rational number and an intermediate value. If a denominator having a constant of a dyadic rational number is decomposed to an addition and subtraction form of a fraction wherein a numerator is 1, a corresponding operation may be performed only by addition, subtraction, and shift operations without a multiplication operation. Also, a number of addition, subtraction, and shift operations may be reduced if a number of terms is minimized during decomposition. For example, 59/64, wherein the denominator is one of a dyadic rational number, may be changed to (1−1/16−1/64). (59*x)/64 is like calculating (59*x)>>6 since (59/64)*x=(59*x)/64, wherein 59/64 is multiplied by a predetermined intermediate value x, and 64 is 2^6. Since 59/64 may be decomposed to (1−1/16−1/64), (59*x)>>6 may be changed to (x−(x>>4)−(x>>6)). Here, if 1 multiplication operation and 1 shift operation were originally required to calculate (59*x)/64, 2 subtraction operations and 2 shift operations are required to calculate (x−x>>4−x>>6), and thus a number of complex multiplication operations may be reduced.

Alternatively, 255/256, 131/256, 999/1024, and 75/1024, wherein the denominators are dyadic rational numbers, may be each decomposed to an addition and subtraction form, wherein a numerator is 1 and a denominator is a dyadic rational number:

255/256=1−1/256; 131/256=1/2+1/128+1/256;

999/1024=1−1/32+1/128−1/1024; 75/1024=1/16+1/128+1/512+1/1024

When at least one denominator includes a multiplication of a dyadic rational number and an intermediate value, a total number of operations may be changed to be minimized. For example, F5=(53*E5+35*E6)>>6 may be changed to F5=(X>>6)+(X>>5)+(X>>1)+(E5>>5)+(E5>>2), if X=E5+E6.

Exemplary embodiments may be used while transforming and inverse-transforming a still image or a moving image.

According to one or more exemplary embodiments, methods of transforming and inverse-transforming an image can reduce complexity of transforming and inverse-transforming a large block and increase operation speed by performing an operation process based on an integer, instead of a floating point operation.

Also, methods are effectively performed while reducing the complexity by compensating for an error of a transforming process based on a floating point operation, by using a scaling factor.

One or more exemplary embodiments can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion. Moreover, one or more units of the above-described elements can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the following claims.

One or more exemplary embodiments may be applicable to a process for transforming or inverse-transforming an image or a video.

What is claimed is:

1. A method of transforming an image, the method comprising:

generating, by a processor, a substituted N×N transformation matrix by substituting elements of an N×N transformation matrix used for a 1-dimensional (1D) discrete cosine transform (DCT) of a N×N block of the image with values based on N variables, where N is an integer;

obtaining a multiplication matrix of the substituted N×N transformation matrix and a transposed matrix of the substituted N×N transformation matrix;

obtaining the N variables that enable a sum of squares of elements excluding diagonal components of the obtained multiplication matrix to be a minimum; and transforming the N×N block by using the substituted N×N transformation matrix, which is substituted with the values based on the obtained N variables.

2. The method of claim 1, wherein the generating of the substituted N×N transformation matrix comprises substituting a component constituting cos(π×(i/2)/N) of the elements of the N×N transformation matrix with N a(i) variables constituting rational numbers, wherein i is an integer from 0 to N−1.

3. The method of claim 2, wherein a denominator of the N a(i) variables constituting rational numbers has a value of power of 2 capable of a shift operation.

4. The method of claim 2, wherein N is 16 and a(i) of the N a(i) variables has the following values: a0=1, a1=63/64, a2=62/64, a3=61/64, a4=59/64, a5=56/64, a6=53/64, a7=49/64, a8=45/64, a9=40/64, a10=35/64, a11=30/64, a12=24/64, a13=18/64, a14=12/64, and a15=6/64.

5. The method of claim 2, wherein N is 32, and a(i) of the N a(i) variables has the following values: a0=1, a1=255/256, a2=254/256, a3=253/256, a4=251/256, a5=248/256, a6=244/256, a7=241/256, a8=236/256, a9=231/256, a10=225/256, a11=219/256, a12=212/256, a13=205/256, a14=197/256, a15=189/256, a16=181/256, a17=171/256, a18=162/256, a19=152/256, a20=142/256, a21=131/256, a22=120/256, a23=109/256, a24=97/256, a25=86/256, a26=74/256, a27=62/256, a28=49/256, a29=37/256, a30=25/256, and a31=12/256.

6. The method of claim 2, wherein N is 64, and a(i) of the N a(i) variables has the following values: a0=1, a1=1024/1024, a2=1023/1024, a3=1021/1024, a4=1019/1024, a5=1016/1024, a6=1013/1024, a7=1009/1024, a8=1004/1024, a9=999/1024, a10=993/1024, a11=987/1024, a12=980/1024, a13=972/1024, a14=964/1024, a15=955/1024, a16=946/1024, a17=936/1024, a18=926/1024, a19=915/1024, a20=903/1024, a21=891/1024, a22=878/1024, a23=865/1024, a24=851/1024, a25=837/1024, a26=822/1024, a27=807/1024, a28=792/1024, a29=775/1024, a30=759/1024, a31=742/1024, a32=724/1024, a33=706/1024, a34=688/1024, a35=669/1024, a36=650/1024, a37=630/1024, a38=610/1024, a39=590/1024, a40=569/1024, a41=548/1024, a42=526/1024, a43=505/1024, a44=483/1024, a45=460/1024, a46=438/1024, a47=415/1024, a48=392/1024, a49=369/1024, a50=345/1024, a51=321/1024, a52=297/1024, a53=273/1024, a54=249/1024, a55=224/1024, a56=200/1024, a57=175/1024, a58=150/1024, a59=125/1024, a60=100/1024, a61=75/1024, a62=50/1024, and a63=25/1024.

7. The method of claim 1, further comprising performing quantization on a transformation block obtained by transforming the N×N block by applying a scaling matrix and a shift operation for compensating for a difference between an original N×N transformation matrix used for DCT and the substituted N×N transformation matrix.

8. The method of claim 7, wherein the scaling matrix is generated based on a matrix obtained by:

obtaining a transformation error matrix constituting a difference between a matrix and the original N×N transformation matrix, where the matrix is obtained by multiplying elements of an N×N intermediate matrix, wherein an element of each i-th row has a value of Si and i is an integer from 1 to N, with corresponding elements of the substituted N×N transformation matrix;

obtaining the Si enabling a sum of squares of elements excluding a diagonal component of the transformation error matrix to be a minimum; and multiplying elements of the N×N intermediate matrix to which the obtained Si is applied and corresponding elements of a transposed matrix of the intermediate matrix.

9. The method of claim 8, wherein, where Qstep denotes a quantization step, PF denotes a matrix obtained by multiplying elements of the intermediate matrix and corresponding elements of a transposed matrix of the intermediate matrix, m denotes a positive integer, and MF denotes the scaling matrix, the scaling matrix is obtained according to: MF=PF*2^m/Qstep.

10. The method of claim 9, wherein the performing of the quantization on the transformation block comprises performing a bit shift operation on a value obtained by multiplying the scaling matrix and the transformation block and then adding a predetermined offset, by a q bit of the following equation: q=floor(QP/6)+m.

11. The method of claim 7, wherein the scaling matrix is obtained by multiplying elements of an intermediate matrix, which is obtained by dividing elements of the original N×N transformation matrix used for DCT by corresponding elements of the substituted N×N transformation matrix, with corresponding elements of a transposed matrix of the intermediate matrix.

12. A method of transforming an image, the method comprising:

performing a 1-dimensional (1D) discrete cosine transform (DCT) on any one of a row unit and a column unit of an N×N block of the image, where N is an integer, wherein the performing of the 1D DCT is performed based on a changed butterfly structure obtained by substituting a trigonometrical function component from among multiplication factors of a butterfly structure with a rational number and replacing 4 multiplication operation and 2 addition operation processes of the butterfly structure with 3 multiplication operation and 3 addition operation processes.

13. The method of claim 12, wherein, in the performing of the 1D DCT, a transformation value is generated according to;

A0=X0+X31; A31=X0−X31; A1=X1+X30; A30=X1−X30; A2=X2+X29; A29=X2−X29; A3=X3+X28; A28=X3−X28; A4=X4+X27; A27=X4−X27; A5=X5+X26; A26=X5−X26; A6=X6+X25; A25=X6−X25; A7=X7+X24; A24=X7−X24; A8=X8+X23; A23=X8−X23; A9=X9+X22; A22=X9−X22; A10=X10+X21; A21=X10−X21; A11=X11+X20; A20=X11−X20; A12=X12+X19; A19=X12−X19; A13=X13+X18; A18=X13−X18; A14=X14+X17; A17=X14−X17; A15=X15+X16; A16=X15−X16;

B0=A0+A15; B15=A0−A15; B1=A1+A14; B14=A1−A14; B2=A2+A13; B13=A2−A13; B3=A3+A12; B12=A3−A12; B4=A4+A11; B11=A4−A11; B5=A5+A10; B10=A5−A10; B6=A6+A9; B9=A6−A9; B7=A7+A8; B8=A7−A8;

t=((171*(A16+A31)>>8); B16=t−((361*A31)>>8); B31=t−((−17*A16)>>8);

t=((205*(A17+A30)>>8); B17=t−((53*A30)>>8); B30=t−((358*A17)>>8);

t=((131*(A18+A29)>>8); B18=t−((351*A29)>>8); B29=t−((−87*A18)>>8);

t=((231*(A19+A28)>>8); B19=t−((121*A28)>>8); B28=t−((340*A19)>>8);

t=((86*(A20+A27)>>8); B20=t−((327*A27)>>8); B27=t−((−77*A20)>>8);

t=((248*(A21+A26)>>8); B21=t−((186*A26)>>8); B26=t−((310*A21)>>8);

t=((37*(A22+A25)>>8); B22=t−((290*A25)>>8); B25=t−((−215*A22)>>8);

t=((255*(A23+A24)>>8); B23=t−((243*A24)>>8); B24=t−((268*A23)>>8);

C0=B0+B7; C7=B0−B7; C1=B1+B6; C6=B1−B6; C2=B2+B5; C5=B2−B5; C3=B3+B4; C4=B3−B4;

t=((197*(B8+B15)>>8); C8=t−((35*B15)>>8); C15=t−((360*B8)>>8);

t=((120*(B9+B14)>>8); C9=t−((346*B14)>>8); C14=t−((−105*B9)>>8);

t=((244*(B10+B13)>>8); C10=t−((170*B13)>>8); C13=t−((B19*B10)>>8);

t=((25*(B11+B12)>>8); C11=t−((279*B12)>>8); C12=t−((−229*B11)>>8);

C16=B16+B23; C23=B16−B23; C17=B17+B22; C22=B17−B22; C18=B18+B21; C21=B18−B21; C19=B19+B20; C20=B19−B20; C24=B24+B31; C31=B24−B31; C25=B25+B30; C30=B25−B30; C26=B26+B29; C29=B26−B29; C27=B27+B28; C28=B27−B28;

D0=C0+C3; D3=C0−C3; D1=C1+C2; D2=C1−C2; t=((49*(C4+C7)>>8); D4=t−((−201*C7)>>8); D7=t−((301*C4)>>8);

t=((142*(C5+C6)>>8); D5=t−((−70*C6)>>8); D6=t−((355*C5)>>8); D8=C8+C11; D11=C8−C1; D9=C9+C10; D10=C9−C10; D12=C12+C15; D15=C12−C15; D13=C13+C14; D14=C13−C14; D16=C16+C28; D28=C16−C28; D17=C17+C29; D29=C17−C29; D18=C18+C30; D30=C18−C30; D19=C19+C31; D31=C19−C31; D20=C20+C23; D23=C20−C23; D21=C21+C22; D22=C21−C22; D24=C24+C27; D27=C24−C27; D25=C25+C26; 026=C25−C26;

E0=((D0+D1)*181>>8); E1=((D0−D1)*181>>8);

t=(97*(D2+D3)>>8); E2=t−((−138*D3)>>8); E3=t−((334*D2)>>8); E4=D4+D5; E5=D4−D5; E6=−D6+D7; E7=D6+D7; E8=D8+D14; E14=D8−D14; E9=D9+D15; E15=D9−D15; E10=D10+D11; E11=D10−D11; E12=D12+D13; E13=D12−D13; E16=((D16+D19)*181>>8); E19=((D16−D19)*181>>8); E20=D20+D26; E26=D20−D26; E21=D21+D27; E27=D21−D27; E22=D22+D23; E23=D22−D23; E24=D24+D25; E25=D24−D25; E28=((D28+D31)*181>>8); E31=((D28−D31)*181>>8);

F5=((E5+E7)*181>>8); F7=((E5−E7)*181>>8);

t=(97*(E8+E9)>>8); F8=t−((334*E9)>>8); F9=t−((−138*E8)>>8); F11=((E11+E12)*181>>8); F12=((E12−F11)*181>>8);

t=(97*(E14+E15)>>8); F14=t−((334*E15)>>8); F15=t−((−138*E14)>>8); F16=E16+D18; F18=E16−D18; F17=D17+E19; F19=D17−E19;

t=(236*(E20+E21)>>8); F20=t−((138*E21)>>8); F21=t−((334*E20)>>8); F23=((E23+E24)*181>>8); F24=((E23−E24)*181>>8);

t=((236*(E26+E27))>>8); F26=t−((138*E27)>>8); F27=t−((334*E26)>>8); F28=−E28+D30; F30=E28+D30; F29=−D29+E31; F31=D29+E31;

t=(251*(F16+F17)>>8); G16=t−((301*F17)>>8); G17=t−((201*F16)>>8);

t=(212*(F18+F19)>>8); G18=t−((355*F19)>>8); G19=t−((70*F18)>>8);

t=(212*(F28+F29)>>8); G28=t−((355*F29)>>8); G29=t−((70*F28)>>8);

t=(251*(F30+F31)>>8); G30=t−((301*F31)>>8); G31=t−((201*F30)>>8);

Y0=E0; Y1=F24; Y2=−F12; Y3=−G16; Y4=E4; Y5=G31; Y6=F8; Y7=−F26; Y8=E2; Y9=F21; Y10=F15; Y11=G29; Y12=F5; Y13=−G18; Y14=E13; Y15=E22; Y16=E1; Y17=E25; Y18=E10; Y19=−G19; Y20=F7; Y21=−G28; Y22=F14; Y23=−F20; Y24=E3; Y75=−F27; Y26=F9; Y27=−G30; Y28=E6; Y29=−G17; Y30=F11; and Y31=−F23, wherein, if N is 32, X0 through X31 denote input values to be transformed, A0 through A31, B0 through B31, C0 through C31, D0 through D31, E0 through E31, and F0 through F31 denote intermediate values, t denotes an auxiliary, and Y0 through Y31 denote transformed values.

14. The method of claim 12, wherein, in the performing of the 1D DCT, a transformation value is generated according to:

A0=X0+X31; A31=X0−X31; A1=X1+X30; A30=X1−X30; A2=X2+X29; A29=X2−X29; A3=X3+X28;

A28=X3−X28; A4=X4+X27; A27=X4−X27; A5=X5+X26; A26=X5−X26; A6=X6+X25; A25=X6−X25; A7=X7+X24; A24=X7−X24; A8=X8+X23; A23=X8−X23; A9=X9+X22; A22=X9−X22; A10=X10+X21; A21=X10−X21; A11=X11+X20; A20=X11−X20; A12=X12+X19; A19=X12−X19; A13=X13+X18; A18=X13−X18; A14=X14+X17; A17=X14−X17; A15=X15+X16; A16=X15−X16;

B0=A0+A15; B15=A0−A15; B1=A1+A14; B14=A1−A14; B2=A2+A13; B13=A2−A13; B3=A3+A12; B12=A3−A12; B4=A4+A11; B11=A4−A11; B5=A5+A10; B10=A5−A10; B6=A6+A9; B9=A6−A9; B7=A7+A8; B8=A7−A8; B16=A16−((113*A31)>>8); B31=A31+((189*B16)>>8); B16=B16−((113*B31)>>8); B17=A17+((21*A30)>>6); B30=A30−((152*B17)>>8); B17=B17+((21*B30)>>6); B18=A18−((145*A29)>>8); B29=A29+((219*B18)>>8); B18=B18−((145*B29)>>8); B19=A19+((57*A28)>>8); B28=A28−((109*B19)>>8); B19=B19+((57*B28)>>8); B20=A20−((45*A27)>>6); B27=A27+((241*B20)>>8); B20=B20−((45*B27)>>6); B21=A21+((31*A26)>>8); B26=A26−((31*B21)>>7); B21=B21+((31*B25)>>8); B22=A22−((55*A25)>>6); B25=A25+((253*B22)>>8); 622=B22−((55*625)>>6); B23=A23+((3*A24)>>7); B24=A24−((3*B23)>>6); B23=B23+((3*B24)>>7);

C0=B0+B7; C7=B0−B7; C1=B1+B6; C6=B1−B6; C2=B2+B5; C5=B2−B5; C3=B3+B4; C4=B3−B4; C15=B15−((B8*91)>>8); C8=B8+((C15*81)>>7); C15=C15−((C8*91)>>8); C9=B9−((B14*153)>>8); C14=B14+((C9*225)>>8); C9=C9−((C14*153)>>8); C13=B13−((B10*37)>>8); C10=B10+((C13*37)>>7); C13=C13−((C10*37)>>8); C11=B11−((B12*29)>>5); C12=B12+((C11*127)>>7); C11=C11−((C12*29)>>5); C16=B16+B23; C23=B16−B23; C17=B17+B22; C22=B17−B22; C18=B18+B21; C21=B18−B21; C19=B19+B20; C20=B19−B20; C24=B24+B31; C31=B24−B31; C25=B25+B30; C30=B25−B30; C26=B26+B29; C29=B26−B29; C27=B27+B28; C28=B27−B28;

D0=C0+C3; D3=C0−C3; D1=C1+C2; D2=C1−C2; D7=C7−((C4*77)>>8); D4=C4+((D7*71)>>7); D7=D7−((D4*77)>>8); D6=C5−((C5*25)>>8); D5=C5+((D6*49)>>8); D6=D6−((D5*25)>>8); D8=C8+C11; D11=C8−C11; D9=C9+C10; D10=C9−C10; D12=C12+C15; D15=C12−C15; D13=C13+C14; D14=C13−C14; D16=C16+C28; D28=C16−C28; D17=C17+C29; D29=C17−C29; D18=C18+C30; D30=C18−C30; D19=C19+C31; D31=C19−C31; D20=C20+C23; D23=C20−C23; D21=C21+C22; D22=C21−C22; D24=C24+C27; D27=C24−C27; D25=C25+C26; D26=C25−C26;

E0=D0+D1; E1=(E0>>1)−D1; E2=−D2+((D3*53)>>7); E3=D3−((E2*45)>>7); E4=D4+D6; E6=D4−D6; E5=D7−D5; E7=D7+D5; E8=D8+D14; E14=D8−D14; E9=D9+D15; E15=D9−D15; E10=D10+D11; E11=D10−D11; E12=D12+D13; E13=D12−D13; E16=((D16+D19)*181)>>8; E19=((−D16+D19)*181)>>8; E20=D20+D26; E26=D20−D26; E21=D21+D27; E27=D21−D27; E22=D22+D23; E23=D22−D23; E24=D24+D25; E25=D24−D25; E28=((D28+D31)*181)>>8; E31=((−D28+D31)*181)>>8;

F7=E7+E4; F4=(F7>>1)−E4; F8=E8+((E9*53)>>7); F9=−E9+((F8*45)>>7); F11=E11+E12; F12=E12−(F11>>1); F14=E14+((E15*53)>>7); F15=E15−((F14*45)>>7); F16=E16+D18; F18=E16−D18; F17=D17+E19; F19=D17−E19; F20=E20+((E21*53)>>7); F21=E21−((F20*45)>>7); F23=E23+((E24*255)>>8); F24=E24−(F23>>1); F26=E26+((E27*53)>>7); F27=E27−((F26*45)>>7); F28=−E28+D30; F30=E28+D30; F29=−D29+E31; F31=D29+E31;

G16=F16−((F17*25)>>7); G17=F17+((G16*3)>>4); G18=F18−((F19*171)>>8); G19=F19+((G18*59)>>7); G28=F28−((F29*171)>>8); G29=F29+((G28*59)>>7); G30=F30−((F31*25)>>7); G31=F31+((G30*3)>>4);

Y0=E0; Y1=F24; Y2=F12; Y3=−G16; Y4=F7; Y5=G31; Y6=F9; Y7=−F26; Y8=E3; Y9=F21; Y10=F14; Y11=G29; Y12=E5; Y13=−G18; Y14=E13; Y15=E22; Y16=E1; Y17=E25; Y18=E10; Y19=−G19; Y20=E6; Y21=−G28; Y22=F15; Y23=−F20; Y24=E2; Y25=−F27; Y26=F8; Y27=−G30; Y28=F4; Y29=−G17; Y30=F11; and Y31=−F23, wherein, if N is 32, X0 through X31 denote input values to be transformed, A0 through A31, B0 through B31, C0 through C31, D0 through D31, E0 through E31, F0 through F31, and G0 through G31 denote intermediate values, and Y0 through Y31 denote transformed values.

15. The method of claim 12, further comprising, if A denotes a changed DCT matrix corresponding to an N point 1D DCT based on the changed butterfly structure, performing quantization on a transformation block, obtained by transforming the N×N size block, by applying a scaling matrix and a shift operation for compensating for a difference between an original N×N transformation matrix based on the butterfly structure and the changed DCT matrix A.

16. The method of claim 15, wherein the scaling matrix is generated based on a matrix obtained by:

obtaining a transformation error matrix constituting a difference between a matrix and the original N×N transformation matrix, where the matrix is obtained by multiplying elements of an N×N intermediate matrix, wherein an element of each i-th row has a value of Si and i is an integer from 1 to N, with corresponding elements of the changed DCT matrix A;

obtaining the Si enabling a sum of squares of elements excluding a diagonal component of the transformation error matrix to be a minimum; and multiplying elements of the N×N intermediate matrix to which the obtained Si is applied and corresponding elements of a transposed matrix of the intermediate matrix.

17. The method of claim 15, wherein the scaling matrix is obtained by multiplying elements of an intermediate matrix, which is obtained by dividing elements of an original N×N transformation matrix used for DCT by corresponding elements of the changed DCT matrix A, with corresponding elements of a transposed matrix of the intermediate matrix.

18. An apparatus for transforming an image, the apparatus comprising:

a transformer which generates a substituted N×N transformation matrix by: substituting elements of an N×N transformation matrix used for a 1-dimensional (1D) discrete cosine transform (DCT) of a N×N block of the image with values based on N variables, where N is an integer; obtaining a multiplication matrix of the substituted N×N transformation matrix and a transposed matrix of the substituted N×N transformation matrix; obtaining the N variables that enable a sum of squares of elements excluding diagonal components of the obtained multiplication matrix to be a minimum; and transforming the N×N block by using the substituted N×N transformation matrix, which is substituted with the values based on the obtained N variables.

19. An apparatus for transforming an image, the apparatus comprising:

a transformer which performs a 1-dimensional (1D) discrete cosine transform (DCT) on any one of a row unit and a column unit of an N×N block of the image based on a changed butterfly structure obtained by substituting a trigonometrical function component from among multiplication factors of a butterfly structure with a rational number and replacing 4 multiplication operation and 2 addition operation processes of the butterfly structure with 3 multiplication operation and 3 addition operation processes, wherein N is an integer.

20. A method of inverse-transforming an image, the method comprising:

receiving quantized transformation coefficients of an N×N block forming an image to be decoded, where N is an integer;

inverse-quantizing the received quantized transformation coefficients; and generating a substituted N×N transformation matrix by substituting elements of an N×N transformation matrix used for a 1-dimensional (1D) discrete cosine transform (DCT) of the N×N block with values based on N variables, obtaining a multiplication matrix of the substituted N×N transformation matrix and a transposed matrix of the substituted N×N transformation matrix, obtaining the N variables that enable a sum of squares of elements excluding diagonal components of the obtained multiplication matrix to be a minimum, and inverse-transforming inverse-quantized transformation coefficients of the N×N block by using an N×N inverse transformation matrix constituting an inverse matrix of the substituted N×N transformation matrix, which is substituted with the values based on the obtained N variables.

21. The method of claim 20, wherein the substituted N×N transformation matrix is obtained by substituting a component constituting cos(π×(i/2)/N) of the elements of the N×N transformation matrix with N a(i) variables constituting rational numbers, wherein i is an integer from 0 to N−1.

22. The method of claim 21, wherein a denominator of the N a(i) variables constituting rational numbers has a value of power of 2 capable of shift operation.

23. The method of claim 21, wherein N is 16 and a(i) of the N a(i) variables has the following values: a0=1, a1=63/64, a2=62/64, a3=61/64, a4=59/64, a5=56/64, a6=53/64, a7=49/64, a8=45/64, a9=40/64, a11=35/64, a11=30/64, a12=24/64, a13=18/64, a14=12/64, and a15=6/64.

24. The method of claim 21, wherein N is 32, and a(i) of the N a(i) variables has the following values: a0=1, a1=255/256, a2=254/256, a3=253/256, a4=251/256, a5=248/256, a6=244/256, a7=241/256, a8=236/256, a9=231/256, a10=225/256, a11=219/256, a12=212/256, a13=205/256, a14=197/256, a15=189/256, a16=181/256, a17=171/256, a18=162/256, a19=152/256, a20=142/256, a21=131/256, a22=120/256, a23=109/256, a24=97/256, a25=86/256, a26=74/256, a27=62/256, a28=49/256, a29=37/256, a30=25/256, and a31=12/256.

25. The method of claim 21, wherein N is 64, and a(i) of the N a(i) variables has the following values: a0=1, a1=1024/1024, a2=1023/1024, a3=1021/1024, a4=1019/1024, a5=1016/1024, a6=1013/1024, a7=1009/1024, a8=1004/1024, a9=999/1024, a10=993/1024, a11=987/1024, a12=980/1024, a13=972/1024, a14=964/1024, a15=955/1024, a16=946/1024, a17=936/1024, a18=926/1024, a19=915/1024, a20=903/1024, a21=891/1024, a22=878/1024, a23=865/1024, a24=851/1024, a25=837/1024, a26=822/1024, a27=807/1024, a28=792/1024, a29=775/1024, a30=759/1024, a31=742/1024, a32=724/1024, a33=706/1024, a34=688/1024, a35=669/1024, a36=650/1024, a37=630/1024, a38=610/1024, a39=590/1024, a40=569/1024, a41=548/1024, a42=526/1024, a43=505/1024, a44=483/1024, a45=460/1024, a46=438/1024, a47=415/1024, a48=392/1024, a49=369/1024, a50=345/1024, a51=321/1024, a52=297/1024, a53=273/1024, a54=249/1024, a55=224/1024, a56=200/1024, a57=175/1024, a58=150/1024, a59=125/1024, a60=100/1024, a61=75/1024, a62=50/1024, and a63=25/1024.

26. The method of claim 20, wherein the inverse-quantizing comprises performing the inverse-quantizing by applying an inverse-scaling matrix and a shift operation for compensating for a difference between an original N×N inverse transformation matrix used for discrete cosine inverse transformation and an N×N inverse transformation matrix constituting an inverse matrix of the substituted N×N transformation matrix.

27. The method of claim 26, wherein the inverse-scaling matrix is generated based on a matrix obtained by:

obtaining a transformation error matrix constituting a difference between a matrix and the original N×N transformation matrix, where the matrix is obtained by multiplying elements of an N×N intermediate matrix, wherein an element of each i-th row has a value of Si and i is an integer from 1 to N, with corresponding elements of the N×N transformation matrix;

obtaining the Si enabling a sum of squares of elements excluding a diagonal component of the transformation error matrix to be a minimum; and multiplying elements of the N×N intermediate matrix to which the obtained Si is applied and corresponding elements of a transposed matrix of the intermediate matrix.

28. The method of claim 17, wherein, where Qstep denotes a quantization step, PF denotes a matrix obtained by multiplying elements of the intermediate matrix and corresponding elements of a transposed matrix of the intermediate matrix, m denotes a positive integer, and V denotes the inverse-scaling matrix, the inverse-scaling matrix is obtained according to: V=Qstep*PF*2^n.

29. The method of claim 28, wherein the inverse-quantizing is performed by performing a bit shift operation on a value obtained by multiplying the inverse-scaling matrix and the quantized transformation coefficients, by a floor(QP/6) bit, wherein floor[x] is a maximum integer smaller than or equal to x and QP denotes a quantization parameter.

30. The method of claim 26, wherein the inverse-scaling matrix is obtained by multiplying elements of an intermediate matrix, which is obtained by dividing elements of the original N×N inverse transformation matrix used for discrete cosine inverse transform by corresponding elements of N×N inverse transformation matrix constituting an inverse matrix of the substituted N×N transformation matrix, with corresponding elements of a transposed matrix of the intermediate matrix.

31. A method of inverse-transforming an image, the method comprising:

receiving quantized transformation coefficients of an N×N block forming an image to be decoded, where N is an integer;

inverse-quantizing the received quantized transformation coefficients; and performing a 1-dimensional (1D) discrete cosine inverse transform on the inverse-quantized transformation coefficients, wherein the performing of the 1D discrete cosine inverse transform is performed based on a changed butterfly structure obtained by substituting a trigonometrical function component from among multiplication factors of a butterfly structure with a rational number and replacing 4 multiplication operation and 2 addition operation processes of the butterfly structure with 3 multiplication operation and 3 addition operation processes.

32. The method of claim 31, wherein, in the performing of the 1D discrete cosine inverse transform, an inverse transformation value is generated according to;

E0=X0; F24=X1; F12=–X2; G16=–X3; E4=X4; G31=X5; F8=X6; F26=–X7; E2=X8; F21=X9; F15=X10; G29=X11; F5=X12; G18=–X13; E13=X14; E22=X15; E1=X16; E25=X17; E10=X18; G19=–X19; F7=X20; G28=–X21; F14=X22; F20=–X23; E3=X24; F27=–X25; F9=X26; G30=–X27; E6=X28; G17=–X29; F11=X30; F23=–X31;

t=(251*(G16+G17)>>8); F16=t–((201*G17)>>8); F17=t–((301*G16)>>8);

t=(212*(G18+G19)>>8); F18=t–((70*G19)>>8); F19=t–((355*G18)>>8);

t=((212*(G28+G29))>>8); F28=t–((70*G29)>>8); F29=t–((355*G28)>>8);

t=(251*(G30+G31)>>8); F30=t–((201*G31)>>8); F31=t–((301*G30)>>8);

E5=((F5+F7)*181>>8); E7=((F5–F7)*181>>8);

t=(97*(F8+F9)>>8); E5=t–((–138*F9)>>8); E9=t–((334*F8)>>8); E11=((F11+F12)*181>>8); E12=((F11–F12)*181>>8);

t=(97*(F14+F15)>>8); E14=t–((–138*F15)>>8); E15=t–((334*F14)>>8); E16=F16+F18; D18=F16–F18; D17=F17+F19; E19=F17–F19;

t=(236*(F20+F21)>>8); E20=t–((334*F21)>>8); E21=t–((138*F20)>>8); E23=((F23+F24)*181>>8); E24=((F23–F24)*181>>8);

t=(236*(F26+F27)>>5); E26=t–((334*F27)>>8); E27=t–((138*F26)>>8);

E28=–F28+F30; D30=F28+F30; D29=–F29+F31; E31=F29+F31; D0=((E0+E1)*181>>8); D1=((E0–E1)*181>>8);

t=(97*(E2+E3)>>8); D2=t–((334*E3)>>8); D3=t–((–138*E2)>>8);

D4=E4+E5; D5=E4–E5; D6=–E6+E7; D7=E6+E7; D8=E8+E14; D14=E8–E14; D9=E9+E15; D15=E9–E15; D10=E10+E11; D11=E10–E11; D12=E12+E13; D13=E12–E13; D16=((E16+E19)*181>>8); D19=((E16–E19)*181>>8); D20=E20+E26; D26=E20–E26; D21=E21+E27; D27=E21–E27; D22=E22+E23; D23=E22–E23; D24=E24+E25; D25=E24–E25; D28=((E28+E31)*181>>8); D31=((E28–E31)*181>>8); C0=D0+D3; C3=D0–D3; C1=D1+D2; C2=D1–D2;

t=(49*(D4+D7)>>8); C4=t–((301*D7)>>8); C7=t–((–201*D4)>>8);

t=(142*(D5+D6)>>8); C5=t–((355*D6)>>8); C6=t–((–70*D5)>>8);

C8=D8+D11; C11=D8–D11; C9=D9+D10; C10=D9–D10; C12=D12+D15; C15=D12–D15; C13=D13+D14; C14=D13–D14; C16=D16+D28; C28=D16–D28; C17=D17+D29; C29=D17–D29; C18=D18+D30; C30=D18–D30; C19=D19+D31; C31=D19–D31; C20=D20+D23; C23=D20–D23; C21=D21+D22; C22=D21–D22; C24=D24+D27; C27=D24–D27; C25=D25+D26; C26=D25–D26;

B0=C0+C7; B7=C0–C7; B1=C1+C6; B6=C1–C6; B2=C2+C5; B5=C2–C5; B3=C3+C4; B4=C3–C4;

t=(197*(C8+C15)>>8); B8=t–((360*C15)>>8); B15=t–((35*C8)>>8);

t=(120*(C9+C14)>>8); B9=t–((–105*C14)>>8); B14=t–((346*C9)>>8);

t=(244*(C10+C13)>>8); B10=t–((319*C13)>>8); B13=t–((170*C10)>>8);

t=(25*(C11+C12)>>8); B11=t–((–229*C12)>>8); B12=t–((279*C11)>>8);

B16=C16+C23; B23=C16–C23; B17=C17+C22; B22=C17–C22; 018=C18+C21; B21=C18–C21; B19=C19+C20; B20=C19–C20; B24=C24+C31; B31=C24–C31; B25=C25+C30; B30=C25–C30; B26=C26+C29; B29=C26–C29; B27=C27+C28; B28=C27–C28;

A0=B0+B15; A1=B1+B14; A2=B2+B13; A3=B3+B12; A4=B4+B11; A5=B5+B10; A6=B6+B9; A7=B7+B8; A8=B7–B8; A9=B6–B9; A10=B5–B10; A11=B4–B11; A12=B3–B12; A13=B2–B13; A14=B1–B14; A15=B0–B15;

t=(171*(B16+B31)>>8); A16=t–((–17*B31)>>8); A31=t–((361*B16)>>8);

t=(205*(B17+B30)>>8); A17=t–((358*B30)>>8); A30=t–((53*B17)>>8);

t=(131*(B18+B29)>>8); A18=t–((–87*B29)>>8); A29=t–((351*B18)>>8);

t=(231*(B19+B28)>>8); A19=t–((340*B28)>>8); A28=t–((121*B19)>>8);

t=(86*(B20+B27)>>8); A20=t–((–154*B27)>>8); A27=t–((327*B20)>>8);

t=(248*(B21+B26)>>8); A21=t–((310*B26)>>8); A26=t–((186*B21)>>8);

t=(37*(B22+B25)>>8); A22=t–((–215*B25)>>8); A25=t–((290*B22)>>8);

t=(255*(B23+B24)>>8); A23=t–((243*B24)>>8); A24=t–((268*B23)>>8);

Y0=A0+A31; Y31=A0–A31; Y1=A1+A30; Y30=A1–A30; Y2=A2+A29; Y29=A2–A29; Y3=A5+A28; Y28=A3–A28; Y4=A4+A27; Y27=A4–A27; Y5=A5+A26; Y26=A5–A26; Y6=A6+A25; Y25=A6–A25; Y7=A7+A24; Y24=A7–A24; Y8=A5+A23; Y23=A8–A23; Y9=A9+A22; Y22=A9–A22; Y10=A10+A21; Y21=A10–A21; Y11=A11+A20; Y20=A11–A20; Y12=A12+A19; Y19=A12–A19; Y13=A13+A18; Y18=A13–A18; Y14=A14+A17; Y17=A14–A17; Y15=A15+A16; and Y16=A15–A16, wherein, if N is 32, X0 through X31 denote input values to be inverse-transformed, A0 through A31, B0 through B31, C0 through C31, D0 through D31, E0 through E31, F0 through F31, and G0 through G31 denote intermediate values, t denotes an auxiliary variable, and Y0 through Y31 denote inverse-transformed values.

33. The method of claim 31, wherein, in the performing of the 1D discrete cosine inverse transform, an inverse transformation value is generated according to:

E0=X0; F24=X1; F12=X2; G16=–X3; F7=X4; G31=X5; F9=X6; F26=–X7; E3–X8; F21=X9; F14=X10; G29=X11; E5=X12; G18=–X13; E13=X14; E22=X15; E1=X16; E25=X17; E10=X18; G19=–X19; E6=X20; G28=–X21; F15=X22; F20=–X23; E2=X24; F27=–X25; F8=X26; G30=–X27; F4=X28; G17=–X29; F11=X30; F23=–X31; F17=G17–((G16*3)>>4); F16=G16+((F17*25)>>7); F19=G19–((G18*59)>>7); F18=G18+((F19*171)>>8); F29=G29–((G28*59)>>7); F28=G28+((F29*171)>>8); F31=G31–((G30*3)>>4); F30=G30+((F31*25)>>7); E4=(F7>>1)–F4; E7=F7–E4; E9=–F9+((F8*45)>>7); E8=F8–((E9*53)>>7); E12=F12+(F11>>1); E11=F11–E12; E15=F15+

((F14*45)>>7); E14=F14–((E15*53)>>7); E16=F16+F18; D18=F16–F18; 017=F17+F19; E19=F17–F19; E21=F21+((F20*45)>>7); E20=F20–((E21*53)>>7); E24=F24+(F23>>1); E23=F23–((E24*255)>>8); E27=F27+((F26*45)>>7); E26=F26–((E27*53)>>7); E28=–F28+F30; D30=F28+F30; D29=–F29+F31; E31=F29+F31; D1=(E0>>1)–E1; D0=E0–D1; D3=E3+((E2*45)>>7); D2=((D3*53)>>7)–E2; D4=E4+E6; D6=E4–E6; D5=E7–E5; D7=E7+E5; D8=E8+E14; D14=E8–E14; D9=E9+E15; D15=E9–E15; D10=E10+E11; D11=E10–E11; D12=E12+E13; D13=E12–E13; D16=((E16–E19)*181)>>8; D19=((E16+E19)*181)>>8; D20=E20+E26; D26=E20–E26; D21=E21+E27; D27=E21–E27; D22=E22+E23; D23=E22–E23; D24=E24+E25; D25=E24–E25; D28=((E28–E31)*181)>>8; D31=((E28+E31)*181)>>8; C0=D0+D3; C3=D0–D3; C1=D1+D2; C2=D1–D2; D7=D7+((D4*77)>>8); C4=D4–((D7*71)>>7); C7=D7+((C4*77)>>8); D6=D6+((D5*25)>>8); C5=D5–((D6*49)>>8); C5=D6+((C5*25)>>8); C8=D8+D11; C11=D8–D11; C9=D9+D10; C10=D9–D10; C12=D12+D15; C15=D12–D15; C13=D13+D24; C14=D13–D14; C16=D16+D28; C28=D16–D28; C17=D17+D29; C29=D17–D29; C18=D18+D30; C30=D18–D30; C19=D19+D31; C31=D19–D31; C20=D20+D23; C23=D20–D23; C21=D21+D22; C22=D21–D22; C24=D24+D27; C27=D24–D27; C25=D25+D26; C26=D25–D26; B0=C0+C7; B7=C0–C7; B1=C1+C6; B6=C1–C6; B2=C2+C5; B5=C2–C5; B3=C3+C4; B4=C3–C4; C15=C15+((C8*91)>>8); B8=C8–((C15*81)>>7); B15=C15+((B8*91)>>8); C9=C9+((C14*153)>>8); B14=C14–((C9*225)>>8); B9=C9+((B14*153)>>8); C13=C13+((C10*37)>>8); B10=C10–((C13*37)>>7); B13=C13+((B10*37)>>8); C11=C11+((C12*29)>>5); B12=C12–((C11*127)>>7); B11=C11+((B12*29)>>5); B16–C16+C23; B23=C16–C23; B17=C17+C22; B22=C17–C22; B18=C18+C21; B21=C18–C21; B19=C19+C20; B20=C19–C20; B24=C24+C31; B31=C24–C31; B25=C25+C30; B30=C25–C30; B26=C26+C29; B29=C26–C29; B27=C27+C28; B28=C27–C28; A0=B0+B15; A1=B1+B14; A2=B2+B13; A3=B3+B12; A4=B4+B11; A5=B5+B10; A6=B6+B9; A7=B7+B8; A8=B7–B8; A9=B6–B9; A10=B5–B10; A11=B4–B11; A12=B3–B12; A13=B2–B13; A14=B1–B14; A15=B0–B15; B16=B16+((113*B31)>>8); A31=B31–((189*B16)>>8); A16=B16+((113*A31)>>8); B17=B17–((21*B30)>>6); A30=B30+((19*B17)>>5); A17=B17–((21*A30)>>6); B18=B18+((145*B29)>>8); A29=B29–((219*B18)>>8); A18=B18+((145*A29)>>8); B19=B19–((57*B28)>>8); A28=B28+((109*B19)>>8); A19=B19–((57*A28)>>8); B20=B20+((459*B27)>>6); A27=B27–((241*B20)>>8); A20=B20+((45*A27)>>6); B21=B21–((31*B26)>>8); A26=B26+((31*B21)>>7); A21=B21–((31*A26)>>8); B22=B22+((55*B25)>>6); A25=B25–((253*B22)>>8); A22=B22+((55*A25)>>6); B23=B23–((3*B24)>>7); A24=B24+((3*B23)>>6); A23=B23–((3*A24)>>7);

Y0=A0+A31; Y31=A0–A31; Y1=A1+A30; Y30=A1–A30; Y2=A2+A29; Y29=A2–A29; Y3=A3+A28; Y28=A3–A28; Y4=A4+A27; Y77=A4–A27; Y5=A5+A26; Y26=A5–A26; Y6=A6+A25; Y25=A6–A25; Y7=A7+A24; Y24=A7–A24; Y8=A8+A23; Y23=A8–A23; Y9=A9+A22; Y22=A9–A22; Y10=A10+A21; Y21=A10–A21; Y11=A11+A20; Y20=A11–A20; Y12=A12+A19; Y19=A12–A19; Y13=A13+A18; Y18=A1331 A18; Y14=A14+A11; Y17=A14–A17; Y15=A15+A16; and Y16=A1–A16, wherein, if N is 32, X0 through X31 denote input values to be inverse-transformed, A0 through A31, B0 through B31, C0 through C31, D0 through D31, E0 through E31, F0 through F31, and G0 through G31 denote intermediate values, t denotes an auxiliary variable, and Y0 through Y31 denote inverse-transformed values.

34. The method of claim 31, wherein the inverse-quantizing is performed by applying an inverse-scaling matrix and a shift operation so as to compensate for a difference between the original N×N inverse transformation matrix used for DCT based on the butterfly structure, and an inverse transformation matrix changed based on the changed butterfly structure.

35. The method of claim 34, wherein the inverse-scaling matrix is generated based on a matrix obtained by:

obtaining a transformation error matrix constituting a difference between a matrix and the original N×N transformation matrix, where the matrix is obtained by multiplying elements of an N×N intermediate matrix, wherein an element of each i-th row has a value of Si and i is an integer from 1 to N, with corresponding elements of the changed transformation matrix;

obtaining the Si enabling a sum of squares of elements excluding a diagonal component of the transformation error matrix to be a minimum; and multiplying elements of the N×N intermediate matrix to which the obtained Si is applied and corresponding elements of a transposed matrix of the intermediate matrix.

36. The method of claim 34, wherein the inverse-scaling matrix is obtained by multiplying elements of an intermediate matrix, which is obtained by dividing elements of the original N×N transformation matrix used for DCT by corresponding elements of the changed transformation matrix, with corresponding elements of a transposed matrix of the intermediate matrix.

37. An apparatus for inverse-transforming an image, the apparatus comprising:

an inverse-transformer which generates a substituted N×N transformation matrix by: substituting elements of an N×N transformation matrix used for a 1-dimensional (1D) discrete cosine transform (DCT) of a N×N block forming an image to be decoded with values based on N variables, where N is an integer; obtaining a multiplication matrix of the substituted N×N transformation matrix and a transposed matrix of the substituted N×N transformation matrix; obtaining the N variables that enable a sum of squares of elements excluding diagonal components of the obtained multiplication matrix to be a minimum; and inverse-transforming inverse-quantized transformation coefficients of the N×N block by using an N×N inverse transformation matrix constituting an inverse matrix of the substituted N×N transformation matrix, which is substituted with the values based on the obtained N variables.

38. An apparatus for inverse-transforming an image, the apparatus comprising:

an inverse-transformer which performs a 1-dimensional (1D) discrete cosine inverse transform on any one of a row unit and a column unit of an N×N block to be decoded based on a changed butterfly structure obtained by substituting a trigonometrical function component from among multiplication factors of a butterfly structure with a rational number and replacing 4 multiplication operation and 2 addition operation processes of the butterfly structure with 3 multiplication operation and 3 addition operation processes, wherein N is an integer.

39. A non-transitory computer readable recording medium having recorded thereon a program executable by a computer for performing the method of claim 1.

40. A non-transitory computer readable recording medium having recorded thereon a program executable by a computer for performing the method of claim 12.

41. A non-transitory computer readable recording medium having recorded thereon a program executable by a computer for performing the method of claim 20.

42. A non-transitory computer readable recording medium having recorded thereon a program executable by a computer for performing the method of claim 31.

* * * * *